(12) United States Patent
Suzuki et al.

(10) Patent No.: US 7,408,657 B2
(45) Date of Patent: Aug. 5, 2008

(54) IMAGE INPUT AND OUTPUT SYSTEM, METHOD AND RECORDING MEDIUM HAVING A COMMON INITIATION PORTION

(75) Inventors: Takanobu Suzuki, Kawasaki (JP); Toshihide Yoshimura, Kawasaki (JP); Hiromi Ohara, Kawasaki (JP); Masahiro Machida, Ebina (JP); Kanji Itaki, Yokohama (JP); Shigeki Ishino, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 917 days.

(21) Appl. No.: 09/954,299

(22) Filed: Sep. 18, 2001

(65) Prior Publication Data

US 2002/0041386 A1    Apr. 11, 2002

(30) Foreign Application Priority Data

| Sep. 19, 2000 | (JP) | ............................. 2000-284295 |
| Sep. 19, 2000 | (JP) | ............................. 2000-284296 |
| Sep. 19, 2000 | (JP) | ............................. 2000-284297 |
| Sep. 19, 2000 | (JP) | ............................. 2000-284298 |
| Sep. 19, 2000 | (JP) | ............................. 2000-284299 |
| Sep. 19, 2000 | (JP) | ............................. 2000-284303 |
| Sep. 19, 2000 | (JP) | ............................. 2000-284305 |
| Sep. 19, 2000 | (JP) | ............................. 2000-284307 |
| Jun. 29, 2001 | (JP) | ............................. 2001-198738 |
| Jun. 29, 2001 | (JP) | ............................. 2001-198739 |
| Jun. 29, 2001 | (JP) | ............................. 2001-198740 |
| Jun. 29, 2001 | (JP) | ............................. 2001-199173 |
| Jun. 29, 2001 | (JP) | ............................. 2001-199174 |
| Jun. 29, 2001 | (JP) | ............................. 2001-199747 |
| Jun. 29, 2001 | (JP) | ............................. 2001-199748 |
| Jun. 29, 2001 | (JP) | ............................. 2001-200083 |

(51) Int. Cl.
*G06F 3/12* (2006.01)
*G06F 13/14* (2006.01)
*G06F 15/173* (2006.01)
*H04N 1/333* (2006.01)
*H04N 1/42* (2006.01)
*H04N 1/32* (2006.01)

(52) U.S. Cl. ..................... 358/1.13; 358/1.15; 358/434; 358/435; 358/436; 358/442; 358/468

(58) Field of Classification Search .................. None
See application file for complete search history.

(56) References Cited

U.S. PATENT DOCUMENTS 5,450,571 A * 9/1995 Rosekrans et al. ............ 703/24

(Continued)

FOREIGN PATENT DOCUMENTS

JP    A 07-264377    10/1995

(Continued)

*Primary Examiner*—Myles D Robinson
(74) *Attorney, Agent, or Firm*—Oliff & Berridge, PLC

(57) ABSTRACT

An image input and output system is provided in which a common operation screen for a plurality of image output devices having different attributes is displayed. Based on attribute information of each of printers, the server generates a signal for generating an operation screen, and transmits the signal to the scanner. At the scanner, image data is inputted, and a common operation screen, which is generated based on the signal for generating the operation screen, is displayed on a display panel. When information designating the printer and information relating to an output format of an image is inputted from the display panel, the inputted information and the image data are transmitted to the server. The server transmits, to a designated printer, the image data and the information relating to the output format of the image, which are transmitted from the scanner, and images are outputted.

28 Claims, 62 Drawing Sheets

U.S. PATENT DOCUMENTS

| | | | |
|---|---|---|---|
| 5,933,582 A | 8/1999 | Yamada | |
| 6,166,826 A * | 12/2000 | Yokoyama | 358/1.16 |
| 6,415,278 B1 * | 7/2002 | Sweet et al. | 707/2 |
| 6,567,176 B1 | 5/2003 | Jeyachandran et al. | |
| 6,965,450 B2 * | 11/2005 | Sweetland et al. | 358/1.18 |
| 2001/0052995 A1 * | 12/2001 | Idehara | 358/1.15 |
| 2002/0030840 A1 * | 3/2002 | Itaki et al. | 358/1.13 |
| 2002/0163666 A1 * | 11/2002 | Iwata et al. | 358/1.15 |

FOREIGN PATENT DOCUMENTS

| | | |
|---|---|---|
| JP | A-8-289067 | 11/1996 |
| JP | A-8-293955 | 11/1996 |
| JP | A-09-179704 | 7/1997 |
| JP | A-09-319533 | 12/1997 |
| JP | A 10-042090 | 2/1998 |
| JP | A-10-254652 | 9/1998 |
| JP | A-10-290320 | 10/1998 |
| JP | A-11-234454 | 8/1999 |
| JP | A-11-289416 | 10/1999 |
| JP | A-11-331446 | 11/1999 |
| JP | A-2000-047771 | 2/2000 |
| JP | A 2000-047771 | 2/2000 |
| JP | A 2000-151756 | 5/2000 |
| JP | A-2000-200226 | 7/2000 |
| JP | A-2000-216944 | 8/2000 |
| JP | A-2000-270148 | 9/2000 |
| JP | A-2001-77959 | 3/2001 |

* cited by examiner

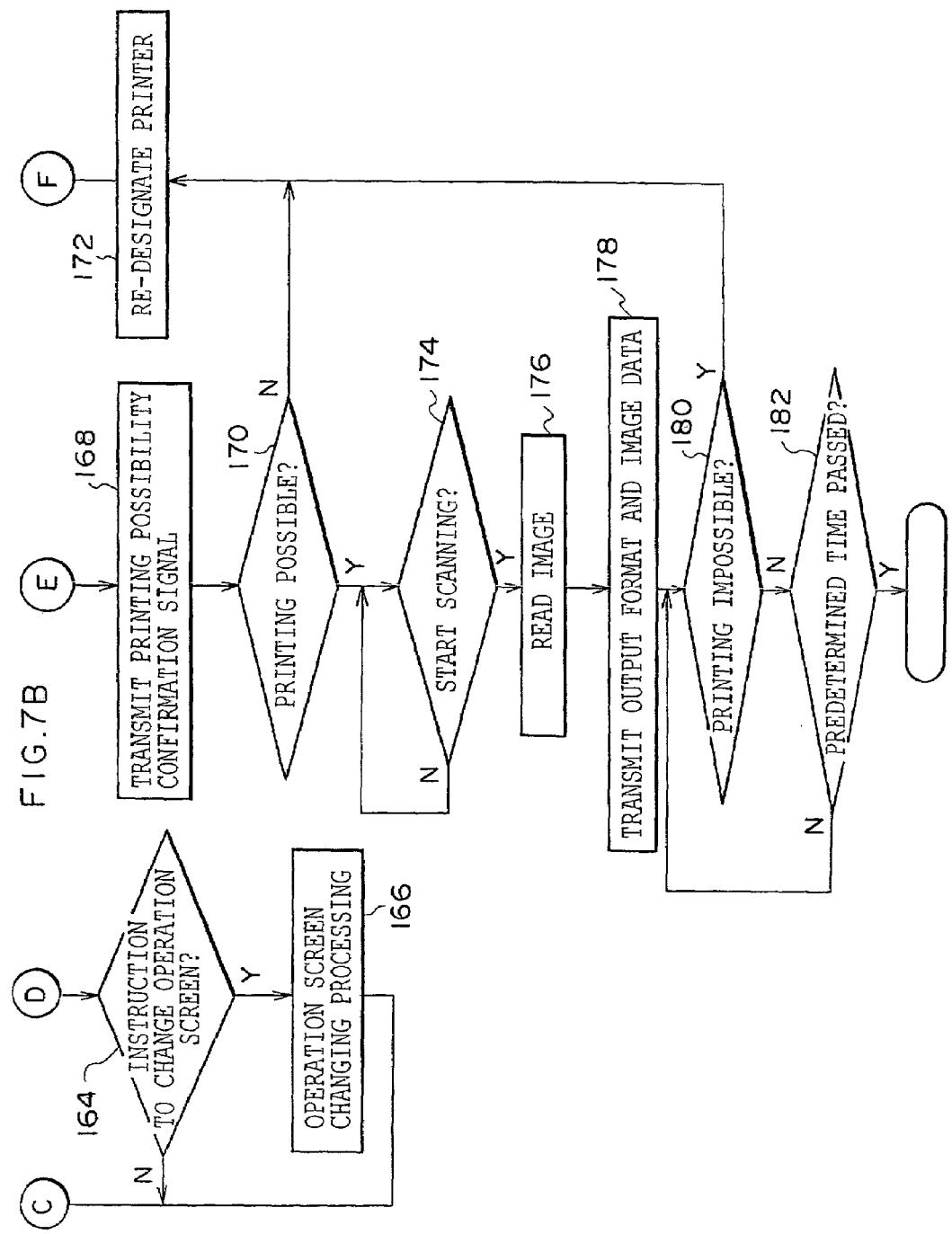

FIG. 8

Welcome to DOMS!

PLEASE WAIT...

FIG. 11

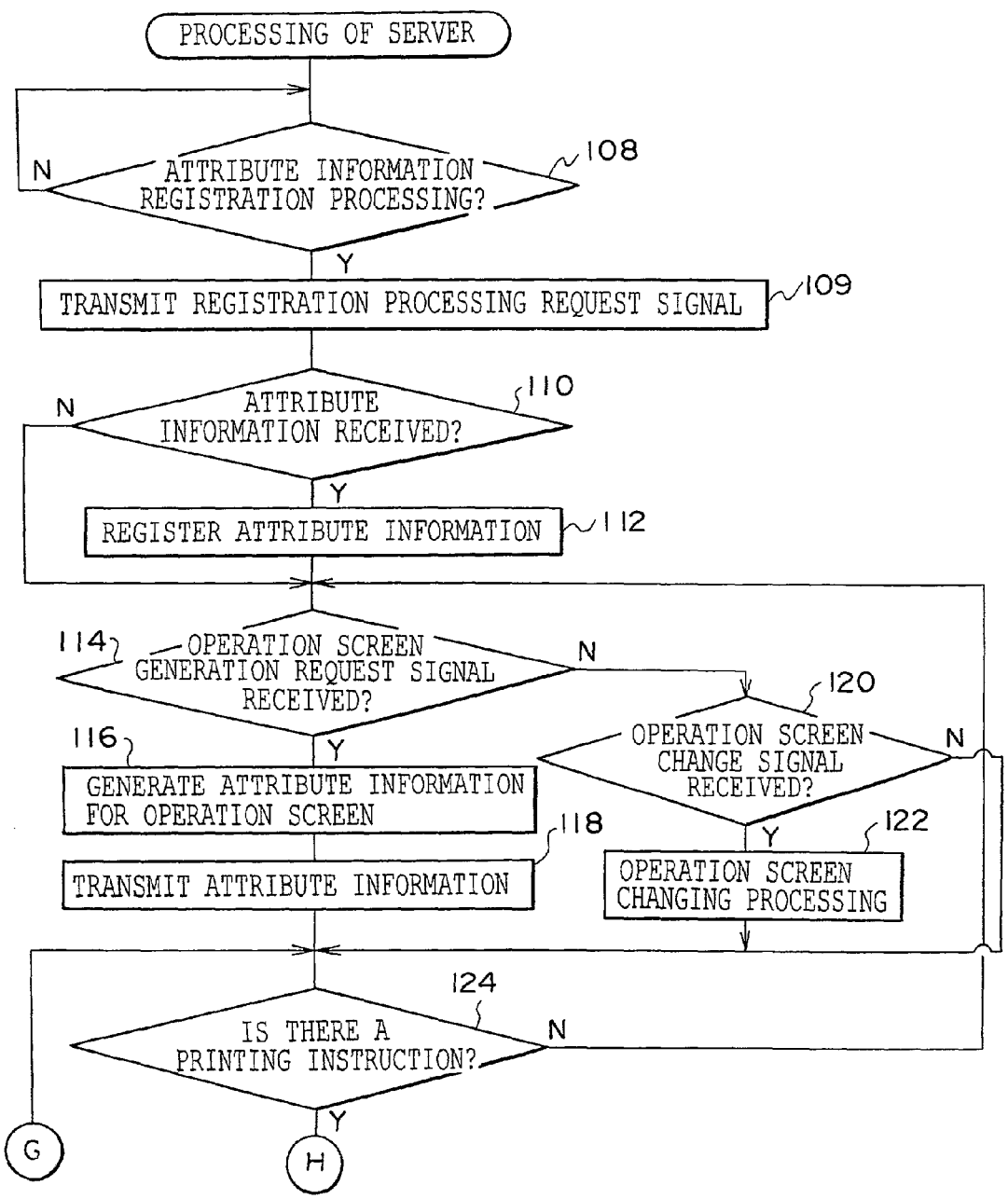

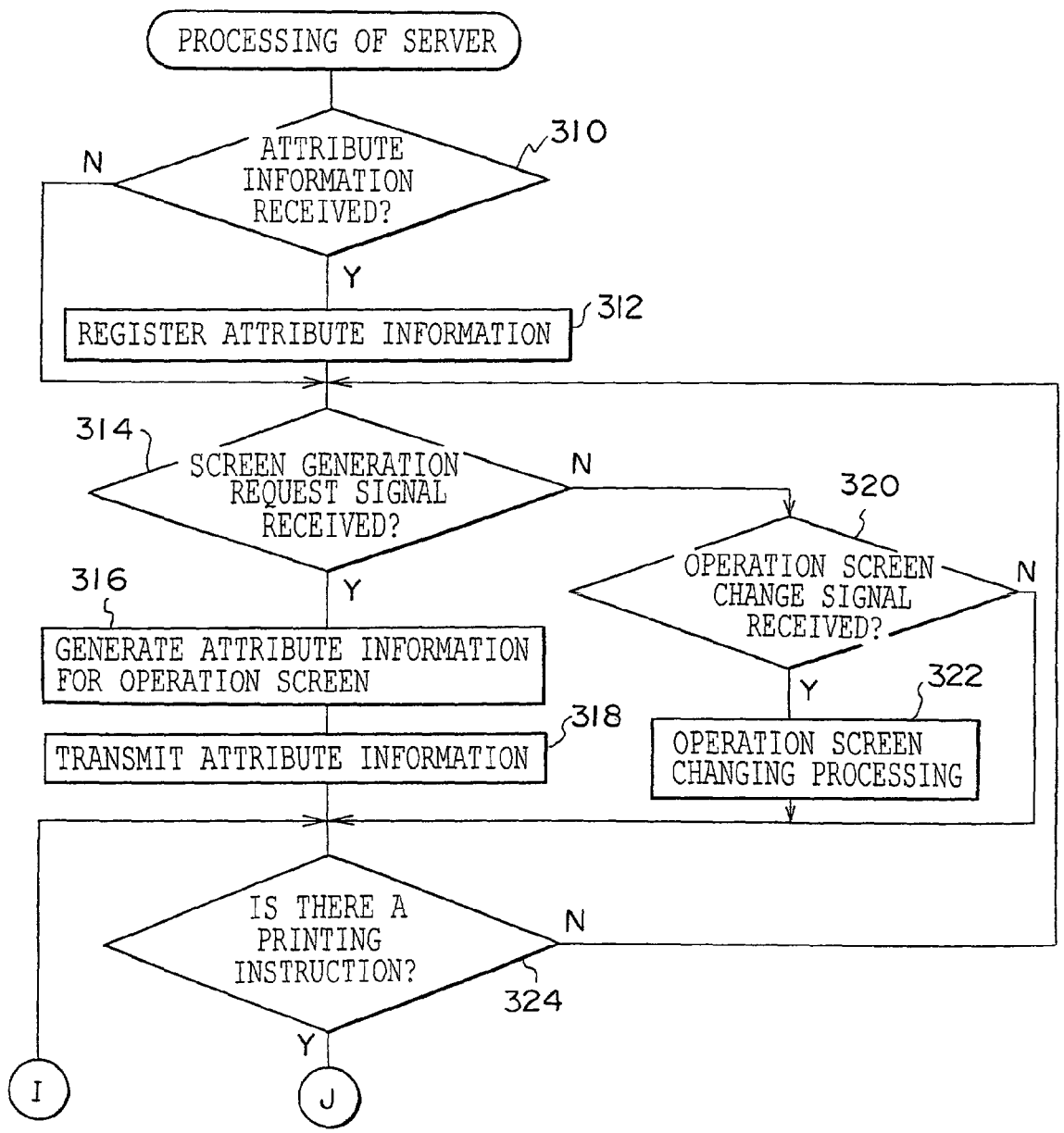

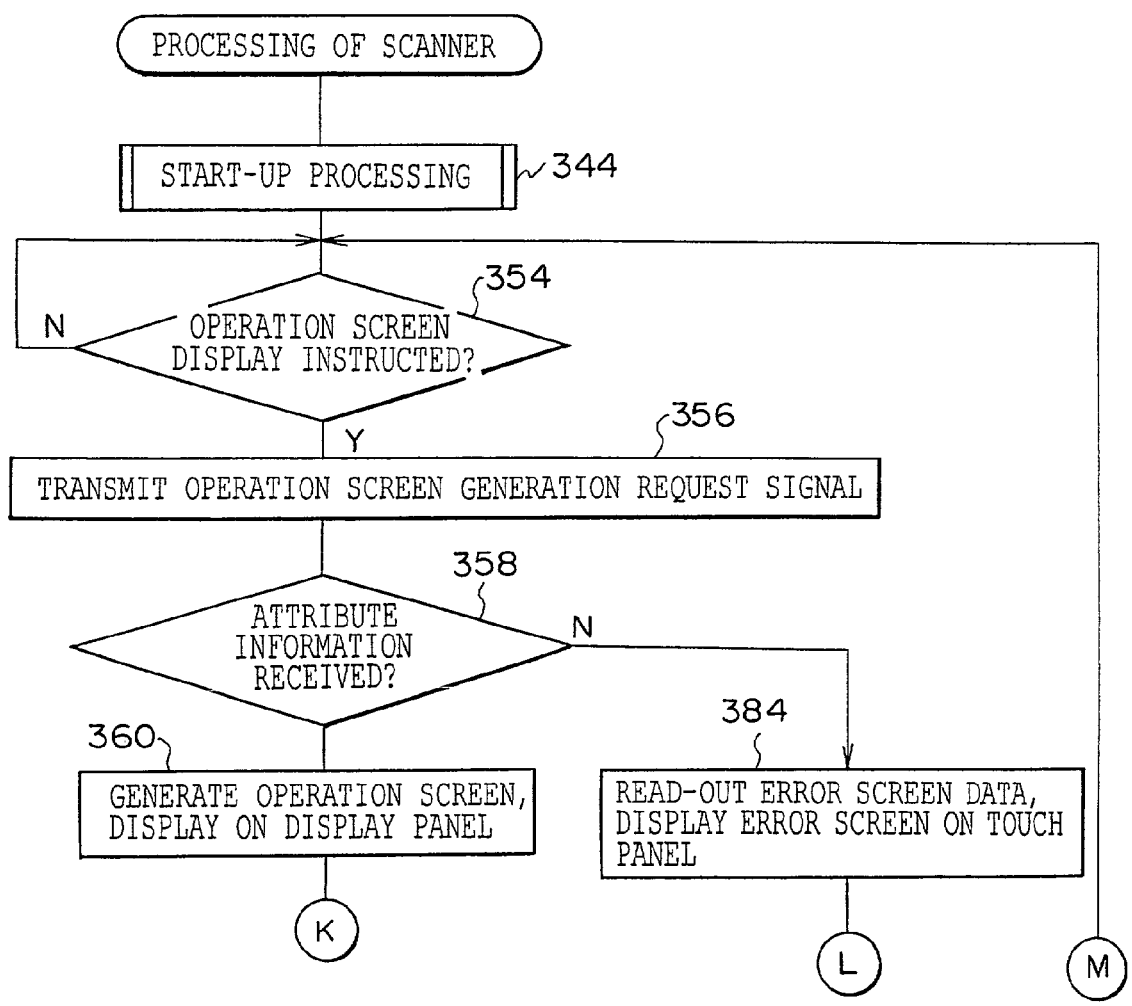

FIG. 17

| AN ERROR HAS OCCURRED. |
|---|
| ERROR TITLE |
| TURN POWER OFF, AND THEN ON AGAIN. IF PROBLEM REMAINS, CONTACT TELEPHONE CENTER. |

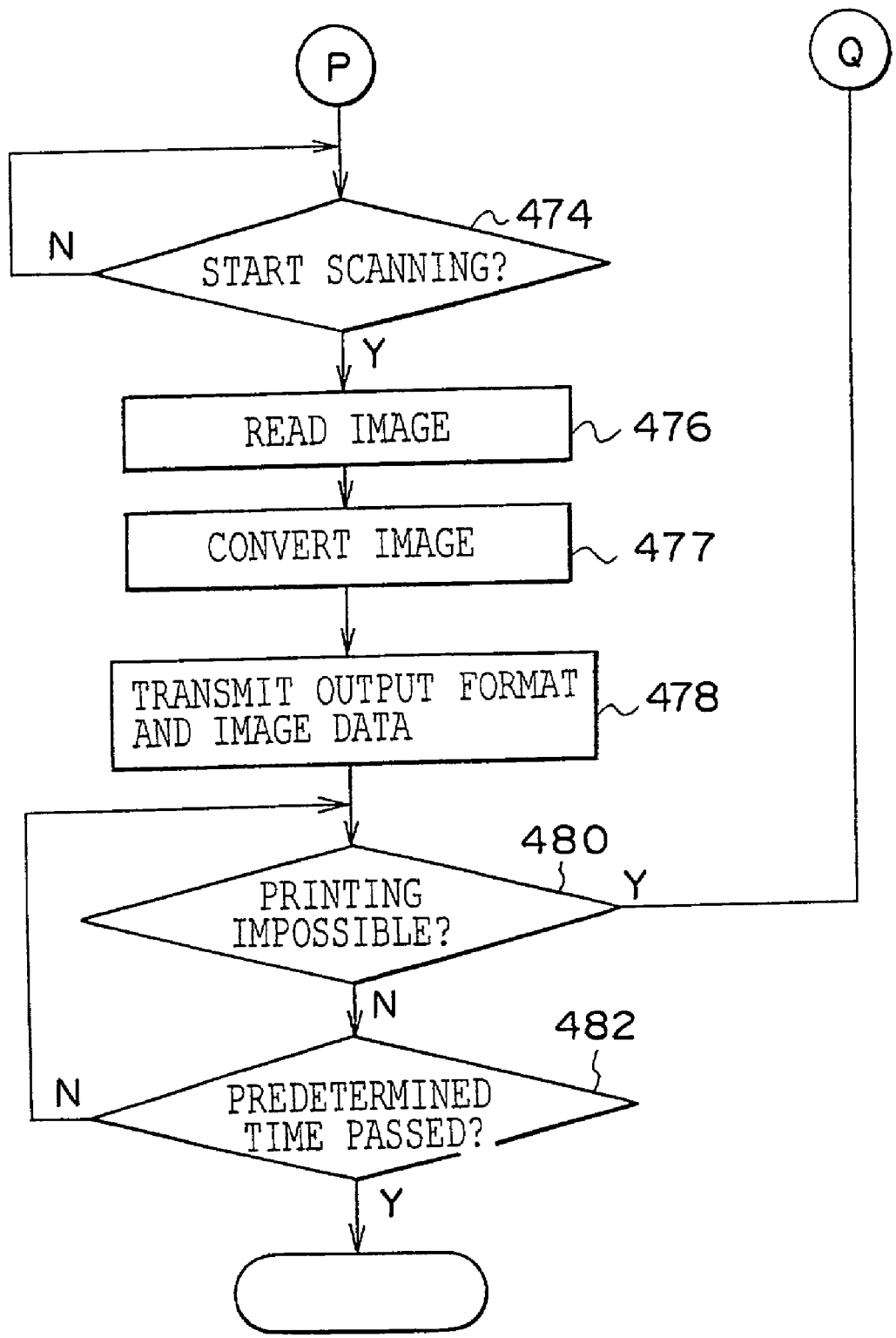

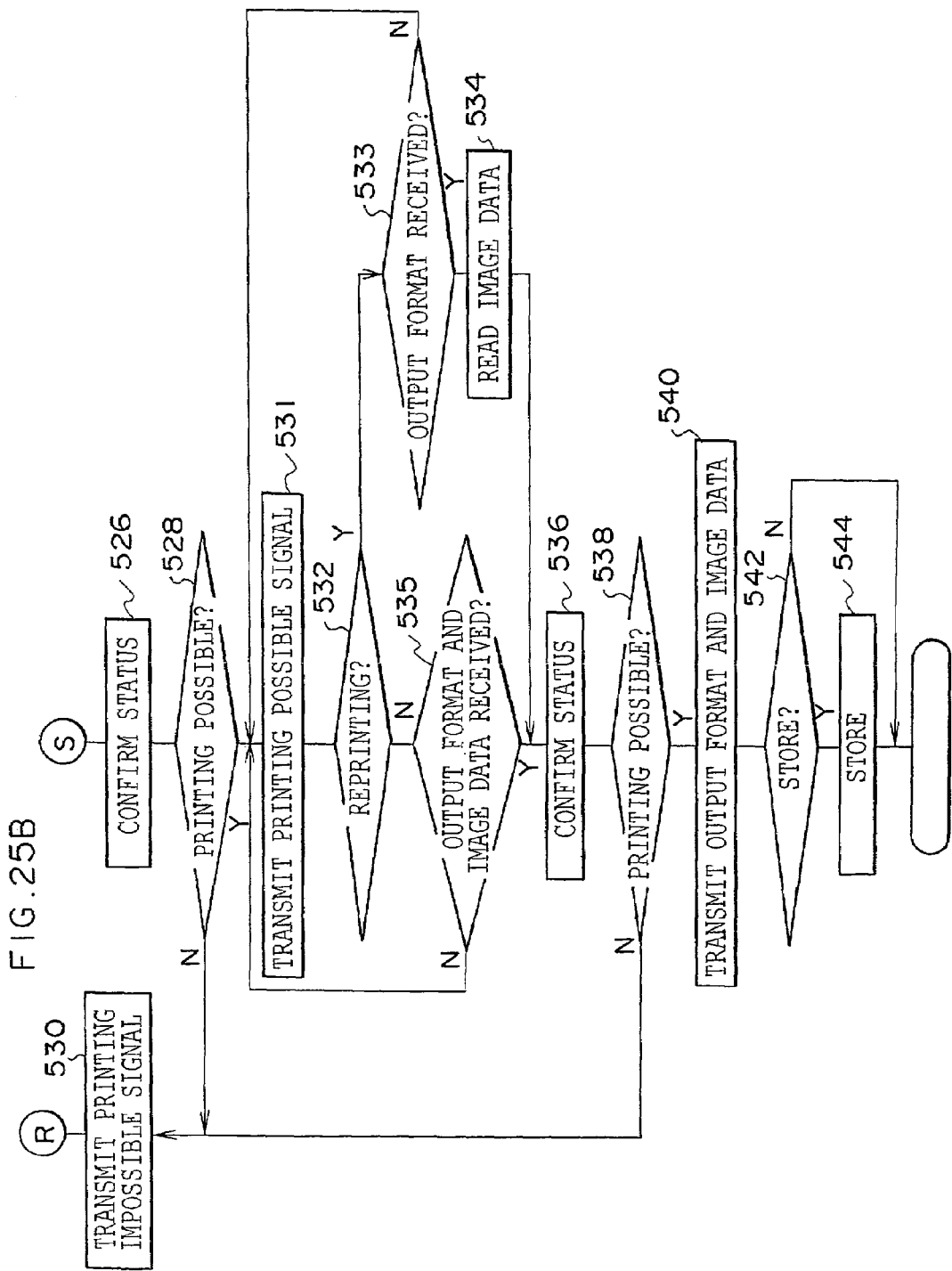

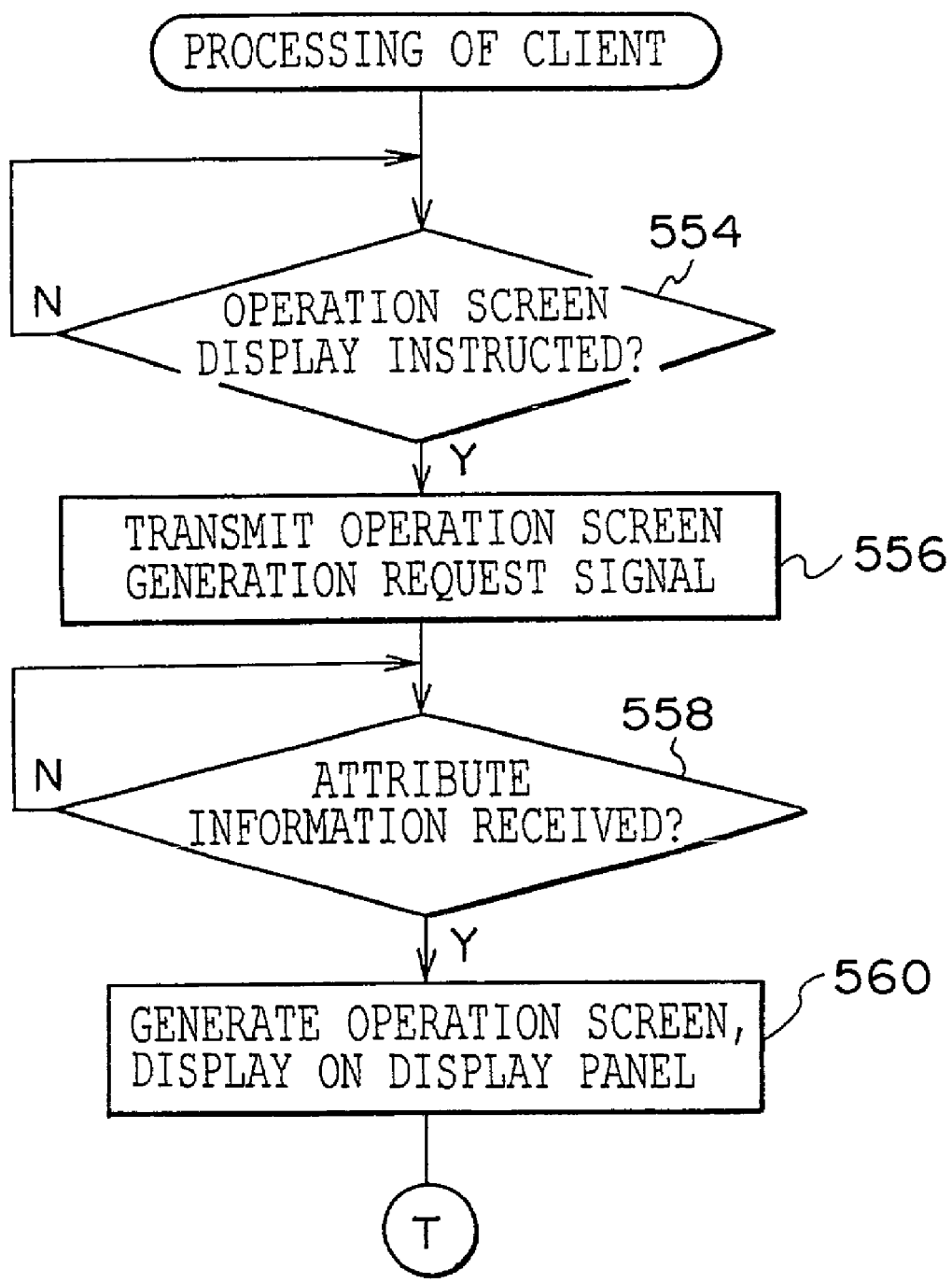

FIG. 31 5036

FILE (F)  EDIT (E)

SITE: ▼

CREATION OF NEW JOB TEMPLATE

<PREVIOUS    NEXT>    CANCEL    RESET

JOB TEMPLATE NAME:
JOB TEMPLATE DESCRIPTION: TEMPLATE FOR ORDINARY USE

COPY OUTPUT:           YES
OUTPUT METHOD:         OUTPUT EQUALLY
OUTPUTTING COPIERS:    COPY GROUP 1

STORE FILE FOR COPYING: YES
STORAGE DESTINATION:

| BASIC COPYING | APPLIED COPYING | IMAGE QUALITY ADJUSTMENT | JOB EDITING |

COPY POSITION / BINDING MARGIN

☑ FRONT SURFACE
DESIGNATE MOVEMENT ▼
  ● MOVE LEFT  ○ MOVE RIGHT  (0~50) [0] mm
  ● MOVE UP    ○ MOVE DOWN   [0] mm

☑ REVERSE SURFACE
DESIGNATE MOVEMENT ▼
  ● MOVE LEFT  ○ MOVE RIGHT  (0~50) [0] mm
  ● MOVE UP    ○ MOVE DOWN   [0] mm

PLACE TOGETHER ON ONE SHEET (N UP)
TWO UP ▼
  ● [1 2] [2 1]   ○ [1 2] [1 2]

DELETE FRAME
☑ YES
  DELETE TOP AND BOTTOM     (0~50) [0] mm
  DELETE LEFT AND RIGHT     [0] mm
  DELETE CENTER             [0] mm

ORIGINAL SIZE INPUT
  ○ STANDARD SIZE   ● ARBITRARY SIZE
  F× DIRECTION (0~432)   [210] mm
  F× DIRECTION (10~432)  [297] mm

DESIGNATION OF SET ORIENTATION OF ORIGINAL
  ○ ORIENTATION WHICH CAN BE READ   ● ORIENTED LEFT
  [F]   [L]

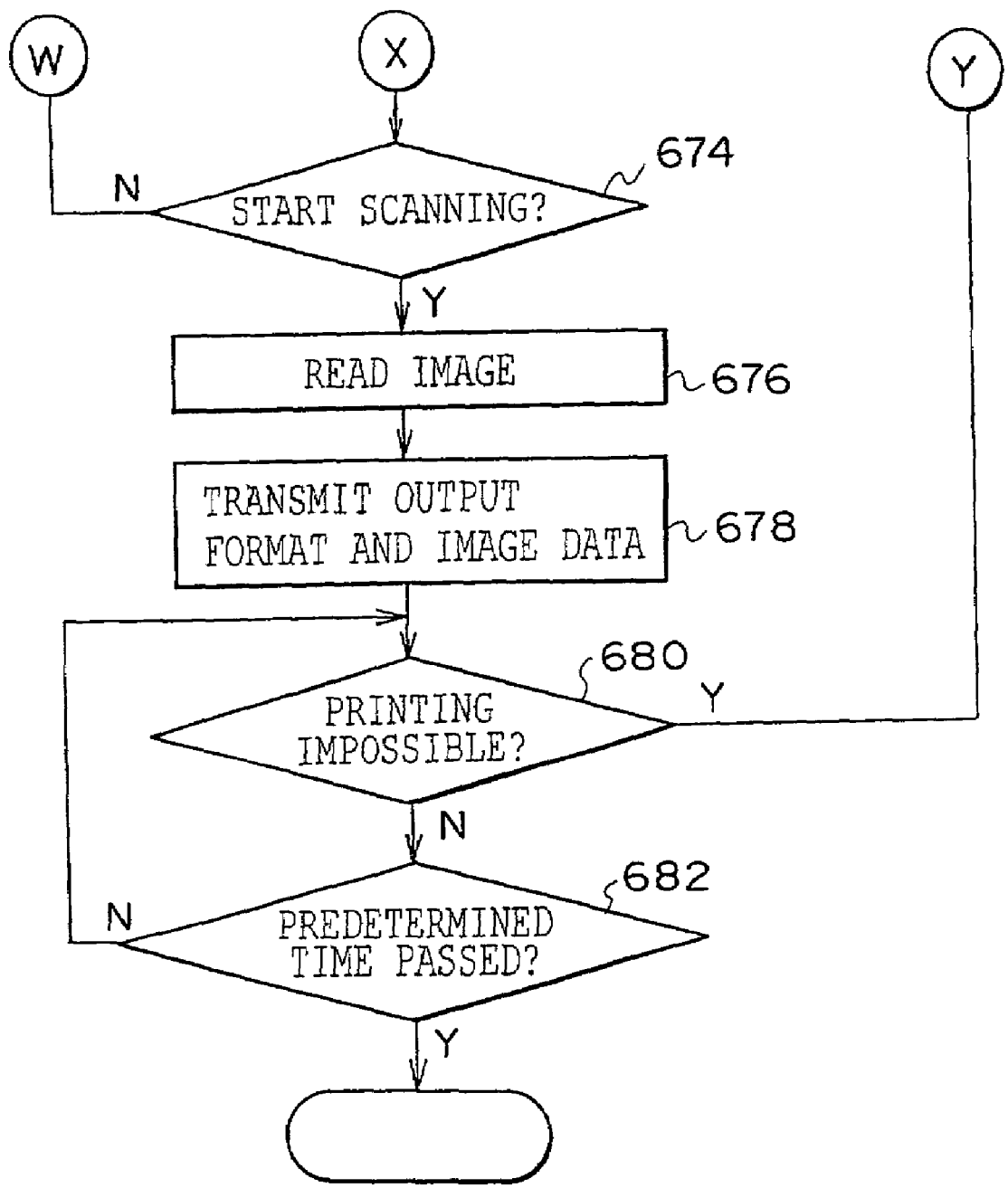

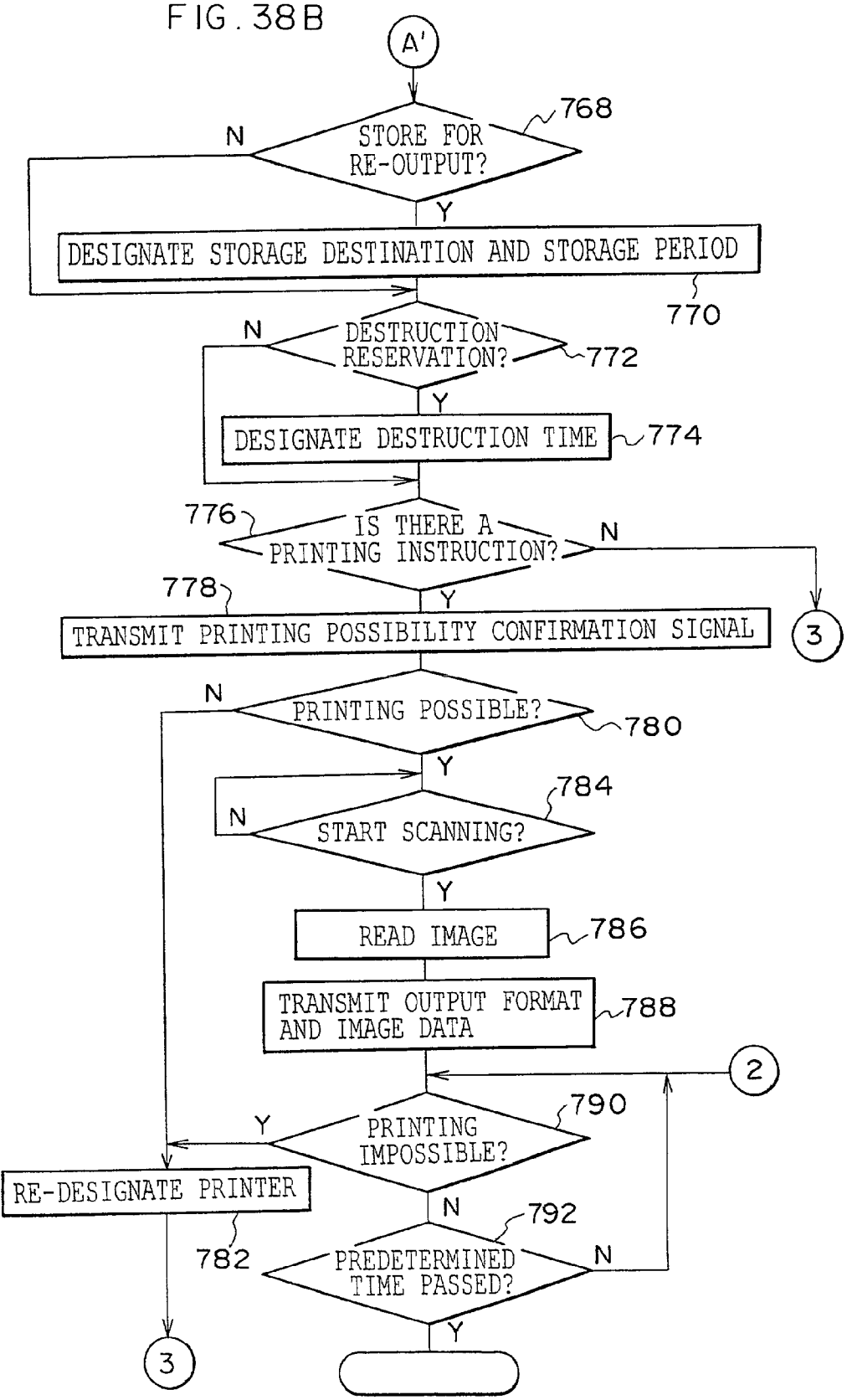

FIG. 42

COPYING IS POSSIBLE.

JOB DESTRUCTION RESERVATION  CANCEL  OK ~7312

| DESTRUCTION TIME | START TIME | |
|---|---|---|
| ☐ TODAY | ▨ AM | ☐ PM |
| ☐ 1 DAY LATER | | |
| ☐ 2 DAYS LATER | ☐ 0:00 | ☐ 6:00 |
| ☐ 3 DAYS LATER | ☐ 1:00 | ☐ 7:00 |
| ☐ 4 DAYS LATER | ▨ 2:00 | ☐ 8:00 |
| ☐ 5 DAYS LATER | ☐ 3:00 | ☐ 9:00 |
| ☐ 6 DAYS LATER | ☐ 4:00 | ☐ 10:00 |
| ▨ 7 DAYS LATER | ☐ 5:00 | ☐ 11:00 |

☐ NO
▨ YES

~7310

▨ 0 MINUTES
☐ 10 MINUTES
☐ 20 MINUTES
☐ 30 MINUTES
☐ 40 MINUTES
☐ 50 MINUTES

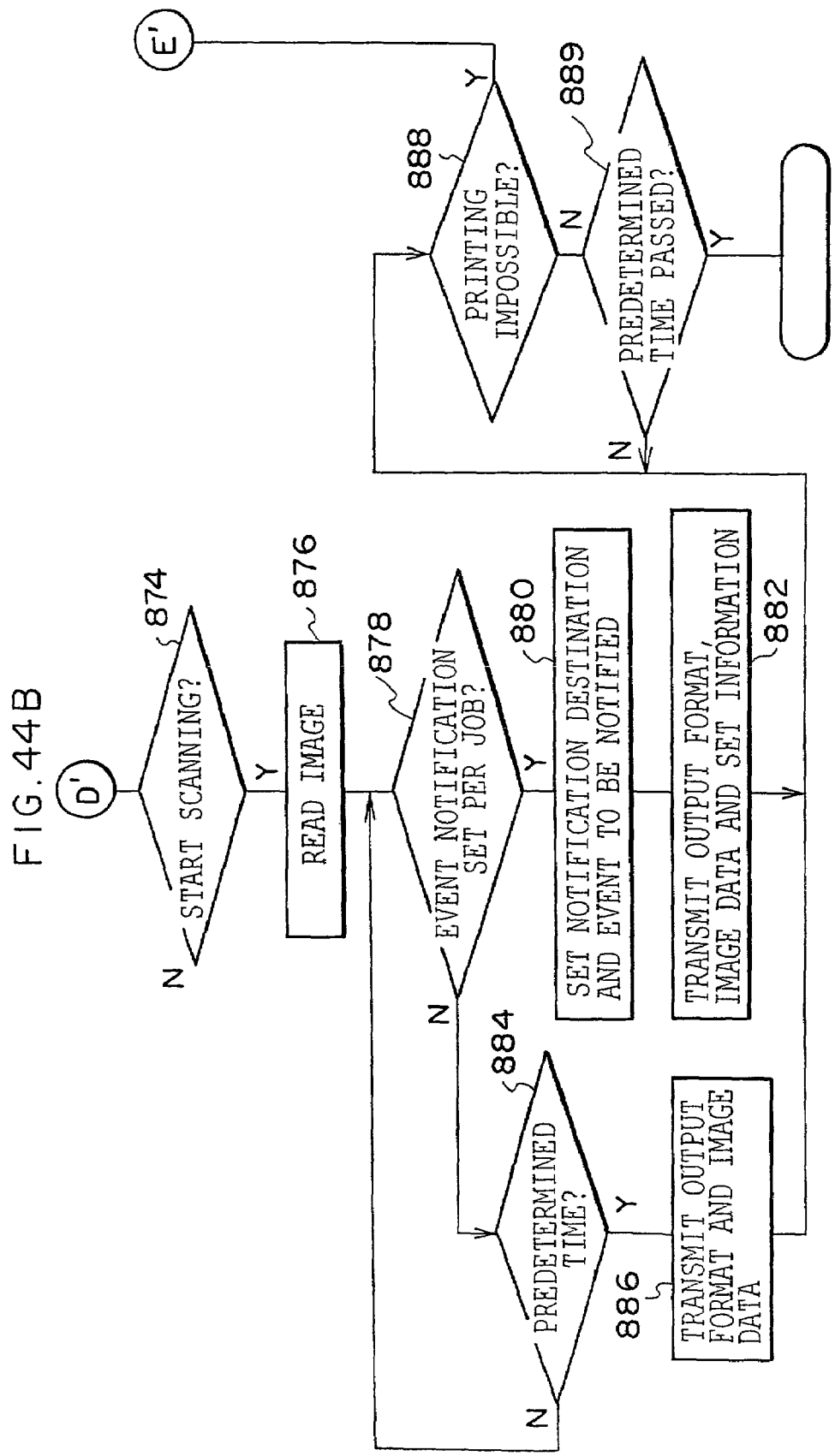

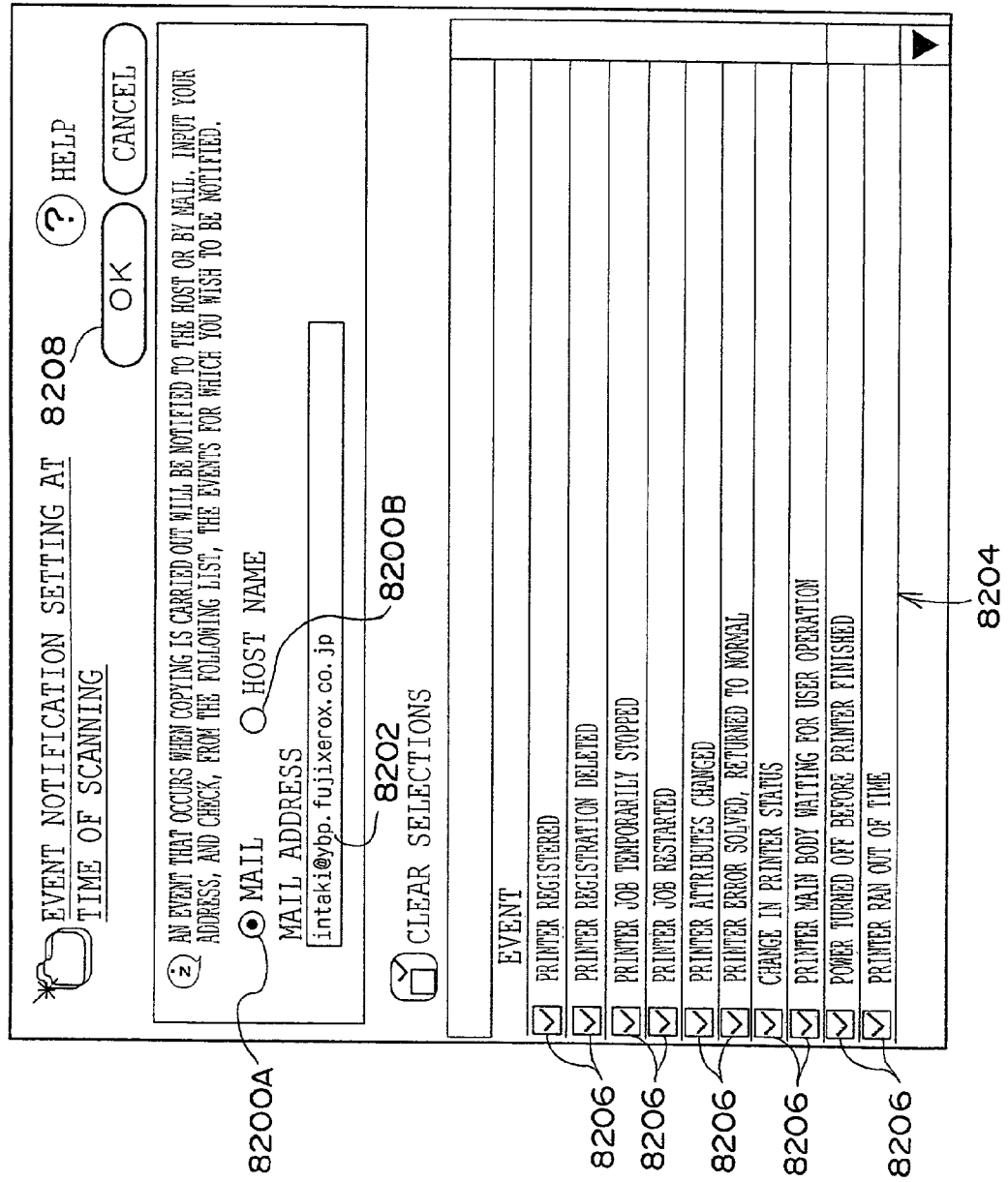

IMAGE INPUT AND OUTPUT SYSTEM, METHOD AND RECORDING MEDIUM HAVING A COMMON INITIATION PORTION

BACKGROUND OF THE INVENTION

1. Field of the Invention

The present invention relates to an image input and output device, method and recording medium. In particular, the present invention relates to an image input device, an input control device, an image output management device, an image output system, a display control device, an image management device, a management device, a program, a recording medium, an operation screen display controlling method, a job managing method, and an event notifying method. In particular, the present invention relates to an image output system provided with a plurality of printers, a scanner which reads an original, and a printer server which are all connected to a network, and relates to an image output management device which is applicable to the image output system, an image input device which is applicable to the image output system, an input control device which is applicable to the image output system, a display control device which is applicable to the image output system, an image input device which is applicable to the image output system, an image management device which is applicable to the image output system, a management device which is applicable to the image output system, a program which is applicable to the image output system, a recording medium on which the program is recorded, an operation screen display controlling method which is applicable to the image output system, a job managing method which is applicable to the image output system, and an event notifying method which is applicable to the image output system.

2. Description of the Related Art

In a conventional copier, an image of an original set on an original stand is read by a CCD (Charge Coupled Device), and a latent image is recorded on a photosensitive drum by using a semiconductor laser. By using an electrophotographic process, the latent image on the photosensitive drum is developed, and is transferred onto a sheet, and an image is thereby outputted. The copier is provided with, as a user interface, a compact display panel which is formed by a touch panel being superposed on a display panel formed from a liquid crystal display board. Thus, there are limits to the amount of information which can be displayed at the same time on the display panel, and the density of the information which can be set.

On the other hand, in the case of forming a network printer by connecting a plurality of printers to a network such that images can be outputted from the respective printers, the network printer is formed from a scanner which is a reading device for reading an original, and a printer server which appropriately processes image data received from the scanner and transmits the processed image data to a designated printer. Usually, one scanner is connected to the network, and the scanner has functions which are similar to the image reading functions of a copier which is used alone. In order to carry out output efficiently, a display panel, which is similar to a display panel which serves as a user interface and is provided at a copier, is provided at the scanner. From this display panel, the printer to output the image is designated, and the output format can be designated. However, with display panels provided at current scanners, there are limits on the amount of information which can be displayed at the same time and on the density of information which can be set. Even if a display panel for a copier which is used alone is applied as is to a scanner, such a structure is not efficient in a case in which a network printer is formed.

Generally, various types of printers having different attributes, such as models, functions, manufacturers, network addresses, and the like, are connected to a network. When giving various types of printers, which have different attributes, different output instructions from specific locations, output must be carried out even more efficiently. However, in order to realize such a system, operation screens corresponding to various types of printers must be displayed on the display panel. As the number of types of printers increases, the number of types of operation screens increases. Thus, a problem arises in that it becomes difficult to efficiently operate the operation screens.

Further, in order to enable the operation screen displayed on the display panel to be used in common, connecting the same type of printers to the network has been contemplated. However, even if printers produced by the same manufacturer are connected to the network, in order to handle various types of desired outputs, black-and-white printers, color printers, and printers having different resolutions must be connected, and it is difficult to have the operation screen be able to be used in common.

Moreover, for example, in cases such as when output is carried out at a color printer on the basis of image data which was read by a scanner for outputting at a black-and-white printer, or when output is carried out at a high resolution printer on the basis of image data which was read by a scanner for outputting at a low resolution printer, a good image cannot be obtained. Thus, when designating outputting at plural printers having, as attributes, different functions, such as a black-and-white printer and a color printer, or printers having different resolutions or the like, the image data must be read by the scanner several times in accordance with the functions of the respective printers.

In such a print system, a set-up has been contemplated in which a display panel, which is similar to a display panel which serves as a user interface and is provided at a copier which is used alone, is provided at a scanner. Various types of operation screens are displayed at the display panel, and the output destination of the image is designated from the image data input side. The output destination is designated from the image data input side, and the image data is transmitted to the server, and this information is registered as a job in the server. At the server, in accordance with the registered job, one or plural output destination devices are selected. The selected devices are operated on the basis of the image data, and images are outputted.

Thus, at the server, data for an operation screen, at which information designating the output destination device, information relating to the printing format of the image, and the like are inputted, is generated and is transmitted to the scanner. By displaying the operation screen on the display panel or the like provided at the scanner, input of various types of instructions from the user (information designating the output destination, information relating to the printing format, and the like) are received.

However, generally, the data for the operation screen includes picture image having a large data amount, such as icons or the like, and time is required to transmit the data from the server. Thus, a problem arises in that, at the scanner, a long time is required to display the operation screen which is the user interface.

Further, if the server is down, data for the operation screen cannot be received from the server. Thus, there is a problem in that the operation screen cannot be displayed on the display panel of the scanner, and the scanner cannot be operated. In particular, when the server is down, not only is use of the scanner not possible even if there are no abnormalities at the scanner, but also, it cannot be learned whether the cause of the inability to use the scanner lies with the scanner or the server.

Further, in such a system, the file format of the image read at the scanner or the like is usually a fixed format which is determined in advance, and generally, the format is designated at the time of downloading at the image receiving side.

Moreover, in such a system, a structure is possible in which the image read at the scanner is held in the printer server, and later, the held image can be designated and reprinted.

However, for example, if a scanner image read for a color printer is, at the time of reprinting, printed at a black-and-white printer, the image quality deteriorates due to the conversion from a multivalue image to a binary image. Further, for example, in a case in which the same scan image is reprinted at plural printers having different writing techniques, the image quality differs. Moreover, when image data read for a black-and-white printer is enlarged or reduced at the time of reprinting, moire or the like may occur and the image may be disturbed.

In addition, in such a system, even in cases in which an operation screen is used in common and various types of printers can be operated from a single scanner, it is preferable to be able to operate each printer independently, and to be able to use the respective printers efficiently.

Also, in such a print system, the output destination and the output format of the image are designated and the image data is transmitted from the scanner to the server. This information is registered in the server as a job. At the server, the registered job is transmitted to the one or plural printers which are designated as output destinations. The printer is operated on the basis of the image data and the output format, and is made to output the image. Further, it is possible to provide a function such that a job of image data, for which output is completed, can be stored as a job for re-output, and an image based on this image data can be re-outputted.

At this time, if it is set to erase a job after output of the image has been completed, a problem arises in that even in a case of a job for which output of the image is unnecessary if the image is not outputted by a predetermined time, the image is outputted after the predetermined time has passed because the job remains registered if the image is not outputted. In order to prevent output of the mage by unnecessary job, the operator must search for the unnecessary job from among the registered jobs and erase the unnecessary job. Not only is effort required, but also, there is the possibility that the operator may mistakenly delete a necessary job.

Further, when a re-output function is provided, because memory resources are limited, jobs for re-output, which have become old and are no longer needed, must be erased from the memory. However, the needed time period differs for each job. Thus, the operator must search for an unnecessary job from among the jobs stored for re-output, and erase the unnecessary job. Not only is effort required, but also, there is the possibility that the operator may mistakenly delete a necessary job for re-output.

Further, in the print system, if, in the above-described series of operations, some type of event occurs (e.g., a job is completed at the printer, or an error arises, or the like), at the print system, a message is displayed on the display panel of the scanner so as to notify the operator of this fact.

However, after the operator has completed the work of inputting information or the like at the scanner, the operator usually moves away from the location of the scanner before completion of output of the image and after a predetermined period of time has passed from the input work at the scanner. For example, the operator may return to his or her seat, or walk to the printer which is the output destination in order to pick up the outputted image, or the like. A problem arises in that the operator cannot be notified of the occurrence of an event.

SUMMARY OF THE INVENTION

The present invention was developed in order to overcome the above-described problems, and an object of the present invention is to provide an image input device, an input control device, an image output management device, an image output system, a program, and a recording medium which display a common operation screen for a plurality of image output devices, which enable the operation screen to be operated efficiently, and which can carry out output from a plurality of image output devices on the basis of image data which is inputted by a single operation.

Another object of the present invention is to provide an input control device, an image input device, an image output management device, an image output system, a program, and a recording medium which display a common operation screen for a plurality of image output devices and which enable the operation screen to be operated efficiently.

Yet another object of the present invention is to provide display control device, an image output system, an image output management device, an image input device, and an operation screen display controlling method in which time required for display of an operation screen can be shortened. Further, in addition to this object, another object is to operate an image input device regardless of the state of an image management output device.

Still another object of the present invention is to provide an image input device and image output system which can designate an output format of an image at the time of input of the image.

A further object of the present invention is to provide an image management device, an image output system, a medium, and a program at which a deterioration in image quality at the time of reprinting can be prevented.

A still further object of the present invention is to provide an input control device, an image management device, an image output system, a medium, and a program which display a common operation screen for image output devices having different attributes, and which enable the operation screen to be operated efficiently, and which enable respective printers to be used effectively.

Yet another object of the present invention is to provide an image output system, an image input device, a management device, and a job managing method which can easily and accurately delete unnecessary jobs.

Still yet another object of the present invention is to provide an image output system, a management device, and an event notifying method by which an operator can be reliably notified of the occurrence of an event.

In order to achieve the above-described objects, a first aspect of the present invention is an input control device comprising: an information input device at which is displayed an operation screen generated on the basis of information for generating an operation screen, and which is for input, from the operation screen which is displayed, of information which designates image output devices which are to output images, and information which relates to output formats of images to be outputted from designated image output devices; and a transmitting and receiving device which transmits the information which designates image output devices and the information which relates to output formats of images to be outputted, which are inputted from the information input device, and image data inputted from an image data input device, and which receives the information for generating the operation screen.

A second aspect of the present invention is an image input device used in an image output system which includes: a plurality of image output devices which are respectively connected to a network, and which output images on the basis of image data and information relating to output formats of images, which image data and information are transmitted via the network; and an image output management device which is connected to the network, and which, on the basis of attribute information of each of the plurality of image output devices, generates and transmits a signal for generating an operation screen, and which outputs, to designated image output devices, transmitted information relating to the output formats of the images and transmitted image data, wherein the image input device comprises: an image data input device for input of the image data; a display-and-input device at which is displayed the operation screen generated on the basis of the signal for generating the operation screen, and which is for input, from the operation screen which is displayed, of information which designates image output devices which are to output the images, and information which relates to output formats of the images to be outputted from the designated image output devices; and a transmitting and receiving device which is connected to the network, and which transmits, to the image output management device via the network, the information which designates image output devices and the information which relates to output formats of images to be outputted, which are inputted from the display-and-input device, and the image data inputted from the image data input device, and which receives, via the network, the signal for generating the operation screen.

In the above described image input device, the display-and-input device can display the operation screen which is for input of the information which designates the plurality of image output devices. Also, the plurality of image output devices are designated by designating a group which is in advance registered and which includes the plurality of image output devices.

A third aspect of the present invention is an image output management device connected to a network to which a plurality of image output devices are connected, wherein, on the basis of attribute information of each of the plurality of image output devices, the image output management device generates and transmits information, which is for generating an operation screen at which is inputted information, which designates image output devices which are to output images, and information, which relates to output formats of images to be outputted from the image output devices which are designated; the image output management device receives the information which designates the image output devices and the information which relates to the output formats of the images, which information are inputted from the operation screen generated on the basis of the information for generating the operation screen; and the image output management device transmits, to the image output devices designated from the operation screen, the received information which relates to the output formats of the images and image data.

In the image output management device described above, the display-and-input device is provided at at least one of the plurality of image output devices, or is provided at the image output management device, or is connected via the network, the display-and-input device displaying the operation screen which is generated on the basis of the information for generating the operation screen, and enabling receiving the information which designates the image output devices and the information which relates to the output formats of the images from the operation screen which is displayed. Namely, the display-and-input device is provided at the image output device so as to structure a multifunction device. Or, a personal computer connected to the network is used as the display-and-input device.

A fourth aspect of the present invention is an image output management device which is connected to a network to which at least one of: a plurality of image output devices, and an image data input device for input of image data, is connected, wherein the image output management device generates and transmits, via the network, a signal for generating an operation screen at which information for operating devices connected to the network is inputted; the image output management device receives, via the network, the information inputted from the operation screen generated on the basis of the signal; and the image output management device transmits, to the devices connected to the network, received information in order to operate the devices connected to the network.

A fifth aspect of the present invention is an image output management device used in an image output system including: a plurality of image output devices which are respectively connected to a network, and which output images on the basis of image data and information relating to output formats of images, which image data and information are transmitted via the network; an image data input device for input of the image data; a display-and-input device at which is displayed an operation screen generated on the basis of a signal for generating an operation screen, and which is for input, from the operation screen which is displayed, of information which designates image output devices which are to output images, and information which relates to output formats of images to be outputted from the image output devices which are designated; and a transmitting and receiving device which is connected to the network, and which transmits, via the network, information inputted from the display-and-input device and the image data inputted from the image data input device, and which receives, via the network, the signal for generating the operation screen, wherein said image output management device is connected to the network, and on the basis of attribute information of each of the plurality of image output devices, generates and transmits, to the transmitting and receiving device, the signal for generating the operation screen, and transmits, to the image output devices which are designated, the image data and the information relating to the output formats of the images, which image data and information are transmitted from the transmitting and receiving device.

The above described image output management device stores attribute information of each of the plurality of image output devices. Also, the signal for generating the operation screen is generated on the basis of attribute information of the image output devices which are designated.

A sixth aspect of the present invention is an image output system comprising: a plurality of image output devices which are respectively connected to a network, and which output images on the basis of image data and information relating to output formats of images, which image data and information are transmitted via the network; an image data input device for input of the image data; a display-and-input device at which is displayed an operation screen generated on the basis of a signal for generating an operation screen, and which is for input, from the operation screen which is displayed, of information which designates image output devices which are to output images, and information which relates to output formats of images to be outputted from the image output devices which are designated; a transmitting and receiving device which is connected to the network, and which transmits, via the network, the information which designates image output devices and the information which relates to output formats of images to be outputted, which are inputted from the display-and-input device, and the image data inputted from the image data input device, and which receives, via the network, the signal for generating the operation screen; and an image output management device which is connected to the network, and which, on the basis of attribute information of each of the plurality of image output devices, generates and transmits, to the transmitting and receiving device, the signal for generating the operation screen, and which transmits, to the image output devices which are designated, the image data and the information relating to the output formats of the images, which image data and information are transmitted from the transmitting and receiving device.

A seventh aspect of the present invention is a recording medium which is readable by a computer and on which is recorded a program which makes a computer function such that, on the basis of attribute information of each of a plurality of image output devices connected to a network, a signal is generated and transmitted via the network, the signal being for generating an operation screen at which are inputted information, which designates image output devices which are to output images, and information, which relates to output formats of the images to be outputted from image output devices which are designated; the information which designates the image output devices and the information which relates to the output formats of the images, which information are inputted from the operation screen which is generated on the basis of the signal, are received via the network; and the received information relating to the output formats of the images, and image data are transmitted to the image output devices which are designated from the operation screen.

An eighth aspect of the present invention is an recording medium which is readable by a computer and on which is recorded a program which makes a computer function such that, on the basis of attribute information of each of a plurality of image output devices connected to a network, a signal is generated and transmitted via the network, the signal being for generating an operation screen at which are inputted information, which designates image output devices which are to output images, and information, which relates to output formats of the images to be outputted from image output devices which are designated; the information which designates the image output devices and the information which relates to the output formats of the images, which information are inputted from the operation screen which is generated on the basis of the signal, are received via the network; and the received information relating to the output formats of the images, and image data are transmitted to the image output devices which are designated from the operation screen.

In each of the above-described aspects, a plurality of image output devices, an image output management device, and an image input device including an image data input device, a display-and-input device and a transmitting and receiving device, are connected to a network. On the basis of attribute information of each of the plurality of image output devices, the image output management device generates a signal for generating the operation screen, and transmits the signal to the transmitting and receiving device. The transmitting and receiving device receives, via the network, this signal for generating the operation screen. Image data is inputted from the image data input device. On the basis of the signal for generating the operation screen, the generated operation screen is displayed on the display-and-input device. Then, information, which designates image output devices which are to output images, and information, which relates to the output formats of the images to be outputted from each of the designated image output devices, are inputted to the display-and-input device from the displayed operation screen. The information inputted from the display-and-input device and the image data inputted from the image data input device, are transmitted by the transmitting and receiving device via the network to the image output management device. The image output management device transmits, to the designated plurality of image output devices, the image data and the information relating to the output formats of the images, which image data and information are transmitted from the transmitting and receiving device. The image output devices output the images on the basis of the image data and information relating to the output formats of the images, which image data and information are transmitted via the network. In this way, a common operation screen is displayed for a plurality of image output devices, and the operation screen can be operated efficiently. Further, on the basis of the inputted image data, output from a plurality of image output devices is possible.

In particular, in the above-described image input device, when a operation screen which is for designating a plurality of image output devices is displayed at the display-and-input device, arbitrary image output devices can be designated, and outputting of images is easily instructed by operating the operation screen which is common for the plurality of image output devices which are designated. In a case in which the plurality of image output devices are designated by designating a group including the plurality of image output devices (the plurality of image output devices are registered in advance as the group), it is not necessary that each of the image output devices included in the group is selected, accordingly the operation becomes further efficiently.

Moreover, in a case in which attribute information of each of the plurality of image output devices is stored in the above-described image output management device, the attribute information of each of the plurality of image output devices can be easily taken (fetched) via the network. Also, when a signal for generating the operation screen is generated on the basis of the designated attribute information of the image output devices, attribute information of each of the plurality of image output devices which are outputted is easily taken via the network.

A ninth aspect of the present invention is an image input device comprises: an image data input device for input of image data; a display-and-input device at which an operation screen generated on the basis of a signal for generating an operation screen is displayed, and which is for input, from the operation screen which is displayed, of information designating a plurality of image output devices which are to output images, and information relating to output formats of the images to be outputted from each of the plurality of image output devices which are designated; and a transmitting and receiving device which transmits, via a network, the information inputted from the display-and-input device and image data inputted by a single operation from the image data input device, and which receives, via the network, the signal for generating the operation screen.

A tenth aspect of the present invention is an image input device used in an image output system which includes: a plurality of image output devices which are respectively connected to a network, and which output images on the basis of image data transmitted via the network and information relating to output formats of the images; and an image output management device which is connected to the network, and which generates and transmits a signal for generating an operation screen on the basis of attribute information of each of the plurality of image output devices, and which transmits, to each of the plurality of image output devices which are designated, transmitted information relating to the output formats of the images and transmitted image data; and the image input device comprises: an image data input device for input of the image data; a display-and-input device at which an operation screen generated on the basis of the signal for generating the operation screen is displayed, and which is for input, from the operation screen which is displayed, of information designating a plurality of image output devices which are to output images, and information relating to the output formats of the images to be outputted from each of the plurality of image output devices which are designated; and a transmitting and receiving device which is connected to the network, and which transmits, to the image output management device and via the network, information inputted from the display-and-input device and image data inputted by a single operation from the image data input device, and which receives, via the network, the signal for generating the operation screen.

In the above-described image input device, at the display-and-input device, a plurality of image output devices having different attributes may be designated, and images may be outputted from the plurality of image output devices which are designated. Further, the output formats for each of the plurality of image output devices which are designated may be respectively different.

An eleventh aspect of the present invention is an input control device which is applied to a dispersed-type copy system in which an image input device and image output devices are connected via a network, and the input control device comprises: receiving section for receiving information designating the image output devices and information relating to output formats of images to be outputted from each of the image output devices which are designated, and for receiving an instruction command to cause execution of a series of operations from fetching of an image by the image input device to outputting of images at the image output devices.

A twelfth aspect of the present invention is an image output management device which manages a dispersed-type copy system in which an image input device and image output devices are connected via a network, the image output management device comprising: receiving section for receiving information designating the image output devices and information relating to output formats of images to be outputted from each of the image output devices which are designated, and for receiving an instruction command to cause execution of a series of operations from fetching of an image by the image input device to outputting of images at the image output devices.

Further, the above image input device may further comprise control section for effecting control to make the image output devices which are designated output the image fetched at the image input device, on the basis of received information relating to the output formats of the images.

A thirteenth aspect of the present invention is an image output management device which is connected to a network to which a plurality of image output devices are connected, wherein, on the basis of attribute information of each of the plurality of image output devices, the image output management device generates and transmits, via a network, a signal for generating an operation screen for input of information, which designates a plurality of image output devices which are to output images, and information, which relates to output formats of the images to be outputted from each of the plurality of image output devices which are designated; the image output management device receives, via the network, the information which designates the image output devices and the information which relates to the output formats of the images, which information are inputted from the operation screen generated on the basis of the signal; and the information management device transmits, to each of the plurality of image output devices which are designated from the operation screen, received information relating to the output formats of the images and image data inputted by a single operation.

In the above-described image output management device, a display-and-input device, at which the operation screen generated on the basis of the signal for generating the operation screen is displayed and which is for input, from the operation screen which is displayed, of the information designating the image output devices and the information relating to the output formats of the images, may be one of connected to the network and provided at at least one of the plurality of image output devices. Namely, the display-and-input device may be provided at an image output device so as to form a multifunction device. Further, a personal computer or the like connected to the network may be used as the display-and-input device.

In the above-described image output management device, an image data input device, which is for input of the image data, may be one of connected to the network and provided at at least one of the plurality of image output devices. Namely, the image data input device may be provided at an image output device so as to form a multifunction device. Further, a personal computer or the like connected to the network may be used as the image data input device. In this case, the display-and-input device may be connected to the image data input device or to the network.

A fourteenth aspect of the present invention is an image output management device which is used in an image output system including: a plurality of image output devices which are respectively connected to a network, and which output images on the basis of image data and information relating to output formats of images, which image data and information are transmitted via the network; an image data input device for input of image data; and a display-and-input device at which an operation screen generated on the basis of a signal for generating the operation screen is displayed, and which is for input, from the operation screen which is displayed, of information which designates a plurality of the image output devices which are to output images, and information which relates to output formats of the images to be outputted from each of the plurality of image output devices which are designated, wherein the image output management device comprises: a transmitting section which is connected to the network, and which transmits, via the network, information inputted from the display-and-input device and image data inputted by a single operation from the image data input device; and a receiving section which is connected to the network, and which receives, via the network, the signal for generating the operation screen, and the image output management device is connected to the network, and, on the basis of attribute information of each of the plurality of image output devices, generates and transmits, to the receiving section, the signal for generating the operation screen, and transmits, to each of the plurality of image output devices which are designated, the image data and the information relating to the output formats of the images, which image data and information are transmitted from the transmitting section.

In the above-described image output management devices, when image data is transmitted to each of the plurality of image output devices, the image data may be converted, in accordance with attributes of a plurality of image output devices which have different attributes and which are designated at the display-and-input device, and transmitted.

A fifteenth aspect of the present invention is an image output system comprises: a plurality of output devices which are respectively connected to a network, and which output images on the basis of image data and information relating to output formats of images, which image data and information are transmitted via the network; an image data input device for input of image data; a display-and-input device at which an operation screen generated on the basis of a signal for generating the operation screen is displayed, and which is for input, from the operation screen which is displayed, of information which designates a plurality of image output devices which are to output images, and information which relates to output formats of the images to be outputted from each of the plurality of image output devices which are designated; a transmitting and receiving device which is connected to the network, and which transmits, via the network, information inputted from the display-and-input device and image data inputted by a single operation from the image data input device, and which receives, via the network, the signal for generating the operation screen; and an image output management device which is connected to the network, and which, on the basis of attribute information of each of the plurality of image output devices, generates and transmits to the transmitting and receiving device the signal for generating the operation screen, and which transmits, to each of the plurality of image output devices which are designated, the image data and the information relating to the output formats of the images, which image data and information are transmitted from the transmitting and receiving device.

A sixteen aspect of the present invention is a program which makes a computer function such that, on the basis of attribute information of each of a plurality of image output devices connected to a network, a signal for generating an operation screen is generated and transmitted via the network, the operation screen being for input of information which designates a plurality of image output devices which are to output images, and information which relates to output formats of the images to be outputted from each of the plurality of image output devices which are designated; the information which designates the image output devices and the information which relates to the output formats, which information are inputted from the operation screen generated on the basis of the signal, are received via the network; and received information which relates to the output formats of the images, and image data inputted by a single operation are transmitted to each of the plurality of image output devices which are designated from the operation screen.

A seventeenth aspect of the present invention is a recording medium in which program is recorded on a recording medium which is readable by a computer, the program making the computer function such that, on the basis of attribute information of each of a plurality of image output devices connected to a network, a signal for generating an operation screen is generated and transmitted via the network, the operation screen being for input of information which designates a plurality of image output devices which are to output images, and information which relates to output formats of the images to be outputted from each of the plurality of image output devices which are designated; the information which designates the image output devices and the information which relates to the output formats, which information are inputted from the operation screen generated on the basis of the signal, are received via the network; and received information which relates to the output formats of the images, and image data inputted by a single operation are transmitted to each of the plurality of image output devices which are designated from the operation screen.

In each of the above-described aspects, a plurality of image output devices, an image output management device, and an image input device including an image data input device, a display-and-input device and a transmitting and receiving device, are connected to a network. On the basis of attribute information of each of the plurality of image output devices, the image output management device generates a signal for generating the operation screen, and transmits the signal to the transmitting and receiving device. The transmitting and receiving device receives, via the network, this signal for generating the operation screen. Image data is inputted from the image data input device. On the basis of the signal for generating the operation screen, the generated operation screen is displayed on the display-and-input device. Then, information, which designates a plurality of image output devices which are to output images, and information, which relates to the output formats of the images to be outputted from each of the designated plurality of image output devices, are inputted to the display-and-input device from the displayed operation screen. The information inputted from the display-and-input device and the image data inputted by a single operation from the image data input device, are transmitted by the transmitting and receiving device via the network to the image output management device. The image output management device transmits, to the designated plurality of image output devices, the image data and the information relating to the output formats of the images, which image data and information are transmitted from the transmitting and receiving device. The image output devices output the images on the basis of the image data and information relating to the output formats of the images, which image data and information are transmitted via the network.

In this way, a common operation screen is displayed for a plurality of image output devices having different attributes, and the operation screen can be operated efficiently. Further, on the basis of the inputted image data, output from a plurality of image output devices is possible.

In particular, in the above-described image input device, when a plurality of image output devices having different attributes are designated at the display-and-input device and images are outputted from the designated plurality of image output devices, images corresponding to the attributes of the image output devices can respectively be outputted on the basis of the inputted image data. Further, when different output formats are set for each of the designated plurality of image output devices, on the basis of the inputted image data, output can be carried out at respectively different output formats.

Moreover, in the above-described image output management device, at the time when the image data is transmitted to each of the plurality of image output devices, the image data is converted in accordance with the attributes of the plurality of image output devices, which have different attributes and are designated at the display-and-input device, and is transmitted. On the basis of the inputted image data, good images can be respectively outputted from a plurality of image output devices having different attributes.

An eighteenth aspect of the present invention is a display control device comprising: storing section for storing first operation screen information which is for generating a portion of an operation screen; receiving section, connected to a network, for receiving, via the network, second operation screen information which is for generating a remaining portion of the operation screen; and generating section for generating the operation screen by combining the first operation screen information which is stored in the storing section and the second operation screen information which is received by the receiving section.

In accordance with the eighteenth aspect of the invention, at the display control device, first operation screen information, which is for generating a portion of an operation screen, is stored in advance in the storing section. The second operation screen information, which is for generating a remaining portion of the operation screen, is received by the receiving section via the network. The second operation screen information is combined with the first operation screen information stored in the storing section, so as to generate the operation screen.

A nineteenth aspect of the present invention is a (operation screen) display controlling method comprising the steps of: storing first operation screen information which is for generating a portion of an operation screen; receiving, via a network, second operation screen information which is for generating a remaining portion of the operation screen; and generating and displaying the operation screen by combining the first operation screen information which is stored and the second operation screen information which is received.

In accordance with the nineteenth aspect of the invention, first operation screen information, which is for generating a portion of an operation screen, is stored in advance. The second operation screen information, which is for generating a remaining portion of the operation screen, is received by a receiving section via the network. The second operation screen information is combined with the first operation screen information stored in a storing section, so as to generate the operation screen.

In this way, in the eighteenth and nineteenth aspects, the first operation screen information is stored in advance at the side which generates and displays the operation screen. In this way, the amount of data of the information transmitted via the network in order to display the operation screen can be reduced, and the time required for displaying the operation screen can be shortened.

A twentieth aspect of the present invention is an image input device used in an image output system formed by a plurality of image output devices being connected to a network, the image input device comprising: image data input section for input of image data; display-and-input section at which an operation screen is displayed, and which is for input, from the operation screen which is displayed, of information which designates image output devices which are to output images, and information which relates to output formats of the images; transmitting and receiving section which is connected to the network, and which transmits information inputted from the display-and-input section and image data inputted from the image data input section, and which receives a signal for generating the operation screen; icon information storing section for storing icon information which forms the operation screen; and display control section for generating the operation screen by combining the icon information, which is stored in the icon information storing section, and the signal for generating the operation screen, which signal is received by the transmitting and receiving section, and for displaying the operation screen on the display-and-input section.

In accordance with the twentieth aspect of the invention, at the image input device, when the signal for generating the operation screen is received by the transmitting and receiving section, by the display control section combining the icon information, which is stored in advance in the icon information storing section, and the received signal, the operation screen is generated, and is displayed on the display-and-input section. Information, which designates the image output devices which are to output images, and information, which relates to the output formats of the images to be outputted from the designated image output devices, are inputted from the displayed operation screen. Then, these information, which are inputted by the transmitting and receiving section, are transmitted via the network, and the image data inputted by the image data input section is also transmitted via the network. In this way, the designated image output devices are made to output images on the basis of the image data and the output formats of the images.

The icon information, which is a large data amount, is stored at the image input device side. Thus, it suffices for the signal for generating the operation screen, which signal is transmitted to the image input device via the network in order to display the operation screen, to be only attribute information which is expressed by text or the like having a small data amount. The time required to display the operation screen can be shortened.

A twenty-first aspect of the present invention is an image output system compriseing: (a) a plurality of image output devices which are respectively connected to a network, and which output images on the basis of image data and output formats of images, which image data and output formats are transmitted via the network; (b) an image input device including: (1) image data input section for input of image data; (2) display-and-input section at which an operation screen is displayed, and which is for input, from the operation screen which is displayed, of information which designates image output devices which are to output images, and information which relates to output formats of the images to be outputted from the image output devices which are designated; (3) transmitting and receiving section which is connected to the network, and which transmits, via the network, image data inputted from the image data input section and information inputted from the display-and-input section, and which receives, via the network, a signal for generating the operation screen; (4) icon information storing section for storing icon information which forms the operation screen; and (5) display control section for generating the operation screen by combining the icon information, which is stored in the icon information storing section, and the signal for generating the operation screen, which signal is received by the transmitting and receiving section, and for displaying the operation screen at the display-and-input section; and (c) an image output management device which is connected to the network, and which stores attribute information of each of the plurality of image output devices, and which, on the basis of the attribute information, generates and transmits, to the transmitting and receiving section, the signal for generating the operation screen, and which transmits, to the image output devices which are designated, the image data transmitted from the transmitting and receiving section and the information relating to the output formats of the images.

A twenty-second aspect of the present invention is an image output management device used in an image output system which includes: a plurality of image output devices which are respectively connected to a network, and which output images on the basis of image data and output formats of images, which image data and output formats are transmitted via the network; and an image input device including image data input section which is connected to the network and which is for input of image data, and a display-and-input section at which an operation screen is displayed, and which is for input, from the operation screen which is displayed, of information which designates image output devices which are to output images, and information which relates to output formats of images to be outputted from the image output devices which are designated, the image input device generating and displaying, at the display-and-input section, the operation screen by combining a signal for generating the operation screen which signal is received via the network and icon information which is stored in advance, and the image input device transmitting, via the network, the image data inputted from the image data input section and the information inputted from the display-and-input section, wherein the image output management device is connected to the network, and stores attribute information of each of the plurality of image output devices, and, on the basis of the attribute information, generates and transmits, to the transmitting and receiving section, the signal for generating the operation screen, and transmits, to the image output devices which are designated, the image data transmitted from the transmitting and receiving section and the information relating to the output formats of the images.

A twenty-third aspect of the present invention is an image input device used in an image output system including: a plurality of image output devices which are respectively connected to a network, and which output images on the basis of image data and output formats of images, which image data and output formats are transmitted via the network; and an image output management device which is connected to the network, and which stores attribute information of each of the plurality of image output devices, and, which, on the basis of attribute information, generates and transmits, via the network, a signal for generating an operation screen, and which transmits, to image output devices which are designated, the image data and information relating to the output formats of the images, which image data and information are transmitted via the network, the image input device comprising: image data input section for input of image data; display-and-input section at which the operation screen is displayed, and which is for input, from the operation screen which is displayed, of information which designates image output devices which are to output images, and information which relates to output formats of the images; transmitting and receiving section which is connected to the network, and which transmits, to the image output management device, information which is inputted from the display-and-input section and image data which is inputted from the image data input section, and which receives the signal for generating the operation screen from the image output management device; icon information storing section for storing icon information which forms the operation screen; and display control section for generating the operation screen by combining the icon information stored in the icon information storing section and the signal for generating the operation screen, which signal is received from the transmitting and receiving section, and for displaying the operation screen at the display-and-input section.

Next, the image output system of the twenty-first aspect will be described together with the image output management device and the image input device of the twenty-second and twenty-third aspects.

At the image output management device, attribute information of each of the plurality of image output devices is stored. On the basis of this attribute information, a signal for generating the operation screen is generated, and the generated signal is transmitted, via the network, to the transmitting and receiving section of the image input device.

At the image input device, when the signal for generating the operation screen is received by the transmitting and receiving section, the display control section combines the received signal and the icon information, which is stored in advance in the icon information storing section, so as to generate the operation screen, and displays the operation screen at the display-and-input section. Information, which is for designating image output devices which are to output images, and information, which relates to the output formats of the images to be outputted from the designated image output devices, are inputted from the displayed operation screen. The transmitting and received section transmits these inputted information via the network. Further, the transmitting and receiving section also transmits, via the network, the image data which is inputted by the image data input section.

The information, which designates the image output devices to output images and which was transmitted by the transmitting and receiving section of the image input device, is received at the image output management device. On the basis of the received information, the image data and the information relating to the output formats of the images, which image data and information were transmitted by the transmitting and receiving section of the image input device, are transmitted to the designated image output devices. The designated image output devices are thereby made to output images on the basis of the image data and the output formats of the images.

In this way, the icon information, which has a large data amount, is stored in the image input device, and not in the image output management device. Thus, as the signal for generating the operation screen from the image output management device, it suffices to transmit only attribute information which is expressed by text or the like having a small data amount. The time required to display the operation screen can be shortened.

Note that, a twenty-fourth aspect of the present invention is an image input device according to the twenty-third aspect further comprising image information storing section for storing at least one of information of a screen relating to only the image input device, and information of a screen which gives notice that the image output management device cannot communicate, wherein, at at least one of a time of operation of only the image input device and a time of failure of receipt of a signal from the image output management device, the display control section may display, at the display-and-input section, a screen which is based on the information stored in the screen information storing section.

A twenty-fifth aspect of the present invention is an operation screen display controlling method in an image output system which is formed by (a) a plurality of image output devices which output images based on image data and output formats of images; (b) an image output management device which transmits, to image output devices which are designated, the image data and information relating to output formats of images; and (c) an image input device including an image data input section for input of image data, and a display-and-input section at which an operation screen is displayed and which is for input, from the operation screen which is displayed, of information which relates to output formats of images and information which designates image output devices which are to output images, the image input device transmitting, to the image output management device, image data inputted from the image data input section and information inputted from the display-and-input section, being connected to a network, the operation screen display controlling method comprising the steps of: storing, in the image output management device, attribute information of each of the plurality of image output devices; storing icon information in the image input device; and at the time of displaying the operation screen at the display-and-input section, transmitting, from the image output management device to the image input device, a signal for generating the operation screen which is generated on the basis of the attribute information, and at the image input device, generating the operation screen by combining the icon information and the received signal for generating the operation screen, and displaying the operation screen at the display-and-input section.

In accordance with the twenty fifth aspect of the invention, the attribute information of each of the plurality of image output devices is stored in the image output management device. The icon information, which forms the operation screen which is displayed at the display-and-input section which is provided at the image input device, is stored in advance in that image input device.

At the time when the operation screen is displayed at the display-and-input section, on the basis of the stored attribute information, a signal for generating the operation screen is generated, and the signal is transmitted from the image output management device to the image input device. At the image input device, the icon information which is stored in advance and the signal for generating the operation screen are combined to form the operation screen, and the operation screen is displayed at the display-and-input section.

In this way, the icon information, which is a large data amount, is stored in the image input device. Thus, as the signal for generating the operation screen from the image output management device, it suffices to transmit only attribute information which is expressed by text or the like having a small data amount. The time required to display the operation screen can be shortened.

A twenty-sixth aspect of the present invention is an image input device comprising: input section for input of image data; designating section for designating an output file format of inputted image data; and converting section for converting the inputted image data into image data of an output file format designated by the designating section.

In accordance with this aspect, at the time of image input, e.g., at the time of scanning an original, the output file format at the time of outputting the read image can be designated, and the read image can be converted into the designated output file format. Thus, the operator can designate an optimal output file format in accordance with the type of the read image.

A twenty-seventh aspect of the present invention is an image input device used in an image output system including: an image output device which is connected to a network, and which outputs an image on the basis of image data transmitted via the network; and a management device which is connected to the network, and which transmits, to the image output device, image data transmitted from the network, wherein the image input device comprises: input section for input of image data; designating section for designating an output file format of inputted image data; converting section for converting the inputted image data into image data of an output file format designated by the designating section; and transmitting section, connected to the network, for transmitting, to the management device and via the network, image data of an output file format converted by the converting section.

In accordance with this aspect, the input section is for inputting image data. For example, a scanner or a facsimile for reading an original by using a reading sensor such as a CCD, or a computer for reading image data stored in an external storage device, or the like, can be used as the input section.

The designating section is for designating the output file format of the image data inputted by the input section. For example, a display panel such as a touch panel can be displayed, or a menu for designating the output file format can be displayed at a display, and designation can be carried out by fingers, a keyboard, a mouse, or the like.

Examples of the output file format are various types of file formats such as JPEG, bitmap, PDF, and the like.

The converting section converts the image data inputted from the input section into image data of the output file format which is designated by the designating section.

The transmitting section is connected to the network, and transmits, to the management device and via the network, the image data of the output file format which has been converted by the converting section.

The management device is connected to the network. The management device transmits, to the image output device, the image data transmitted from the network, i.e., the image data which has been inputted at the image input device and which has been converted into the designated output format. Namely, the management device functions as a so-called server, and manages the image data transmitted via the network, and outputs the image data to the image output device.

The image output device is connected to a network such as, for example, a LAN, and outputs an image on the basis of the image data transmitted via the network, i.e., the image data transmitted from the management device. Examples of the image output device are a network printer or a computer such as a personal computer or the like, which can be connected to the network. For example, in the case of a printer, an image based on the image data transmitted via the network is printed onto a recording sheet. In the case of a computer such as a personal computer, an image based on the image data transmitted via the network is displayed on a display or the like.

In this way, at the time of image input, e.g., at the time of scanning an original, the output file format at the time of outputting the read image can be designated, and the read image can be converted into the designated output file format. As a result, the operator can designate an optimal output file format in accordance with the type of the read image.

A twenty-eighth aspect of the present invention is an image input device used in an image output system including: an image output device which is connected to a network, and which outputs an image on the basis of image data transmitted via the network; and a management device which is connected to the network, and which includes a converting section for converting image data transmitted from the network into image data of a transmitted output file format, and which transmits, to the image output device, image data of an output file format converted at the converting section, wherein the image input device comprises: input section for input of image data; designating section for designating an output file format of inputted image data; and transmitting section, connected to the network, for transmitting, to the management device, the image data and the output file format designated by the designating section.

In accordance with this aspect, the converting section, which converts the image data transmitted from the network into image data of the transmitted output file format, is provided at the management device. The image input device transmits the image data inputted by the input section and the output file format designated by the designating section, by the transmitting section via the network to the management device.

Accordingly, the image data is converted at the converting section provided at the management device, and the converted image data is outputted to the image output device.

In this way, at the time of input of the image, the output file format at the time of outputting the read image can be designated. As a result, the operator can designate an optimal output file format in accordance with the type of the read image.

A twenty-ninth aspect of the present invention is an image input device used in an image output system including: an image output device which is connected to a network, and which includes a converting section for converting image data transmitted via the network into image data of a transmitted output file format, and which outputs an image on the basis of image data of an output file format, converted at the converting section; and a management device which is connected to the network, and which transmits, to the image output device, the image data transmitted via the network and the transmitted output file format, wherein the image input device comprises: input section for input of image data; designating section for designating an output file format of inputted image data; and transmitting section, connected to the network, for transmitting, to the management device, the image data and the output file format which is designated by the designating section.

In accordance with this aspect, the converting section, which converts the image data transmitted from the network into image data of the transmitted output file format, is provided at the image output device. The image input device transmits the image data inputted by the input section and the output file format designated by the designating section, by the transmitting section via the network to the management device. The management device outputs, to the image output device, the image data and the output file format which are transmitted via the network from the image input device.

Accordingly, the image data is converted at the converting section provided at the image output device, and an image is outputted on the basis of the converted image data.

In this way, at the time of input of the image, the output file format at the time of outputting the read image can be designated. As a result, the operator can designate an optimal output file format in accordance with the type of the read image.

A thirtieth aspect of the present invention is an image output system comprising: (a) an image input device including: (1) input section for input of image data; (2) designating section for designating an output file format of inputted image data; (3) converting section for converting the inputted image data into image data of an output file format designated by the designating section; and (4) transmitting section, connected to a network, for transmitting, to the network, image data of an output file format converted by the converting section; (b) a management device which is connected to the network, and which transmits, to an image output device, image data of an output file format transmitted via the network; and (c) an image output device which is connected to the network, and which outputs an image on the basis of the image data of the output file format transmitted via the network. In this way, at the time of image input, the output file format at the time of outputting the read image can be designated. As a result, the operator can designate an optimal output file format in accordance with the type of the read image.

A thirty-first aspect of the present invention is an image output system comprising: (a) an image input device including: (1) input section for input of image data; (2) designating section for designating an output file format of inputted image data; and (3) transmitting section, connected to the network, for transmitting, to the network, the image data and the output file format designated by the designating section; (b) converting section, connected to the network, for converting image data transmitted via the network into image data of a transmitted output file format; (c) a management device which transmits, to an image output device, image data of an output file format converted at the converting section; and (d) an image output device which is connected to the network, and which outputs an image on the basis of image data of an output file format transmitted via the network. In this way, at the time of image input, the output file format at the time of outputting the read image can be designated. As a result, the operator can designate an optimal output file format in accordance with the type of the read image.

A thirty-second aspect of the present invention is an image output system comprising: (a) an image input device including: (1) input section for input of image data; (2) designating section for designating an output file format of inputted image data; and (3) transmitting section, connected to the network, for transmitting, to a management device, the image data and the output file format designated by the designating section; (b) the management device which is connected to the network, and which transmits, to an image output device, image data and an output file format, which image data and output file format are transmitted from the network; and (c) an image output device which is connected to the network, and which includes a converting section for converting image data transmitted via the network into image data of a transmitted output file, and which outputs an image on the basis of image data of an output file format converted at the converting section. In this way, at the time of image input, the output file format at the time of outputting the read image can be designated. As a result, the operator can designate an optimal output file format in accordance with the type of the read image.

A thirty-third aspect of the present invention is an image management device applied to an image output system which stores image data inputted from an image input device and which can, via a network, make an image output device output an image, the image management device comprising: storing section for storing image data inputted from the image input device and information relating to an output format of an image; and control section for receiving image data to be outputted and a designation of information relating to an output format of an image, and on the basis of the information relating to the output format of the image which information is stored in the storing section, the control section effects control to limit designation of information relating to an output format of an image to be outputted.

In accordance with this aspect, at the time when the image data stored in the storing section is outputted, on the basis of the information relating to the output format of the image which information is stored in the storing section, the control section effects control such that the designation of the information relating to the output format of the image to be outputted is limited. In this way, a situation can be prevented in which an output format, which essentially cannot be designated, is mistakenly set.

The above-described image management device can carry out the above-described processings on the basis of a program for making a computer function as a storing section, which stores the image data inputted from the image input device and the information relating to the output format of the image, and as a control section which effects control such that the outputted image data and a designation of the information relating to the output format of the image are received, and on the basis of information relating to the output format of the image which information is stored in the storing section, the designation of the information relating to the output format of the image to be outputted is limited. Further, this program can be recorded on a recording medium which is readable at a computer.

Specifically, functions to be executed at the image management device can be easily implemented at any computer by making the program for executing the above-described processing functions portable by storing it on the following medium and by executing the program, which is stored on the medium, at a computer. Specifically, the fifth aspect is a storage medium on which is stored an image management program which is to be executed at an image management device which is applied to an image output system which stores image data inputted by an image input device and which can, via a network, make an image output device output, wherein the image management program makes the image data inputted from the image input device and information relating to an output format of an image, be stored; and the image management program makes image data to be outputted and a designation of information relating to an output format of an image be received, and on the basis of stored information relating to the output format of the image, makes control be effected to limit designation of information relating to an output format of an image to be outputted.

Further, by executing the following program on a computer, the above-described processing functions can easily be implemented. Specifically, a sixth aspect is an image management program which is to be executed at an image management device which is applied to an image output system which stores image data inputted by an image input device and which can, via a network, make an image output device output, wherein the image management program makes the image data inputted from the image input device and information relating to an output format of an image, be stored; and the image management program makes image data to be outputted and a designation of information relating to an output format of an image be received, and on the basis of stored information relating to the output format of the image, makes control be effected to limit designation of information relating to an output format of an image to be outputted.

A thirty-fourth aspect of the present invention is an image management device used in an image output system including: a plurality of image output devices which are respectively connected to a network, and which output images on the basis of image data and information relating to output formats of the images, which image data and information are transmitted via the network; storing section, connected to the network, for storing image data inputted from an image data input device connected to the network, and information relating to output formats of images; a display-and-input device at which is displayed an operation screen which is generated on the basis of a signal for generating the operation screen, and which is for input, from the operation screen which is displayed, of information which designates image output devices which are to output images, information which relates to output formats of the images, and image data which is to be re-outputted and information relating to the output formats of the images from among the image data and the information relating to the output formats of the images stored in the storing section; and a transmitting device which is connected to the network, and which transmits, via the network, information inputted from the display-and-input device, and which receives, via the network, the signal for generating the operation screen, wherein the image management device is connected to the network, and on the basis of attribute information of each of the plurality of image output and information relating to output formats of images to be re-outputted which information is stored in the storing section, the image management device generates and transmits, to the transmitting device, a signal generating an operation screen relating to operation of re-outputting, and transmits, to image output devices which are designated, image data for which re-outputting is designated and the information relating to the output formats of the images which information is transmitted from the transmitting device.

In accordance with this aspect, the image output device is connected to a network such as a LAN or the like, and outputs images on the basis of image data and information relating to the output formats of the images, which image data and information are transmitted via the network. Examples of the information relating to the output format of the image include the sheet size, the number of sets to be outputted, the type of image (color or black-and-white), and the like. The image output device is, for example, a network printer which can be connected to a network. An image, which is based on the image data transmitted via the network, is printed onto a recording paper at the sheet size and the number of sets which are designated by the information relating to the output format of the image. Note that, here, the term "image" encompasses document text images which are only characters, and images including characters and photographs, pictures, and the like.

The storing section is connected to the network, and stores the image data, which is inputted by the image data input device connected to the network, and the information relating to the output format of the image.

The image data input device is for input of image data. For example, a scanner or facsimile for reading an original by using a reading sensor such as a CCD, or a computer for reading image data stored in an external storage device, or the like, may be used as the image data input device.

The display-and-input device displays the operation screen which is generated on the basis of a signal for generating the operation screen. Then, the information designating the image output device which is to output the image, and the information relating to the output format of the image to be outputted from the designated image output device, and image data to be re-outputted and information relating to the output format of the image from among the image data and information relating to the output format of the image which are stored in the storing section, can be inputted from the displayed operation screen.

The transmitting device is connected to the network, and transmits, via the network, information inputted from the display-and-input device, i.e., information designating the image output device which is to output the image and information relating to the output format of the image to be outputted from the designated image output device, as well as the image data which is inputted from the image data input device. Further, the transmitting device receives, via the network, the signal for generating the operation screen. The display-and-input device generates and displays the operation screen by the received signal for generating the operation screen.

The image management device is connected to the network, and on the basis of the attribute information of each of the plurality of image output devices and the information relating to the output format of the image to be re-outputted which information is stored in the storing section, generates a signal for generating an operation screen relating to the operation of re-outputting, and transmits the signal to the transmitting device. Examples of the attribute information include information expressing whether the image output device is for black-and-white printing or color printing, information expressing whether the image output device has a function for printing both sides of a sheet, information expressing whether the image output device has a finisher (a stapling function), information expressing the location of the image output device (the floor, the department or the like where the image output device is located in a single building, or the department or the like where the image output device is located in another building), information expressing whether the image output device is high resolution or not, information expressing the sizes of sheets which can be printed, and the like.

By using the attribute information and the information relating to the output format of the image to be re-outputted which is stored in the storing section, i.e., by using the information relating to the output format at the time of the initial output, it is possible to generate an operation screen which relates to the operation of re-outputting, e.g., an output screen which permits selection only of functions which can be set only at the time of re-outputting.

In this way, an operation screen which relates to the operation of re-outputting is displayed at the display-and-input device, and information, which relates to the output format of the image set by the operation of the user, is transmitted to the image management device by the transmitting device. Then, at the image management device, the information relating to the output format of the image and the image data, which is stored in the storing section and for which re-output is designated, are transmitted to the designated image output device.

In this way, at the time of re-output, because an operation screen used exclusively for re-output is generated, the setting of functions which are valid only at the time of re-output can be carried out.

A thirty-fifth aspect of the present invention is an image management device according to the thirty-fourth aspect wherein at an operation screen, which is generated by the signal for generating an operation screen relating to operation of re-outputting, for specific attribute information, it is possible for the information relating to the output format of the image to not be able to be changed. Namely, specific output formats for which changing at the time of re-output is not permitted (e.g., the type of image such as color or black-and-white) and functions for which setting is impossible (such as the reading density of the image) are, for example, not displayed on the operation screen, so that they cannot be selected. In this way, changing of settings at the time of re-output can be prevented, and a deterioration in image quality can be prevented.

A thirty-sixth aspect of the present invention is an image output system comprising: a plurality of image output devices which are respectively connected to a network, and which output images on the basis of image data and information relating to output formats of the images, which image data and information are transmitted via the network; storing section, connected to the network, for storing image data inputted from an image data input device connected to the network, and information relating to output formats of images; a display-and-input device at which is displayed an operation screen which is generated on the basis of a signal for generating the operation screen, and which is for input, from the operation screen which is displayed, of information which designates image output devices which are to output images, information which relates to output formats of the images, and image data which is to be re-outputted and information relating to the output formats of the images from among the image data and the information relating to the output formats of the images stored in the storing section; a transmitting device which is connected to the network, and which transmits, via the network, information inputted from the display-and-input device, and which receives, via the network, the signal for generating the operation screen; and an image management device which is connected to the network, and which, on the basis of attribute information of each of the plurality of image output devices and information relating to output formats of images to be re-outputted which information is stored in the storing section, generates and transmits, to the transmitting device, a signal for generating an operation screen relating to operation of re-outputting, and which transmits, to image output devices which are designated, image data for which re-outputting is designated and the information relating to the output formats of the images which information is transmitted from the transmitting device. Thus, a deterioration in image quality at the time of re-output can be prevented.

A thirty-seventh aspect of the present invention is a storage medium on which is stored an image management program of an image output system which stores image data inputted from an image input device and which can, via a network, make an image output device output an image, wherein the image management program makes the image data inputted from the image input device and information relating to an output format of an image, be stored; and the image management program makes image data to be outputted and a designation of information relating to an output format of an image be received, and on the basis of stored information relating to the output format of the image, makes control be effected to limit designation of information relating to an output format of an image to be outputted.

A thirty-eighth aspect of the present invention is an image management program of an image output system which stores image data inputted from an image input device and which can, via a network, make an image output device output, wherein the image management program makes the image data inputted from the image input device and information relating to an output format of an image, be stored; and the image management program makes image data to be outputted and a designation of information relating to an output format of an image be received, and on the basis of stored information relating to the output format of the image, makes control be effected to limit designation of information relating to an output format of an image to be outputted.

A thirty-ninth aspect of the present invention is an image management device applied to an image output system which makes an image output device output an image of image data which is inputted from an image data input device, via a network, the image management device comprising: control section for receiving, via the network, image data inputted from the image data input device and information of an image output device which is designated, and if the image output device which is designated is currently operating, the control section holds the image data, and when operation of the image output device which is designated is completed, the control section outputs the held image data to the image output device which is designated.

In accordance with this aspect, even if the designated image output device is currently operating, the image data which is inputted from the image data input device is held. After operation of the designated image output device is completed, the held image data is outputted to the designated image output device. Thus, the efficiency of using the image output device can be improved.

The above-described image management device can carry out the above-described processings on the basis of a program for making a computer function as a control section which receives, via a network, the image data inputted from the image data input device and the designated image output device, and which, when the designated image output device is currently operating, holds the image data, and when operation of the designated image output device is completed, outputs the held image data to the designated image output device. Further, this program can be recorded on a recording medium which can be read by a computer.

A fortieth aspect of the present invention is an image output system comprising: a plurality of image output devices which are respectively connected to a network, and which output images on the basis of image data and information relating to output formats of images, which image data and information are transmitted via the network; an image data input device for input of image data; a display-and-input device at which is displayed an operation screen which is generated on the basis of a signal for generating the operation screen, and which is for input, from the operation screen which is displayed, of information which designates an image output device which is to output an image, and information which relates to the output format of the image to be outputted from the image output device which is designated; a transmitting device which is connected to the network, and which transmits, via the network, information inputted from the display-and-input device and image data inputted from the image data input device, and which receives, via the network, the signal for generating the operation screen; and a management device which is connected to the network, and which, on the basis of attribute information of each of the plurality of image output devices, generates and transmits, to the transmitting device, the signal for generating the operation screen, and when information relating to the output format of the image and the image data are transmitted from the transmitting device, the management device confirms whether or not the image output device which is designated is currently operating, and if the image output device which is designated is currently operating, the management device holds the information relating to the output format of the image and the image data which information and image data are transmitted from the transmitting device, and when operation of the image output device which is designated is completed, the management device outputs, to the image output device which is designated, the information relating to the output format of the image and the image data which are held.

In accordance with this aspect, the image output device is connected to a network such as a LAN or the like, and outputs images on the basis of image data and information relating to the output format of the image, which image data and output format are transmitted via the network. Examples of the information relating to the output format of the image include the sheet size, the number of sets to be outputted, and the like. The image output device is, for example, a network printer which can be connected to a network. An image, which is based on the image data transmitted via the network, is printed onto a recording paper at the sheet size and the number of sets which are designated by the information relating to the output format of the image. Note that, here, the term "image" encompasses document text images which are only characters, and images including characters and photographs, pictures, and the like.

The image data input device is for input of image data. For example, a scanner or facsimile for reading an original by using a reading sensor such as a CCD, or a computer for reading image data stored in an external storage device, or the like, may be used as the image data input device.

The display-and-input device displays the operation screen which is generated on the basis of a signal for generating the operation screen. Then, information designating the image output device which is to output the image, and information relating to the output format of the image to be outputted from the designated image output device can be inputted from the displayed operation screen.

The transmitting device is connected to the network, and transmits, via the network, information inputted from the display-and-input device, i.e., information designating the image output device which is to output the image and information relating to the output format of the image to be outputted from the designated image output device, as well as the image data which is inputted from the image data input device. Further, the transmitting device receives, via the network, the signal for generating the operation screen. The display-and-input device generates and displays the operation screen by the received signal for generating the operation screen.

The management device is connected to the network, and on the basis of the attribute information of each of the plurality of image output devices, generates a signal for generating an operation screen and transmits the signal to the transmitting device. Examples of the attribute information include information expressing whether the image output device is for black-and-white printing or color printing, information expressing whether the image output device has a function for printing both sides of a sheet, information expressing whether the image output device has a finisher (a stapling function), information expressing the location of the image output device (the floor, the department or the like where the image output device is located in a single building, or the department or the like where the image output device is located in another building), information expressing whether the image output device is high resolution or not, information expressing the sizes of sheets which can be printed, and the like. By using these attribute information, an operation screen common to the plurality of image output devices can be generated.

When information relating to the output format of the image and the image data are transmitted from the transmitting device, the management device confirms whether or not the designated image output device is currently operating. If the designated image output device is currently operating, the management device holds the information relating to the output format of the image and the image data, which were transmitted from the transmitting device. Namely, even if the image output device which is designated is currently operating, the information relating to the output format of the image and the image data, which are transmitted from the transmitting device, are received. Then, when the operation of the designated image output device is completed, the held information relating to the output format of the image and image data are outputted to the designated image output device.

In this way, even if the designated image output device is currently operating, the information relating to the output format of the image and the image data, which are transmitted from the transmitting device, are held. After operation of the designated image output device has been completed, the held information relating to the output format of the image and held image data are outputted to the designated image output device. Thus, the efficiency of using the image output device can be improved.

Further, when the designated image output device is currently operating, the management device may transmit, to the transmitting device, a signal for generating an operation screen which expresses that the image output device is currently operating. In this way, the fact that the designated image output device is currently being used can be displayed at the display-and-input device. Thus, the user can easily learn that the designated image output device is currently being used.

Note that, if the designated image output device is currently operating, the held information relating to the output format of the image and the held image data may be cancelled, and a different image output device can be designated.

Further, the image output device may also have an operation device for displaying the operation screen and for operating the image operation device. In this case, even if the operation device is being operated, i.e., even if the image output device is currently operating, the management device holds the information relating to the output format of the image and the image data. Thus, the display-and-input device and the operation device of the image output device can be operated independently, and these respective devices can be used independently.

A forty first aspect of the present invention is an input control device applied to a dispersed-type copy system in which an image output device is made to output, via a network, image data which is read at an image data input device, wherein the input control device receives, as a copy instruction, a series of operations from input of image data by the image data input device to output by the image output device, and even if the image output device is currently operating, the input control device receives the copy instruction.

A forty second aspect of the present invention is an image management device of a dispersed-type copy system in which an image output device is made to output, via a network, image data which is read at an image data input device, the image management device comprising: control section for effecting control such that a series of operations from input of image data by the image data input device to output by the image output device is received as a copy instruction, and even if the image output device is currently operating, the copy instruction is received.

Functions to be executed at the image management system can be easily implemented at any computer by making the program for executing the above-described processing functions portable by storing it on the following medium and by executing the program, which is stored on the medium, at a computer. A forty third aspect of the present invention is a storage medium on which is stored an image management program of a dispersed-type copy system in which an image output device is made to output, via a network, image data which is read at an image data input device, wherein the image management program makes control be effected such that a series of operations from input of image data by the image data input device to output by the image output device are made to be received as a copy instruction, and even if the image output device is currently operating, the copy instruction is made to be received.

Further, by executing the following program on a computer, the above-described processing functions can easily be implemented. A forty fourth aspect of the present invention is an image management program of a dispersed-type copy system in which an image output device is made to output, via a network, image data which is read at an image data input device, wherein the image management program makes control be effected such that a series of operations from input of image data by the image data input device to output by the image output device are made to be received as a copy instruction, and even if the image output device is currently operating, the copy instruction is made to be received.

A forty fifth aspect of the present invention is a management device used in an image output system which is formed by a plurality of image output devices, which output images on the basis of image data, being connected to a network, wherein the management device is connected to the network, and registers a job based on image data transmitted via the network, and transmits a registered job to an image output device which is designated, and if a valid term of the registered job has elapsed, the management device erases the registered job.

In accordance with this aspect of the invention, at the management device, a job based on image data is received via the network and registered. The registered job is transmitted to the image output device. The image output device is made to output the job, i.e., an image based on image data. After the valid term has passed, the management device erases the registered job.

A forty sixth aspect of the present invention is a job managing method in an image output system which is formed by a plurality of image output devices, which output images on the basis of image data, being connected to a network, the job managing method comprising the steps of: registering a job which is based on image data transmitted via the network, and transmitting the job to an image output device which is designated; and if a valid term of a registered job has elapsed, erasing the registered job.

In accordance with this aspect of the invention, a job based on image data is received via the network and registered. The registered job is transmitted to the image output device. The image output device is made to output the job, i.e., an image based on image data. After the valid term has passed, the registered job is erased.

Namely, in the forty fifth and forty sixth aspects of the present invention, for image data for which output is unnecessary if the image data has not been outputted by a predetermined time, the period of time until that predetermined time is set as the valid term of the job, and the job is automatically erased if it has not been outputted by the predetermined time. Thus, output of unnecessary images can be prevented. Further, in the same way, for image data for which there is the possibility of re-output, the period of time over which the data should be held for re-output is set as the valid term of the job, and the image data remains as a job for re-output during that valid term. Thus, the job can be outputted plural times, and when the valid term has elapsed, the job is automatically erased from the memory. Thus, wasteful use of memory resources can be prevented.

Namely, a job can be automatically deleted when the valid term thereof has elapsed. Therefore, even if the operator does not search for and delete an unnecessary job, from among registered jobs or stored jobs for re-output, the unnecessary job can be deleted by the simple work of merely inputting the valid term. Further, there is no fear that a needed job will be mistakenly deleted by an operational error of the operator.

Further, when a job at the image output device which is designated is completed, the management device may erase the registered job.

A forty seventh aspect of the present invention is an image output system comprising: (a) a plurality of image output devices which are respectively connected to a network, and which output images on the basis of image data transmitted via the network; (b) an image input device including: (1) image data input section for input of image data; (2) information input section for input of information designating an image output device which is to output an image, and information expressing a valid term of a job which is based on image data inputted from the image data input section; and (3) transmitting section which is connected to the network, and which transmits, via the network, image data inputted from the image data input section and information inputted from the information input section; and (c) a management device which is connected to the network, and which registers a job which is based on image data transmitted via the network, and which transmits a registered job to an image output device which is designated, and if a valid term of the registered job has elapsed, the management device erases the registered job.

A forty eighth aspect of the present invention is an image input device used in an image output system including: a plurality of image output devices which are respectively connected to a network, and which output images on the basis of image data transmitted via the network; and a management device which is connected to the network, and which registers a job which is based on image data transmitted via the network, and which transmits a registered job to an image output device which is designated, and if a valid term of the job has elapsed, the management device erases the registered job, and the image input device comprises: image data input section for input of image data; information input section for input of information designating an image output device which is to output an image, and information expressing a valid term of a job which is based on image data inputted from the image data input section; and transmitting section which is connected to the network, and which transmits, via the network, image data inputted from the image data input section and information inputted from the information input section.

A forty ninth aspect of the present invention is a management device used in an image output system which includes: (a) a plurality of image output devices which are respectively connected to a network, and which output images on the basis of image data transmitted via the network; and (b) an image input device including: (1) image data input section for input of image data; (2) information input section for input of information designating an image output device which is to output an image, and information expressing a valid term of a job which is based on image data inputted from the image data input section; and (3) transmitting section which is connected to the network, and which transmits, via the network, image data inputted from the image data input section and information inputted from the information input section, wherein the management device is connected to the network, and registers a job which is based on image data transmitted via the network, and transmits a registered job to an image output device which is designated, and if a valid term of the registered job has elapsed, the management device erases the registered job.

A fiftieth aspect of the present invention is a job managing method in an image output system which is formed by: (a) a plurality of image output devices which output images on the basis of image data; (b) a management device which manages the plurality of image output devices; and (c) an image input device including: (1) image data input section for input of image data, and (2) information input section for input of information designating an image output device which is to output an image, and information expressing a valid term of a job which is based on image data inputted from the image data input section, being respectively connected to a network, the job managing method comprising the steps of: transmitting, from the image input device to the management device, image data inputted from the image data input section and information inputted from the information input section; at the management device, registering a job on the basis of the image data transmitted from the input device, and transmitting a registered job to an image output device which is designated; and if a valid term of a registered job has elapsed, erasing the registered job.

Next, the image output system of the forty seventh aspect and the job managing method of the fiftieth aspect will be described together with the image input device of the forty eighth aspect and the management device of the forty ninth aspect.

The image input device includes an image data input section and an information input section. The image data, which is inputted from the image input section, and the information, which designates the image output device which is to output an image, and the information, which expresses the valid term of the job, which information are inputted from the information input section, are transmitted to the management device via the network. When this data and information are received, the management device registers a job based on the image data, and transmits the registered job to the image output device. The management device makes the image output device output the job, i.e., an image based on the image data, and deletes the registered job when the valid term has elapsed.

In this way, for image data, for which output is unnecessary if output has not been carried out by a predetermined time, if the operator inputs, from the information input device and as the valid term of the job, the period of time until that predetermined time, if output is not carried out by that predetermined time, the job is automatically erased. Thus, output of unnecessary images can be prevented. Further, in the same way, for image data for which there is the possibility of re-output, if the operator inputs, from the information input device and as the valid term of the job, the period of time over which that image data is to be held for re-output, the image data will remain as a job for re-output throughout that valid term. Thus, the image data can be outputted plural times, and when the valid term elapses, the job is automatically erased from the memory. Thus, wasteful use of memory resources can be prevented.

Namely, a job can be automatically deleted when the valid term thereof has elapsed. Therefore, even if the operator does not search for and delete an unnecessary job, from among the registered jobs or the stored jobs for re-output, the unnecessary job can be deleted by the simple work of merely inputting the valid term. Further, there is no fear that a needed job will be mistakenly deleted by an operational error of the operator.

Further, if a job at the image output device which is designated is completed before expiration of the valid term, the management device may erase the registered job.

A fifty first aspect of the present invention is a management device used in an image output system which is formed by a plurality of image output devices, which output images on the basis of image data, and an image input device, which inputs image data, being respectively connected to a network, wherein the management device monitors image input and output operations at the image input device and the image output devices, and if a predetermined event occurs, transmits, to a notification destination which is designated in advance, a signal for giving notice of occurrence of the event.

A fifty second aspect of the present invention is an event notifying method in an image output system which is formed by a plurality of image output devices, which output images on the basis of image data, and an image input device, which inputs image data, being respectively connected to a network, the event notifying method comprising the steps of: monitoring image input and output operations at the image input device and the image output devices; and if a predetermined event occurs, transmitting, to a notification destination which is designated in advance, a signal for giving notice of occurrence of the event.

In accordance with the inventions of the fifty first and fifty second aspects, image data is inputted by the image input device, and an image is outputted by the image output device on the basis of that image data. The image input and output operations are monitored, and if an predetermined event occurs, a signal, which is for giving notice that the event has occurred, is transmitted to a notification destination which is designated in advance. In this way, even if the operator moves away from the image input device, if a notification destination, at which the operator can receive the notification in advance, is designated, the signal for giving notice that the event has occurred is transmitted to that notification destination. Therefore, the operator can reliably be informed of the occurrence of the event.

A fifty third aspect of the present invention is an image output system comprising: (a) a plurality of image output devices which are respectively connected to a network, and which output images on the basis of image data transmitted via the network; (b) an image input device including: (1) image data input section for input of image data; (2) information input section for input of information designating a notification destination of an event relating to image input and output operations; and (3) transmitting section which is connected to the network, and which transmits, via the network, image data inputted from the image data input section and information inputted from the information input section; and (c) a management device which is connected to the network, and which monitors image input and output operations at the image input device and the image output devices, and if the event occurs, the management device transmits a signal for giving notice of occurrence of the event to a designated notification destination on the basis of the information designating the notification destination of the event.

A fifty fourth aspect of the present invention is a management device used in an image output system including: (a) a plurality of image output devices which are respectively connected to a network, and which output images on the basis of image data transmitted via the network; and (b) an image input device including: (1) image data input section for input of image data; (2) information input section for input of information designating a notification destination of an event relating to image input and output operations; and (3) transmitting section which is connected to the network and which transmits, via the network, image data inputted from the image data input section and information inputted from the information input section, wherein the management device is connected to the network, and monitors image input and output operations at the image input device and the image output devices, and if the event occurs, the management device transmits a signal for giving notice of occurrence of the event to a designated notification destination on the basis of the information designating the notification destination of the event.

A fifty fifth aspect of the present invention is an event notifying method in an image output system which is formed by: a plurality of image output devices which output images on the basis of image data; an image input device including: image data input section for input of image data, and information input section for input of information designating a notification destination of an event relating to image input and output operations; and a management device which monitors image input and output operations at the image input device and the image output devices, being respectively connected to the network, the event notifying method comprising the steps of: transmitting, from the image input device to the management device, the information designating the notification destination of the event, which information is inputted from the information input section; and when the event relating to image input and output operations occurs, transmitting a signal for giving notice of occurrence of the event, by the management device and on the basis of the information designating the notification destination of the event and to the designated notification destination.

The image output system of the fifty third aspect and the event notifying method of the fifty fifth aspect will be explained together with the management device of the fifty fourth aspect.

The image input device includes the image data input section and the information input section. At the image output device, an image is outputted on the basis of image data which has been inputted from the image data input section and which has been transmitted via the network. The information, which designates an event notification destination and which is inputted from the information input section, is transmitted to the management device via the network. At the management device, the image input and output operations at the image input device and the image output device are monitored. In a case in which an event relating to image input and output operations occurs, on the basis of the received information which designates the event notification destination, a signal for giving notice that the event has occurred is transmitted to the designated notification destination. In this way, even if the operator moves away from the image input device, the signal, which gives notice that an event has occurred, is transmitted to the notification destination which the operator designated. Thus, the operator can reliably be notified of the occurrence of the event.

The notification destination of the event can be made to be changeable over time, or can be made to be changeable per job, or can be set in common in advance. Further, it is possible to enable selection, per job, of whether occurrence of an event should be notified or not notified.

A fifty sixth aspect of the present invention is an image output system comprising: (a) a plurality of image output devices which are respectively connected to a network, and which output images on the basis of image data transmitted via the network; (b) an image input device including: (1) image data input section for input of image data; and (2) image data transmitting section which is connected to the network and which transmits, via the network, image data inputted from the image data input section; (c) an information input device including: (1) information input section for input of information designating a notification destination of an event relating to image input and output operations; and (2) information transmitting section which is connected to the network and which transmits, via the network, information inputted from the information input section; and (d) a management device which is connected to the network, and which monitors image input and output operations at the image input device and the image output devices, and which, if the event occurs, transmits, to a designated notification destination, a signal for giving notice of occurrence of the event.

A fifty seventh aspect of the present invention is a management device used in an image output system including: (a) a plurality of image output devices which are respectively connected to a network, and which output images on the basis of image data transmitted via the network; (b) an image input device including: (1) image data input section for input of image data; and (2) image data transmitting section which is connected to the network and which transmits, via the network, image data inputted from the image data input section; and (c) an information input device including: (1) information input section for input of information designating a notification destination of an event relating to image input and output operations; and (2) information transmitting section which is connected to the network and which transmits, via the network, information inputted from the information input section, wherein the management device is connected to the network, and monitors image input and output operations at the image input device and the image output devices, and if the event occurs, transmits, to a designated notification destination, a signal for giving notice of occurrence of the event.

A fifty eighth aspect of the present invention is an event notifying method in an image output system which is formed by: a plurality of image output devices which output images on the basis of image data; an image input device for input of image data; an information input device for input of information designating a notification destination of an event relating to image input and output operations; and a management device which monitors image input and output operations at the image input device and the image output devices, being respectively connected to the network, the event notifying method comprising the steps of: transmitting, from the information input device to the management device, inputted information designating a notification destination of an event; and when the event relating to image input and output operations occurs, transmitting a signal for giving notice of occurrence of the event, by the management device and on the basis of the information designating the notification destination of the event and to the designated notification destination.

The image output system of the fifty sixth aspect and the event notifying method of the fifty eighth aspect will be explained together with the management device of the fifty seventh aspect.

At the image output device, an image is outputted on the basis of image data which has been inputted from the image input device (image data input section) and which has been transmitted via the network. At the information input device, the information, which designates an event notification destination and which is inputted from the information input section, is transmitted to the management device via the network. At the management device, the image input and output operations at the image input device and the image output device are monitored. In a case in which an event relating to image input and output operations occurs, on the basis of the received information which designates the event notification destination, a signal for giving notice that the event has occurred is transmitted to the designated notification destination. In this way, even if an information input device, for inputting the information for designating the event notification destination, is provided separately from the image input device, in the same way as in the first, third and fifth aspects, even if the operator moves away from the image input device, the signal, which gives notice that an event has occurred, is transmitted to the notification destination which the operator designated. Thus, the operator can reliably be notified of the occurrence of the event.

The notification destination of the event can be made to be changeable over time, or can be made to be changeable per job, or can be set in common in advance. Further, it is possible to enable selection, per job, of whether occurrence of an event should be notified or not notified.

BRIEF DESCRIPTION OF THE DRAWINGS

FIG. 7B is a flowchart for explaining a processing routine which is executed by the scanner.

FIG. 8 is a diagram showing an initial screen which is displayed on a display panel at a time of start-up of the scanner.

FIG. 11 is a diagram showing an operation screen for printing.

FIG. 13A is a flowchart for explaining a processing routine which is executed by a server of a modified example of a first embodiment.

FIG. 14A is a processing routine which is executed by a controller of the server.

FIG. 15A is a processing routine which is executed by a controller of the scanner.

FIG. 17 is a diagram showing an example of an error screen which reports errors at the time of start-up of the scanner.

FIG. 23B is a flowchart of a control routine which is executed at the scanner.

FIG. 25B is a flowchart of a control routine which is executed at the server.

FIG. 27A is a flowchart of a control routine which is executed at the client.

FIG. 31 is an example of a setting screen of respective functions at a time of new copying.

FIG. 36B is a flowchart of a control routine which is executed at the scanner.

FIG. 38B is a processing routine which is executed by the controller of the scanner.

FIG. 42 is an example of an operation screen which is displayed in order to designate a destruction time.

FIG. 44B is a processing routine which is executed by the controller of the scanner.

FIG. 47 is an example of an operation screen for event notification setting which is displayed in order to set event notification of the printer.

DESCRIPTION OF THE PREFERRED EMBODIMENTS

First Embodiment

Figure 1:
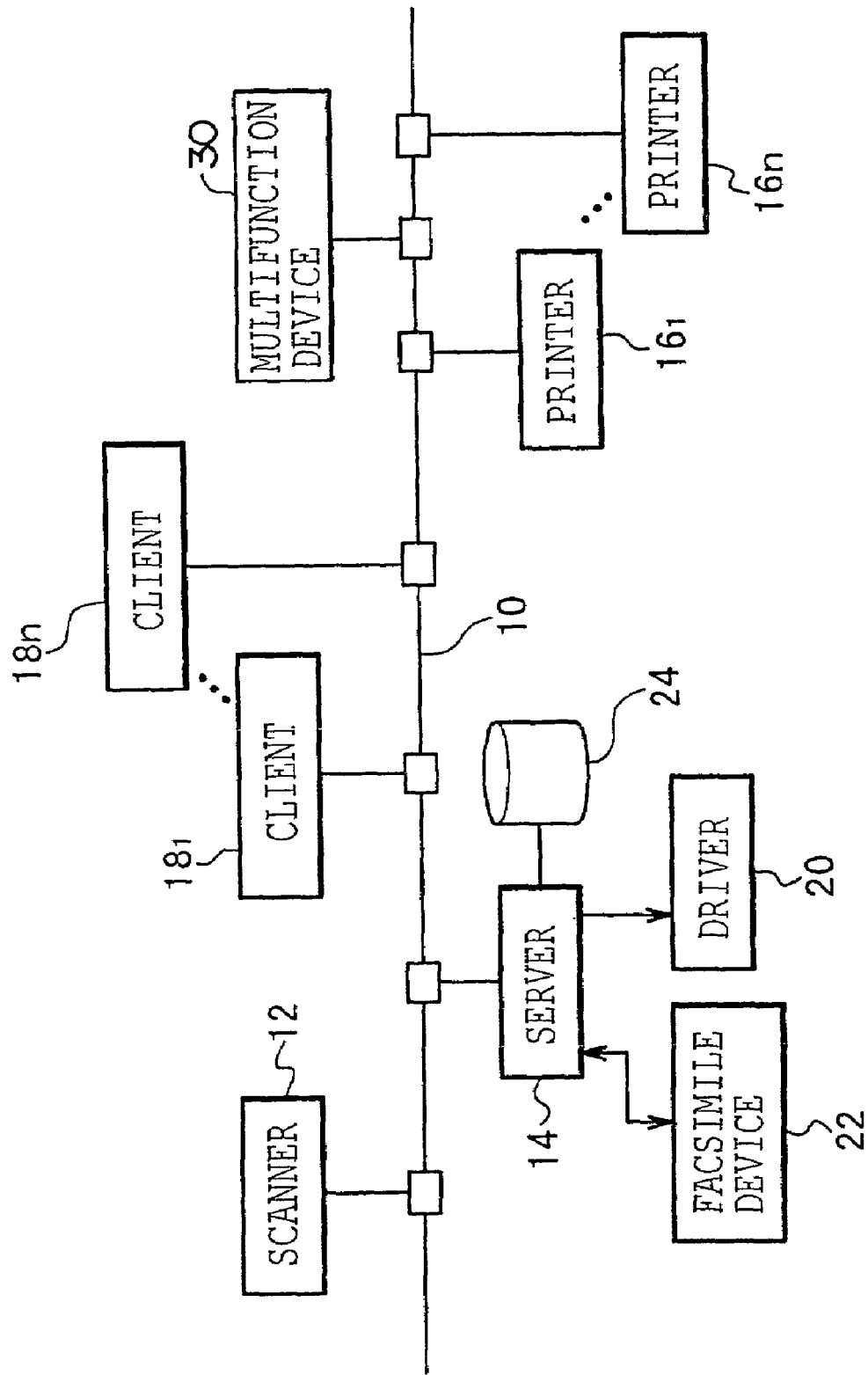
FIG. 1 is a block diagram showing a schematic structure of a print system.

Hereinafter, a first embodiment of the present invention will be described in detail with reference to the drawings. As shown in FIG. 1, a print system of the present embodiment is structured by a scanner 12, which serves as an image data input device which inputs image data, a server 14, printers $16_1$, $16_2$ (not show in the drawings), ... $16_n$, which are a plurality of image output devices, and a plurality of clients $18_1$, $18_2$ (not show in the drawings), ... $18_n$, being connected to a network 10 which is formed by the internet, a LAN or the like. The image data is expressed in, for example TIFF (Tagged Image File Format). Further, a multifunction device 30, which is provided with a printer function, a scanner function, and a facsimile device function, is connected to the network 10.

Figure 2:
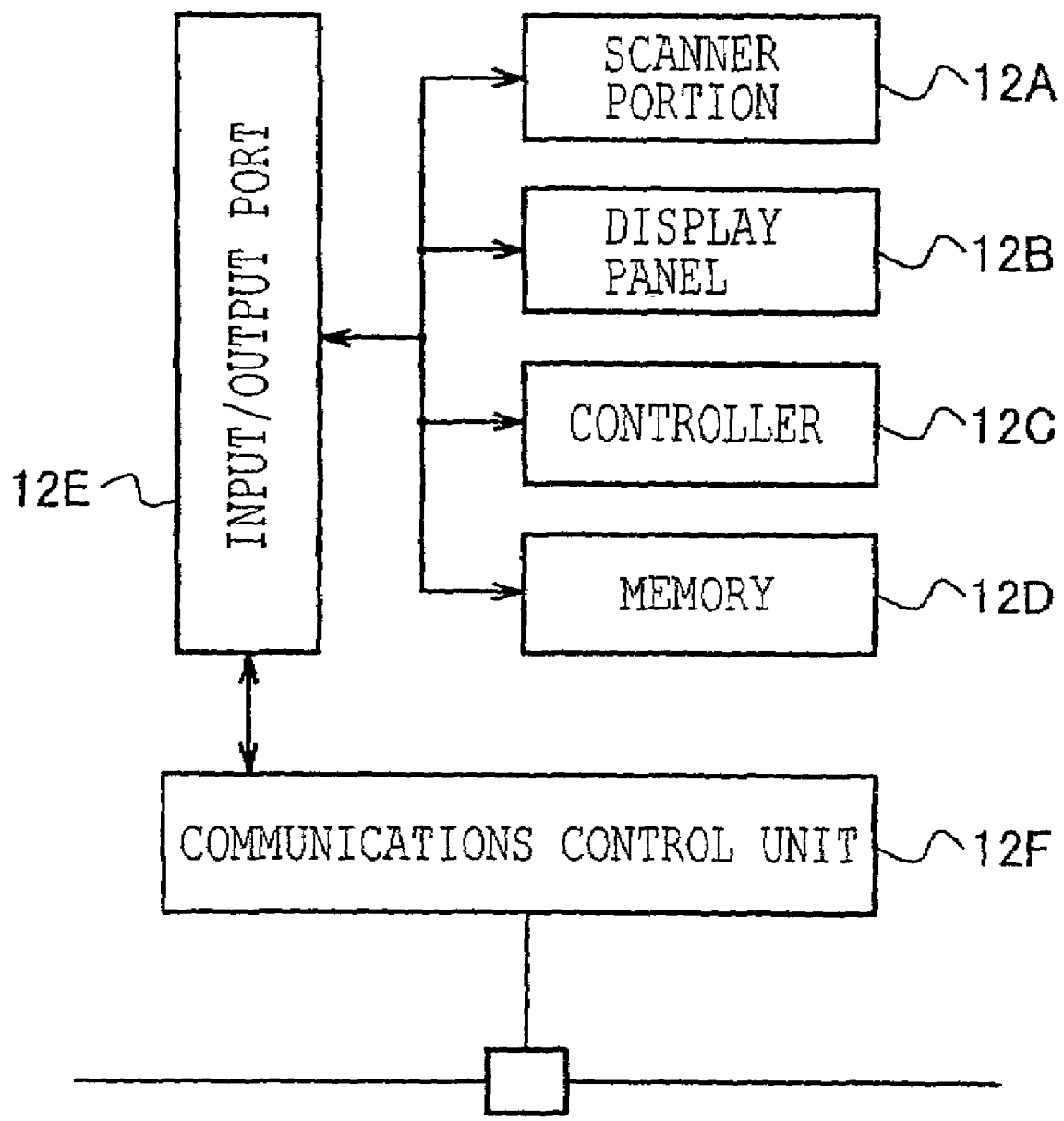
FIG. 2 is a block diagram showing a schematic structure of a scanner.

As shown in FIG. 2, the scanner is provided with a scanner portion 12A equipped with a CCD which reads an image recorded on an original; a display panel 12B (preferably structured by superposing touch panels on a liquid crystal display board) which displays an operation screen for printing equipped with a plurality of icons, and which functions as a user interface for the input of data, such as the printing format (output format) of a printer or the like, by the displayed icons being touched; a controller 12C for controlling the entire scanner; a memory 12D which stores image data read by the scanner portion 12A and the like; and an input/output port 12E for the input and output of data. The scanner portion 12A, the display panel 12B, the controller 12C, the memory 12D, and the input/output port 12E are connected to one another via a bus. The input/output port 12E is connected to the network 10 via a communications control unit 12F which carries out communications, via the network, with devices connected to the network.

The user interface, which is for the input of data from the operation screen for printing which is equipped with plural icons, is divided into user interface parts, which are elements of screen information such as icons, buttons, scroll bars, frames and the like, and attribute information of the printer 16 which is expressed by text data. The user interface parts (icon information) are stored in the memory 12D of the scanner, and the attribute information of the printer 16 is stored in the server 14 as will be describe later. Note that the screen information can be created by, for example, HTML (Hypertext Makeup Language).

In this way, the user interface is divided into the user interface parts and the attribute information, which are stored so as to be divided between the scanner 12 and the server 14. Thus, in a case in which data for forming the user interface is transmitted to the scanner 12 from the server 14, the amount of data transmitted from the server 14 to the scanner 12 can be made small, and the user interface can thereby quickly be displayed on the display panel 12B. Note that the program of processing routine, which will be described later, is also stored in the memory 12D.

Note that it is possible for the user interface, which displays the operation screen for printing, to not be stored in a divided manner, and for all of the information to be generated at the server 14 and transmitted to a controller 12C of the scanner 12.

Further, in place of the scanner 12, image data, which is in electronic form and which is recorded on a storage medium such as an FD, a CD-ROM or the like, may be read and inputted. Or, image data may be inputted from a facsimile or a database by using a personal computer. Or, image data may be inputted by using mail software which is installed in a personal computer.

The printers $16_1$, $16_2$, ... $16_n$ have substantially the same structures, and the different points thereof are only their attributes. Thus, with reference to FIG. 3, description will be given of one printer, and description of the other printers will be omitted. Note that, in the following explanation, in cases in which a printer is described without particularly differentiating the respective printers, the printer will be referred to as "printer 16", with the subscript at the end thereof omitted.

Figure 3:
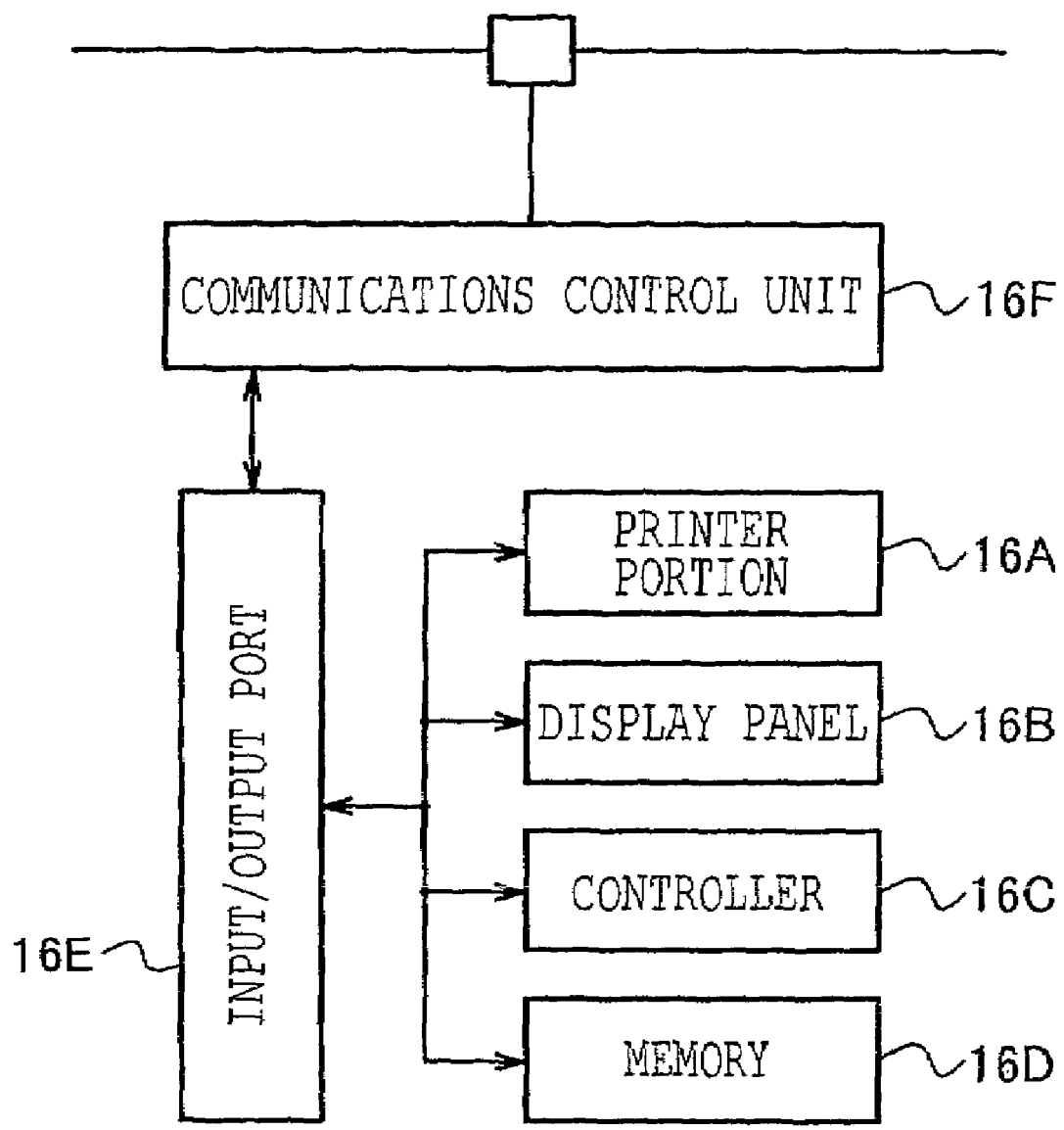
FIG. 3 is a block diagram showing a schematic structure of a printer.

As shown in FIG. 3, the printer 16 is equipped with a printer portion 16A which records an electrostatic latent image on a photosensitive body, and develops the electrostatic latent image by using a monochrome toner or a color toner, and transfers and outputs the developed image onto a recording sheet which is a recording medium; a display panel 16B, such as a touch panel or the like, which displays an operation screen and which is for operating the printer 16 by icons of the displayed operation screen being touched or the like; a controller 16C which controls the entire printer 16; a memory 16D which stores received image data and data of the output format and the like, and which stores, in advance, the program of a processing routine which will be described later, and the like; and an input/output port 16E for the input and output of data. The printer portion 16A, the display panel 16B, the controller 16C, the memory 16D and the input/output port 16E are connected to one another by a bus. The input/output port 16E is connected to the network 10 via a communications control unit 16F which carries out communications, via the network, with devices connected to the network.

A driver 20, which reads and inputs data recorded on a CD-ROM drive, a FDD, a CD-RW drive (which are external storage devices) and the like, and which can write data as well, and a facsimile device 22, and a database 24, which stores attribute information and the like of all of the printers 16 connected to the network, are connected to the server 14.

Figure 4:
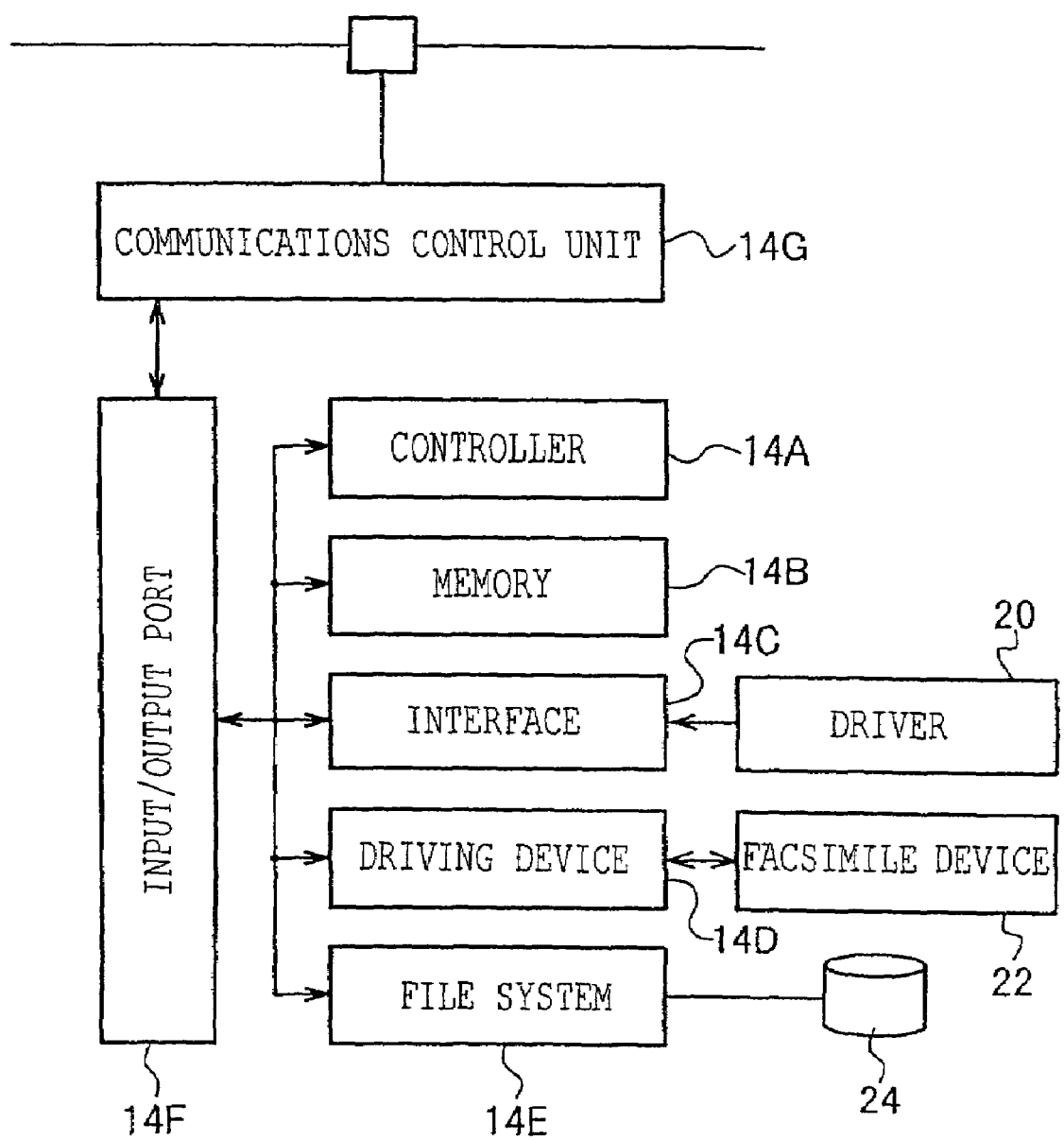
FIG. 4 is a block diagram showing a schematic structure of a server.

As shown in FIG. 4, the server 14 is equipped with a controller 14A which controls the entire server; a memory 14B which stores received data, and which stores in advance program of mailer which carries out transmitting and receiving of mail, and program for carrying out control of transmission and receipt of the facsimile device, and program of a processing routine which will be described later, and the like; an interface 14C which is connected to the driver 20 which is formed by a CD-ROM writer or the like; a driving device 14D which drives the facsimile device 22; a file system 14E which is connected to the database 24; and an input/output port 14F for the input and output of data. The controller 14A, the memory 14B, the interface 14C, the driving device 14D, the file system 14E, and the input/output port 14F are connected to one another via a bus. The input/output port 14F is connected to the network 10 via a communications control unit 14G which carries out communications, via the network, with devices connected to the network.

A database server, which is connected to the network, may be provided separately from the server 14, and the database 24 may be connected to this database server.

The clients $18_1, 18_2, \ldots 18_n$ are formed by personal computers which are equipped with communications control units for carrying out, via the network, communications with devices connected to the network.

Processing routines, which are executed by the respective controllers of the scanner, the server and the printer of the present embodiment, will be described hereinafter with reference to FIGS. 5 through 7. These processing routines are divided into routines for attribute information registration processing, operation screen display processing, printing instructing processing, and printing processing, and each will be described separately hereinafter.

[Attribute Information Registration Processing]aAttribute information registration processing is a processing for registering, in the database connected to the server 14, the attribute information of the printers 16 connected to the network.

In a case in which the printer 16 is connected to the network 10, by operating an operation panel (not shown) provided at the server 14 or by operating management tool software provided at the server 14 from the client 18 which is connected to the server 14 via the network, attribute information registration processing for registering the attribute information of the printer 16 in the server 14 is carried out. Namely, at the server 14, by an instruction to the management tool software, in step 108 of FIG. 6, when it is judged that there is an attribute information registration processing request, in step 109, a registration processing request signal, which requests registration processing of printer attribute information, is transmitted from the server 14 to the printer 16.

Figure 5:
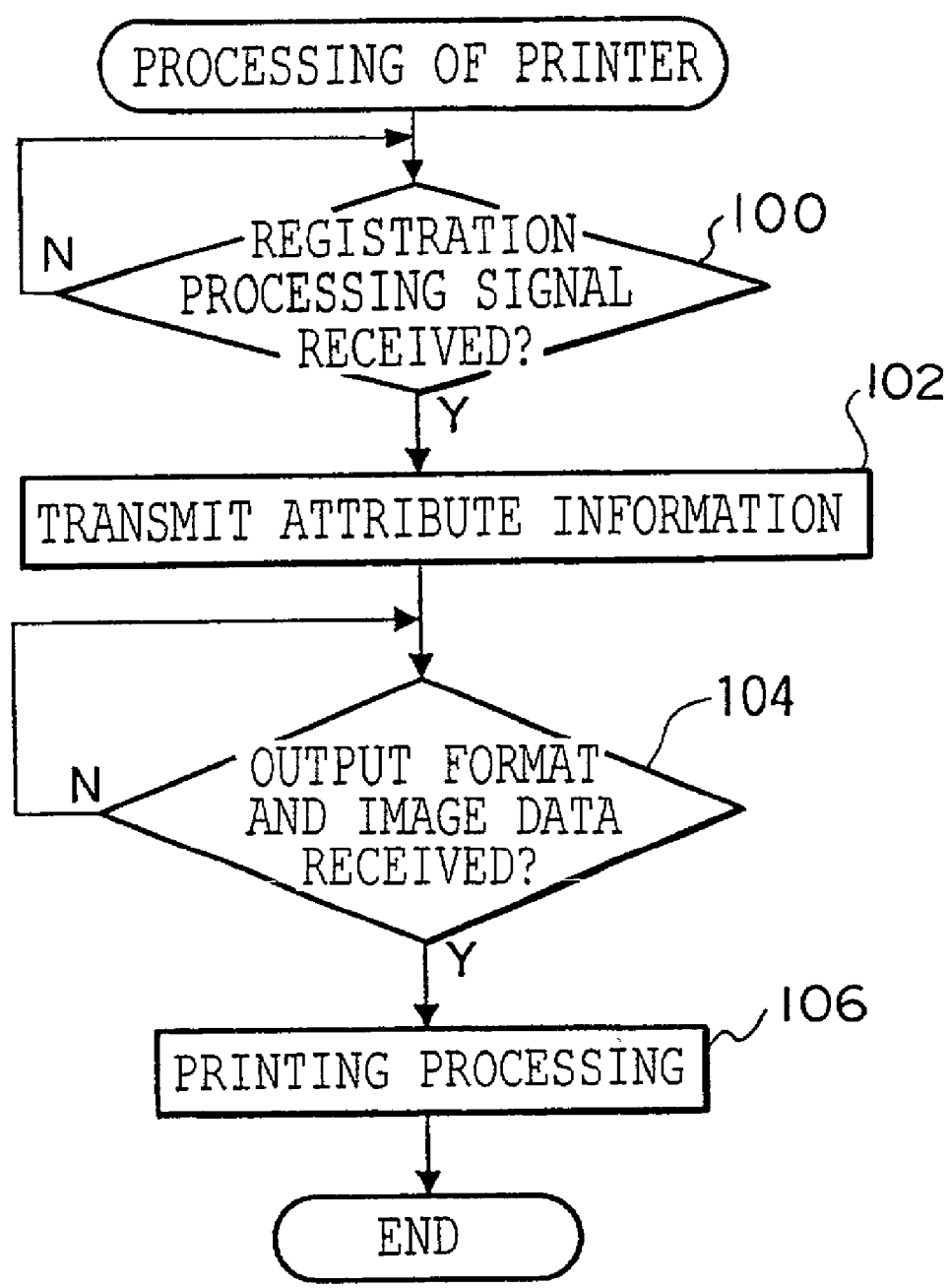
FIG. 5 is a flowchart for explaining a processing routine which is executed by the printer.

At the printer 16, in step 100 of FIG. 5, a determination is made as to whether a registration processing request signal has been received. If a registration processing request signal has been received, in step 102, attribute information of the printer 16 is transmitted from the printer 16 to the server 14.

In step 110, the server 14 judges whether attribute information transmitted from the printer 16 has been received. If attribute information has been received, in step 112, the file system 14E is controlled, and the attribute information of the printer 16 is registered in the database 24.

When the printer 16 is connected to the network 10, the printer 16 may automatically transmit the attribute information to the server 14, and the registration of the attribute information in the database 24 may be carried out automatically. Or, the attribute information of the printer 16 may be detected by the server 14, and the detected attribute information may be registered in the database. Further, the display panel 16B provided at the printer 16 may be operated so as to register the attribute information of the printer 16 in the server 14. In this way, the attribute information of all of the printers 16 connected to the network 10 are registered in the database 24 connected to the server 14.

Examples of attribute information of the printer 16 are information expressing whether the printer 16 is for black-and-white printing or for color printing; information expressing whether the printer 16 has a function for printing on both sides of a sheet; information expressing whether the printer 16 has a finisher (a function for stapling or a function for punching holes or the like); information expressing whether the printer 16 is high resolution or low resolution; information expressing the size of sheets which can be printed; information relating to the types of fonts that the printer 16 is equipped with; information relating to the output format such as color characteristic information like a particular color map or color adjusting information or the like in the case of a color printer; information of network settings such as the IP address, information relating to the place where the printer is set (the floors or departments or the like when printers are set in one building, or the departments or the like when printers are set in different buildings), and the like; and information for identifying the printer 16 such as information of the printer name or the like. All of the information relating to the output formats and output conditions of the printers 16 are registered in the database as attribute information.

[Operation Screen Display Processing]

Figure 8:
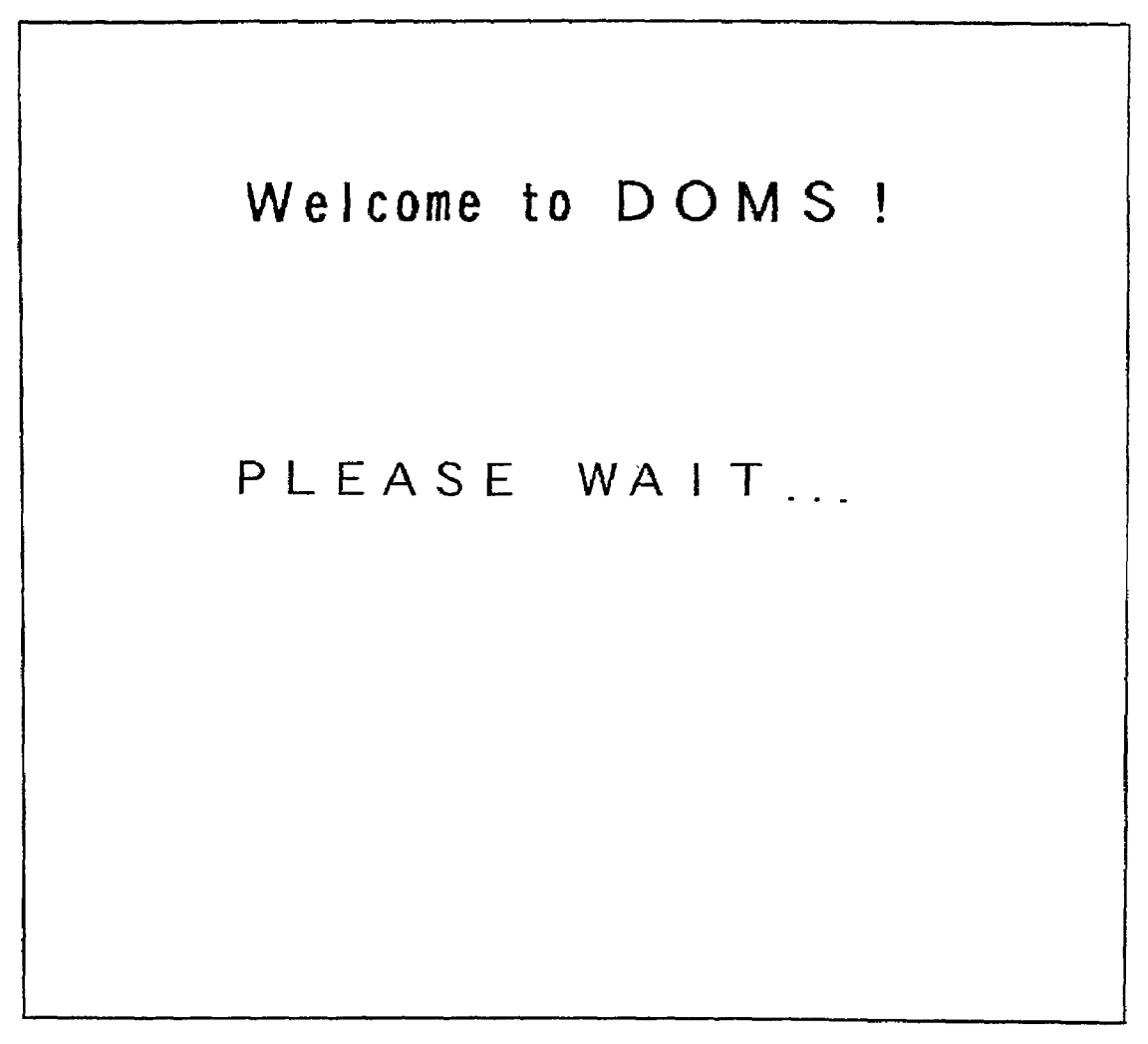
Figure 9:
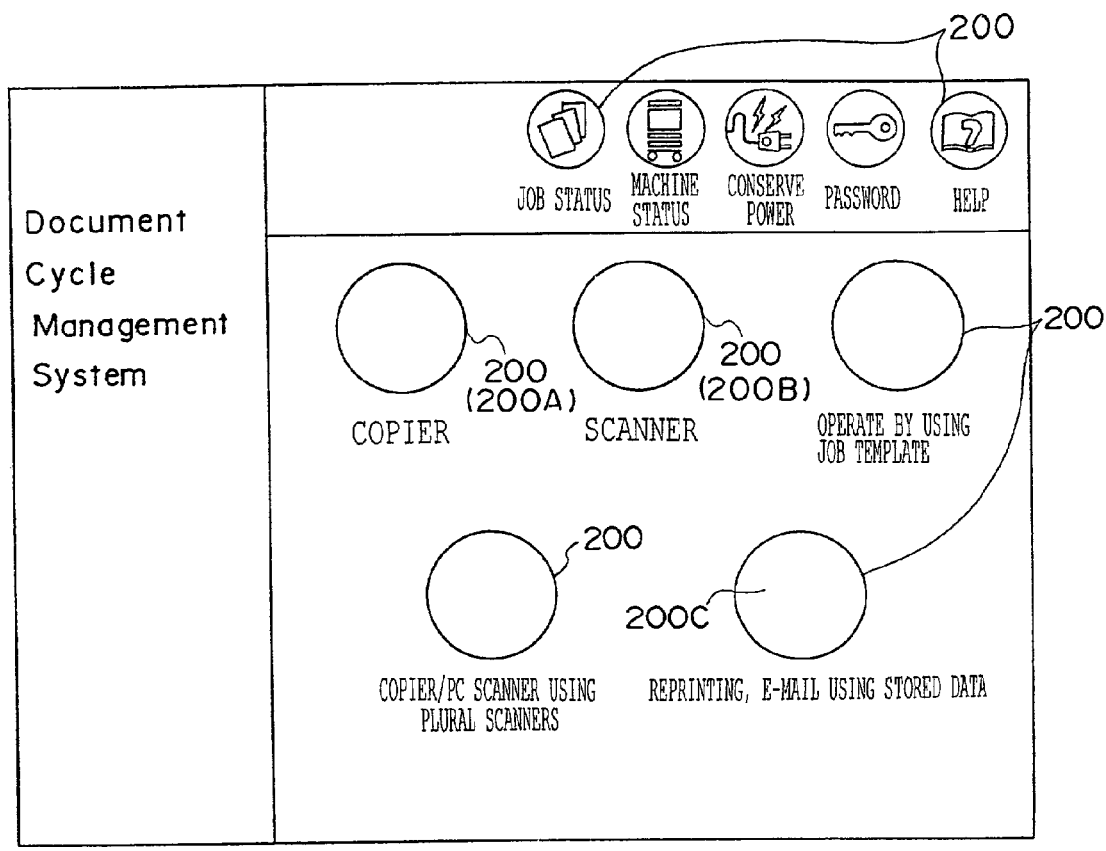
FIG. 9 is a diagram showing a menu screen for service selection.

When the scanner 12 is activated, at the display panel 12B of the scanner 12, first, the initial screen (start-up screen) shown in FIG. 8 is displayed. Next, the menu screen for service selection shown in FIG. 9 is displayed. At the menu screen, as shown in FIG. 9, service selection buttons 200, which are displayed by icons, are displayed. When a button 200A is clicked on, the copy (printing) service is selected. When a button 200B is clicked on, the scanner service is selected.

Figure 10:
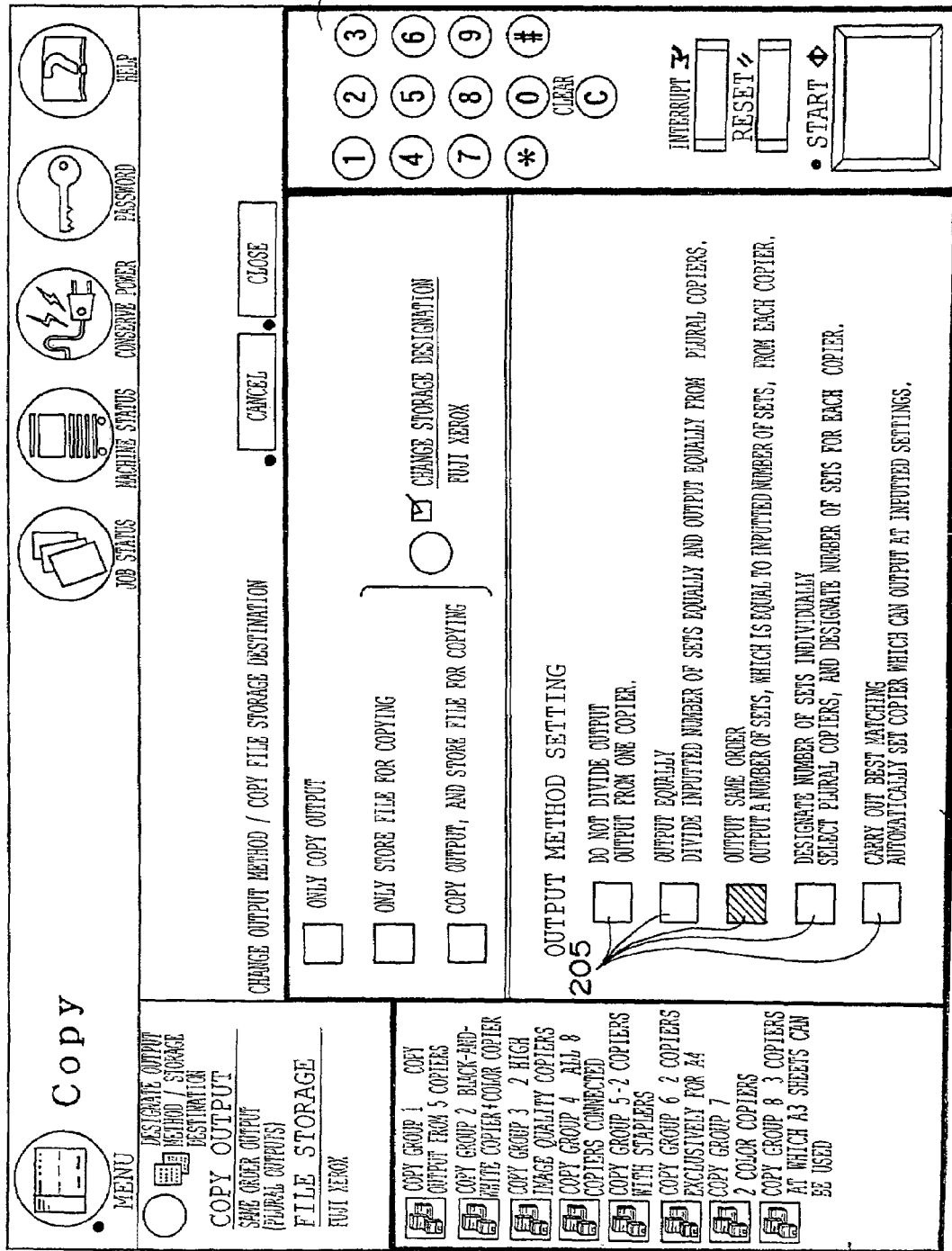
FIG. 10 is a diagram showing an operation screen for carrying out output method/storage destination designation.

When an operator presses the button 200A and selects the copy service from the menu screen shown in FIG. 9 which is displayed on the display panel 12B of the scanner 12, the operation screen for carrying out designation of the output method/storage destination shown in FIG. 10 is displayed. This operation screen includes a group display portion 202 which displays, in groups which were registered in advance by operation of an operator, the printers 16 which are connected to the network 10; a setting portion 204 for setting the output method and the like; and a tenkey portion 206. Selection buttons 205 for the output method and the like which are displayed by icons, are displayed in the setting portion 204. The choices for the output method are "Do not divide output" for one job to be outputted from one printer without being divided; "Output equally (equal output)" for the inputted number of sets to be divided and outputted to plural printers such that the outputted sets from the respective printers are equal; "Output same order (same order output)" for a number of sets, which is equal to the inputted number of sets, to be outputted from each of the printers; "Designate sets individually (individual set designation)" for designating plural printers and for designating the number of sets for each printer; and "Carry out best matching (best match)" for designating output conditions and for selecting and outputting from the printer which is the most suited to those conditions. By clicking on the selection button 205, one of the output methods can be selected. In the operation screen shown in FIG. 10, a state is shown in which "Same order output", by which a number of sets equal to the inputted number of sets is outputted from each printer, is selected as the output method.

Figure 7A:
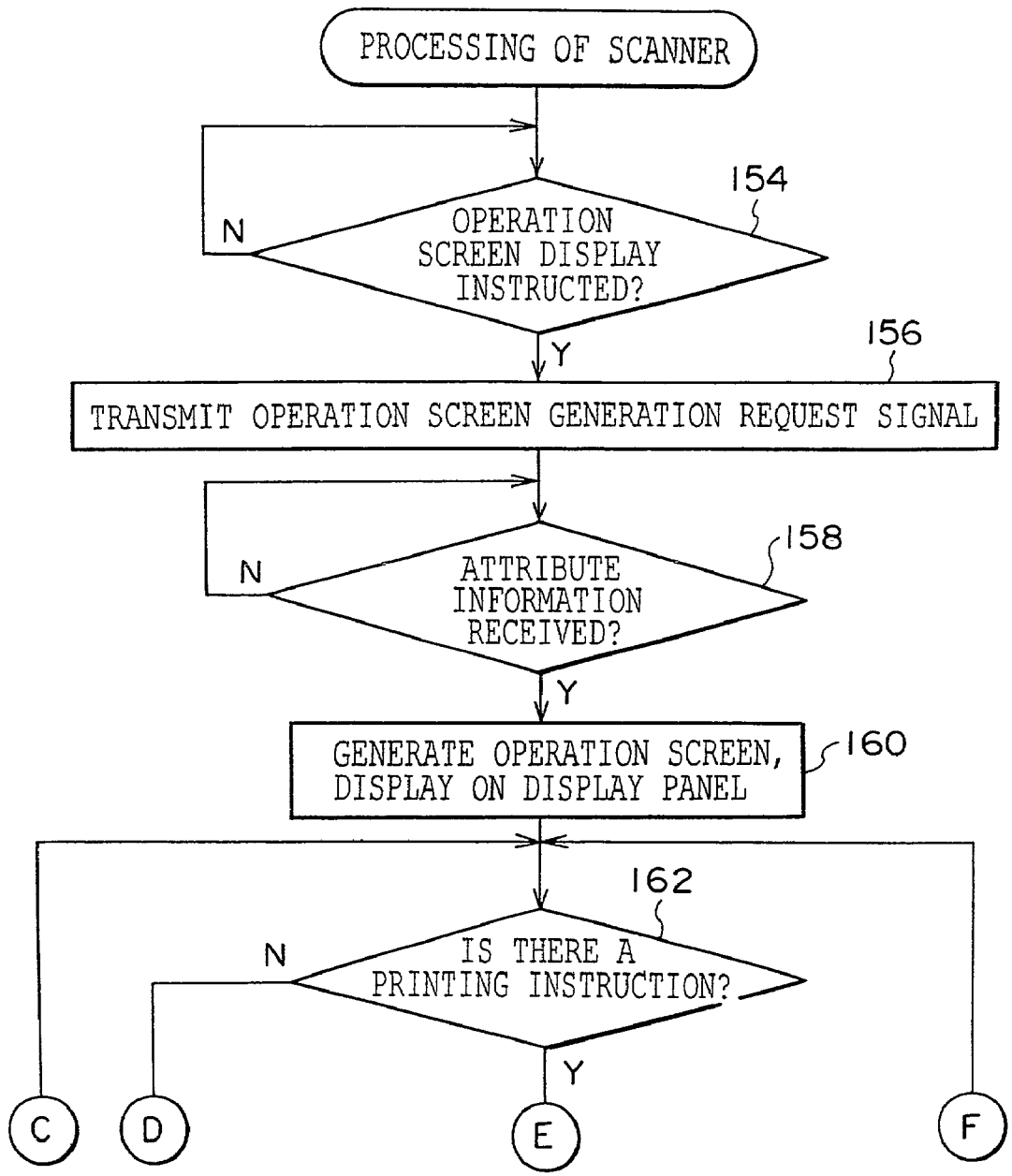
FIG. 7A is a flowchart for explaining a processing routine which is executed by the scanner.

When the operator selects one group of the printers 16 displayed in the group display portion 202 of the operation screen, in step 154 of FIG. 7, it is judged that there is an instruction for display of operation screen for printing. In step 156, in order to generate an operation screen generating request signal, an operation screen for printing is transmitted to the server 14 from the scanner 12. Further, it is possible for only information expressing that a group of printers 16 has been selected to be transmitted from the scanner 12 to the server 14.

Figure 6A:
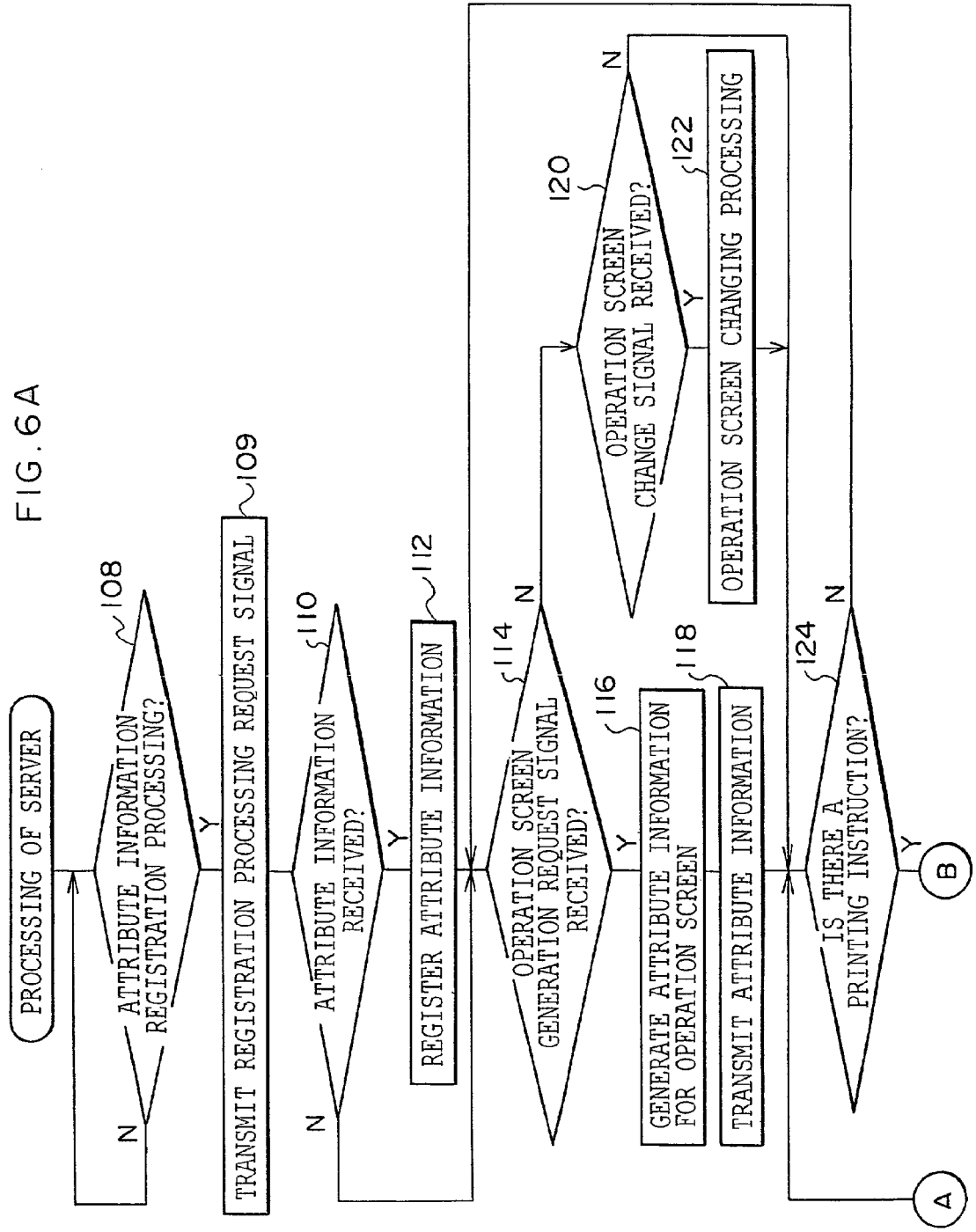
FIG. 6A is a flowchart for explaining a processing routine which is executed by the server.
Figure 6B:
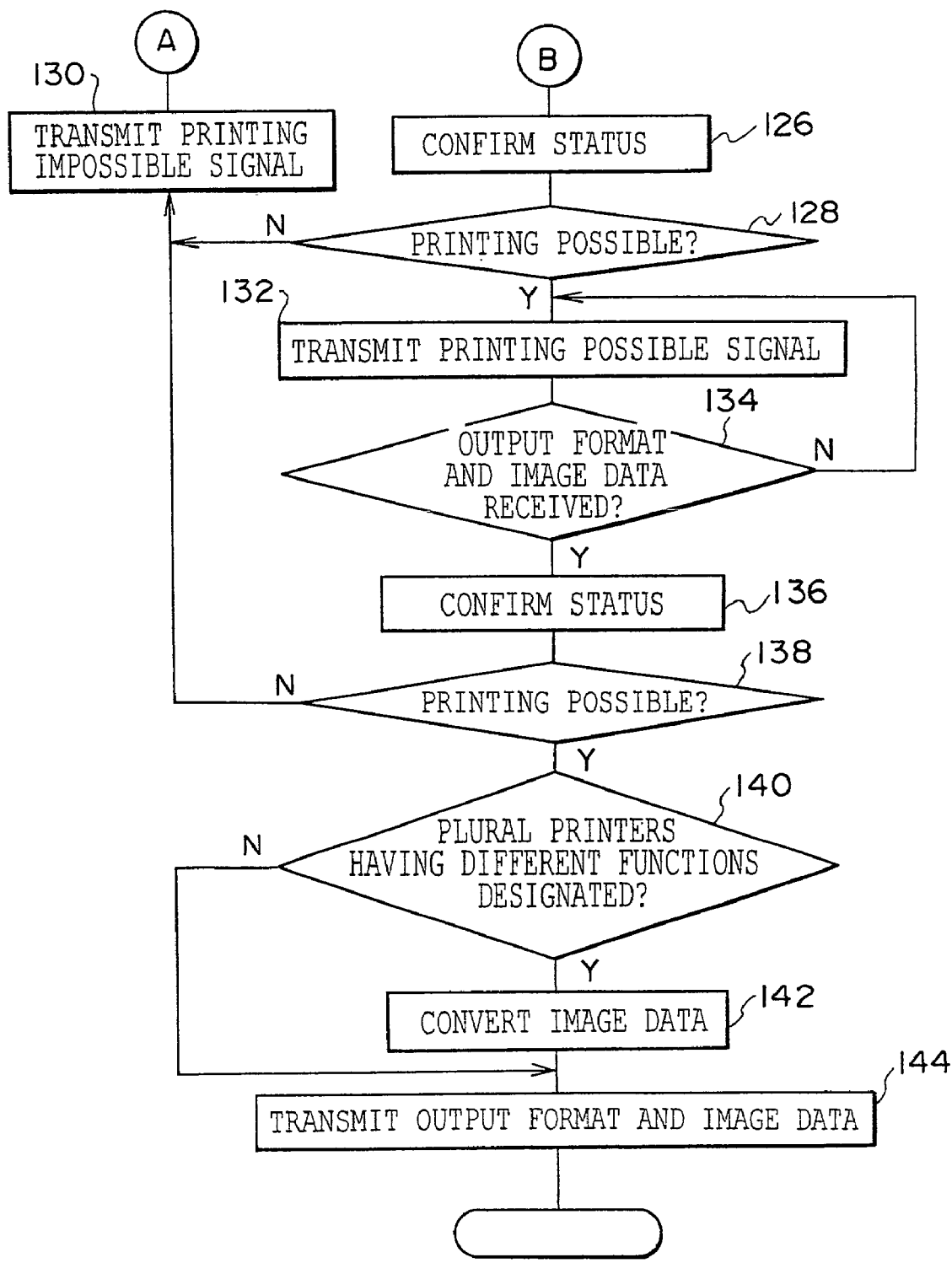
FIG. 6B is a flowchart for explaining a processing routine which is executed by the server.

At the server 14, when it is judged in step 114 of FIG. 6 that an operation screen generating request signal transmitted from the scanner 12 has been received, in step 116, the status of the printer 16 connected to the network 10 is confirmed. On the basis of the operation screen generating request signal and the registered attribute information of the printer 16, attribute information for generating an operation screen for printing of the designated printer 16 is generated. In step 118, the generated attribute information is transmitted to the scanner 12.

A request signal, for display of the attribute information of all of the printers 16 connected to the network 10, or for display of only the attribute information of the printers 16 equipped with a color printing function, or for display of attribute information of only the printers 16 of a group designated in advance, or the like, can be transmitted as the operation screen generating request signal.

At this time, by confirming the status of the designated printer 16, in a case in which there exists a printer 16 which is down due to an error such as the power being off, a paper jam, no sheets being accommodated in the tray, or the like, the server 14 generates attribute information for generating an operation screen for printing such that the attribute information of the printer 16 which is down is not displayed. At this time, information for displaying an operation screen for printing which displays error information expressing, for the printer 16 that is down, that the printer 16 is down, may be generated.

Figure 11:
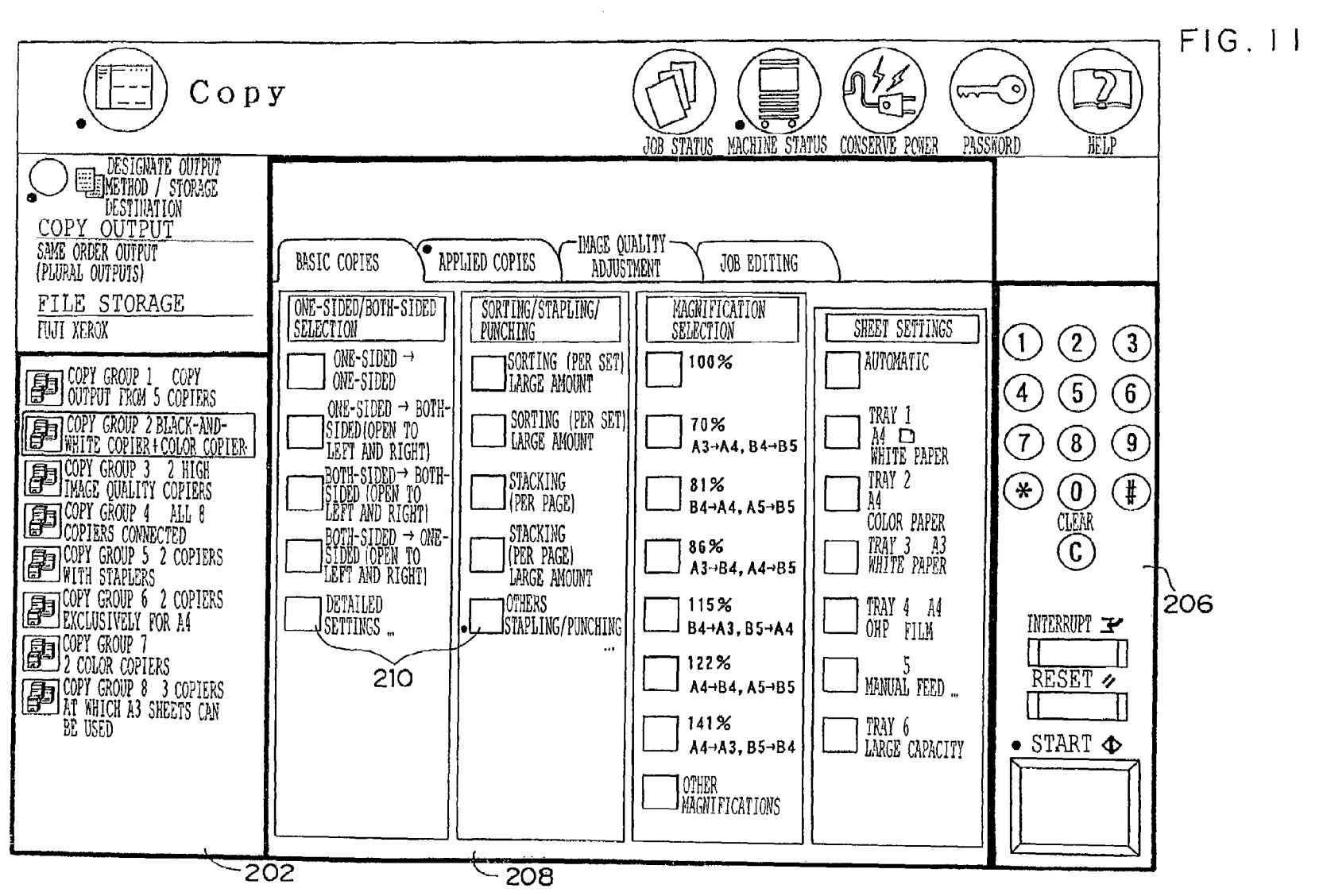

When the attribute information is transmitted from the server 14 to the scanner 12 and it is judged in step 158 of FIG. 7 that the attribute information from the server 14 has been received, the scanner 12 combines the received attribute information, which is expressed as text data for generating an operation screen for printing, and user interface parts, which are stored in the memory 12D and which express picture information such as buttons or the like, and the scanner 12 generates the operation screen for printing which is shown in FIG. 11. In step 160, the generated operation screen for printing is displayed on the display panel 12B as the user interface. The operation screen for printing is formed so as to include the group display portion 202; a parameter setting portion 208 for setting output parameters expressing the image data output format such as the paper size, the enlargement/reduction magnification, and the like; and the ten-key portion 206. Parameter selection buttons 210 displayed by icons are displayed in the parameter setting portion 208.

When the operator operates the displayed operation screen for printing and designates a screen change of the operation screen for printing, the routine moves from step 162 in FIG. 7 on to steps 164 and 166, and moves from step 114 in FIG. 6 on to steps 120 and 122, and operation screen changing processing is carried out. In this operation screen changing processing, as shown in steps 156 through 160 of FIG. 7 and in steps 114 through 118 of FIG. 6, a new operation screen generating request signal is transmitted to the server 14 in accordance with the operation of the display panel 12B of the scanner 12, and attribute information for generating a new operation screen for printing is generated by the server 14, and the generated attribute information is transmitted. As a result, the display of the operation screen for printing is changed in accordance with operation using the operation screen for printing of the display panel 12B of the scanner 12.

To describe the operation screen changing processing in further detail, by operation of the operation screen for printing shown in FIG. 11 of the display panel 12B of the scanner 12, a group of printers 16 displayed in the group display portion 202 of the operation screen for printing is selected, and the printers 16 belonging to the group are designated. When an operation screen generating request signal for setting output instructions to the printers belonging to the designated group is transmitted, at the server 14, the logical product of the attribute information of the printers 16 belonging to the group is computed. The attribute information common to the printers 16 belonging to the group is selected, and the common attribute information is transmitted to the scanner 12. In this way, an operation screen for printing, which displays a group of printers 16 and attribute information common to the group, is newly generated and displayed.

When a plurality of printers 16 are registered as one group, the operator selects attribute information expressing the function which is to be grouped. When an operation screen generating request signal for displaying the printers 16 having that attribute information is transmitted to the server 14, all of the printers 16 equipped with the selected attribute are displayed. Thus, by the operator selecting, from the screen, the printers 16 which are to be grouped and giving a grouping instruction to the server 14, grouping can be carried out.

In the screen shown in FIG. 10, when the operator selects, as the output method, the "Do not separate output" button so that one job will be outputted without being divided, and selects one group of printers 16 displayed in the group display portion 202, a list (not shown) of the printers 16 belonging to the selected group is displayed. Or, a list (not shown) of the single printers 16 which are not grouped may be displayed in the group display portion 202. When individual printer 16 is selected from this printer list, at the server 14, the attribute information of the selected printer 16 is selected and transmitted to the scanner 12. An operation screen for printing, which displays the attribute information of the selected printer 16, is generated and is displayed on the display panel 12B of the scanner 12.

When attribute information of the outputting printers 16, i.e., the output conditions, are designated, and display (best match) of the printers 16 which are the most suited to the conditions is selected as the output method, at the server 14, the logical sum of the attribute information of the printers 16 belonging to the group selected as the output destination is computed. The attribute information of the printers 16 based on these results of computation is transmitted to the scanner 12. At the scanner 12, an operation screen for printing is generated and displayed on the display panel 12B. All of the attribute information which can be selected by the operator can be displayed in a list by this screen.

Figure 12:
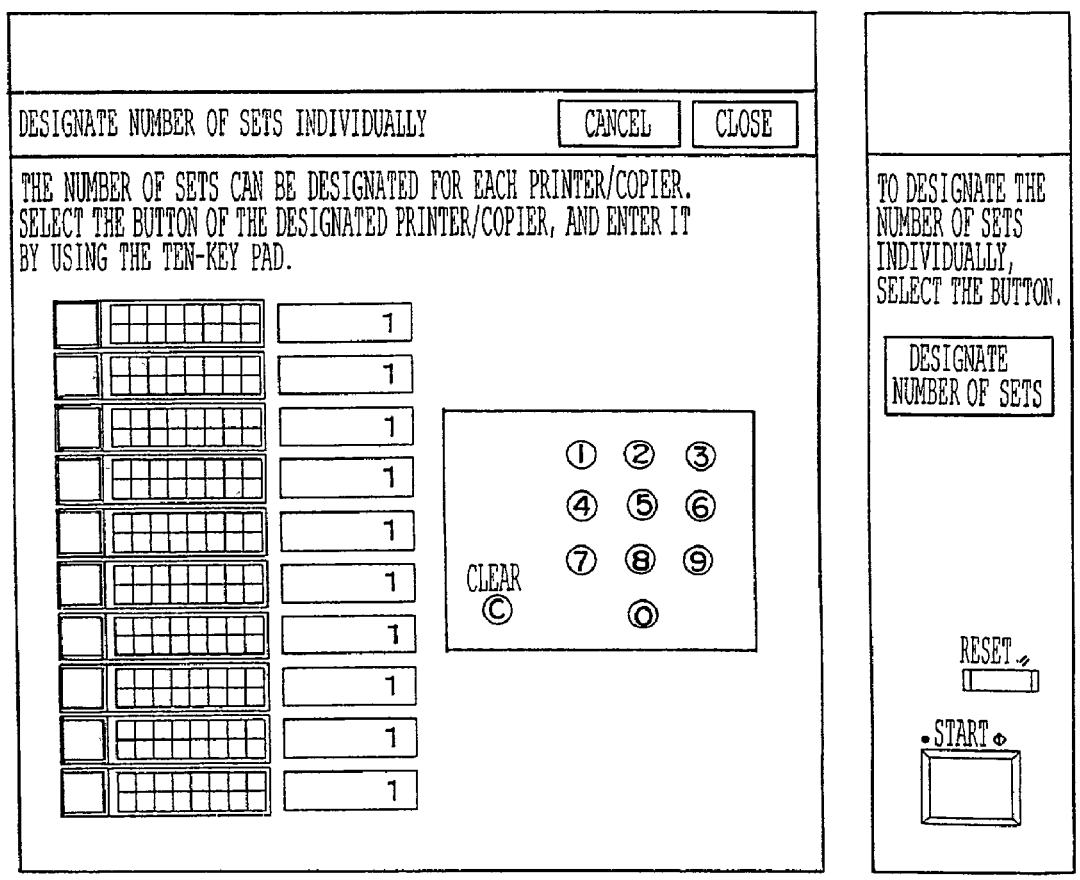
FIG. 12 is a diagram showing an individual number of sets designation screen for designating a number of output sets for each printer.

When "individual set designation" is selected as the output method and one group of the printers 16 displayed at the group display portion 202 is selected, the individual number of sets designation screen shown in FIG. 12, which displays the number of sets per printer 16 belonging to the selected group, is displayed. The operator can set the number of sets to be outputted for each printer from this individual number of sets designation screen. Then, an operation screen for printing is displayed for each of the printers 16 which is to carry out output.

[Printing Instructing Processing]

The operator confirms the attribute information of the printers 16 by the operation screen for printing shown in FIG. 11. Thereafter, from the operation screen for printing, the operator sets the output parameters which express the image data output format, such as sheet size, enlargement/reduction magnification, and the like, and carries out printing instruction. Here, the printers 16 are designated and the output parameters which determine the output format are set such that printed matter can be outputted from the plural printers 16 under different conditions, on the basis of image data (common image data) inputted from the scanner 12 by one operation.

As described above, in a case in which the printers 16 are grouped, a plurality of printers 16, which are equipped with different functions as attributes, are set in advance so as to belong to the same group. On the basis of the common image data, printed matter can be outputted from the each of the plural printers 16 which are equipped with different functions as attributes. For example, printed matter may be outputted from each of a printer 16 equipped with a color output function and a printer 16 equipped with a black-and-white output function. In this case, by designating the outputting such that one set is outputted from the printer 16 equipped with the color output function and the remaining sets are outputted from the printer 16 equipped with the black-and-white output function, costs can be reduced as compared with a case in which all of the sets are color outputted. Further, on the basis of the common image data, printed matter may be outputted from each of plural printers 16 which have different resolutions. In this case, a designation may be carried out such that one set is outputted from a high resolution printer, and the remaining sets are outputted from a low resolution printer.

Further, after plural printers 16 for outputting have been designated, when output parameters expressing the image data output format are set from the operation screen for printing, different parameters may be set such that, for each of the plurality of designated printers 16, the output formats, such as the paper size, the recording side (one-sided/both-sided), the presence/absence of a finishing processing, and the like, respectively differ. Further, the number of sets to be outputted may be designated respectively in accordance with the output formats. For example, the number of sets to be outputted may be designated in accordance with the size (e.g., 1 set of A4 and the remaining sets of B4), or the number of sets to be outputted may be designated in accordance with the recording side (e.g., one set of both-sided copies, and the remaining sets are single-sided copies), or the number of sets to be outputted may be designated in accordance with the presence/absence of finishing processing (e.g., one set to be stapled, and the remaining sets not to be stapled).

As described above, when the operator designates the printer 16 which is to output, and sets the output parameters showing the image data output format, and gives a printing instruction, it is judged in step 162 of FIG. 7 that there is a printing instruction. In step 168, a printing possibility confirmation signal for confirming whether or not printing is possible by the designated printer 16 is transmitted to the server.

When the printing possibility confirmation signal is transmitted from the scanner 12 to the server 14 and it is judged in step 124 of FIG. 6 that the printing possibility confirmation signal has been received (i.e., that there is a printing instruction), in step 126, the status of the designated printer 16 is confirmed. In step 128, if it is judged from the status that printing is possible, in step 132, a printing possible signal is transmitted to the scanner 12. On the other hand, if it is judged in step 128 that printing is not possible, in step 130, a printing impossible signal is transmitted to the scanner 12.

At the scanner 12, in step 170 of FIG. 7, it is judged whether a printing possible signal has been received. If a printing possible signal has been received, in the next step 174, it is judged whether image reading (scan starting) has been instructed by the operator pressing a start button or the like. When it is judged in step 174 that there is an image reading instruction, in step 176, the scanner portion 12A is controlled such that the image recorded on the set original is read in one operation, i.e., a series of image data is read as common image data, and is stored in the memory 12D of the scanner as image data in electronic form. Then, in step 178, the output format inputted from the operation screen and the image data read from the scanner portion 12A are transmitted to the server 14.

On the other hand, in step 170, in a case in which it is judged that a printing impossible signal has been inputted, in step 172, the operator is instructed to re-designate the printer 16. When the operator operates the display panel 12B and re-designates the printer 16 which is to output, in the same way as described above, the routine proceeds from step 162 to step 168. A printing possibility confirmation signal for confirming whether or not printing is possible is transmitted to the server 14. In a case in which a printing possible signal is received in step 170 and it is judged in step 174 that image reading has been instructed, the image data recorded on the original is read in step 176, and in step 178, the output format and the image data are transmitted to the server 14.

Further, in a case in which an instruction is given to execute one job at a plurality of the printers 16, the higher level job and all of the lower level jobs can be executed in the same way by independently positioning the jobs of each of the printers 16 at the lower level of one job and operating (starting, stopping, restarting, changing, deleting, and the like) the higher level job. Further, the lower level jobs can be executed independently by being operated independently.

[Printing Processing]

In step 134 of FIG. 6, when it is judged that the output format and the image data from the scanner 12 have been received at the server 14, in step 136, the status of the printer (s) 16 which has been designated to execute the job is confirmed. In step 138, it is judged, from the confirmed status, whether or not printing is possible. If an error has arisen and printing is not possible at a printer 16 for which printing has been designated, in step 130, a printing impossible signal is transmitted to the scanner 12. In this way, at the scanner 12, in step 180, it is judged that, after transmission of the output format and the image data, a printing impossible signal was received. As described above, in step 172, when the operator is instructed by the operation screen to re-designate the printer 16 and the operator operates the display panel 12B and re-designates the printer 16 which is to output, a printing possible signal is received. When start of scanning is instructed, the image is read, and the output format and image data are again transmitted to the server 14. Then, until it is judged in step 182 that a predetermined time has elapsed, the routine returns to step 180, and it is repeatedly judged whether or not a printing impossible signal has been received.

Even if the printer 16 is re-designated after the output format and image data have been transmitted from the scanner 12 to the server 14, usually, there is no change in the output format and image data. Thus, it is possible to not again transmit the output format and image data to the server 14, and to use as is the output format and image data which have already been transmitted to the server 14. Further, in a case in which it is necessary to change the output format due to the re-designation of the printer 16, it is possible to transmit and change only the output format.

On the other hand, when it is judged in step 138 that printing is possible, in step 140, a judgement is made as to whether a plurality of printers 16 having different functions have been designated. When a plurality of printers 16 having different functions are designated, in step 142, the image data inputted from the scanner 12 is, as needed, converted into image data which corresponds to the attributes of the respective printers 16. In step 144, an image data output format signal, which expresses the sheet size, the number of sets, and the like, and, if needed, the image data which have been converted, are transmitted via the network 10 from the server 14 to the printers 16 for which printing has been designated.

For example, in a case in which a printer 16 equipped with a color output function and a printer 16 equipped with a black-and-white output function are designated, at the scanner 12, an image is read and image data, which is in electronic form, is obtained for a printer equipped with a color output function. Thus, this image data is converted into image data for a printer equipped with a black-and-white output function, and transmitted to the printer 16 equipped with a black-and-white color function. In this case, for example, the average value of R, G, B for each pixel (i.e., (R+G+B/3)) can be used as the image data for each pixel of the printer equipped with a black-and-white output function. Note that, in cases in which, as the output format, the sheet sizes, recording sides, number of sets, and the like are different, it is not necessary to convert the image data.

Further, in a case in which a high resolution printer and a low resolution printer are designated, image data for a high resolution printer is obtained at the scanner. Thus, image data, which is converted by the image data being thinned out every other pixel or every other several pixels, is transmitted to the low resolution printer. Note that, the image may be read at the scanner such that image data for a low resolution printer is obtained, and the data amount may be increased by pixel interpolation and transmitted to the high resolution printer.

In these image data conversion processings, the image data read by the scanner and the output format designated at the display panel may be transmitted to the server, and conversion processing may be carried out at the server.

Moreover, in a case in which it is judged in step 140 that a plurality of printers 16 having different functions have not been designated, image data conversion is not carried out, and the image data output format signal and the image data are transmitted to the printer(s) 16 via the network 10.

At the printer 16, in step 104 of FIG. 5, when it is judged that the output format and image data transmitted from the server 14 have been received, in step 106, an image based on the image data is formed on a recording sheet in the designated output format, and the recording sheet, on which the image has been formed, is outputted.

As described above, in the print system of the present embodiment, on the basis of image data inputted from the scanner by a single (one-time) operation, output can be carried out from a plurality of printers connected to the network, under different conditions (e.g., black-and-white and color, high resolution and low resolution, different output formats, and different numbers of sets to be outputted).

Further, at the scanner, a display panel is provided which displays an operation screen equipped with plural icons and which functions as a user interface for the input of data, such as the printing format of the printer or the like, by the displayed icons being touched. Thus, when image data is inputted from the scanner, by giving instructions at the operation screen which is displayed on the display panel, output parameters are initially set and thereafter, the start button is merely pressed, such that the usual copier is operated, processings from reading of the original to printing can be carried out automatically.

The attribute information of the printers connected to the network is registered in the database of the server. Thus, attribute information of the printers connected to the network can be extracted from the scanner. Similarly, attribute information of the printers connected to the network can be extracted from clients other than the scanner as well.

Further, at the server, on the basis of the operation screen generating request signal, which is for displaying attribute information of all of or some of the printers connected to the network, and on the basis of the attribute information of the printers connected to the network, text data for generating an operation screen is generated and is transmitted to the scanner. At the scanner, on the basis of the transmitted text data and the like, an operation screen is generated, and the generated operation screen is displayed on the display panel as a user interface. Thus, a common operation screen can be displayed for a plurality of printers having different attributes, and this display panel can be operated efficiently.

In the present embodiment, an example is described in which, at the scanner, an operation screen is generated on the basis of transmitted text data and the like, and the generated operation screen is displayed on the display panel as a user interface. However, a user interface may be provided at a client or at a multifunction device, and may be operated from the client or the multifunction device. For example, in a case in which the print system of the present embodiment is connected to a multifunction device, the multifunction device can usually be operated as an independent multifunction device, and when a "network copy mode" is designated, the multifunction device can operate as a user interface device or an image input device or an image output device.

Usually, the multifunction device operates as a multifunction device which displays, on the display panel, a user interface screen which is particular to the multifunction device, and operates independently. However, if an instruction is given to switch over to the "network copy mode", a request is given to the server connected via the network to obtain information for generating a user interface screen. On the basis of the information which is which is transmitted in from the server, a user interface screen, which enables instructing of settings and output formats for other devices connected via the network, is displayed on the display panel of the multifunction device. Selection of the printer which is the output destination, and setting of the output format are carried out from this screen. When a network copy start instruction is given, if an original is read at the image reading section of the multifunction device, the read image and the information relating to the output destination printer and the output format are transmitted to the server, and printing processing is possible.

In the present embodiment, the output parameters are first set so as to operate a usual copier, and thereafter, processings from reading of the original to printing are automatically carried out merely by pushing a start button. However, as described hereinafter, after images are read from a scanner and accumulated at a scan service, the accumulated images can be print outputted by instructing reprinting.

In a case in which images recorded on originals are accumulated, by pressing the "scanner" button 200B in the menu screen shown in FIG. 9, the scan service is selected. The originals are set at the scanner portion 12A and the start button is pressed. In this way, it is judged that there is an instruction to read images, and the scanner portion 12A is controlled such that the images recorded on the originals are read. The read image data is stored in the memory 12D of the scanner as image data which is in electronic form. In this case, it is preferable that the images be read so as to obtain image data to be used in a printer with better (higher level) functions. For example, in a case in which a printer equipped with a color output function (a color printer) and a printer equipped with a black-and-white output function (a black-and-white printer) are connected, it is preferable to read the image such that image data for the color printer is obtained. In a case in which a high resolution printer and a low resolution printer are connected, it is preferable to read the image such that image data for the high resolution printer is obtained.

When image data is inputted from an external storage device in which image data is stored in advance, the above-described image reading processing is not necessary. It suffices to store the image data, which is read from the external storage device by using an unillustrated reading device, as common image data in the memory 12D in one operation.

Next, when an image accumulated by the scan service is to be printed, by pressing a "reprint" button 200C in the menu screen shown in FIG. 9, the reprinting service is selected. In the reprinting service, a desired image, from the images accumulated in the memory 12D of the scanner, can be outputted again by the same processing as in the previously-described "Printing Instructing Processing".

Further, in the present embodiment, the image read by the scanner is temporarily stored in the memory 12D of the scanner 12, and, at the time of output to the printers 16, is transmitted to the server 14 from the memory 12D, and is transmitted to the respective printers 16. However, at the time of reading the original, the read image may be transmitted to the server 14 and stored in the server 14, and may be transmitted to the respective printers 16 at the time of output to the printers 16. Further, the image read by the scanner may be temporarily stored in the memory 12D of the scanner 12, and, at the time of printing, may be transmitted directly from the memory 12D to the printers without being transmitted through the server 14.

Moreover, a structure is possible in which the image read by the scan service is temporarily stored in the memory 12D of the scanner 12, and information expressing the stored location of the image is transmitted to the server 14 or the printer 16. At the time of output of the image from the printer 16, the server 14 or the printer 16 reads the image on the basis of the information expressing the stored location of the image.

In the above explanation, an example of outputting an image to printers was described. However, other than printers, images may be outputted to multifunction devices or facsimile devices. Further, images may be outputted as electronic mail to other devices (e.g., cellular phones) connected via a network.

In accordance with the first embodiment of the present invention, a common operation screen is displayed for a plurality of image output devices having different attributes, and the operation screen can be operated efficiently. Further, images can be outputted from a plurality of image output devices on the basis of image data which is inputted by a single operation.

Second Embodiment

In the print system of the first embodiment of the present invention described above, images are outputted from a plurality of image output devices on the basis of image data which is inputted by a single operation. However, in a print system of a second embodiment of the present invention described later, the images are not necessarily outputted from the plurality of image output devices on the basis of image data which is inputted by a single operation. Namely, due to an operation screen which is common for a plurality of image output devices, by operating the operation screen which is common for the plurality of image output devices, designation of arbitrary image output devices and outputting of images are easily performed. Also, in a case in which the plurality of image output devices are designated by designating a group including the plurality of image output devices (the plurality of image output devices are registered in advance as the group), it is not necessary that the image output devices included in the group is selected each, accordingly, the operation becomes further efficiently.

Figure 13B:
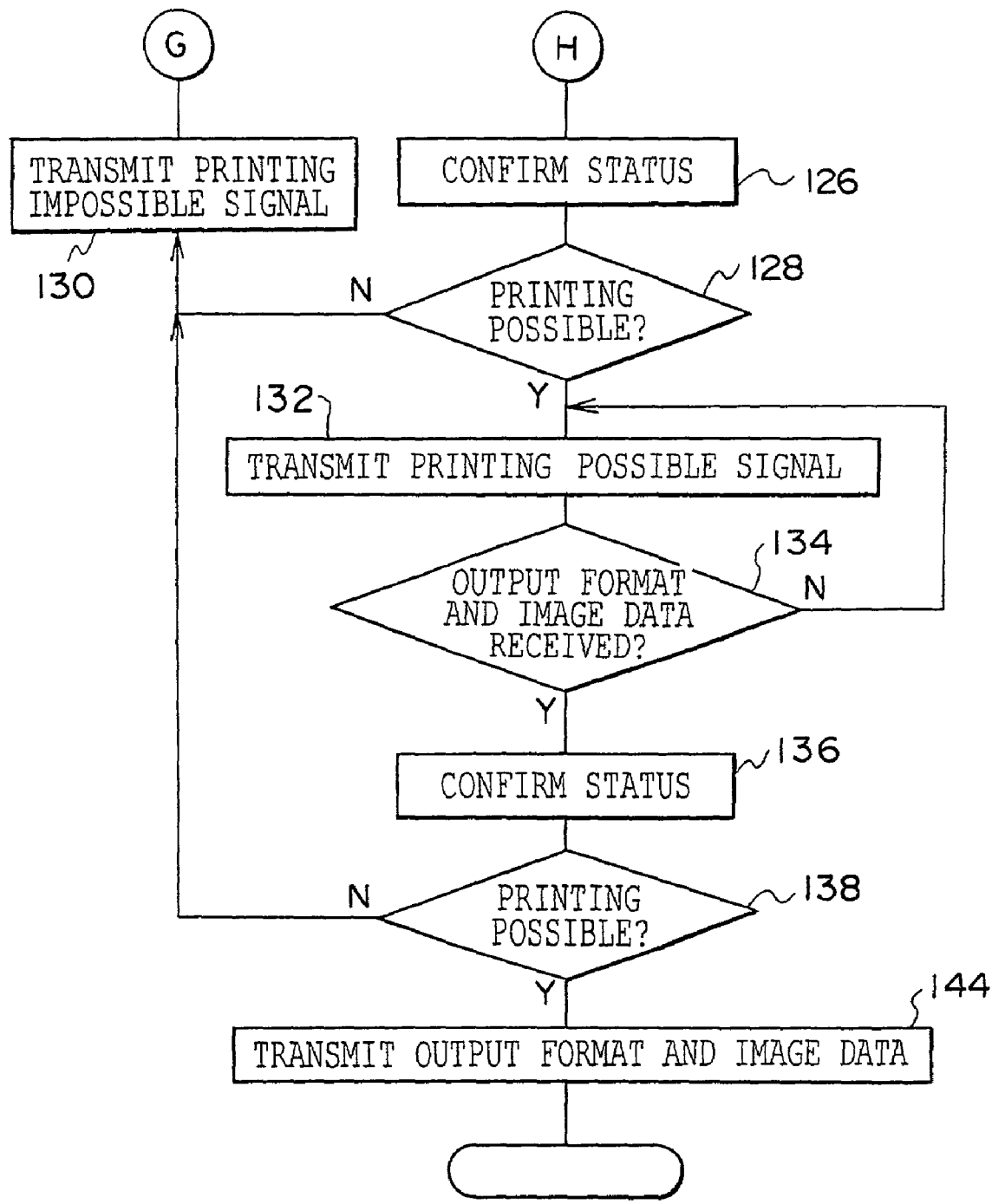
FIG. 13B is a flowchart for explaining a processing routine which is executed by a server of a modified example of a first embodiment.

The basic structure of a print system of the second embodiment is substantially the same as that of the first embodiment of the present invention. However, the print system of the second embodiment is different from the first embodiment only with respect to the point that (1) in the step 176, it is not necessarily that the images are read by a single operation with respect to the designated one or a plurality of the printers (the images may be read with respect to each of the plurality of the printers), and (2), as shown in FIG. 13, when it is judged in step 138 that printing is possible, in step 144, an image data output format signal, which expresses the sheet size, the number of sets, and the like, and the image data inputted from the scanner 12 are transmitted from the server 14 via the network 10 to the printers 16 for which printing is designated. In step 104 of FIG. 5, when it is judged that the output format and the image data transmitted from the server 14 have been received, in step 106, the printers 16 form images based on the image data onto recording sheets in the designated output formats, and output the recording sheets on which images have been formed.

In the print system of the present embodiment, the attribute information of the printers connected to the network is registered in the database of the server. Thus, the attribute information of the printers connected to the network can be extracted from the scanner. Similarly, the attribute information of the printers connected to the network can be extracted from clients other than the scanner.

Third Embodiment

Hereinafter, a third embodiment of the present invention will be described in detail with reference to the drawings. The basic structure of the print system of the present embodiment is the same as that of the first embodiment of the present invention. Thus, the same structural elements, members and the like are denoted by the same reference numerals, and description thereof is omitted. Further, description is omitted of portions of the functions, operations, and effects of the print system of the present embodiment which are the same as those of the first embodiment.

Data of various types of screens (corresponding to screens relating to only the image input device), which relate only to the scanner 12 and which are displayed on the display panel 12B at the time of start-up of the scanner 12 and at the time of image reading and the like, and an error screen (corresponding to a screen for giving notice that the image output management device is unable to communicate), which is for reporting an error at the time when the sever 14 is unable to communicate, are stored in the memory 12D. Specific examples of the screens relating to only the scanner 12 are a start-up screen for reporting that start-up processing has started, an error screen for reporting failure in the start-up processing, a menu screen for selecting various functions such as image reading, printing and the like, an operation screen for image reading which is for carrying out various types of settings for image reading, an error screen for reporting failure in the image reading, and the like. Namely, the memory 12D corresponds to the icon information storing section and the image information storing section of the present invention.

Hereinafter, processing routines which are carried out by the respective controllers of the scanner, the server, and the printer of the present embodiment will be described with reference to FIG. 5 and FIGS. 14 through 16. These processing routines are divided into respective routines of start-up processing of the scanner, attribute information registration processing, operation screen display processing, print instructing processing, and printing processing, and will respectively be described hereinafter.

[Start-Up Processing of Scanner]

Figure 15B:
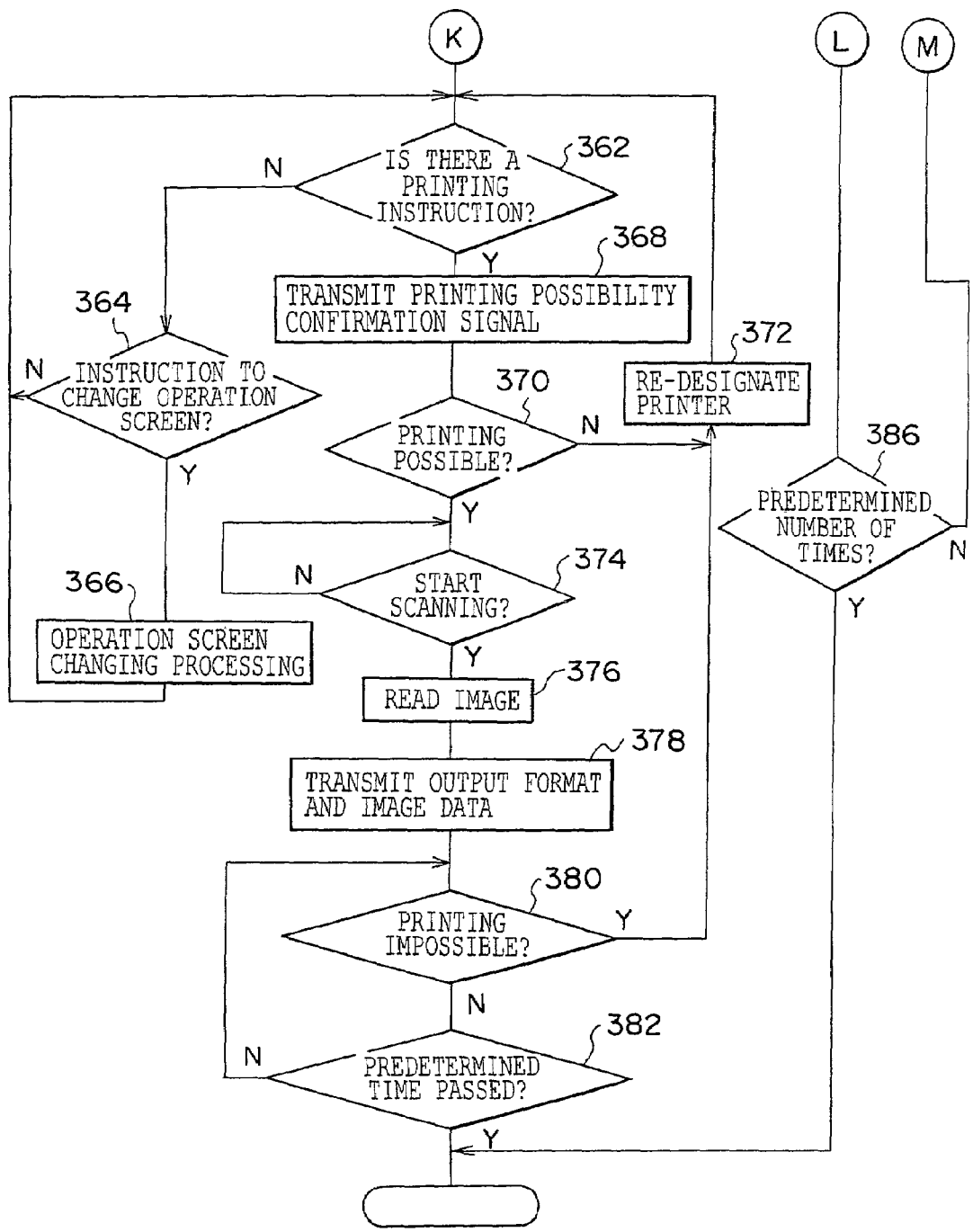
FIG. 15B is a processing routine which is executed by a controller of the scanner.

The start-up processing of the scanner 12 is processing which is first carried out when the power source of the scanner 12 is turned on. When the power source of the scanner 12 is turned on, as shown in FIG. 15, in step 344, the start-up processing is implemented, and the scanner 12 is set in a state in which image reading and printing can be carried out.

Figure 16:
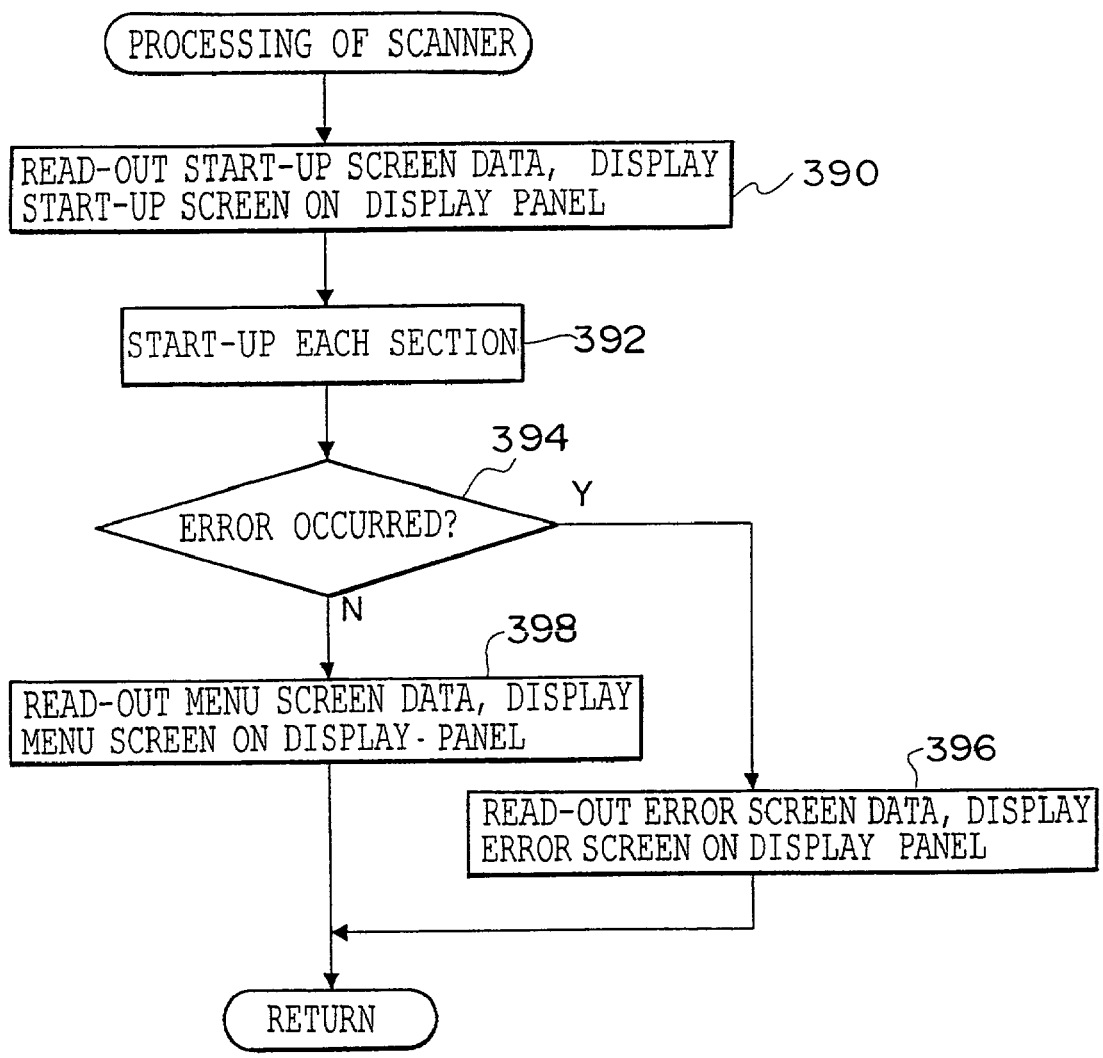
FIG. 16 is a start-up processing routine (sub-routine) executed by the controller at the time of start-up of the scanner.

As shown in FIG. 16, in this start-up processing, in step 390, the data of a start-up screen which is stored in the memory 12D is read-out. On the basis of the read-out data, a start-up screen, such as that shown in FIG. 8 for example, is displayed on the display panel 12B, and in step 392, the respective portions of the scanner 12 are started-up.

When the respective portions of the scanner 12 are started-up, in a case in which some type of error occurs and start-up fails, the routine proceeds from step 394 to step 396. The data, which is stored in the memory 12D, of an error screen, which is for reporting an error at the time of start-up, is read-out. On the basis of the read-out data, an error screen, such as that shown in FIG. 17 for example, is displayed on the display panel 12B so as to notify the operator of the error.

On the other hand, in a case in which the respective portions of the scanner 12 are started-up normally, the routine proceeds from step 394 to step 398. The data of the menu screen stored in the memory 12D is readout. On the basis of the read-out data, a menu screen, such as that shown in FIG. 9 for example, is displayed on the display panel 12B as a user interface. By the operator pressing the service selection buttons 200, which are displayed by icons on the menu screen, it is possible to input an instruction to display an operation screen for image reading which is for reading an image from an original, an instruction to display an operation screen for printing which is for printing a read image, and the like.

[Attribute Information Registration Processing]

The attribute information registration processing is processing for registering, in the database connected to the server 14, attribute information of the printers 16 connected to the network.

When printers 16 are connected to the network 10, management tool software, which is provided at the server 14, is operated from an operation panel (not shown) provided at the server 14, or any of the clients 18 connected to the server 14 via the network. In this way, attribute information registration processing for registering the printers at the server is carried out. Namely, at the server 14, by instructing the management tool software, in step 308 shown in FIG. 14, when it is judged that there is a request for attribute information registration processing, in step 309, a registration processing request signal, which requests registration processing of printer attribute information, is transmitted from the server 14 to the printer 16.

At the printer 16, in step 100 of FIG. 5, it is judged whether or not a registration processing request signal has been received. When a registration processing request signal has been received, in step 102, the attribute information of the printer 16 is transmitted from the printer 16 to the server 14.

In step 310, it is judged whether the server 14 has received the attribute information transmitted from the printer 16. When the attribute information has been received, in step 312, the file system 14E is controlled such that the attributes of the printer 16 are registered in the database 24.

[Operation Screen Display Processing]

When the operator selects the output method from the operation screen and selects one of the groups of the printers 16, in step 354 of FIG. 15, it is judged that there is a printing operation screen display instruction. In step 356, an operation screen generating request signal for generating an operation screen for printing is transmitted from the scanner 12 to the server 14. Further, it is possible for the operator to operate the display panel 12B and, for example, select, as the output destination, one group of printers 16 from among the groups of the printers 16 registered in advance, and for only information expressing that the group of printers 16 has been selected to be transmitted from the scanner 12 to the server 14.

Figure 14B:
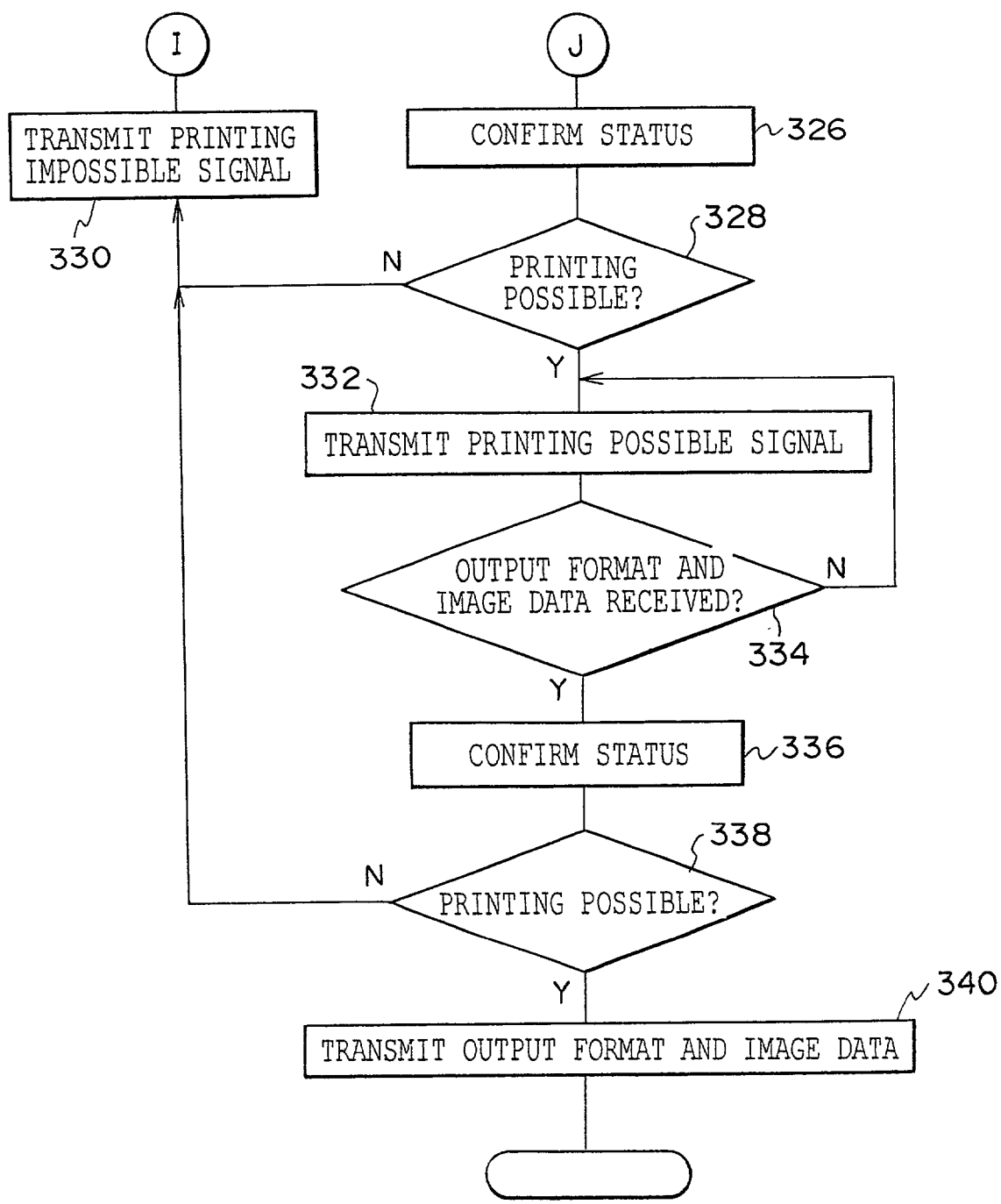
FIG. 14B is a processing routine which is executed by a controller of the server.

In step 314 of FIG. 14, when it is judged that the operation screen generation request signal transmitted from the scanner 12 has been received at the server 14, in step 316, the status of the printer 16 connected to the network 10 is confirmed. On the basis of the operation screen generation request signal and the registered attribute information of the printer 16, attribute information for generating an operation screen for printing of the designated printer 16 is generated. In step 318, the generated attribute information is transmitted to the scanner 12.

At this time, when a group is designated and an operation screen generation request signal is transmitted, at the server 14, the logical product of the attribute information of the printers 16 belonging to that group is computed. Common attribute information at the printers 16 belonging to that group is selected, and attribute information for displaying an operation screen for printing, which displays the common attribute information, is generated. In this way, for example, if all of the printers 16 equipped with a color printing function are registered in advance as a group and that group is selected, it is possible to display only the printers 16 equipped with the color printing function and the attribute information thereof.

When attribute information is transmitted from the server 14 to the scanner and it is judged in step 358 of FIG. 15 that attribute information from the server 14 has been received, the scanner 12 generates an operation screen for printing by combining the received attribute information, which is expressed in text data for generating the operation screen for printing, and the user interface part, which shows picture information such as buttons or the like and which is stored in the memory 12D. In step 360, the generated operation screen for printing is displayed on the touch panel 12B as a user interface.

Figure 20:
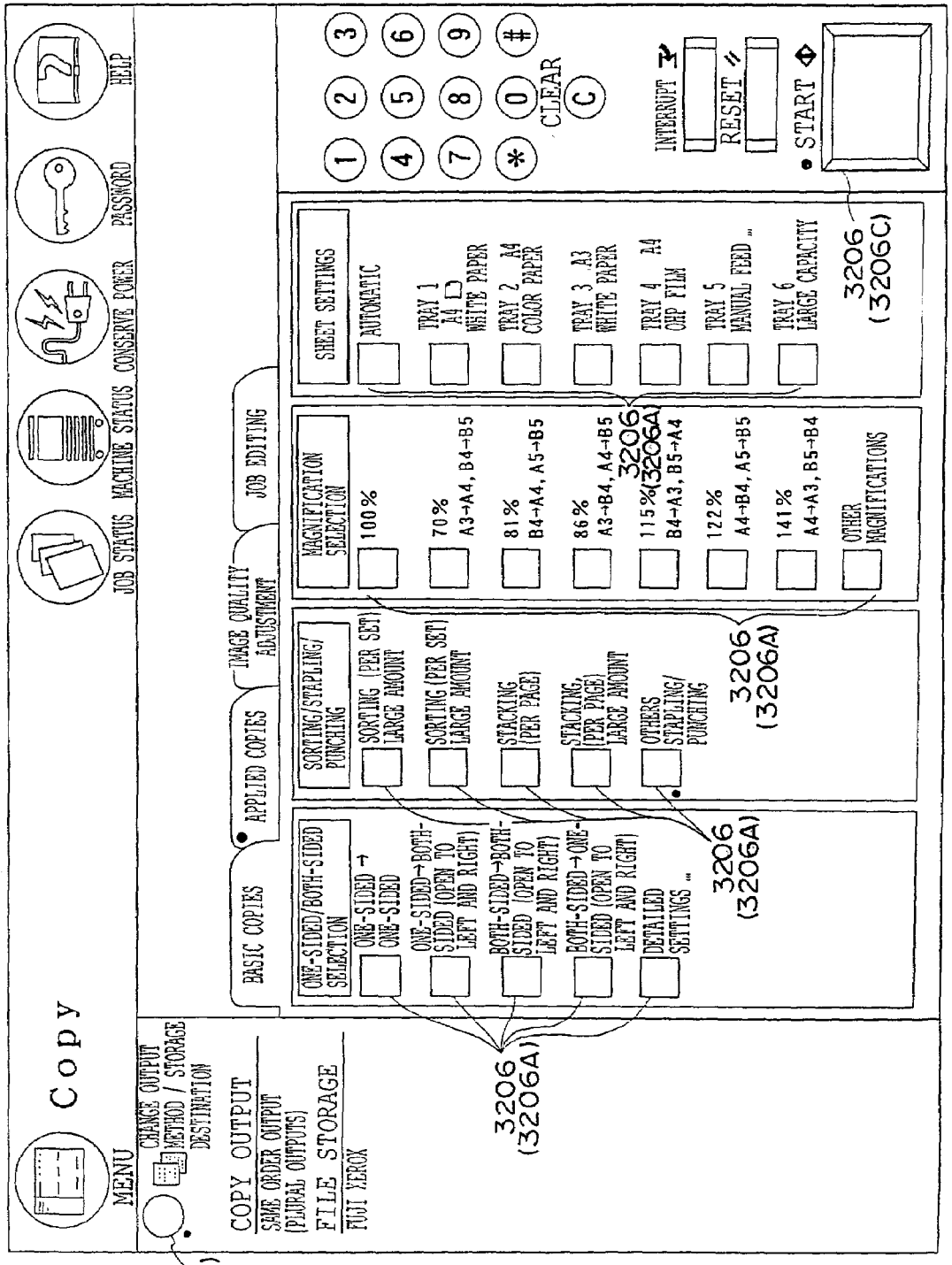
FIG. 20 is a diagram showing an example of an operation screen for printing.

In this way, an operation screen for printing such as that shown in FIG. 20 is displayed on the display panel 12B. This operation screen for printing includes various types of icons 3206 such as icons 3206A for respective functions which relate to output formats which can be set at the printers 16, which are designated as the output destinations, on the basis of the attribute information of these printers 16; an icon 3206B for carrying out a screen changing instruction of the operation screen for printing, in order to designate/change the output destination; an icon 3206C serving as a start button; and the like. Note that the start button may be physically provided at the scanner 12.

When a screen change instruction of the operation screen for printing is given by the operator operating the displayed operation screen for printing and, for example, pressing the icon 206B in FIG. 20, the routine proceeds from step 362 in FIG. 15 to steps 364 and 366, and proceeds from step 314 in FIG. 14 to steps 320 and 322, such that screen changing processing is carried out. In this screen changing processing, as described in steps 356 through 360 of FIG. 15 and in steps 314 through 318 of FIG. 14, a new operation screen generating request signal is transmitted to the server 14 in accordance with the operation of the display panel 12B of the scanner 12. Attribute information, which is for generating a new operation screen for printing, is generated by the server 14, and the generated attribute information is transmitted. Thus, the display of the operation screen for printing can be changed in accordance with operations using the operation screen for printing of the display panel 12B of the scanner 12.

Figure 21:
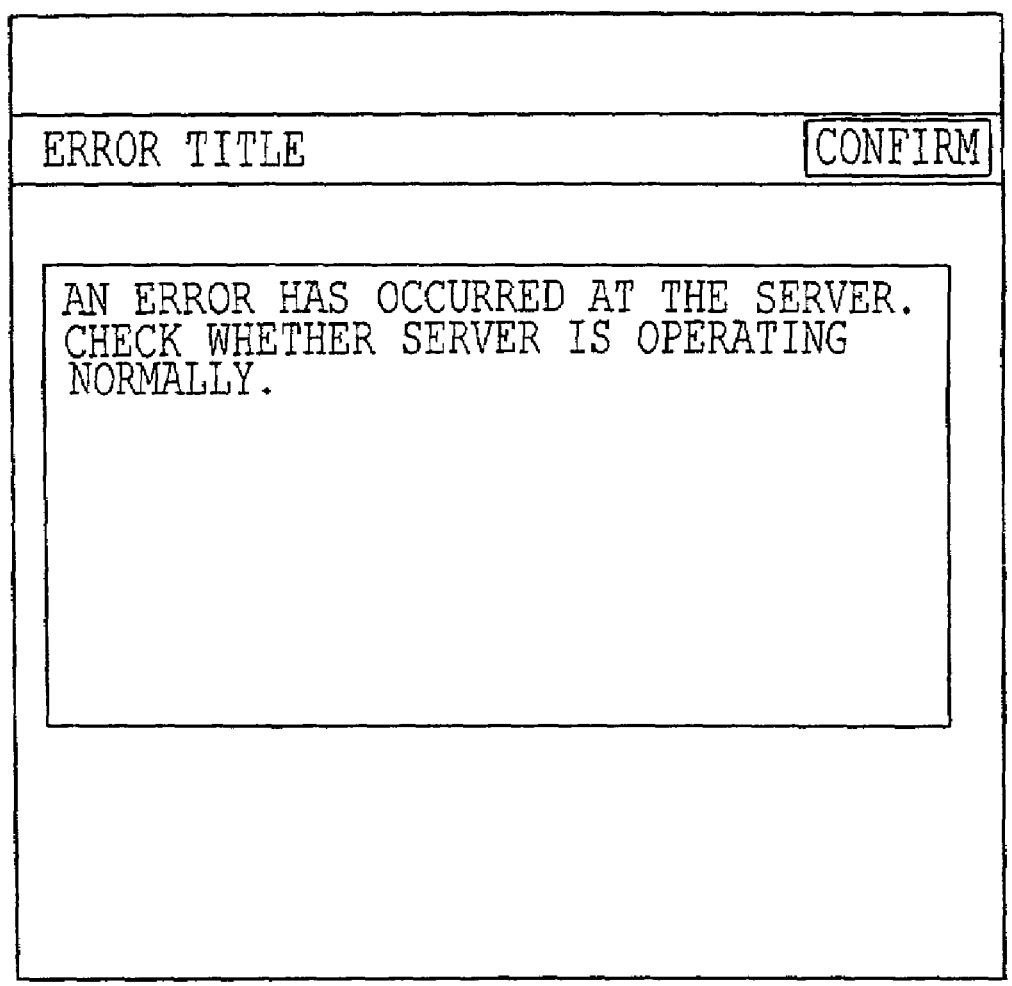
FIG. 21 is a diagram showing an example of an error screen which reports errors of the server.

If the attribute information is not transmitted from the server 14 due to the server 14 being down or the like, regardless of the fact that an operation screen generation request signal has been transmitted from the scanner 12 to the server 14, the scanner 12 judges that the server 14 is in a state in which communication is not possible, and the routine moves on from step 358 in FIG. 15 to steps 384 and 386. In step 384, data, which is stored in the memory 12D, of an error screen, which is for giving notice of an error at the time when the server 14 cannot communicate, is read-out. On the basis of the read-out data, an error screen, such as that shown in FIG. 21 for example, is displayed on the display panel 12B, and the operator is informed of the error.

In subsequent step 386, it is judged whether or not that error is repeatedly arising a predetermined number of times (plural times). In a case in which that error has arisen less than the predetermined number of times, the routine returns to step 354 and waits for the menu screen to be operated by the operator and for an instruction to display the operation screen for printing to again be inputted. If the server 14 does not recover from the state in which communication is not possible, and by the operator operating the menu screen, an instruction to display the operation screen for printing is repeatedly inputted and an operation screen generation request signal is transmitted to the server 14, and as a result, the error occurs repeatedly the predetermined number of times, in step 378, the determination is affirmative, and the server 12 ends the processing.

[Printing Instructing Processing]

After the operator has confirmed the attribute information of the printer 16 by the operation screen for printing shown in FIG. 20, the operator presses the icons 3206A of the operation screen for printing, thereby setting output parameters expressing the image data output format such as the sheet size, the enlargement/reduction magnification, and the like. By the operator pressing the icon 3206C which serves as a start button, a printing instruction is carried out.

As the designation of the printer 16, one printer 16 can be designated and output prints, or one group can be designated and prints can be simultaneously outputted from the respective printers 16 belonging to the designated group. When a group is designated, same order output or equal output can be designated, or the number of sets to be outputted can be designated individually for each of the printers 16 belonging to that group. Namely, printer designation as well as output method designation are carried out.

As described above, when the operator designates the printer 16 which is to carry out outputting and sets the output parameters expressing the image data output format and gives a print instruction, in step 362 of FIG. 15, it is judged that there is a printing instruction. In step 368, a printing possibility confirmation signal, for confirming whether or not printing by the designated printer 16 is possible, is transmitted to the server.

When a printing possibility confirmation signal is transmitted from the scanner 12 to the server 14 and it is determined in step 324 of FIG. 14 that the printing possibility confirmation signal has been received (i.e., that there is a printing instruction), in step 326, the status of the designated printer 16 is confirmed. In step 328, if it is judged from the status that printing is possible, in step 332, a printing possible signal is transmitted to the scanner 12. On the other hand, if it is judged in step 328 that printing is impossible, in step 330, a printing impossible signal is transmitted to the scanner 12.

At the scanner 12, in step 370 of FIG. 15, it is judged whether a printing possible signal has been received. If a printing possible signal has been received, in subsequent step 374, it is judged whether or not image reading (start of scanning) has been instructed by the operator pressing the start button or the like. If it is judged in step 374 that image reading has been instructed, in step 376, the scanner portion 12A is controlled such that the image recorded on the set original is read in one operation, i.e., a series of image data is read as common image data, and the data is stored in the memory 12D of the scanner as image data which is in electronic form. Then, in step 378, the output format inputted from the operation screen and the image data read from the scanner portion 12A are transmitted to the server 14.

On the other hand, if it is judged in step 370 that a printing impossible signal has been inputted, in step 372, the operator is instructed to re-designate the printer 16. When the operator operates the touch panel 12B and re-designates the printer 16 which is to carry out outputting, in the same way as described above, the routine proceeds from step 362 to step 368. A printing possibility confirmation signal, for confirming whether or not printing is possible, is transmitted to the server 14. If it is judged in step 370 that a printing possible signal has been received and it is judged in step 374 that image reading has been instructed, in step 376, the image data recorded on the original is read. In step 378, the output format and the image data are transmitted to the server 14.

[Printing Processing]

In step 334 of FIG. 14, when it is judged that the output format and the image data from the scanner 12 have been received at the server 14, in step 336, the status of the printer 16, for which job execution has been designated, is confirmed. In step 338, from the confirmed status, it is judged whether or not printing is possible. If an error has arisen and printing is not possible at the printer 16 for which printing has been designated, in step 330, a printing impossible signal is transmitted to the scanner 12. In this way, at the scanner 12, in step 380, it is judged that, after the output format and the image data were transmitted, a printing impossible signal was received. In the same way as described above, in step 372, the operator is instructed by the operation screen to carry out re-designation of the printer 16. When the operator operates the display panel 12B and re-designates a printer 16 to carry out outputting, a printing possible signal is received. When start of scanning is instructed, the image is read, and the output format and the image data are transmitted to the server 14 again. Then, until it is judged in step 382 that a predetermined time has passed, the routine returns to step 380, and it is repeatedly judged whether or not a printing impossible signal has been received.

On the other hand, when it is judged in step 338 that printing is possible, in step 340, the server 14 transmits, via the network 10 and to the printer 16 for which printing is designated, an image output format signal, which expresses the sheet size, the number of sets, and the like, and the image data inputted from the scanner 12. In step 104 of FIG. 5, if it is judged that the printer 16 has received the output format and the image data transmitted from the server 14, in step 106, an image based on the image data is formed on recording sheet in the designated output format, and the recording sheet on which the image is formed is outputted.

As described above, in the present embodiment, among the data for generating the operation screen for printing, a portion of the information is stored in the memory 12D of the scanner 12. Thus, in order to generate the operation screen for printing, the amount of data transmitted from the server 14 to the scanner 12 via the network can be reduced. As described above, in particular, the user interface parts which express picture information, such as icons which have a large data amount, are stored in the memory 12D of the scanner 12. When the operation screen for printing is displayed as the user interface, it suffices to merely transmit from the server 14 the attribute information of the printer which is text data or the like and has a small amount of data. In this way, the time required to display the operation screen for printing (the operation screen) can be shortened.

As described above, by storing the data of the screen relating to only the scanner 12 in the memory 12D of the scanner 12, the screen relating to the scanner 12 can be displayed on the display panel 12B without passing through the server 14. In this way, if the scanner 12 alone is operated such as at the time of starting-up the scanner 12 or at the time of reading an image from an original, execution is possible regardless of the state of the server 14. Further, as described above, data of an error screen, which gives notice of errors at the time of start-up processing or at the time of image reading, is also stored in the memory 12D of the scanner 12 as a screen relating to the scanner 12. In this way, if an error occurs at the time of start-up processing or at the time of image reading, the data of the error screen can be read-out and displayed. Thus, the operator can grasp that the cause of the error lies with the scanner 12.

Moreover, as described above, an error screen, which reports that the server 14 cannot communicate, is also stored in the memory 12D of the scanner 12D. In this way, in a case in which the scanner 12 cannot communicate with the server 14 because the server 14 is down or the like and an error occurs, the data of this error screen can be read-out from the memory 12D of the scanner 12 and displayed. Thus, the operator can grasp that the cause of the error lies with the server 14.

In a case in which the image recorded on the original is accumulated, when the scan service is selected by pressing the "scanner" button 200B in the menu screen shown in FIG. 9, it is judged that there is an instruction to display the operation screen for image reading. The data of the operation screen for image reading, which is stored in the memory 12D, is read-out. On the basis of the read-out data, an operation screen for image reading, such as that shown in FIG. 18 for example which is provided with a plurality of icons 3202, is displayed on the display panel 12B as the user interface.

Figure 18:
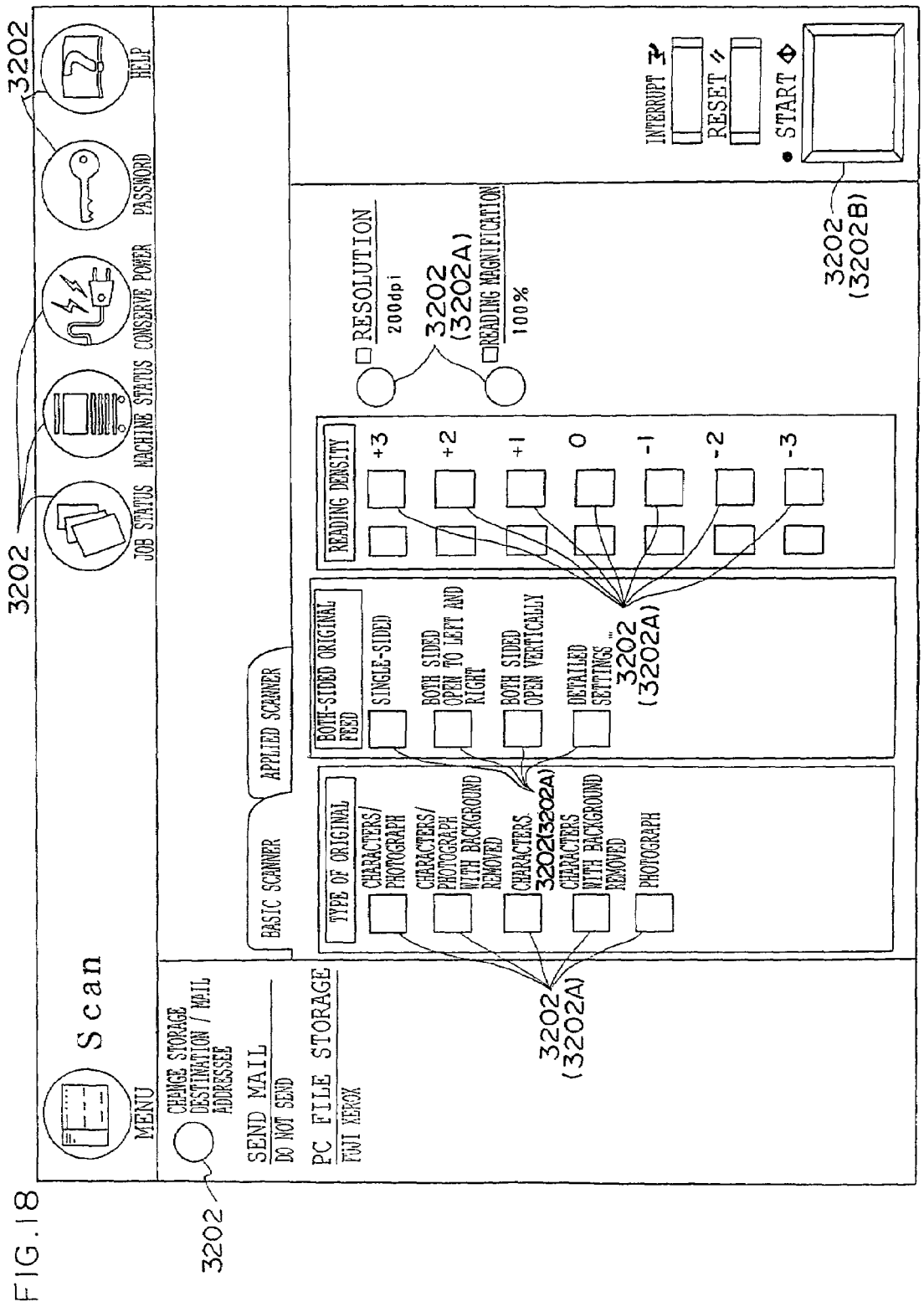
FIG. 18 is a diagram showing an example of an operation screen for image reading.

By the operator operating the operation screen for image reading and pressing, for example, icons 3202A in FIG. 18, various types of settings (the type of the original, both-sided original feeding, reading density, reading resolution, and the like) for reading the image from the original are carried out. The original is set at the scanner portion 12A, and an icon 3202B provided as a start button on the image reading operation screen is pressed. Note that the start button may be physically provided at the scanner 12, rather than being an icon.

Figure 19:
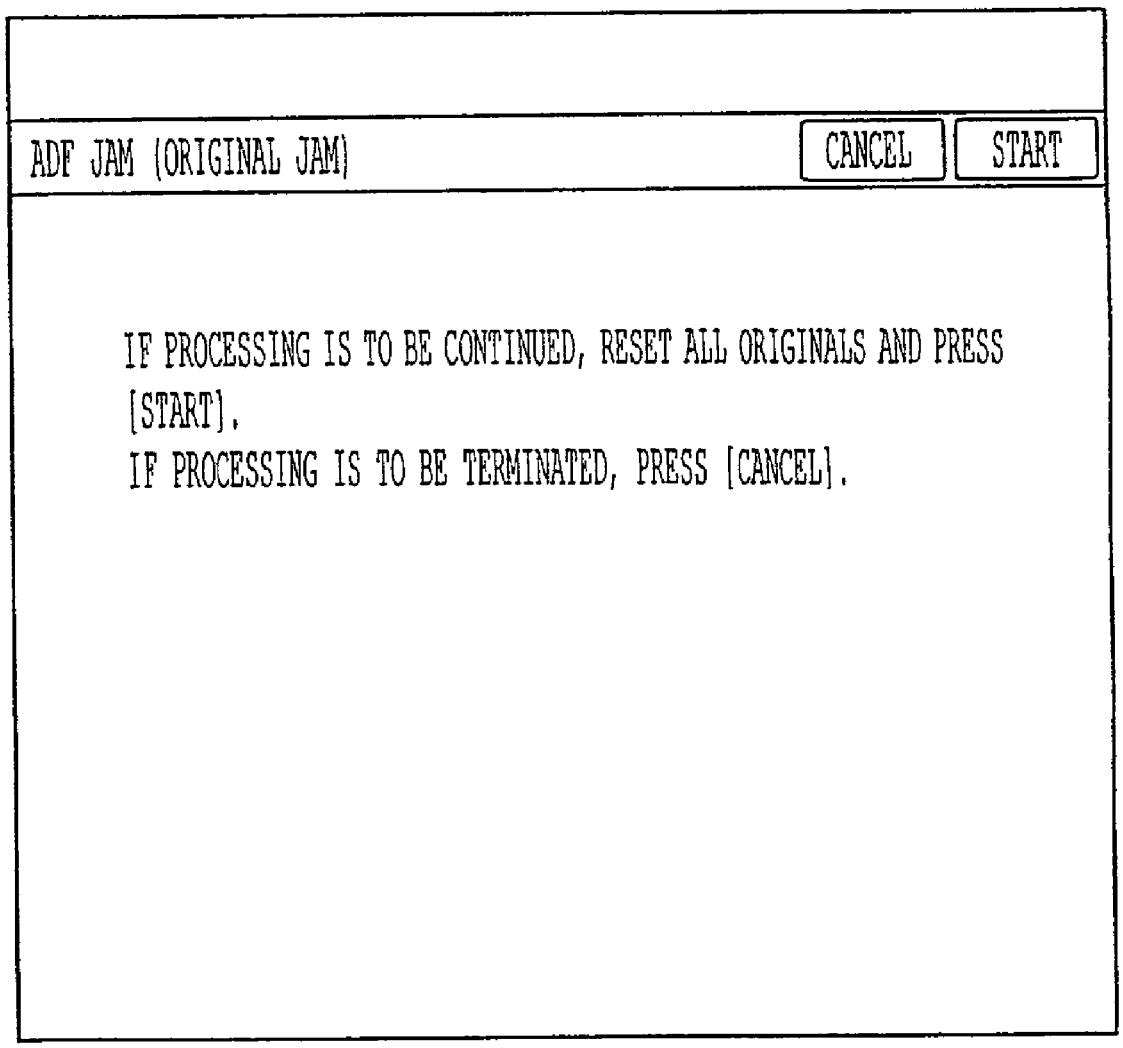
FIG. 19 is a diagram showing an example of an error screen which reports errors at the time of image reading of the scanner.

In a case in which some type of error arises at the time of image reading, the scanner reads-out data, which is stored in the memory 12D, of an error screen for reporting an error at the time of image reading. On the basis of the read-out data, an error screen is displayed on the display panel 12B, and the operator is notified of the error. For example, when the image is read from the original by automatic feeding, at the time when a document jam occurs, an error screen such as that in FIG. 19 is displayed.

Further, in the present embodiment, an image read by the scanner is temporarily stored in the memory 12D of the scanner 12, and at the time of output to the printers 16, the image is transmitted from the memory 12D to the server 14, and is transmitted to the respective printers 16. At the time of reading an original, the read image is transmitted to the server 14 and stored in the server 14, and at the time of output to the printers 16, is transmitted to the respective printers 16. However, the image read by the scanner may be temporarily stored in the memory 12D of the scanner 12, and may be transmitted to the respective printers 16 at the time of output to the printers 16.

As described above, the third embodiment has the excellent effect that the time required for display of the operation screen can be reduced. Further, in addition to the above-described effect, there is the effect that the image input device can be operated regardless of the state of the image output management device.

Hereinafter, a fourth embodiment of the present invention will be described in detail with reference to the drawings. The basic structure of the print system of the present embodiment is the same as that of the first embodiment of the present invention. Thus, the same structural elements, members and the like are denoted by the same reference numerals, and description thereof is omitted. Further, description is omitted of portions of the functions, operations, and effects of the print system of the present embodiment which are the same as those of the first embodiment.

Figure 22A:
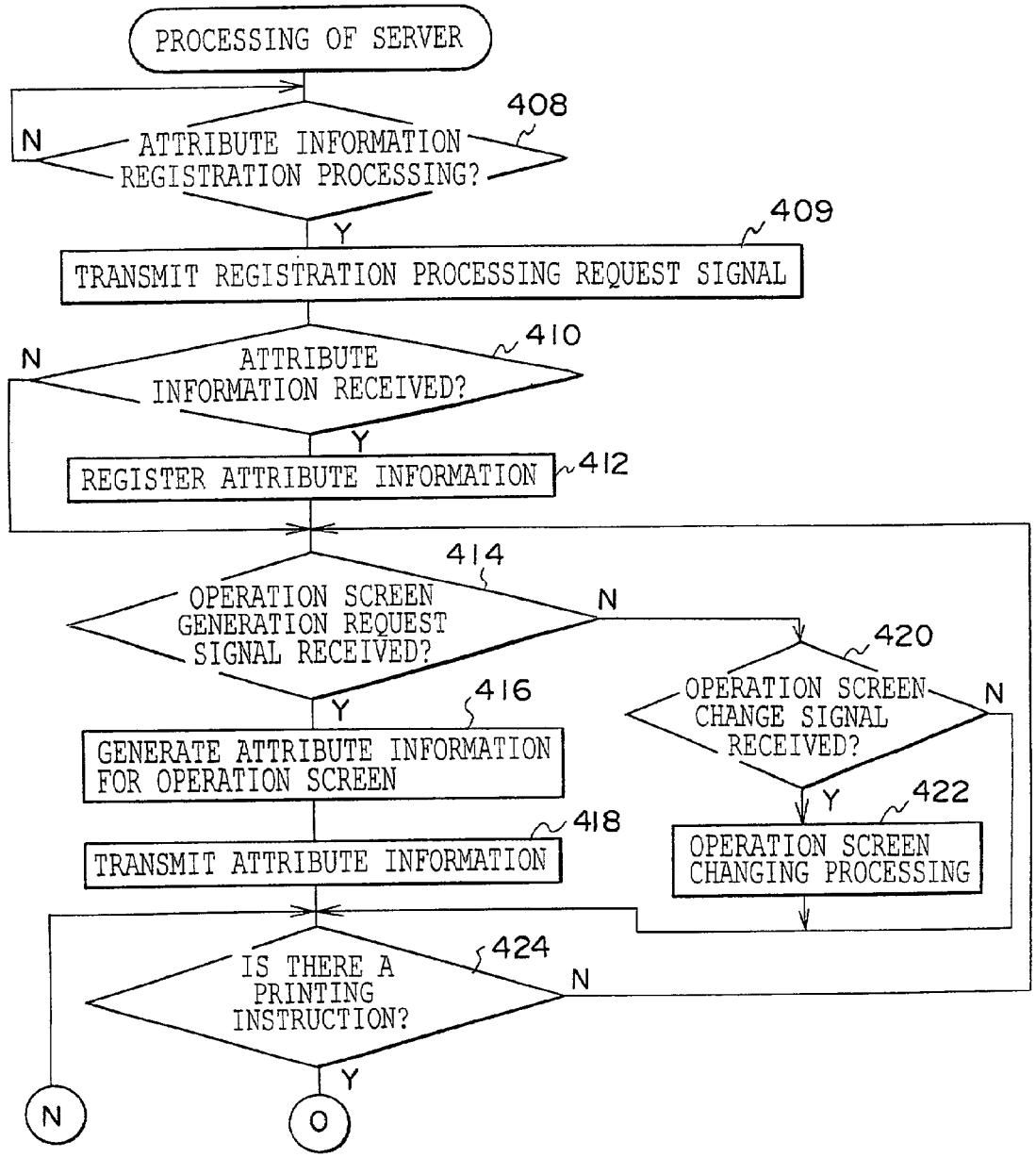
FIG. 22A is a flowchart of a control routine which is executed at the server.
Figure 22B:
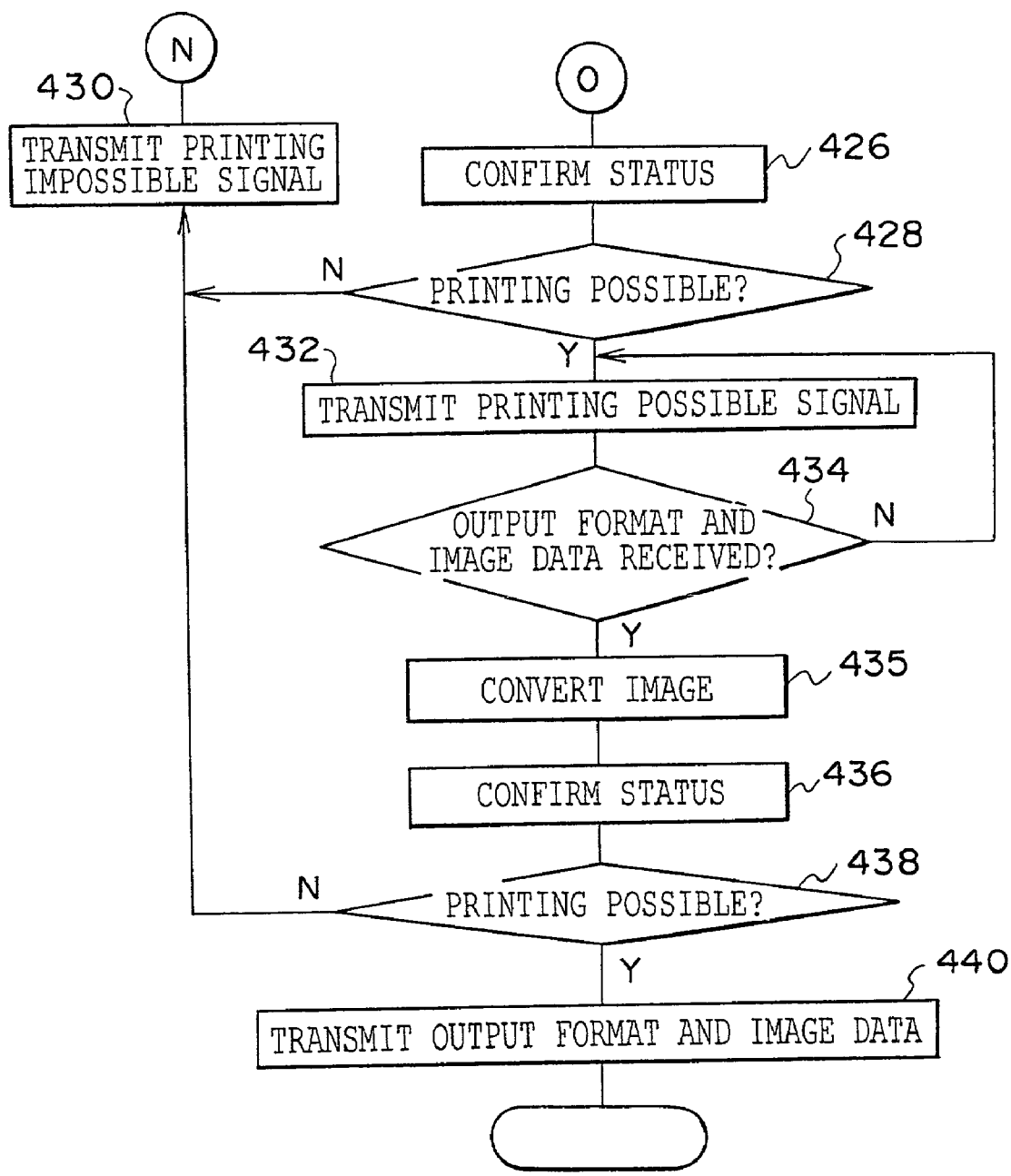
FIG. 22B is a flowchart of a control routine which is executed at the server.
Figure 23A:
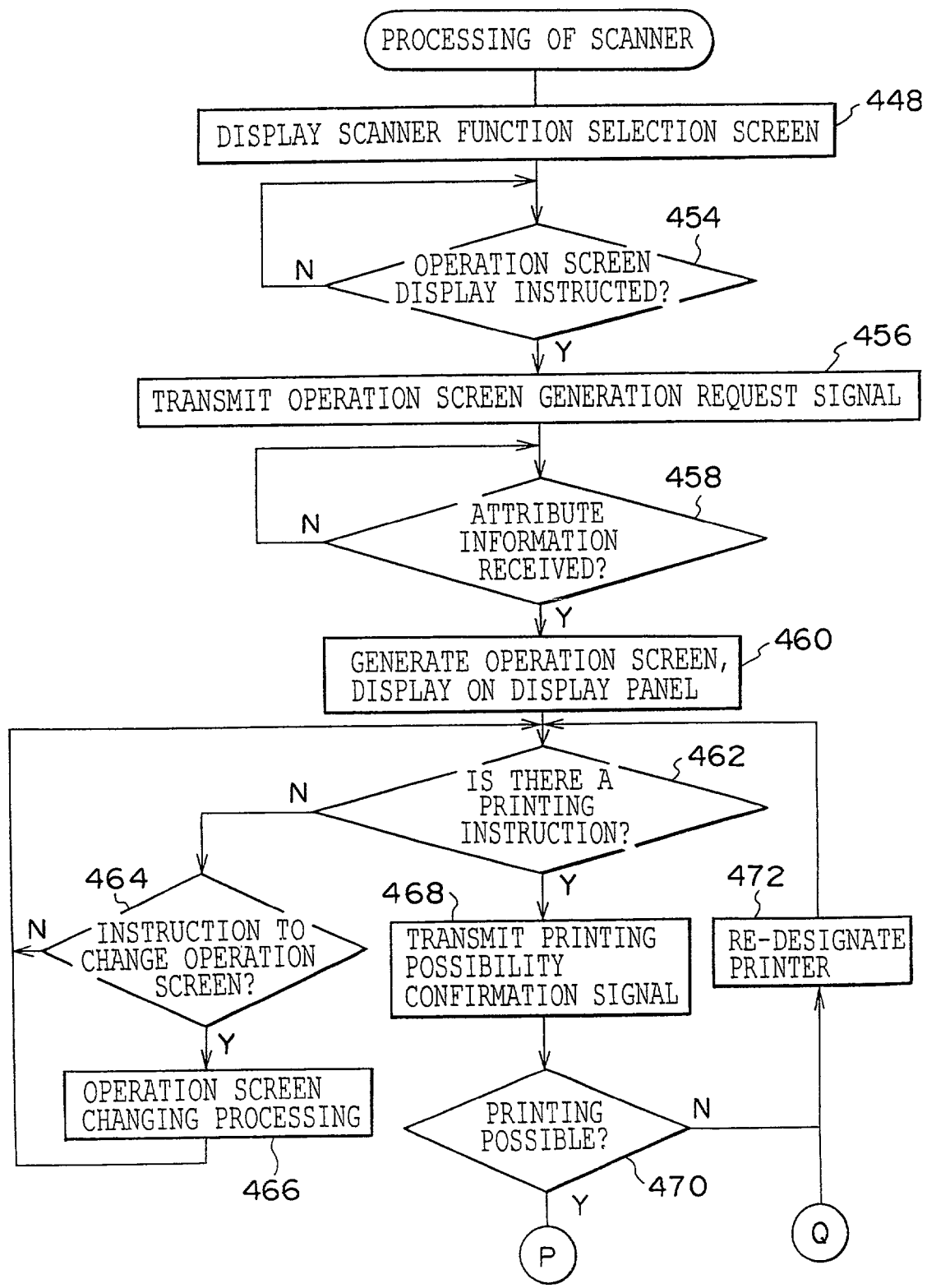
FIG. 23A is a flowchart of a control routine which is executed at the scanner.

With reference to FIGS. 5, 22, and 23, the processing routines which are executed by the respective controllers of the scanner, the server, and the printer of the present embodiment will be described. These processing routines are divided into attribute information registration processing, operation screen display processing, printing instructing processing, and printing processing, and will respectively be described hereinafter.

[Attribute Information Registration Processing]

The attribute information registration processing is processing for registering, in the database connected to the server 14, attribute information of the printers 16 connected to the network.

When printers 16 are connected to the network 10, management tool software, which is provided at the server 14, is operated from an operation panel (not shown) provided at the server 14, or the client 18 connected to the server 14 via the network. In this way, attribute information registration processing for registering the attribute information of the printers 16 at the server 14 is carried out. Namely, at the server 14, by instructing the management tool software, in step 408 shown in FIG. 22, when it is judged that there is a request for attribute information registration processing, in step 409, a registration processing request signal, which requests registration processing of printer attribute information, is transmitted from the server 14 to the printer 16.

At the printer 16, in step 100 of FIG. 5, it is judged whether or not a registration processing request signal has been received. When a registration processing request signal has been received, in step 102, the attribute information of the printer 16 is transmitted from the printer 16 to the server 14.

In step 410, it is judged whether the server 14 has received the attribute information transmitted from the printer 16. When the attribute information has been received, in step 412, the file system 14E is controlled such that the attribute information of the printer 16 is registered in the database 24.

[Operation Screen Display Processing]

When the scanner 12 is started-up, first, an initial screen is displayed at the display panel 12B of the scanner 12, and next, a menu screen for service selection is displayed.

Figure 24:
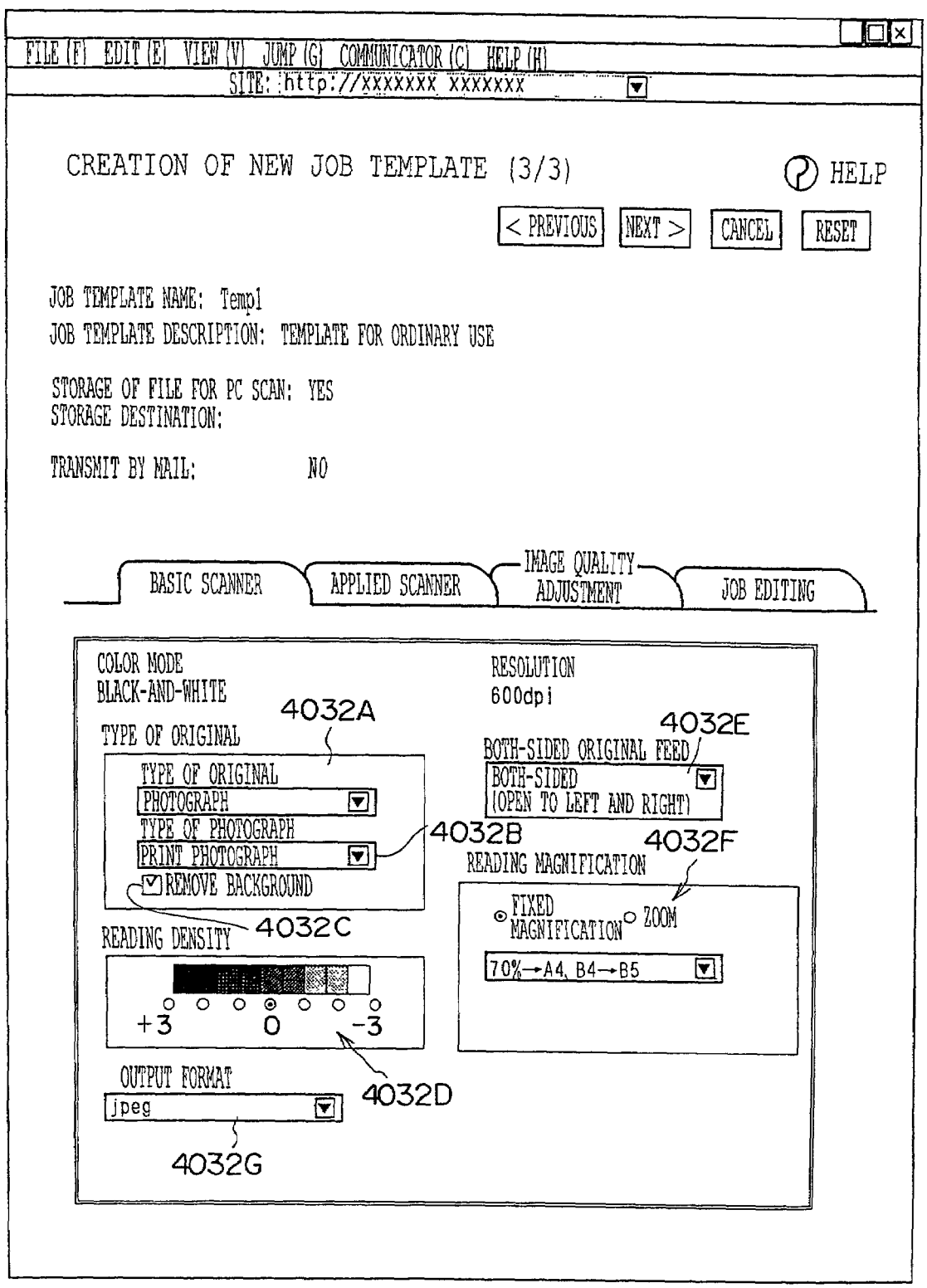
FIG. 24 is a diagram showing an example of a selection screen of scanner functions.

When the scan function selection service is selected by the operator from the menu screen, in step 448 of FIG. 23, first, a scan function selection screen 4030 such as that shown in FIG. 24 is displayed, and scan function selection is carried out by the operator.

As shown in FIG. 24, there are, for example, the respective menu items of basic scanner, applied scanner, image quality adjustment, and job editing at the scan function selection screen 30.

Provided at the basic scanner menu are, as shown in FIG. 24 for example, a selection box 4032A for selecting the type of original (e.g., photograph, document, or the like); a selection box 4032B for selecting the type of photograph (e.g., print photograph, shot photograph, or the like); a selection box 4032C for selecting whether or not the read image is to be subjected to background removal processing; a selection box 4032D for selecting the reading density (e.g., in 7 levels from −3 to +3); a selection box 4032E for selecting both-sided original feed (both sides (opening to the left and the right), or the like); a selection box 4032F for selecting the reading magnification (fixed magnification, zoom, or the like); and a selection box 4032G for selecting the output format (JPEG, bitmap, PDF, GIF, or the like). The desired function can be selected for each item. Each item which the operator selects is temporarily stored in the memory 12D.

In this way, the output format can be designated at the time of reading the image. Therefore, the operator can select an optimal output format in accordance with the type of image.

Each of the selected items may be stored in the memory 12D as a job template, and may be called-up later. In this way, at the time of reading the next image, the respective items can be set merely by reading the job template from the memory 12D, such that there is no need to select the items again, and scanning can be implemented quickly. Further, the read image may be attached to mail and transmitted.

When the operator selects the respective items of the scan functions in accordance with the read image and selects printing from the menu displayed on the display panel 12B of the scanner 12, in step 454, it is judged that there is an instruction to display the printing operation screen. In step 456, a screen generation request signal for generating an operation screen for printing is transmitted from the scanner 12 to the server 14. Further, it is possible to transmit only information, which expresses that a group of the printers 16 has been selected, from the scanner 12 to the server 14.

At the server 14, when it is judged in step 414 of FIG. 22 that a screen generation request signal transmitted from the scanner 12 has been received, in step 416, the status of the printer 16 connected to the network 10 is confirmed. On the basis of the screen generation request signal and the registered attribute information of the printer 16, attribute information for generating an operation screen for printing of the designated printer 16 is generated. In step 418, the generated attribute information is transmitted to the scanner 12. A signal, for display of the attribute information of all of the printers 16 connected to the network 10, or for display of only the attribute information of the printers 16 equipped with a color printing function, or for display of attribute information of only the printers 16 of a group designated in advance, or the like, can be transmitted as the screen generating request signal.

When the attribute information is transmitted from the server 14 to the scanner 12 and it is judged in step 458 of FIG. 23 that the attribute information from the server 14 has been received, the scanner 12 combines the received attribute information, which is expressed as text data for generating an operation screen for printing, and user interface parts, which are stored in the memory 12D and which express picture information such as buttons or the like, and the scanner 12 generates an operation screen for printing. In step 460, the generated operation screen for printing is displayed on the display panel 12B as the user interface.

When the operator operates the displayed operation screen for printing and designates a screen change of the operation screen for printing, the routine moves from step 462 in FIG. 23 on to steps 464 and 466, and moves from step 414 in FIG. 22 on to steps 420 and 422, and screen changing processing is carried out. In this screen changing processing, as shown in steps 456 through 460 of FIG. 23 and in steps 414 through 418 of FIG. 22, a new screen generating request signal is transmitted to the server 14 in accordance with the operation of the display panel 12B of the scanner 12, and attribute information for generating a new operation screen for printing is generated by the server 14, and the generated attribute information is transmitted. As a result, the display of the operation screen for printing is changed in accordance with operation using the operation screen for printing of the display panel 12B of the scanner 12.

[Printing Instructing Processing]

The operator confirms the attribute information of the printer 16 by the operation screen for printing. Thereafter, the operator sets, from the operation screen for printing, the output parameters which express the image data output format, such as sheet size, enlargement/reduction magnification, and the like, and instructs printing. In this way, it is judged in step 462 of FIG. 23 that there is a printing instruction. In step 468, a printing possibility confirmation signal, for confirming whether or not printing by the designated printer 16 is possible, is transmitted to the server.

When the printing possibility confirmation signal is transmitted from the scanner 12 to the server 14 and it is judged in step 424 of FIG. 22 that the printing possibility confirmation signal has been received (i.e., that there is a printing instruction), in step 426, the status of the designated printer 16 is confirmed. In step 428, if it is judged from the status that printing is possible, in step 432, a printing possible signal is transmitted to the scanner 12. On the other hand, if it is judged in step 428 that printing is not possible, in step 430, a printing impossible signal is transmitted to the scanner 12.

At the scanner 12, in step 470 of FIG. 23, it is judged whether a printing possible signal has been received. If a printing possible signal has been received, in the next step 474, it is judged whether image reading (scan starting) has been instructed by the operator pressing a start button or the like. When it is judged in step 474 that there is an image reading instruction, in step 476, the scanner portion 12A is controlled such that the image recorded on the set original is read in one operation, i.e., a series of image data is read as common image data, and is stored in the memory 12D of the scanner as image data in electronic form.

In this reading, reading is carried out under the conditions selected by the operator as described above, and the image data, which is in electronic form, is stored in the memory 12D of the scanner. Namely, reading is carried out in accordance with the conditions such as the type of original, the reading density, the reading magnification, and the like which have been selected by the operator.

Further, in a case in which the output format is designated, in step 477, the read image is file-converted into the designated output format (e.g., JPEG).

When image data is inputted from an external storage device in which image data is stored in advance, the above-described image reading processing is not necessary, and it suffices to store, in the memory 12D, the image data read from the external storage device by using a reading device (not shown). Further, in this case as well, as described above, a screen such as that shown in FIG. 24 may be displayed, and the output format of the image may be selected, and the read image may be converted into an image of the selected output format.

Further, the inputted image data and the selected output format may be transmitted to the server 14 as output image information, without the image being converted at the scanner. In this case, at the server 14, the inputted image may be converted into an image of the selected output format (step 435 of FIG. 22 which will be described later), or may be converted at the output destination of the image without being converted at the server 14.

Then, in step 178, the output format inputted from the operation screen and the image data read from the scanner portion 12A are transmitted to the server 14.

On the other hand, in step 470, in a case in which it is judged that a printing impossible signal has been inputted, in step 472, the operator is instructed to re-designate the printer 16. When the operator operates the display panel 12B and re-designates the printer 16 which is to output, in the same way as described above, the routine proceeds from step 462 to step 468. A printing possibility confirmation signal for confirming whether or not printing is possible is transmitted to the server 14. In a case in which a printing possible signal is received in step 470 and it is judged in step 474 that image reading has been instructed, the image data recorded on the original is read in step 476, and in step 478, the output format and the image data are transmitted to the server 14.

As the designation of the printer 16, one printer 16 can be designated, or one group can be designated and printed matter can be simultaneously outputted from the respective printers 16 belonging to the designated group.

A plurality of printers 16, which are equipped with different functions as attributes, may be set in advance so as to belong to the same group, and on the basis of the same image data, prints can be outputted from each of a printer 16 equipped with a color output function and a printer 16 equipped with a black-and-white output function. In this case, by designating the outputting such that one set is outputted from the printer 16 equipped with the color output function and the remaining sets are outputted from the printer 16 equipped with the black-and-white output function, costs can be reduced as compared with a case in which all of the sets are color-outputted.

[Printing Processing]

In step 434 of FIG. 22, it is judged whether or not the output format and the image data from the scanner 12 have been received at the server 14. If it is judged that the output format and the image data from the scanner 12 have been received at the server 14, in step 435, the image data, which was received only in the case in which there was an instruction to convert the received image into a designated output format, is converted into the designated output format. If the output format has not been designated, i.e., if the inputted image was converted into an image of the output format at the scanner 12, conversion of the image data is not carried out. Further, it is possible to instruct the output destination to convert the image data into the selected output format at the time of output, without the image data being converted at the server.

In step 436, the status of the printer 16, which was designated to execute the job, is confirmed. In step 438, it is judged, from the confirmed status, whether or not printing is possible. If an error has occurred at the printer 16 for which printing is designated and printing is not possible, in step 430, a printing impossible signal is transmitted to the scanner 12. In this way, at the scanner 12, in step 480, it is judged that, after transmission of the output format and the image data, a printing impossible signal has been received. As described above, in step 472, when the operator is instructed by the operation screen to re-designate the printer 16 and the operator operates the display panel 12B so as to re-designate the printer 16 to carry out output, a printing possible signal is received. When start of scanning is instructed, the image is read, and the output format and the image data are transmitted again to the server 14. Then, until it is judged in step 482 that a predetermined time has passed, the routine returns to step 480, and it is repeatedly judged whether or not a printing impossible signal has been received.

On the other hand, when it is judged in step 438 that printing is possible, in step 440, an image data output format signal, which expresses the paper size, the number of sets and the like, and the image data, which is inputted from the scanner 12, are transmitted from the server 14 via the network 10 to the printer 16 for which printing has been designated. In step 104 of FIG. 5, when it is judged that the output format and the image data transmitted from the server 14 have been received, the image data, which was received only in a case in which it was instructed to convert the received image data into the designated output format, is converted, at the printer 16, into an image of the designated output format. If the output format is not designated, i.e., if the image data is converted into image data of the output format at the scanner 12 or the server 14, image data conversion is not carried out.

Then, in step 106, an image based on the image data is formed on a recording sheet in the designated output format, and the recording sheet on which the image is formed is outputted.

In this way, in the present embodiment, the output format can be designated at the time of reading the image. Thus, the operator can select the optimal output format in accordance with the type of the image.

In the present embodiment, a case is described in which, when the output format is designated, the read image is file-converted into the designated output format by the scanner 12. However, the read image does not have to be file-converted at the scanner 12. The read image may be stored as is in the memory 12D, and information relating to the designated output format may be transmitted to the server 14 together with the image data, and at the server 14, the received image data may be file-converted into the designated output format.

As described above, in accordance with the fourth embodiment of the present invention, there is the effect that, at the time of image reading, the operator can select the optimal output format in accordance with the type of the image.

Hereinafter, a fifth embodiment of the present invention will be described in detail with reference to the drawings. The basic structure of the print system of the present embodiment is the same as that of the first embodiment of the present invention. Thus, the same structural elements, members and the like are denoted by the same reference numerals, and description thereof is omitted. Further, description is omitted of portions of the functions, operations, and effects of the print system of the present embodiment which are the same as those of the first embodiment.

Figure 26:
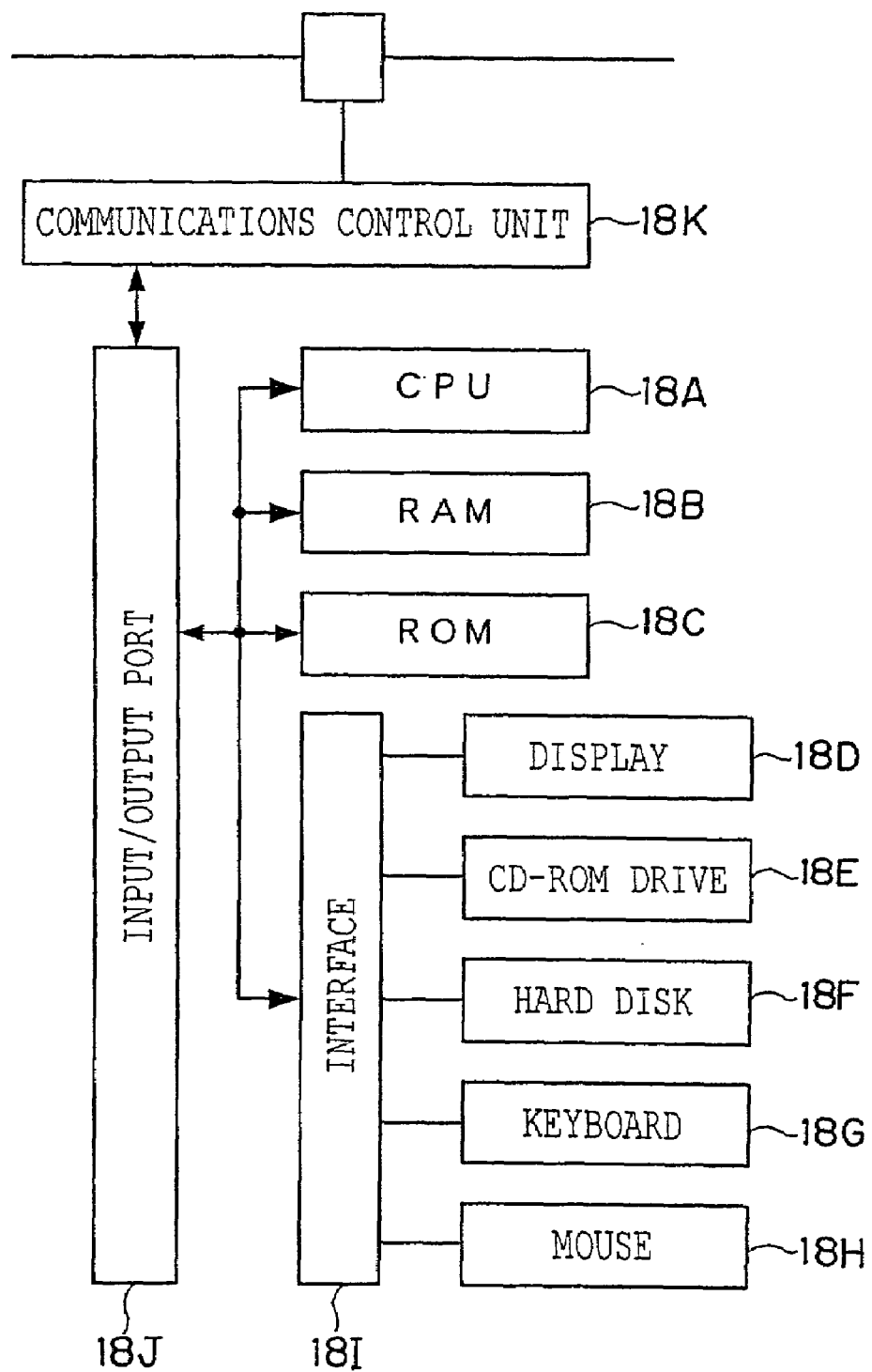
FIG. 26 is a schematic structural view of a client.

As shown in FIG. 26, a personal computer 18 is equipped with a CPU 18A which controls the entire personal computer 18; a RAM 18B; a ROM 18C in which programs of processing routines, which will be described later, and the like are stored in advance; an interface 18I to which a display 18D, a CD-ROM drive 18E, a hard disk 18F, a keyboard 18G, and a mouse 18H are connected; and an input/output port 18J. The CPU 18A, the RAM 18B, the ROM 18C, the interface 18I and the input/output port 18J are connected to the network 10 via a communications control unit 18K which carries out communications, via the network, with devices connected to the network.

Processing routines, which are executed by the respective controllers of the scanner, the server and the printer of the present embodiment, will be described hereinafter with reference to FIGS. 5 through 7 and 25. These processing routines are divided into routines for attribute information registration processing, operation screen display processing, printing instructing processing, and printing processing, and each will be described separately hereinafter.

[Attribute Information Registration Processing]

Attribute information registration processing is a processing for registering, in the database connected to the server 14, the attribute information of the printers 16 connected to the network.

In a case in which the printer 16 is connected to the network 10, by operating an operation panel (not shown) provided at the server 14 or by operating management tool software provided at the server 14 from the client 18 which is connected to the server 14 via the network, attribute information registration processing for registering the attribute information of the printer 16 in the server 14 is carried out. Namely, at the server 14, by an instruction to the management tool software, in step 508 of FIG. 25, when it is judged that there is an attribute information registration processing request, in step 509, a registration processing request signal, which requests registration processing of printer attribute information, is transmitted from the server 14 to the printer 16.

At the printer 16, in step 100 of FIG. 5, a determination is made as to whether a registration processing request signal has been received. If a registration processing request signal has been received, in step 102, attribute information of the printer 16 is transmitted from the printer 16 to the server 14.

In step 510, the server 14 judges whether attribute information transmitted from the printer 16 has been received. If attribute information has been received, in step 512, the file system 14E is controlled, and the attribute information of the printer 16 is registered in the database 24.

[Operation Screen Display Processing]

When the scanner 12 is started-up, first, an initial screen is displayed on the display panel 12B of the scanner 12, and next, a menu screen for service selection is displayed.

In a case in which image data is inputted from an external storage device in which image data is stored in advance, the above-described image reading processing is not needed, and it suffices to store, in the memory 12D, the image data read from the external storage device by using a reading device (not shown).

When the operator selects printing from the menu displayed on the display panel 12B of the scanner 12, in step 154 of FIG. 7, it is judged that there is an instruction for display of operation screen for printing. In step 156, an operation screen generating request signal for generating an operation screen for printing is transmitted to the server 14 from the scanner 12. Further, it is possible for only information expressing that a group of printers 16 has been selected to be transmitted from the scanner 12 to the server 14.

Figure 25A:
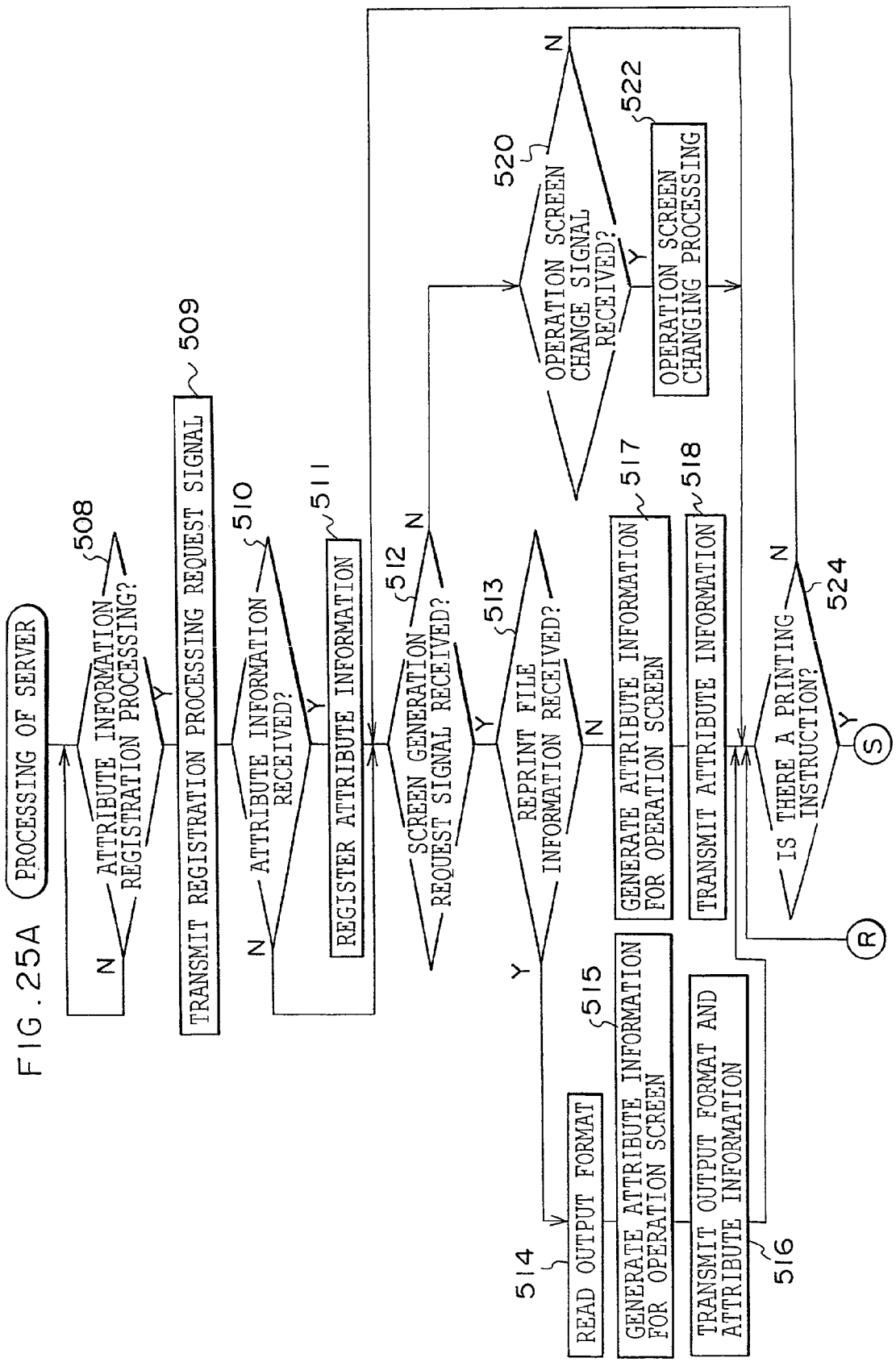
FIG. 25A is a flowchart of a control routine which is executed at the server.

At the server 14, when it is judged in step 512 of FIG. 25 that a screen generating request signal transmitted from the scanner 12 has been received, in step 513, it is judged whether reprint file information has been received. Namely, it is judged whether reprinting has been instructed by the scanner 12. Then, if reprint file information has been received, the routine moves on to step 514. If reprint file information has not been received, the routine proceeds to step 517. Note that reprinting processing will be described later.

In step 517, the status of the printer 16 connected to the network 10 is confirmed. On the basis of the screen generating request signal and the registered attribute information of the printer 16, attribute information for generating an operation screen for printing of the designated printer 16 is generated. In step 518, the generated attribute information is transmitted to the scanner 12. A signal, for display of the attribute information of all of the printers 16 connected to the network 10, or for display of only the attribute information of the printers 16 equipped with a color printing function, or for display of attribute information of only the printers 16 of a group designated in advance, or the like, can be transmitted as the screen generating request signal.

When the attribute information is transmitted from the server 14 to the scanner 12 and it is judged in step 158 of FIG. 7 that the attribute information from the server 14 has been received, the scanner 12 combines the received attribute information, which is expressed as text data for generating an operation screen for printing, and user interface parts, which are stored in the memory 12D and which express picture information such as buttons or the like, and the scanner 12 generates the operation screen for printing. In step 160, the generated operation screen for printing is displayed on the display panel 12B as the user interface.

When the operator operates the displayed operation screen for printing and designates a screen change of the operation screen for printing, the routine moves from step 162 in FIG. 7 on to steps 164 and 166, and moves from step 514 in FIG. 25 on to steps 520 and 522, and screen changing processing is carried out. In this screen changing processing, as shown in steps 156 through 160 of FIG. 7 and in steps 514 through 518 of FIG. 25, a new operation screen generating request signal is transmitted to the server 14 in accordance with the operation of the display panel 12B of the scanner 12, and attribute information for generating a new operation screen for printing is generated by the server 14, and the generated attribute information is transmitted. As a result, the display of the operation screen for printing is changed in accordance with operation using the operation screen for printing of the display panel 12B of the scanner 12.

[Printing Instructing Processing]

The operator confirms the attribute information of the printer 16 by the operation screen for printing. Thereafter, the operator sets, from the operation screen for printing, the output parameters which express the image data output format, such as sheet size, enlargement/reduction magnification, and the like, and instructs printing. In this way, it is judged in step 162 of FIG. 7 that there is a printing instruction. In step 168, a printing possibility confirmation signal, for confirming whether or not printing by the designated printer 16 is possible, is transmitted to the server.

When the printing possibility confirmation signal is transmitted from the scanner 12 to the server 14 and it is judged in step 524 of FIG. 25 that the printing possibility confirmation signal has been received (i.e., that there is a printing instruction), in step 526, the status of the designated printer 16 is confirmed. In step 528, if it is judged from the status that printing is possible, in step 531, a printing possible signal is transmitted to the scanner 12. On the other hand, if it is judged in step 528 that printing is not possible, in step 530, a printing impossible signal is transmitted to the scanner 12.

At the scanner 12, in step 170 of FIG. 7, it is judged whether a printing possible signal has been received. If a printing possible signal has been received, in the next step 174, it is judged whether image reading (scan starting) has been instructed by the operator pressing a start button or the like. When it is judged in step 174 that there is an image reading instruction, in step 176, the scanner portion 12A is controlled such that the image recorded on the set original is read in one operation, i.e., a series of image data is read as common image data, and is stored in the memory 12D of the scanner as image data in electronic form. Then, in step 178, the output format inputted from the operation screen and the image data read from the scanner portion 12A are transmitted to the server 14.

On the other hand, in step 170, in a case in which it is judged that a printing impossible signal has been inputted, in step 172, the operator is instructed to re-designate the printer 16. When the operator operates the display panel 12B and re-designates the printer 16 which is to output, in the same way as described above, the routine proceeds from step 162 to step 168. A printing possibility confirmation signal for confirming whether or not printing is possible is transmitted to the server 14. In a case in which a printing possible signal is received in step 170 and it is judged in step 174 that image reading has been instructed, the image data recorded on the original is read in step 176, and in step 178, the output format and the image data are transmitted to the server 14.

[Printing Processing]

In step 532 of FIG. 25, it is judged whether reprinting has been instructed from the client 18. When reprinting has been instructed, the routine moves on to step 533 (details will be described later). If reprinting has not been instructed, i.e., if printing of the image read by the scanner 12 is instructed, in step 535, it is judged whether the output format and the image data from the scanner 12 have been received at the server 14.

When it is judged that the output format and the image data from the scanner 12 have been received at the server 14, in step 536, the status of the printer 16 which has been designated to execute the job is confirmed. In step 538, it is judged, from the confirmed status, whether or not printing is possible. If an error has arisen and printing is not possible at a printer 16 for which printing has been designated, in step 130, a printing impossible signal is transmitted to the scanner 12. At the scanner 12, in step 180, it is judged whether a printing impossible signal has been received after transmission of the output format and the image data. In this way, at the scanner 12, it is judged in step 170 whether a printing impossible signal has been inputted. As described above, in step 172, when the operator is instructed by the operation screen to re-designate the printer 16 and the operator operates the display panel 12B and re-designates the printer 16 which is to output, a printing possible signal is received. When start of scanning is instructed, the image is read, and the output format and image data are again transmitted to the server 14. Then, in step 182, until it is judged that a predetermined time has passed, the routine returns to step 180, and it is repeatedly judged whether or not a printing impossible signal has been received.

On the other hand, when it is judged in step 538 that printing is possible, in step 540, an image data output format signal, which expresses the sheet size, the number of sets, and the like, and the image data, which is inputted from the scanner 12, are transmitted via the network 10 from the server 14 to the printer 16 for which printing has been designated. At the printer 16, in step 104 of FIG. 5, when it is judged that the output format and image data transmitted from the server 14 have been received, in step 106, an image based on the image data is formed on a recording sheet in the designated output format, and the recording sheet, on which the image has been formed, is outputted.

In step 542, it is judged whether, together with the instruction for printing from the scanner 12, storage has been instructed. If there is a storage instruction, in step 544, by controlling the file system 14E, the received image data and output format are stored in the database 24 as a file for reprinting.

[Reprinting Processing]

By storing the image read by the scanner 12 and the output format in the database 24 as described above, the image and output format can be called-up at any time later and reprinted. Here, a case will be described in which, at the client 18, a file to be reprinted is designated and reprinting is carried out.

Figure 27B:
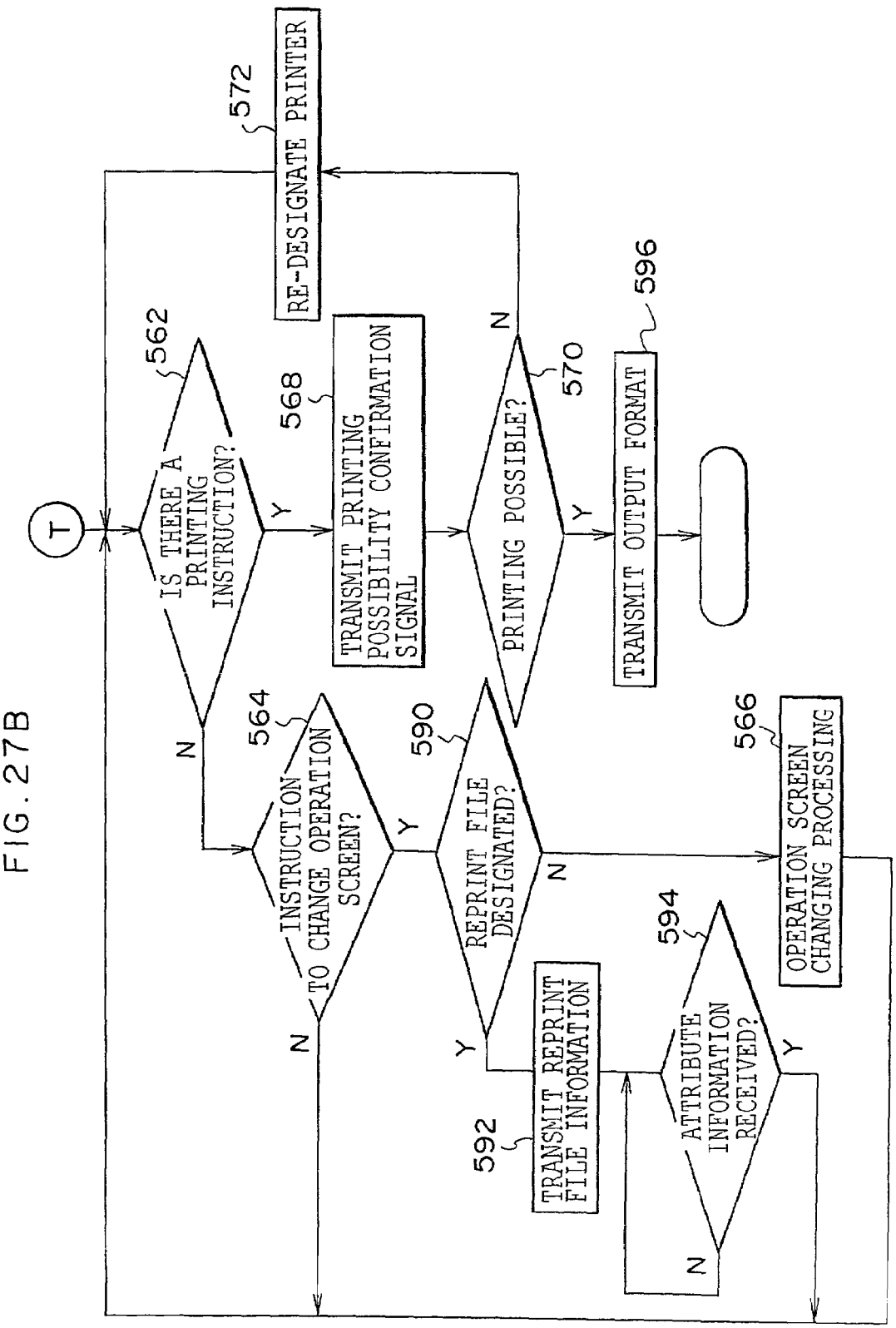
FIG. 27B is a flowchart of a control routine which is executed at the client.

A control routine which is executed at the client (personal computer) 18 is shown in FIG. 27. The control routine executed at the personal computer 18 is basically similar to the control routine which is executed at the scanner 12 and which is shown in FIG. 7 and which was described previously. Thus, the same processings are denoted by the same reference numerals, and detailed description thereof is omitted.

After the operator confirms the attribute information of the printer 16 by the operation screen for printing, when the operator designates the printer 16 which is to output prints and instructs printing, it is judged in step 562 of FIG. 27 that there is a printing instruction. In step 568, a printing possibility confirmation signal, for confirming whether or not printing by the designated printer 16 is possible, is transmitted to the server.

On the other hand, if there is no printing instruction, in step 564, the operator operates the displayed operation screen for printing, and it is judged whether a screen change instruction for the operation screen for printing has been carried out. If there is no instruction to change the screen, the routine returns to step 562.

If there is a screen change instruction, in step 590, it is judged whether or not a reprint file has been designated. Namely, it is judged whether the operator has selected reprinting from the menu displayed on the display 18D and has designated a reprint file.

Figure 28:
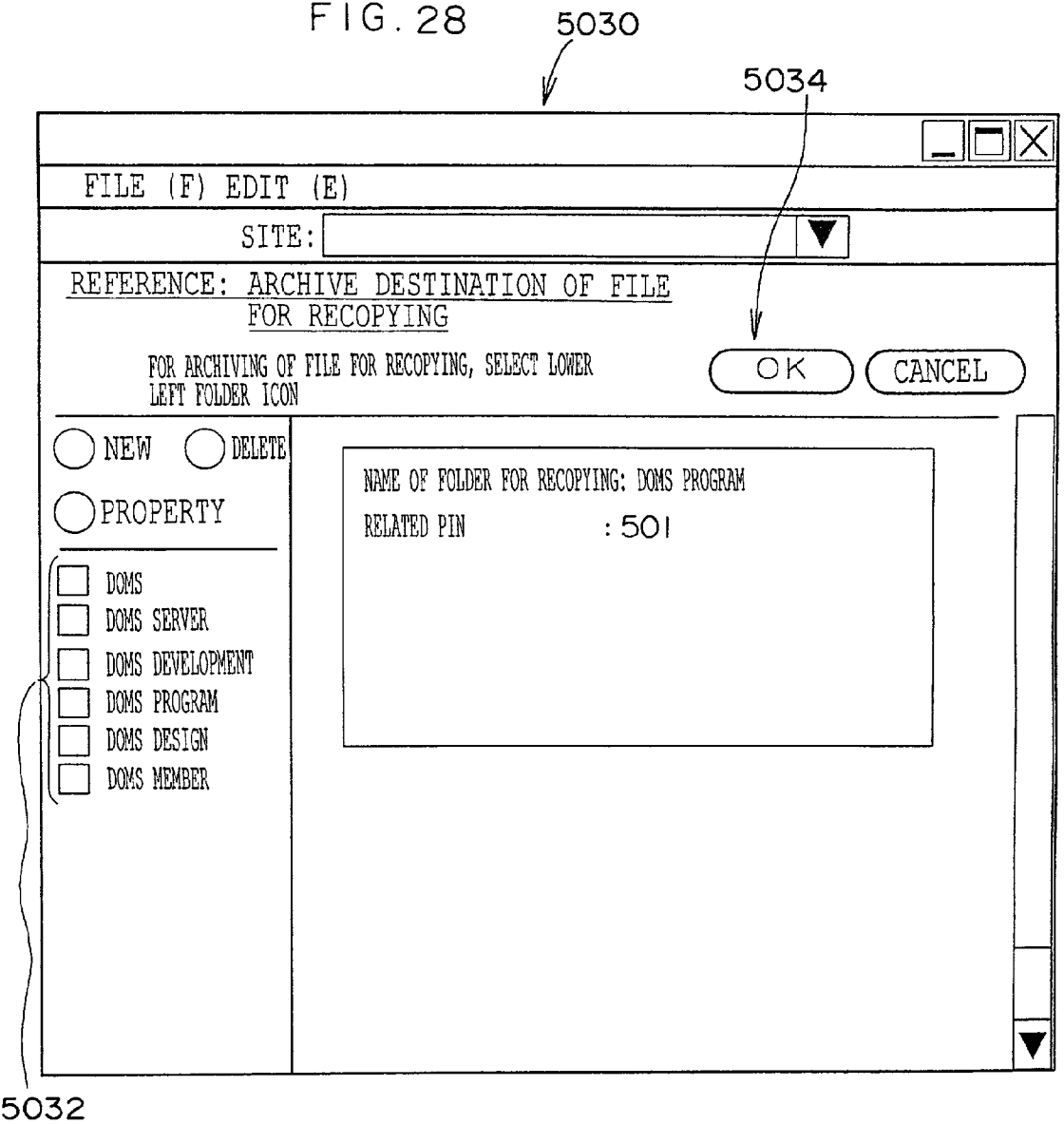
FIG. 28 is an example of a screen in a case in which a storage destination of a file for recopying is designated.

The designation of the reprint file is carried out by, for example, displaying on the display 18D a screen 5030 such as that shown in FIG. 28, and the reprint file being designated by an input device such as the keyboard 18G or the mouse 18H or the like. Specifically, as shown in FIG. 28, a folder is selected (clicked-on) from among folder icons 5032 displayed at the left side of the screen 5030. A file for reprinting (file for recopying), for which reprinting is desired, is selected from the selected folder. By clicking on an OK button 5034 at the upper right by using the mouse 18H, the file for recopying can be set.

When the file for reprinting is set in this way, in step 592, file information for reprinting, e.g., information expressing the stored position of the reprint file such as the file name of the reprint file or the like, is transmitted to the server 14 via the network 10. In this way, at the server 14, it is judged in step 513 that a file for reprinting has been received. In step 514, the output format of the designated file for reprinting is read.

Then, in step 515, on the basis of the registered attribute information of the printer 16, attribute information for generating an operation screen for reprinting is generated. In step 516, the generated attribute information and the read output format are transmitted to the client 18 as a signal for generating an operation screen.

In this way, at the client 18, in step 594, it is judged that the attribute information and the output format have been received, and the routine returns to step 562.

Then, at the client 18, when a change in the output format of reprinting is instructed for example, operation screen changing processing is carried out in step 566. In this way, a recopy setting changing screen 5036, such as that shown in FIG. 29 for example, is displayed on the display 18D. At this time, at the client 18, on the basis of the received attribute information and output format, an operation screen, at which settings of predetermined unalterable functions cannot be changed, is generated and displayed.

Figure 29:
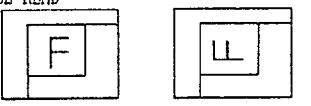
FIG. 29 is an example of a setting screen of respective functions at a time of new copying.
Figure 30:
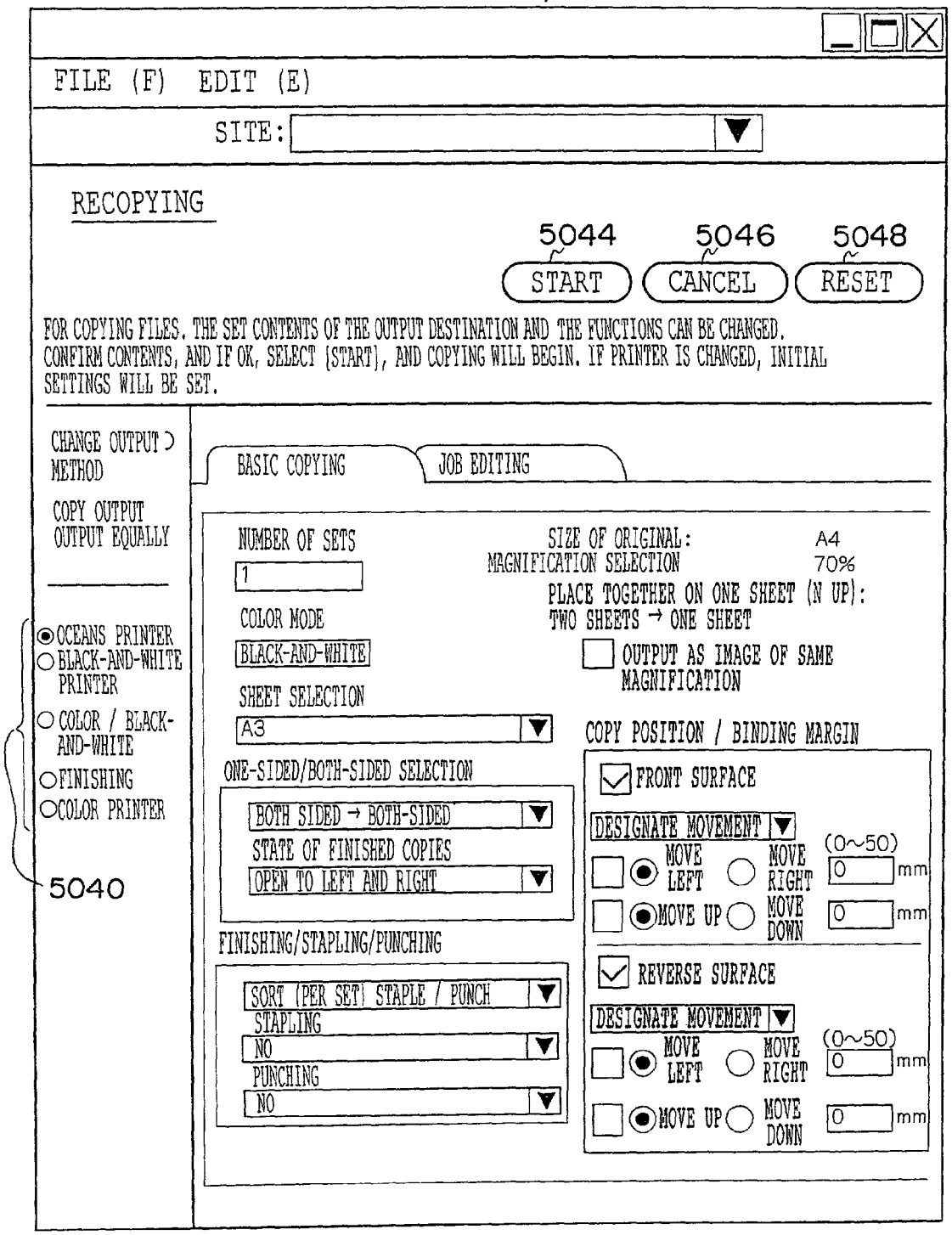
FIG. 30 is an example of a setting screen of respective functions at a time of recopying.

Namely, as shown in FIG. 29 for example, in a case in which the items basic copying, applied copying, image quality adjustment, and job editing are in the setting screen 5036 which is displayed at the time of new copying, when black-and-white is selected at color mode selection box 5037 among the output formats in the basic copy item, a setting screen 5038 such as that shown in FIG. 30 is generated at the time of recopying. Namely, the box for selecting the color mode is not displayed, and the mode is fixed to black-and-white mode. Further, in a printer selection area 5040, only printers for black-and-white are displayed. In this way, because an image which was printed in black-and-white is reprinted at a printer for black-and-white at the time of recopying as well, a deterioration in image quality can be prevented.

Further, even in a case in which a magnification selection box 5042 for reducing or enlarging the image is provided at the time of newly copying a black-and-white image, as shown in FIG. 29, the magnification selection box 5042 is not displayed at the time of recopying as shown in FIG. 30. In this way, enlargement and reduction processings at the time of recopying can be prohibited.

Functions which can be set at the time of newly copying but which cannot be set at the time of recopying are, for example, the "place on one sheet (N up)" item of the applied copying shown in FIG. 31, and the like.

Figure 32:
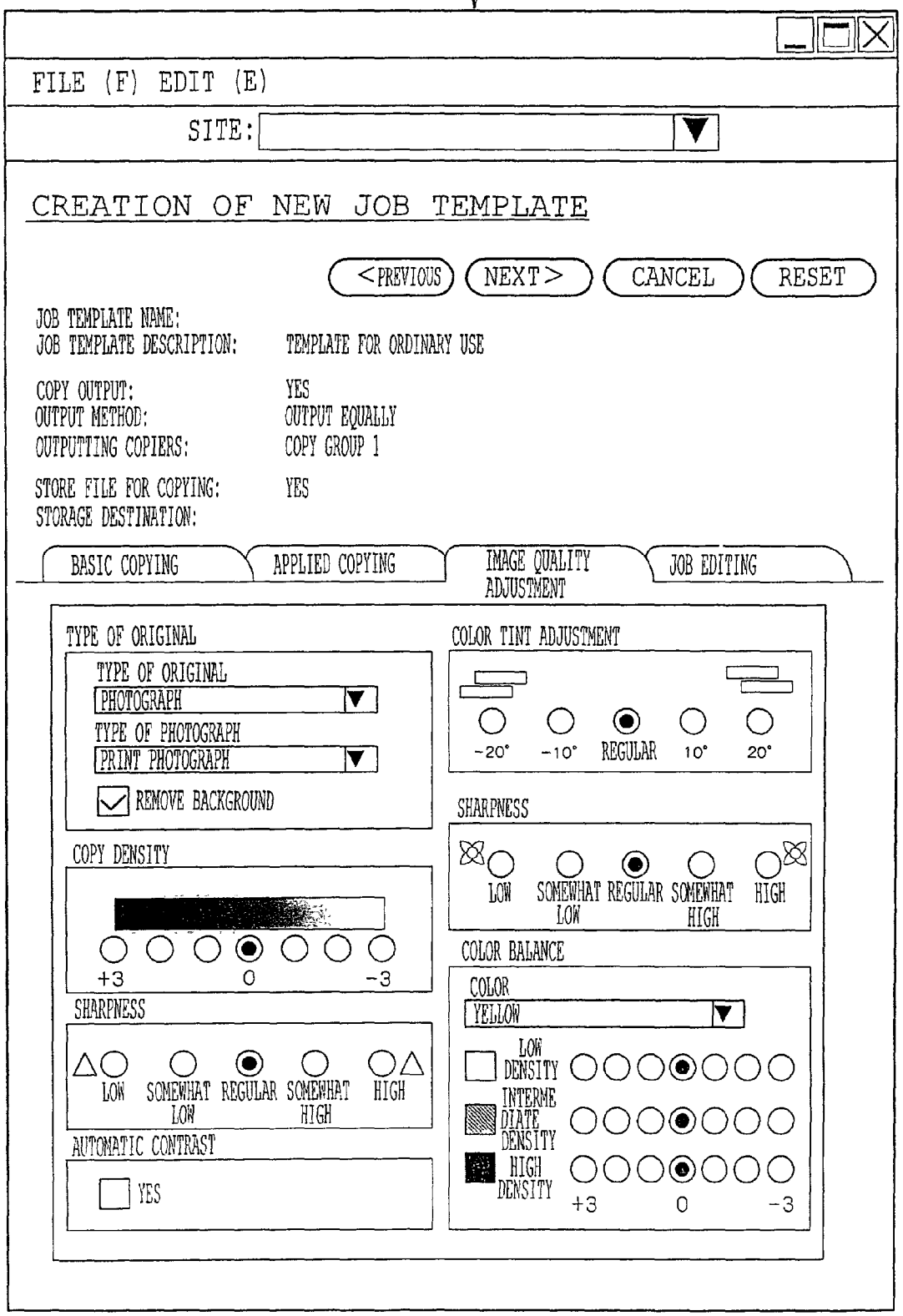
FIG. 32 is an example of a setting screen of respective functions at a time of new copying.

Further, for functions which are implemented at the time of scanning, there are functions for which there is a need to read the original again and which cannot be set at the time of recopying. For example, there are the functions of remove background and copy density and the like in the item image quality adjustment shown in FIG. 32. For such functions as well, as shown in FIG. 30, setting cannot be carried out at the time of recopying.

On the other hand, as functions for which settings can be changed at the time of recopying, there are the following functions. For example, as shown in FIG. 30, in the item basic copying, there are the number of sets to be outputted, sheet selection, one-sided/both-sided selection, finishing/stapling/punching, and copy position/binding margin.

Figure 33:
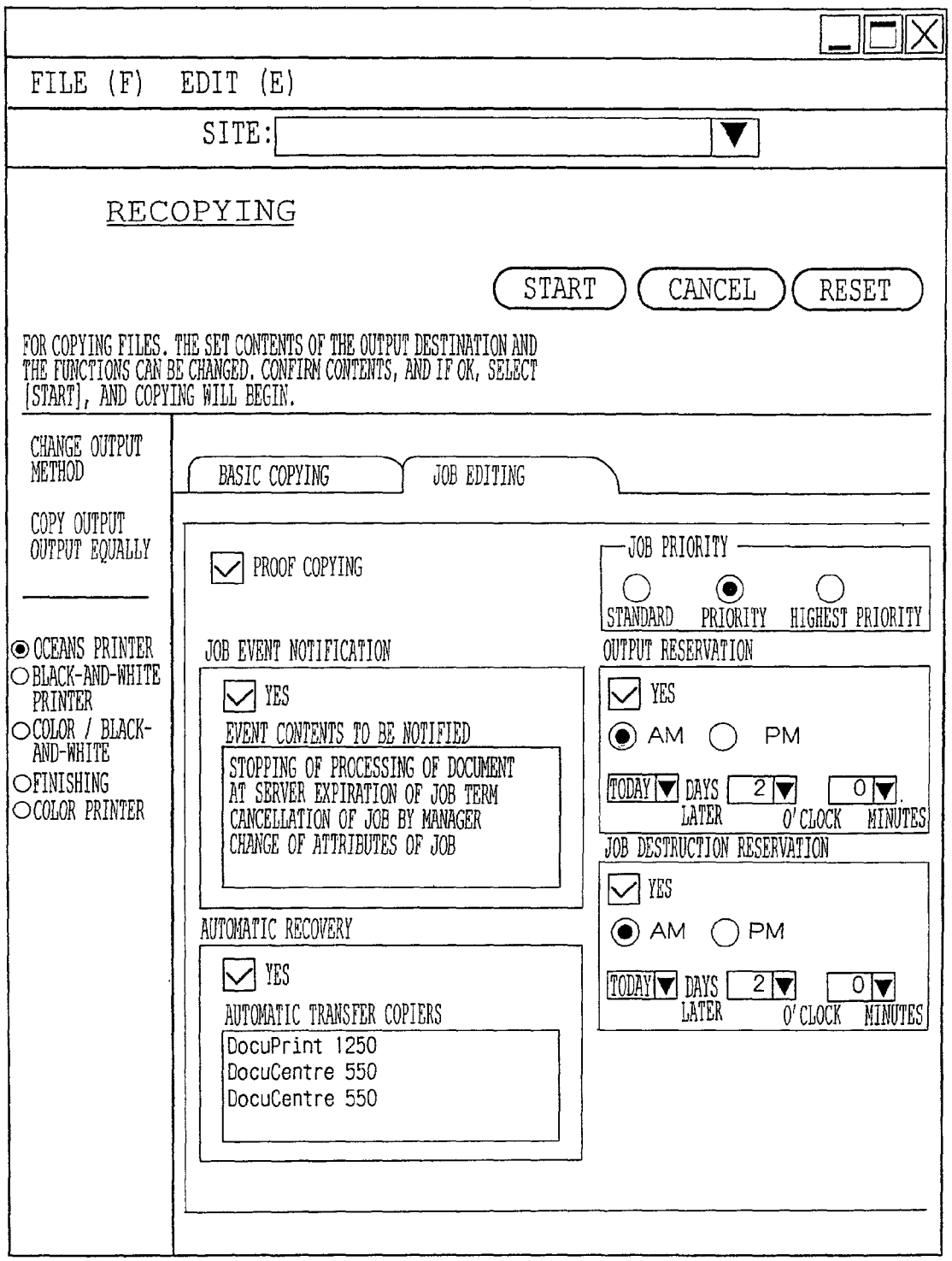
FIG. 33 is an example of a setting screen of respective functions at a time of recopying.

Further, as shown in FIG. 33, in the job editing item, there are proof copy, job event notification, automatic recovery, job priority, output reservation, job destruction reservation, and the like.

Figure 34:
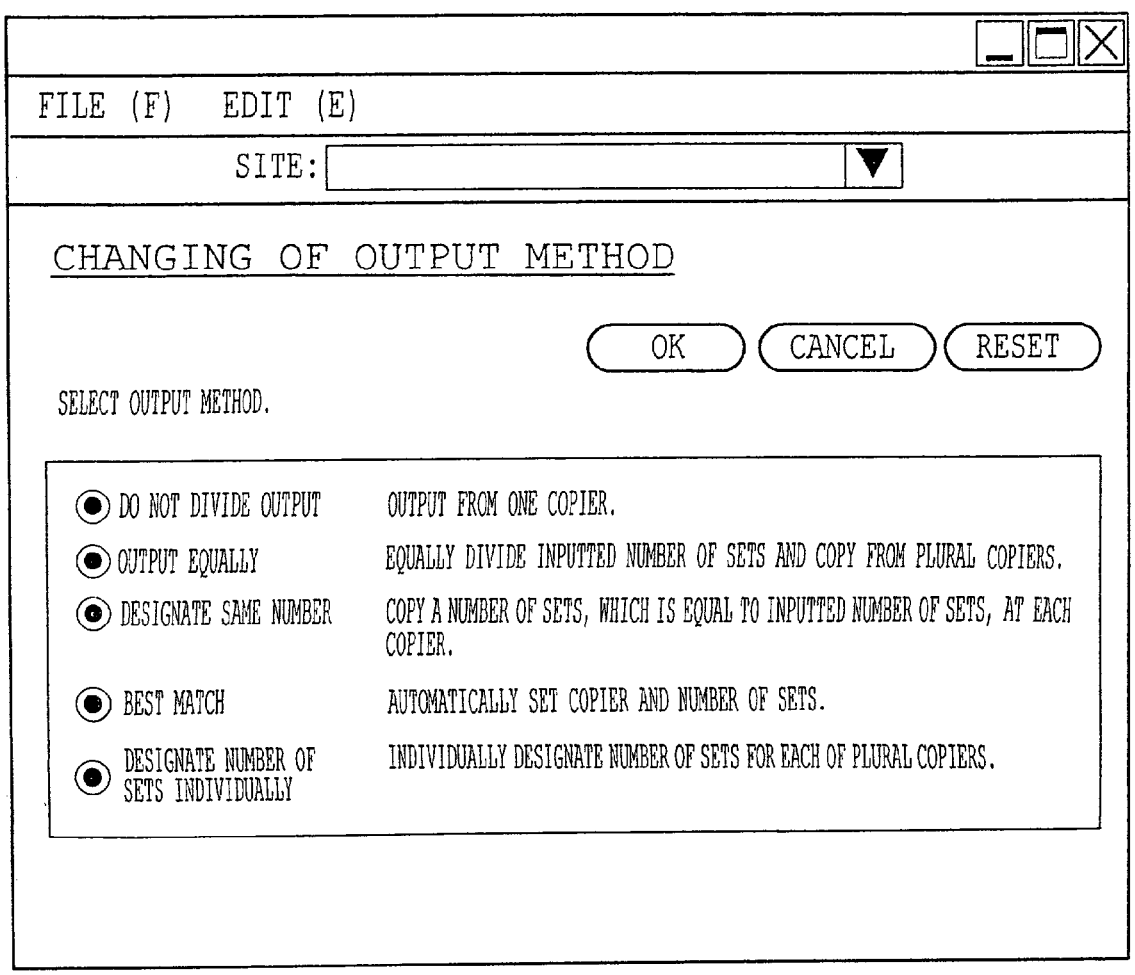
FIG. 34 is an example of a setting screen of respective functions at a time of recopying.

As shown in FIG. 34, in the item of changing the output method, there are the functions of do not divide, output equally, output same order, best matching, and designate number of sets individually.

In this way, specific functions, whose settings cannot be changed at the time of recopying, and functions, for which setting is impossible at the time of recopying, are not displayed in the setting screen 38 and cannot be selected.

Then, when the operator refers to the setting screen 5038 shown in FIG. 30 and carries out a setting change and clicks on a start button 5044, it is judged in step 562 that printing has been instructed. In step 568, a printing possibility confirmation signal, for confirming whether or not printing by the designated printer 16 is possible, is transmitted to the server. Note that, by clicking on a cancel button 5046, the recopying processing is cancelled, and by clicking on a reset button 5048, the set contents are reset.

Then, when the printing possibility confirmation signal is transmitted from the client 18 to the server 14 and it is judged in step 524 of FIG. 25 that the printing possibility confirmation signal has been received (i.e., that there is a printing instruction), in step 526, the status of the designated printer 16 is confirmed. In step 528, if it is judged from the status that printing is possible, in step 531, a printing possible signal is transmitted to the client 18. On the other hand, if it is judged in step 528 that printing is impossible, in step 530, a printing impossible signal is transmitted to the client 18.

At the client 18, in step 570, it is judged whether a printing possible signal has been received. If a printing possible signal has been received, in step 596, the output format inputted from the operation screen is transmitted to the server 14.

At the server 14, in step 532 of FIG. 25, it is judged whether reprinting has been instructed from the client 18. If reprinting has been instructed, the routine moves on to step 533 where it is judged whether the output format has been received. If the output format has been received, in step 534, the image data of the designated reprint file is read.

Then, in step 536, the status of the printer 16 which has been designated to execute the job is confirmed. In step 538, it is judged, from the confirmed status, whether or not printing is possible. If it is judged that printing is possible, in step 540, the output format received in step 533 and the image data read in step 534 are transmitted, from the server 14 via the network 10, to the printer 16 for which printing has been designated. In this way, recopying processing is carried out at the printer 16.

In this way, specific functions, whose settings cannot be changed at the time of recopying, and functions, for which setting is impossible at the time of recopying, are, at the time of recopying, not displayed in the setting screen 5038 and cannot be selected. Thus, a deterioration in the image quality at the time of recopying can be prevented.

In the above explanation, a case of recopying by the client 18 is described as an example. However, it goes without saying that recopying can be carried out at the scanner 12.

Further, when the printer is changed at the time of recopying, image data for recopying may be regenerated in accordance with the changed printer, and outputted to the printer. In this way, a deterioration in image quality due to differences in various machines can be prevented.

Further, for those functions for which a change in settings at the time of recopying is basically impossible, it is possible for the settings thereof to be able to be changed by a specific manager alone, or the like.

As described above, the fifth embodiment of the present invention has the effect that a deterioration in image quality at the time of re-output can be prevented.

Hereinafter, a sixth embodiment of the present invention will be described in detail with reference to the drawings. The basic structure of the print system of the present embodiment is the same as that of the first embodiment of the present invention. Thus, the same structural elements, members and the like are denoted by the same reference numerals, and description thereof is omitted. Further, description is omitted of portions of the functions, operations, and effects of the print system of the present embodiment which are the same as those of the first embodiment.

Figure 35A:
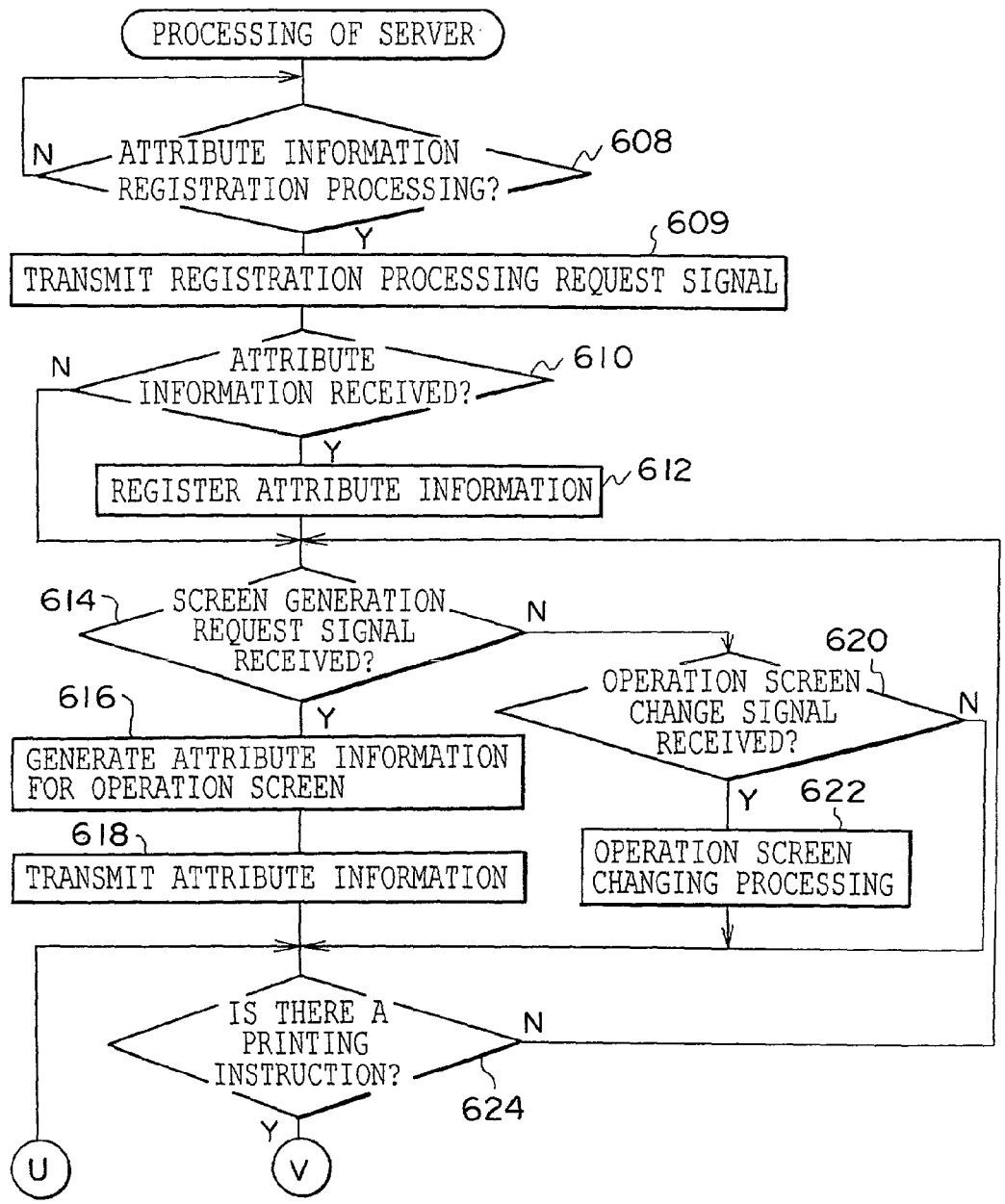
FIG. 35A is a flowchart of a control routine which is executed at the server.
Figure 35B:
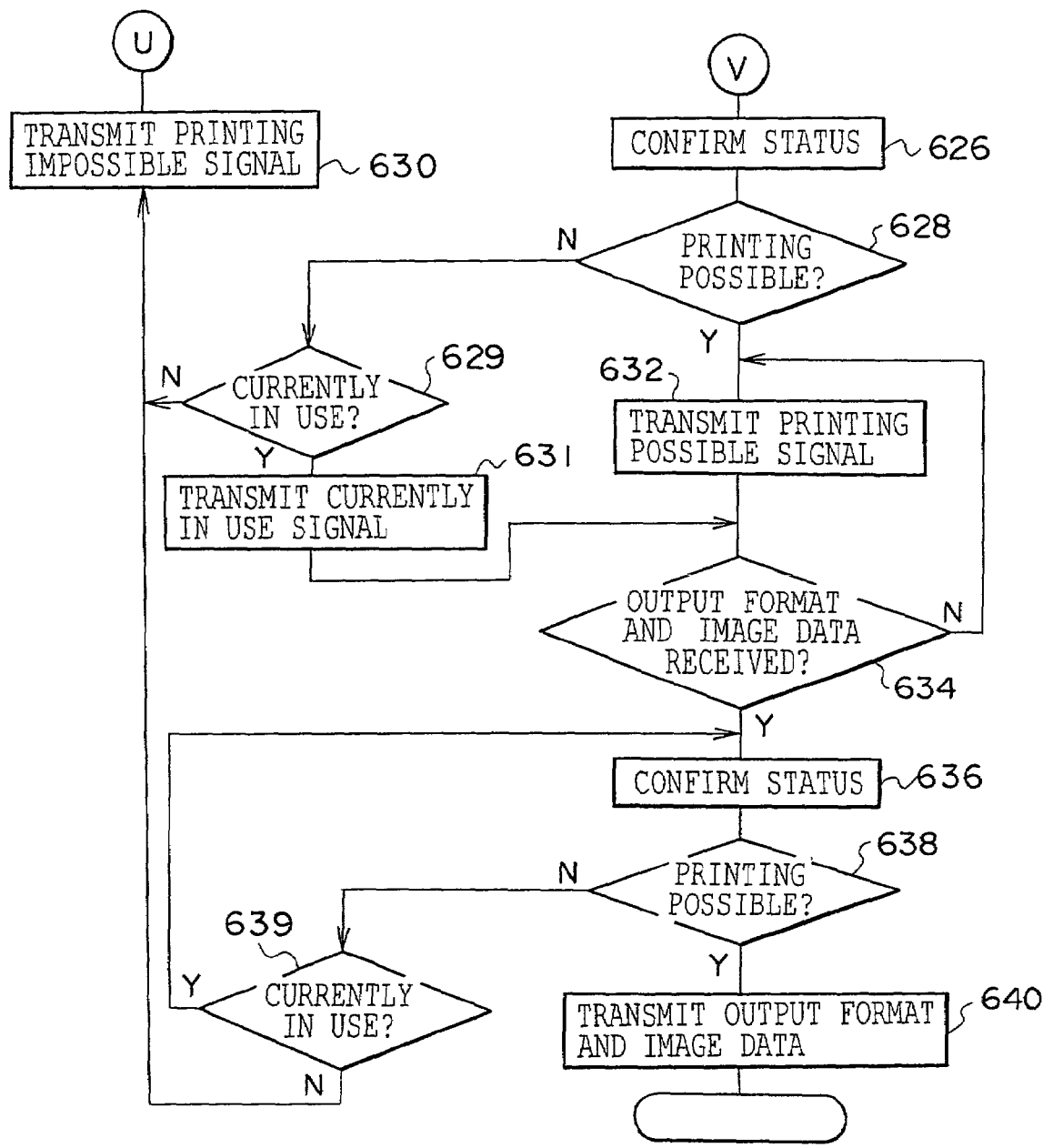
FIG. 35B is a flowchart of a control routine which is executed at the server.
Figure 36A:
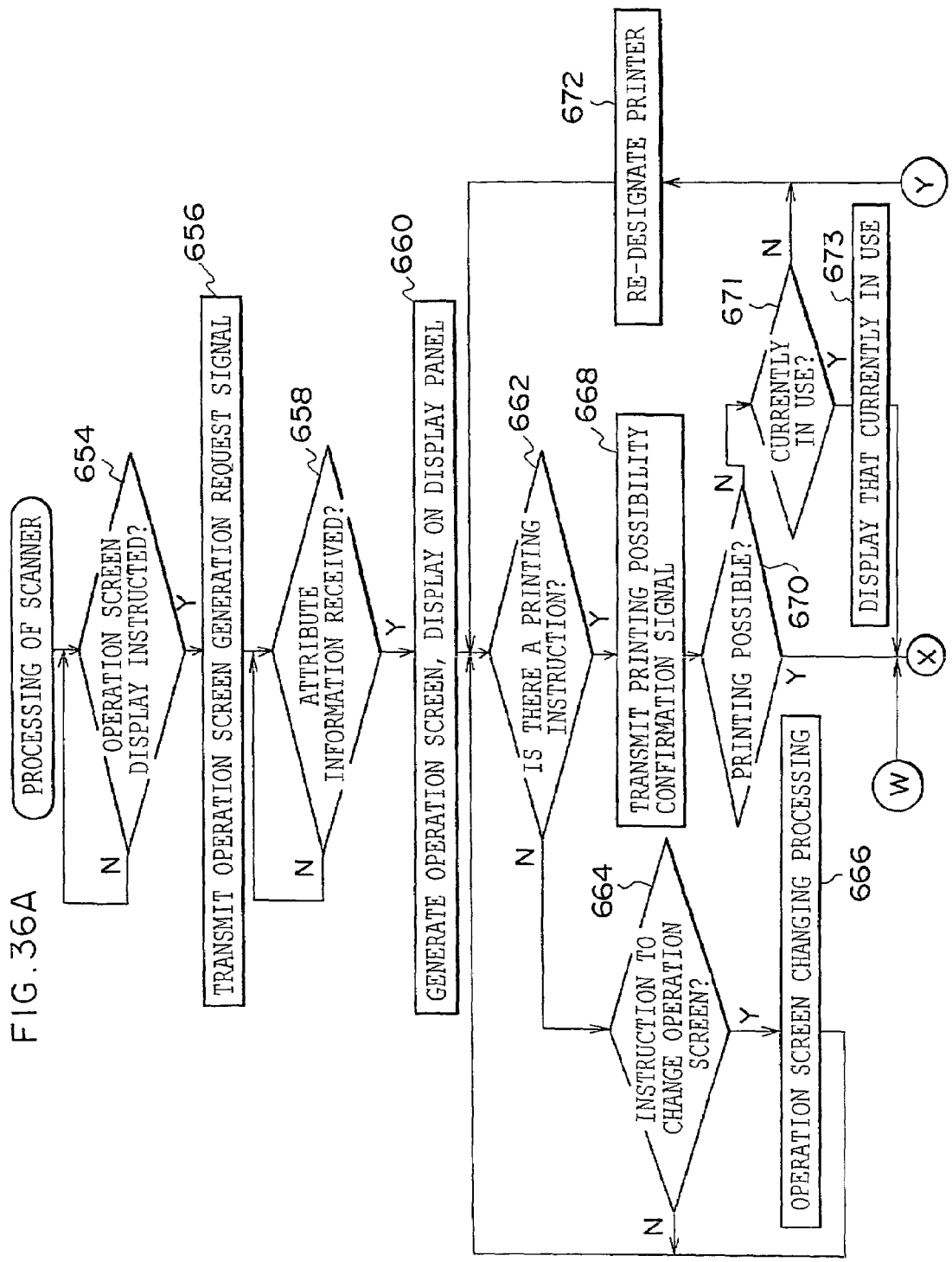
FIG. 36A is a flowchart of a control routine which is executed at the scanner.

With reference to FIGS. 5, 35, and 36, the processing routines which are executed by the respective controllers of the scanner, the server, and the printer of the present embodiment will be described. These processing routines are divided into attribute information registration processing, operation screen display processing, printing instructing processing, and printing processing, and will respectively be described hereinafter.

[Attribute Information Registration Processing]

Attribute information registration processing is a processing for registering, in the database connected to the server 14, the attribute information of the printers 16 connected to the network.

In a case in which the printer 16 is connected to the network 10, by operating an operation panel (not shown) provided at the server 14 or by operating management tool software provided at the server 14 from the client 18 which is connected to the server 14 via the network, attribute information registration processing for registering the attribute information of the printer 16 in the server 14 is carried out. Namely, at the server 14, by an instruction to the management tool software, in step 608 of FIG. 35, when it is judged that there is an attribute information registration processing request, in step 609, a registration processing request signal, which requests registration processing of printer attribute information, is transmitted from the server 14 to the printer 16.

At the printer 16, in step 100 of FIG. 5, a determination is made as to whether a registration processing request signal has been received. If a registration processing request signal has been received, in step 102, attribute information of the printer 16 is transmitted from the printer 16 to the server 14.

In step 610, the server 14 judges whether attribute information transmitted from the printer 16 has been received. If attribute information has been received, in step 612, the file system 14E is controlled, and the attribute information of the printer 16 is registered in the database 24.

Further, the server 14 can confirm the current status of the printer, i.e., can confirm whether printing is possible or not possible. Examples of states in which printing is not possible are states in which the power source is off, there is a paper jam, no sheets are accommodated in the tray, the printer 16 is currently in use, and the like.

[Operation Screen Display Processing]

When the scanner 12 is started-up, at the display panel 12B of the scanner 12, first, an initial screen is displayed, and next, a menu screen for service selection is displayed.

In a case in which image data is inputted from an external storage device in which image data is stored in advance, the above-described image reading processing is not necessary, and the image data, which is read from the external storage device by using a reading device (not shown) can be stored in the memory 12D.

Then, when the operator selects printing from the menu displayed on the display panel 12B of the scanner 12, in step 654 of FIG. 36, it is judged that there is an instruction for display of operation screen for printing. In step 656, a screen generating request signal for generating an operation screen for printing is transmitted to the server 14 from the scanner 12. Further, it is possible for only information expressing that a group of printers 16 has been selected to be transmitted from the scanner 12 to the server 14.

At the server 14, when it is judged in step 114 of FIG. 35 that a screen generating request signal transmitted from the scanner 12 has been received, in step 616, the status of the printer 16 connected to the network 10 is confirmed. On the basis of the screen generating request signal and the registered attribute information of the printer 16, attribute information for generating an operation screen for printing of the designated printer 16 is generated. In step 618, the generated attribute information is transmitted to the scanner 12. A request signal, for display of the attribute information of all of the printers 16 connected to the network 10, or for display of only the attribute information of the printers 16 equipped with a color printing function, or for display of attribute information of only the printers 16 of a group designated in advance, or the like, can be transmitted as the screen generating request signal.

When the attribute information is transmitted from the server 14 to the scanner 12 and it is judged in step 658 of FIG. 36 that the attribute information from the server 14 has been received, the scanner 12 combines the received attribute information, which is expressed as text data for generating an operation screen for printing, and user interface parts, which are stored in the memory 12D and which express picture information such as buttons or the like, and the scanner generates the operation screen for printing. In step 660, the generated operation screen for printing is displayed on the display panel 12B as the user interface.

When the operator operates the displayed operation screen for printing and designates a screen change of the operation screen for printing, the routine moves from step 662 in FIG. 36 on to steps 664 and 666, and moves from step 614 in FIG. 35 on to steps 620 and 622, and screen changing processing is carried out. In this screen changing processing, as shown in steps 656 through 660 of FIG. 36 and in steps 614 through 618 of FIG. 35, a new screen generating request signal is transmitted to the server 14 in accordance with the operation of the display panel 12B of the scanner 12, and attribute information for generating a new operation screen for printing is generated by the server 14, and the generated attribute information is transmitted. As a result, the display of the operation screen for printing is changed in accordance with operation using the operation screen for printing of the display panel 12B of the scanner 12.

[Printing Instructing Processing]

The operator confirms the attribute information of the printers 16 by the operation screen for printing. Thereafter, from the operation screen for printing, the operator sets the output parameters which express the image data output format, such as sheet size, enlargement/reduction magnification, and the like, and carries out printing instruction. In this way, it is judged in step 662 of FIG. 36 that there is a printing instruction. In step 668, a printing possibility confirmation signal, which is for confirming whether printing by the designated printer 16 is possible, is transmitted to the server.

When the printing possibility confirmation signal is transmitted from the scanner 12 to the server 14 and it is judged in step 624 of FIG. 35 that the printing possibility confirmation signal has been received (i.e., that there is a printing instruction), in step 626, the status of the designated printer 16 is confirmed. In step 628, if it is judged from the status that printing is possible, in step 632, a printing possible signal is transmitted to the scanner 12. On the other hand, if it is judged in step 628 that printing is not possible, in step 629, it is confirmed whether the status is that the printer 16 is currently in use.

If the designated printer 16 is currently not in use, i.e., if there is an error state such as the power is off, or there is a paper jam, or no sheets are accommodated in the tray, or the like, in step 630, a printing impossible signal is transmitted to the scanner 12.

On the other hand, if the designated printer 16 is currently in use, i.e., if the display panel 16B of the printer 16 is operated and the printer 16 is currently operating, in step 631, a currently in use signal, which expresses that the currently designated printer 16 is currently in use, is transmitted to the scanner 12.

At the scanner 12, in step 670 of FIG. 36, it is judged whether a printing possible signal has been received. If a printing possible signal has been received, in the next step 674, it is judged whether image reading (scan starting) has been instructed by the operator pressing a start button or the like. When it is judged in step 674 that there is an image reading instruction, in step 676, the scanner portion 12A is controlled such that the image recorded on the set original is read in one operation, i.e., a series of image data is read as common image data, and is stored in the memory 12D of the scanner as image data in electronic form. Then, in step 678, the output format inputted from the operation screen and the image data read from the scanner portion 12A are transmitted to the server 14.

On the other hand, in step 670, in a case in which it is judged that a signal other than a printing possible signal has been inputted, in step 671, it is judged whether a currently in use signal has been inputted. If a printing impossible signal and not a currently in use signal has been received, in step 672, the operator is instructed to re-designate the printer 16. When the operator operates the display panel 12B and re-designates the printer 16 which is to output, in the same way as described above, the routine proceeds from step 662 to step 668. A printing possibility confirmation signal for confirming whether or not printing is possible is transmitted to the server 14. In a case in which a printing possible signal is received in step 670 and it is judged in step 674 that image reading has been instructed, the image data recorded on the original is read in step 676, and in step 678, the output format and the image data are transmitted to the server 14.

Further, if it is judged in step 671 that a currently in use signal has been received, in step 673, it is displayed on the display panel 12B that the designated printer 16 is currently in use. In this way, the user can easily grasp that the designated printer 16 is currently in use.

As the designation of the printer 16, one printer 16 can be designated, or one group can be designated and prints can be simultaneously outputted from the respective printers 16 belonging to the designated group.

A plurality of printers 16, which are equipped with different functions as attributes, may be set in advance so as to belong to the same group. On the basis of the same image data, prints can be outputted from each of a printer 16 equipped with a color output function and a printer 16 equipped with a black-and-white output function. In this case, by designating the outputting such that one set is outputted from the printer 16 equipped with the color output function and the remaining sets are outputted from the printer 16 equipped with the black-and-white output function, costs can be reduced as compared with a case in which all of the sets are color-outputted.

[Printing Processing]

In step 634 of FIG. 35, when it is judged that the output format and the image data from the scanner 12 have been received at the server 14, in step 636, the status of the printer 16 which has been designated to execute the job is confirmed. In step 638, it is judged, from the confirmed status, whether or not printing is possible. If an error has arisen and printing is not possible at a printer 16 for which printing has been designated, in step 139, it is confirmed whether the status of the designated printer 16 is that the printer 16 is currently in use.

If the designated printer 16 is not currently in use, i.e., if there is an error state such as the power is off, or there is a paper jam, or no sheets are accommodated in the tray, or the like, in step 630, a printing impossible signal is transmitted to the scanner 12. In this way, at the scanner 12, in step 680, it is judged that, after the output format and the image data were transmitted, a printing impossible signal was received. As described above, in step 672, when the operator is instructed by the operation screen to re-designate the printer 16 and the operator operates the display panel 12B and re-designates the printer 16 which is to output, a printing possible signal is received. When start of scanning is instructed, the image is read, and the output format and image data are again transmitted to the server 14. Then, in step 682, until it is judged that a predetermined time has passed, the routine returns to step

680, and it is repeatedly judged whether or not a printing impossible signal has been received.

On the other hand, if it is judged in step 639 that the designated printer 16 is currently in use, i.e., if the display panel 16B of the printer 16 is operated and the printer 16 is currently operating, the routine proceeds to step 636, and the status is repeatedly confirmed until printing becomes possible.

When it is determined in step 638 that printing is possible, in step 640, an image data output format signal, which expresses the sheet size, the number of sets and the like, and the image data, which is inputted from the scanner 12, are transmitted, from the server 14 and via the network 10, to the printer 16 for which printing has been designated. At the printer 16, in step 104 of FIG. 5, when it is judged that the output format and image data transmitted from the server 14 have been received, in step 106, an image based on the image data is formed on a recording sheet in the designated output format, and the recording sheet, on which the image has been formed, is outputted.

In this way, in the present embodiment, even if the display panel 16B of the printer 16 is operated and the printer 16 is currently operating, the printer 16 which is currently operating can be designated at the scanner 12 and the job can be set. It is displayed at the scanner 12 that the printer 16 is currently operating, and when operation has finished, the job set at the scanner 12 can be executed at the printer 16. Namely, not only can operation be carried out at the scanner 12, but also, each printer can be made to operate alone. Therefore, each printer can be effectively used.

Note that, while the designated printer 16 is currently in use, stopping of the job set at the scanner 12 can be set, and another printer can be set.

As described above, in accordance with the sixth embodiment of the present invention, there are the effects that an operation screen common to image output devices provided with different attributes can be displayed such that the operation screen can be effectively operated, and each printer can be effectively used.

Hereinafter, a seventh embodiment of the present invention will be described in detail with reference to the drawings. The basic structure of the print system of the present embodiment is the same as that of the first embodiment of the present invention. Thus, the same structural elements, members and the like are denoted by the same reference numerals, and description thereof is omitted. Further, description is omitted of portions of the functions, operations, and effects of the print system of the present embodiment which are the same as those of the first embodiment.

Figure 37A:
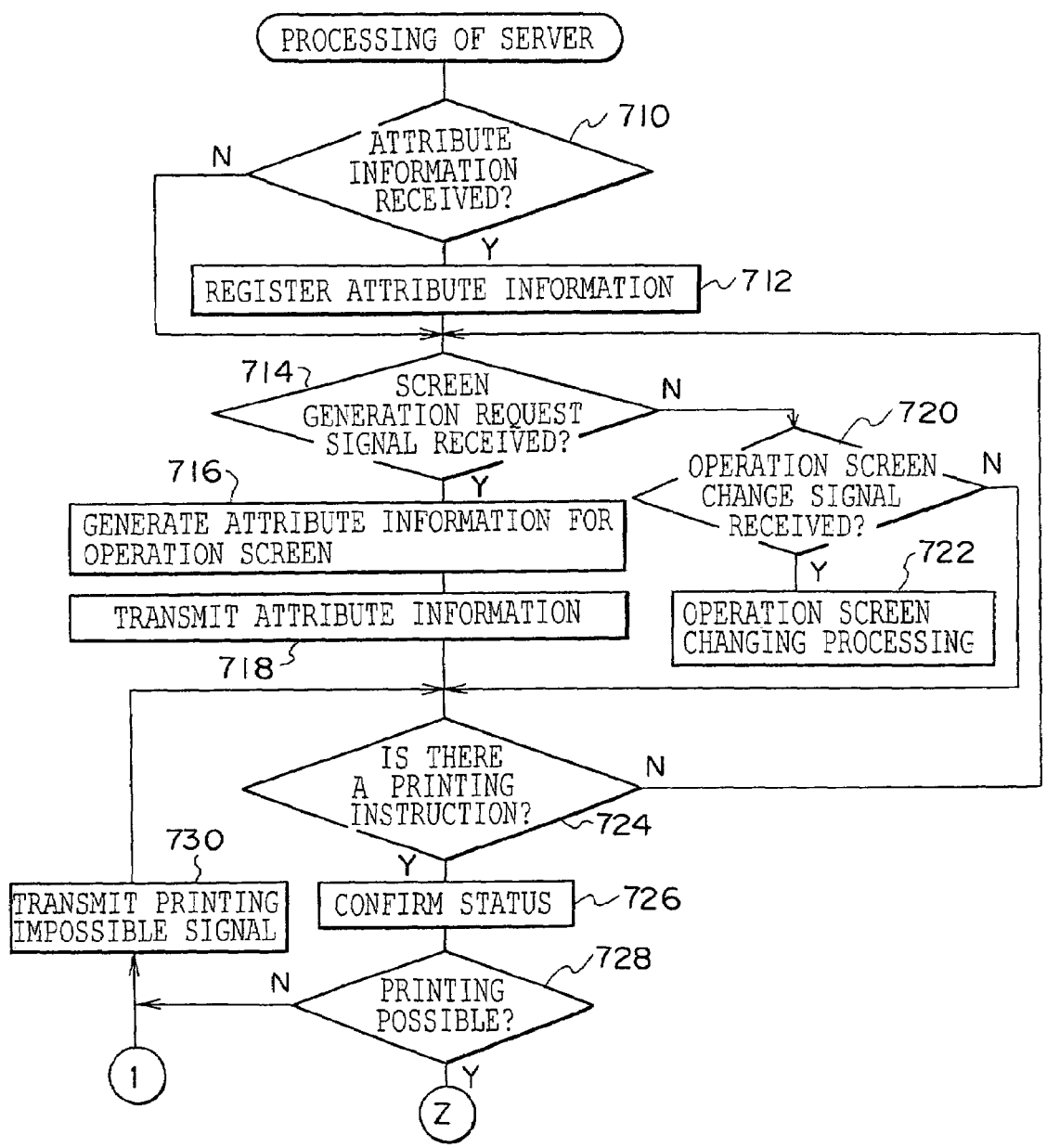
FIG. 37A is a processing routine which is executed by the controller of the server.
Figure 37B:
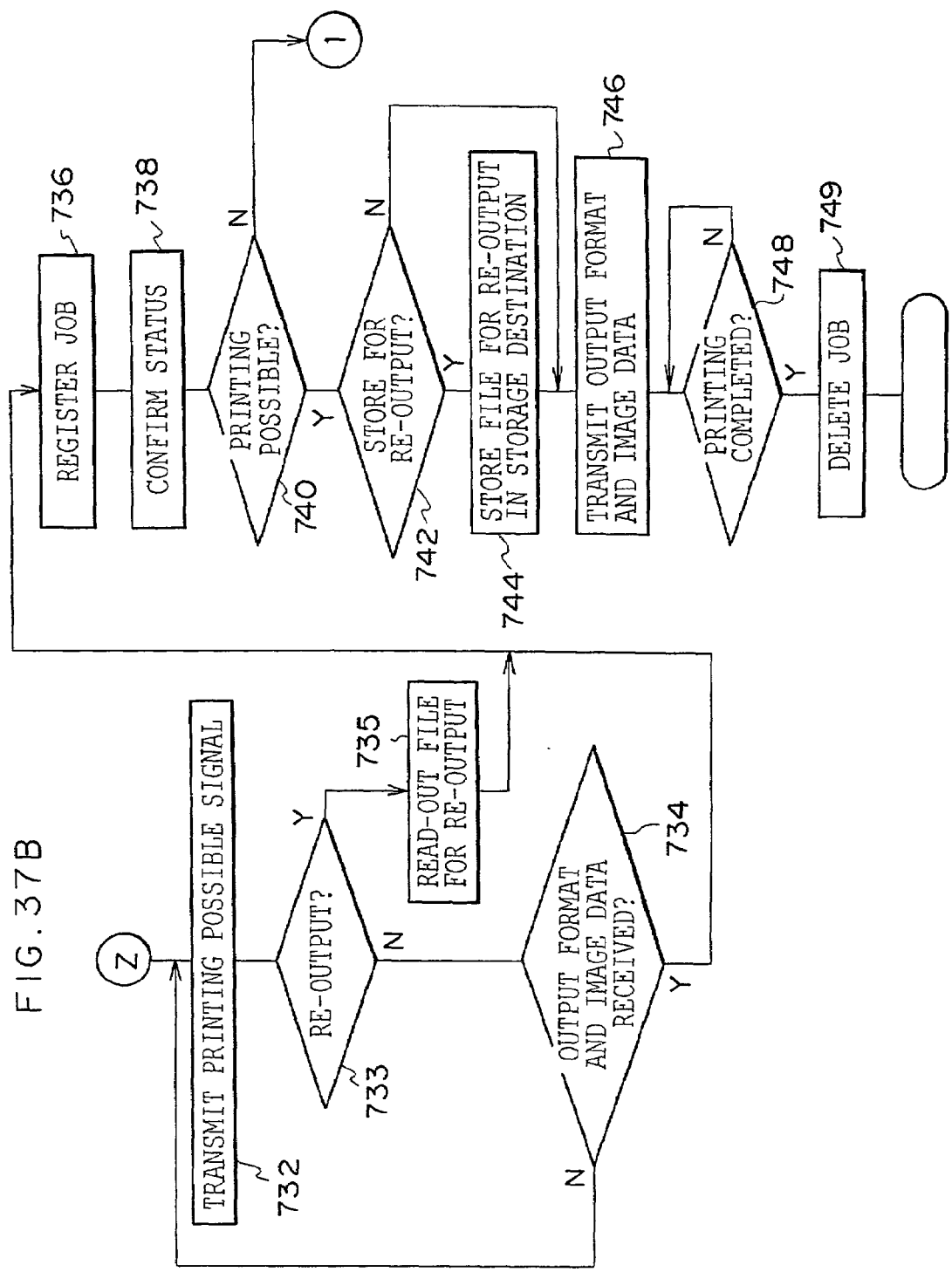
FIG. 37B is a processing routine which is executed by the controller of the server.
Figure 38A:
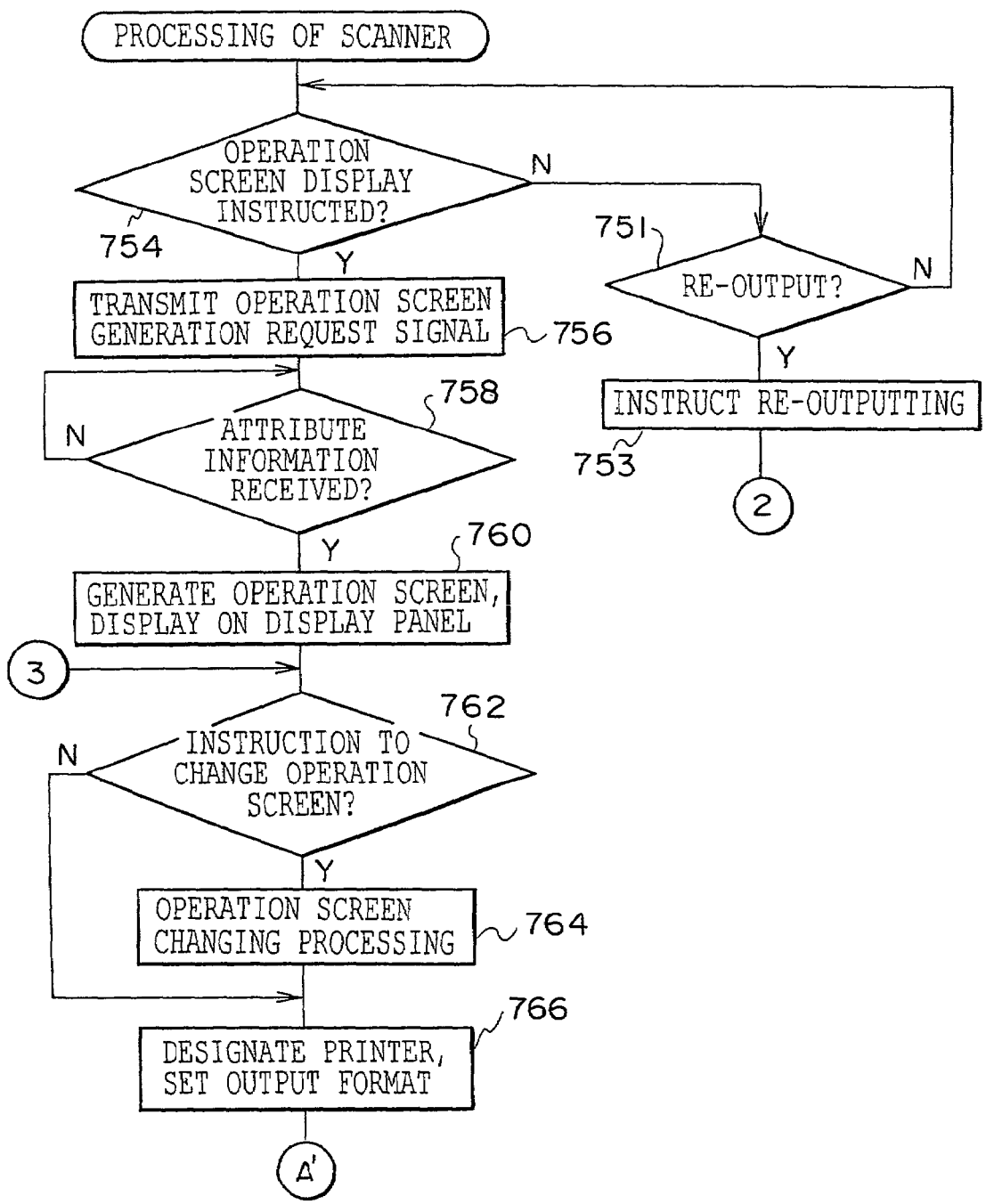
FIG. 38A is a processing routine which is executed by the controller of the scanner.

With reference to FIGS. 5, 37, and 38, the processing routines which are executed by the respective controllers of the scanner, the server, and the printer of the present embodiment will be described. These processing routines are divided into attribute information registration processing, operation screen display processing, printing instructing processing, printing processing, re-output processing, and job management processing, and will respectively be described hereinafter.

[Attribute Information Registration Processing]

Attribute information registration processing is a processing for registering, in the database connected to the server 14, the attribute information of the printers 16 connected to the network.

In a case in which the printer 16 is connected to the network 10, by operating an operation panel (not shown) provided at the server 14 or by operating management tool software provided at the server 14 from any of the clients 18 which are connected to the server 14 via the network, attribute information registration processing for registering the printer in the server is carried out. Namely, at the server 14, by an instruction to the management tool software, in step 708 of FIG. 37, when it is judged that there is an attribute information registration processing request, in step 709, a registration processing request signal, which requests registration processing of printer attribute information, is transmitted from the server 14 to the printer 16.

At the printer 16, in step 100 of FIG. 5, a determination is made as to whether a registration processing request signal has been received. If a registration processing request signal has been received, in step 102, attribute information of the printer 16 is transmitted from the printer 16 to the server 14.

In step 710, the server 14 judges whether attribute information transmitted from the printer 16 has been received. If attribute information has been received, in step 712, the file system 14E is controlled, and the attributes of the printer 16 are registered in the database 24.

[Operation Screen Display Processing]

When the operator selects an output method from the operation screen and selects one of the groups of printers 16, in step 754 of FIG. 38, it is judged that there is an instruction for display of a printing operation screen. In step 756, an operation screen generating request signal for generating an operation screen for printing is transmitted to the server 14 from the scanner 12. Further, it is possible for the operator to operate the display panel 12B and, for example, select, as the output destination, one group of printers 16 from among the pre-registered groups of printers 16, and for only information expressing that that group of printers 16 has been selected to be transmitted from the scanner 12 to the server 14.

At the server 14, when it is judged in step 714 of FIG. 37 that an operation screen generating request signal transmitted from the scanner 12 has been received, in step 716, the status of the printer 16 connected to the network 10 is confirmed. On the basis of the operation screen generating request signal and the registered attribute information of the printer 16, attribute information for generating an operation screen for printing of the designated printer 16 is generated. In step 718, the generated attribute information is transmitted to the scanner 12.

When the attribute information is transmitted from the server 14 to the scanner 12 and it is judged in step 758 of FIG. 38 that the attribute information from the server 14 has been received, the scanner 12 combines the received attribute information, which is expressed as text data for generating an operation screen for printing, and user interface parts, which are stored in the memory 12D and which express picture information such as buttons or the like, and the scanner 12 generates the operation screen for printing. In step 760, the generated operation screen for printing is displayed on the display panel 12B as the user interface.

When the operator operates the displayed operation screen for printing and designates a screen change of the operation screen for printing, the routine moves from step 762 in FIG. 38 on to step 764, and moves from step 714 in FIG. 37 on to steps 720 and 722, and screen changing processing is carried out. In this screen changing processing, as shown in steps 756 through 760 of FIG. 38 and in steps 714 through 718 of FIG. 37, a new operation screen generating request signal is transmitted to the server 14 in accordance with the operation of the display panel 12B of the scanner 12, and attribute information for generating a new operation screen for printing is generated by the server 14, and the generated attribute information is transmitted. As a result, the display of the operation screen for printing is changed in accordance with operation using the operation screen for printing of the display panel 12B of the scanner 12.

[Printing Instructing Processing]

After the operator confirms the attribute information of the printer by such an operation screen for printing, the operator sets, from the operation screen for printing, output parameters which express the image data output format such as sheet size, enlargement/reduction magnification, and the like, and instructs printing.

At this time, if storage of the job for the purpose of re-outputting the job is selected, the routine moves on from step 768 to step 770, and operator is urged to designate the storage destination and the storage term of the job for re-output.

Figure 40:
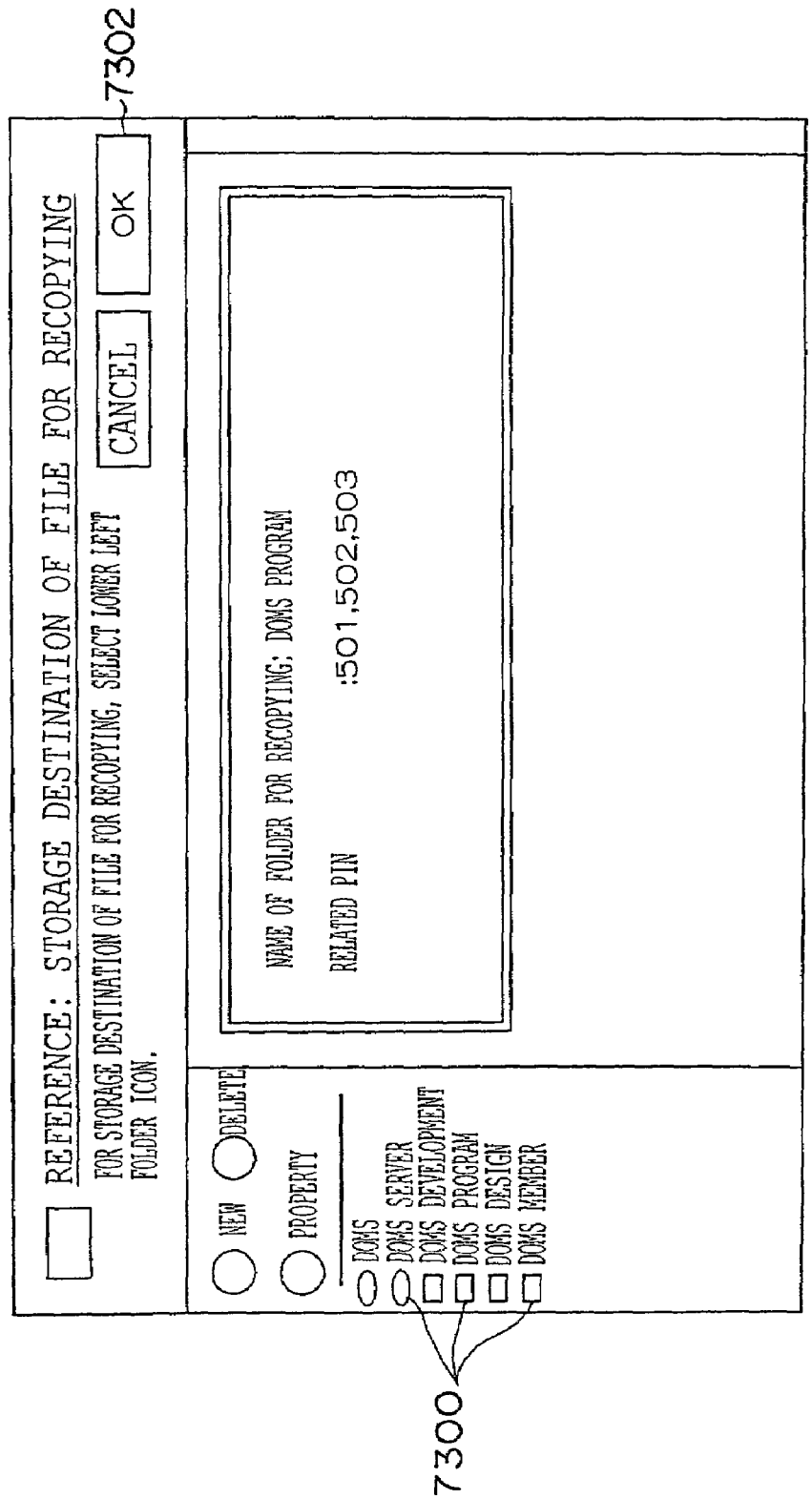
FIG. 40 is an example of an operation screen which is displayed in order to designate a storage destination.

For example, an operation screen such as that shown in FIG. 40 is displayed on the display panel 12B. The operator is urged to select an icon 7300 of a desired folder from the icons 7300 which express selectable folders and which are provided in the lower left portion of the operation screen. The information (name of folder for re-copying, related PIN, and the like) of the folder corresponding to the selected icon 7300 is displayed in the lower right portion. When the operator confirms this information and selects an OK button 7302, that folder is designated as the storage destination of the job for re-output.

Figure 41:
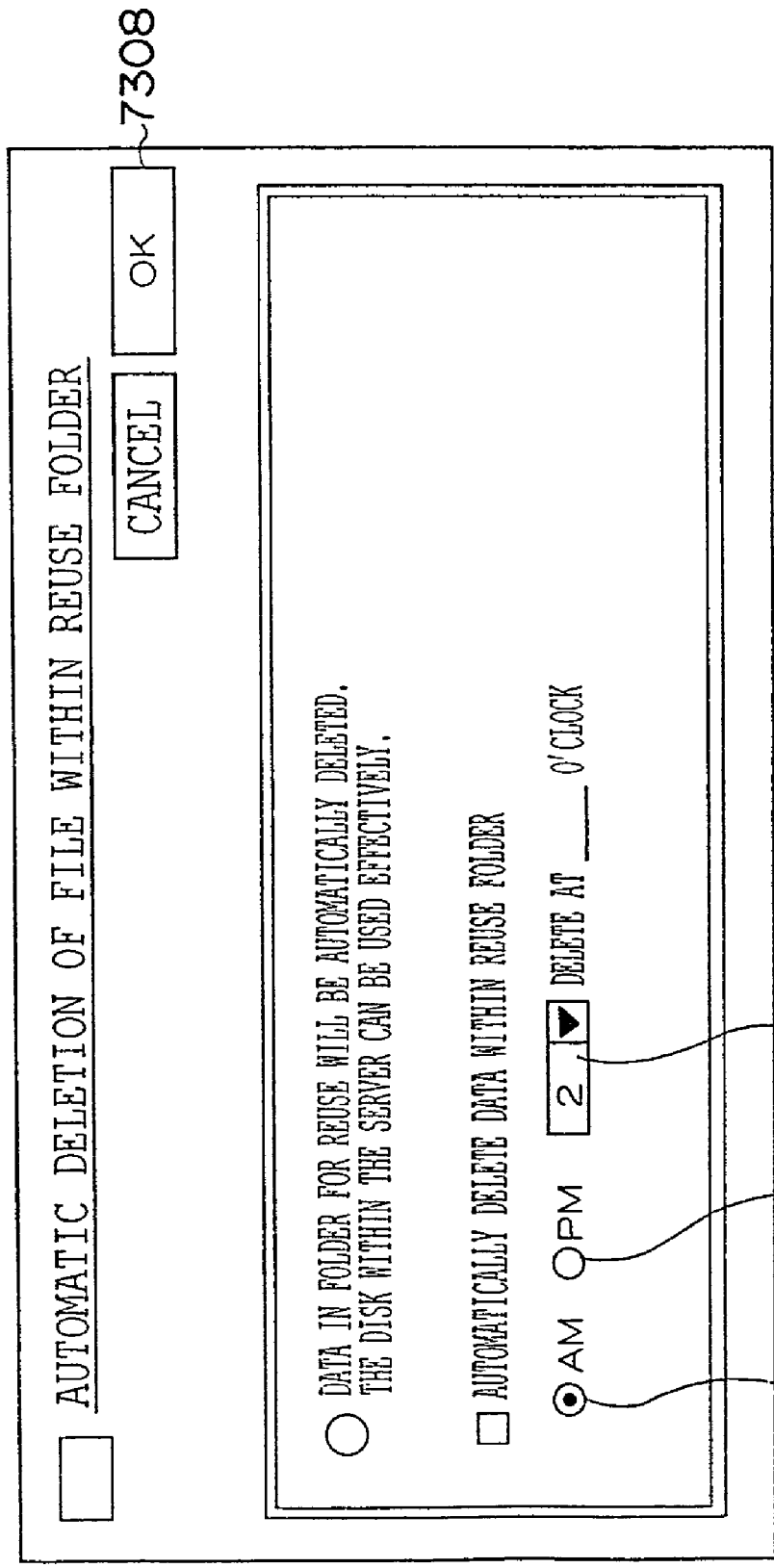
FIG. 41 is an example of an operation screen which is displayed in order to designate a storage term.

Next, an operation screen such as that shown in FIG. 41 is displayed on the display panel 12B. The operator operates radio buttons 7304A, 7304B, which are provided on the operation screen and which show AM and PM, and a pull-down menu 7306, by which a time from 1:00 to 12:00 can be selected. When the deletion time of the job for re-output (image data) is selected and an OK button 7308 is selected, the period of time until the deletion time is designated as the storage term.

Further, at this time, in a case in which a job destruction reservation is carried out, the routine proceeds from step 772 to step 774 where the operator is urged to designate the destruction time.

For example, an operation panel such as that shown in FIG. 42 is displayed on the display panel 12B. When the operator selects icons 7310 of a desired time from among the icons 7310, which are provided on the operation screen and which show selectable destruction times (days), and the operator selects an OK button 7312, the time corresponding to the selected icons 7310 is designated as the destruction time.

As the designation of the printer 16, one printer 16 can be designated and output prints, or one group can be designated and prints can be simultaneously outputted from the respective printers 16 belonging to the designated group. When a group is designated, same order output or equal output can be designated, or the number of sets to be outputted can be designated individually for each of the printers 16 belonging to that group. Namely, printer designation as well as output method designation are carried out.

For example, a plurality of printers 16, which are equipped with different functions as attributes, may be set in advance so as to belong to the same group. On the basis of the same image data, prints can be outputted from each of a printer 16 equipped with a color output function and a printer 16 equipped with a black-and-white output function. In this case, by designating the outputting such that one set is outputted from the printer 16 equipped with the color output function and the remaining sets are outputted from the printer 16 equipped with the black-and-white output function, costs can be reduced as compared with a case in which all of the sets are color-outputted As described above, in a case in which a job is to be stored for the purpose of re-output, the operator designates the storage destination for re-output and the storage term. In a case in which a job destruction reservation is to be carried out, the operator designates the destruction time. When the printer 16 which is to carry out output is designated, and the output parameters expressing the image data output format are set, and the start button is selected from the operation screen for printing, and printing is instructed, it is judged in step 776 of FIG. 38 that there is a printing instruction. In step 778, a printing possibility confirmation signal, for confirming whether or not printing by the designated printer 16 is possible, is transmitted to the server.

When the printing possibility confirmation signal is transmitted from the scanner 12 to the server 14 and it is judged in step 724 of FIG. 37 that the printing possibility confirmation signal has been received (i.e., that there is a printing instruction), in step 726, the status of the designated printer 16 is confirmed. In step 728, if it is judged from the status that printing is possible, in step 732, a printing possible signal is transmitted to the scanner 12. On the other hand, if it is judged in step 728 that printing is not possible, in step 730, a printing impossible signal is transmitted to the scanner 12.

At the scanner 12, in step 780 of FIG. 38, it is judged whether a printing possible signal has been received. If a printing possible signal has been received, in the next step 784, it is judged whether image reading (scan starting) has been instructed by the operator pressing a start button or the like. When it is judged in step 784 that there is an image reading instruction, in step 786, the scanner portion 12A is controlled such that the image recorded on the set original is read in one operation, i.e., a series of image data is read as common image data, and is stored in the memory 12D of the scanner as image data which is in electronic form. Then, in step 788, the output format inputted from the operation screen and the image data read from the scanner portion 12A are transmitted to the server 14.

On the other hand, in step 780, in a case in which it is judged that a printing impossible signal has been inputted, in step 782, the operator is instructed to re-designate the printer 16, and the routine returns to step 762. When the operator operates the display panel 12B and re-designates the printer 16 which is to output, in the same way as described above, the routine proceeds from step 776 to step 778, and a printing possibility confirmation signal for confirming whether or not printing is possible is transmitted to the server 14. In a case in which a printing possible signal is received in step 780 and it is judged in step 784 that image reading has been instructed, the image data recorded on the original is read in step 786, and in step 788, the output format and the image data are transmitted to the server 14.

[Printing Processing]

In step 734 of FIG. 37, when it is judged that the output format and the image data from the scanner 12 have been received at the server 14, in step 736, the output format and the image data are registered as the job of the designated image output device. In step 738, the status of the printer 16, for which execution of the job has been designated, is confirmed. In step 740, it is judged, from the confirmed status, whether or not printing is possible.

If it is judged that an error has arisen or the like and printing is not possible at the printer 16 for which printing has been designated, in step 730, a printing impossible signal is transmitted to the scanner 12. In this way, at the scanner 12, in step 790, it is judged that, after transmission of the output format and the image data, a printing impossible signal was received. As described above, in step 782, when the operator is instructed by the operation screen to re-designate the printer 16 and the operator operates the display panel 12B and re-designates the printer 16 which is to output, a printing possible signal is received. When start of scanning is instructed, the image is read, and the output format and image data are again transmitted to the server 14. Then, until it is judged in step 792 that a predetermined time has elapsed, the routine returns to step 790, and it is repeatedly judged whether or not a printing impossible signal has been received.

On the other hand, when it is judged in step 740 that printing is possible, in a case of printing a job for which a storage destination was designated in step 770, the routine moves from step 742 to step 744 where a copy file of the image data is stored in the designated folder as a job for re-output. Thereafter, the routine moves on to step 746 where an image output format signal, which expresses the sheet size, the number of sets and the like, and the image data, which is inputted from the scanner 12, are transmitted, via the network 10 from the server 14, to the printer 16 for which printing has been designated. Note that the job for re-output may be stored in the memory 14B of the server 14, or may be stored in an external storage device connected to the server 14 via the driver 20, or may be stored in a storage device connected via the network 10.

If no storage destination has been designated, the routine moves on as is from step 742 to step 746 where, similarly, the image format signal and the image data are transmitted to the designated printer 16.

At the printer 16, in step 104 of FIG. 5, when it is judged that the output format and image data transmitted from the server 14 have been received, in step 106, an image based on the image data is formed on a recording sheet in the designated output format, and the recording sheet, on which the image has been formed, is outputted.

At the server 14, the status of the printing processing at the printer 16 is monitored. When the printing processing is completed, the routine moves from step 748 to step 749, and the information of the corresponding job which is registered and held is erased.

[Re-Output Processing]

When an image, which has already been outputted from the printer 16, is to be re-outputted, the operator selects the reprinting service from the menu screen (not shown) displayed on the display panel 12B. The operator designates the file to be re-outputted, from among the files which are stored as re-output jobs. In the same way as in the above-described printing instructing processing, the operator designates the printer 16 which is to output the image, and sets the output format. In this way, at the server 12, it is judged that a re-output instruction has been inputted. The routine moves on from step 754 in FIG. 38 to steps 751 and 753, and a re-output instruction is transmitted to the server 14.

At the server 14, when the reprinting instruction is received, in the same way as in the above-described printing instructing processing, the routine moves from step 724 of FIG. 37 to steps 726, 728, and 732. Thereafter, the routine proceeds from step 733 to step 735, and the file, which has been designated from the files stored as re-output jobs, is read-out. In step 736, the job is registered. Thereafter, processings similar to the processings described in the above [Printing Processing] are carried out, and the image is again formed onto recording paper and outputted from the printer 16.

Namely, by storing a copy file of the image data as a job for re-output, even after an image based on the image data is printed from the printer 16, the operator can use the stored job (image data) for re-output, such that an image based on the same image data can be printed again.

[Job Management Processing]

Figure 39:
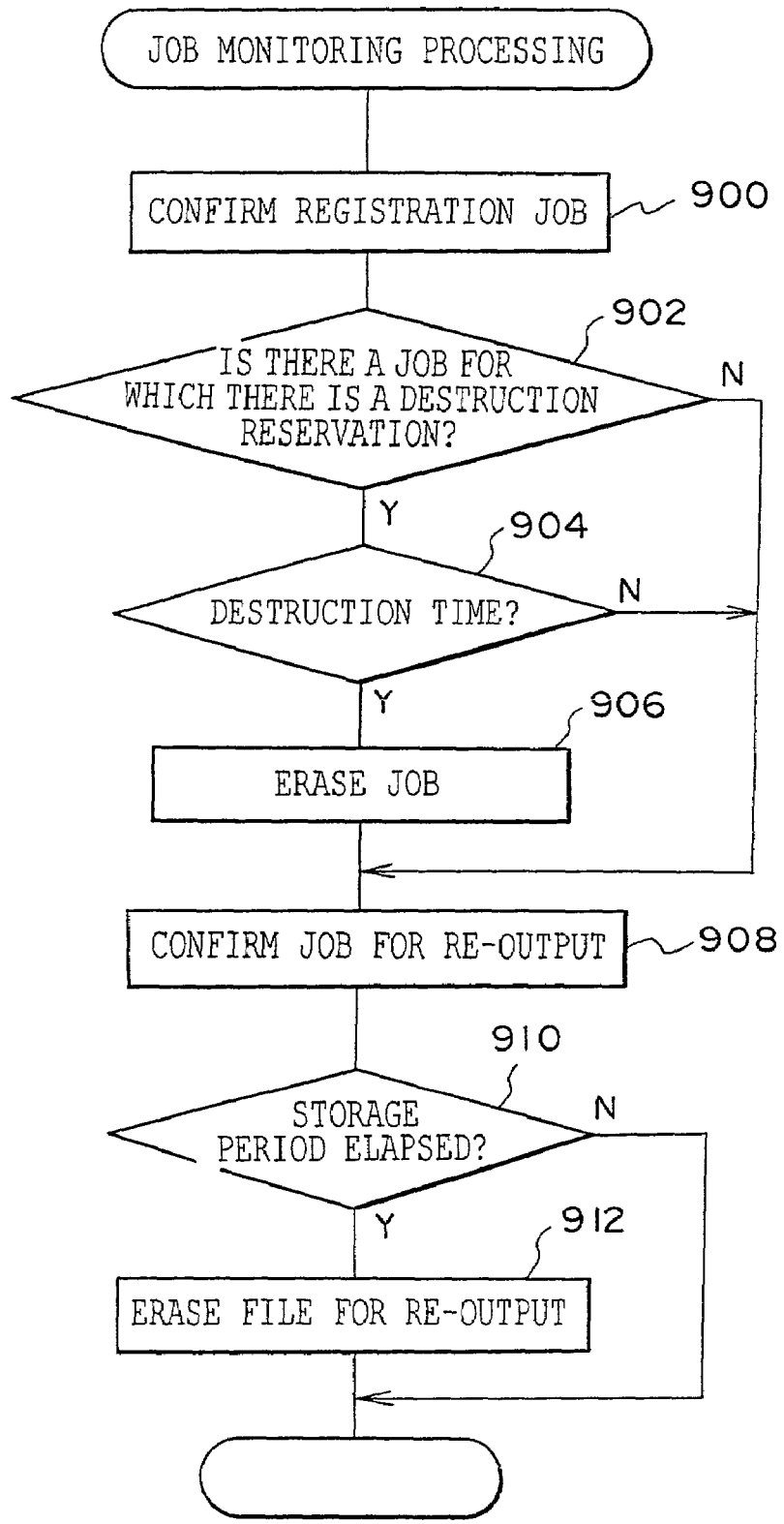
FIG. 39 is a job monitoring processing routine which is executed, in an interrupting manner, by the controller of the server.

Job management processing is processing which is always carried out in a background process at the server 14. This background process will be described hereinafter with reference to FIG. 39. Note that, while the server 14 is starting-up, the process shown in FIG. 39 is executed repeatedly by the controller 14A in an interrupting manner each time a predetermined period of time passes.

First, in step 900, the information of the job which is registered and held (see step 736 of FIG. 37) is confirmed. If there is a job for which a destruction reservation has been set, the routine proceeds from step 902 to step 904, and it is confirmed whether or not the designated destruction time has been reached (has passed). If the destruction time has been reached, it is judged that the job is an unnecessary job. The routine moves on to step 906 where the job is deleted, and the processings relating to that job are terminated.

Next, in step 908, for each of the folders which can be designated as a storage destination of jobs for re-output (image data), the jobs for re-output stored in the folder are confirmed. If there are jobs for which the designated storage term has elapsed, that job is judged to be an unnecessary job. The routine moves on from step 910 to step 912, and that job for re-output is erased.

As described above, the storage destination and storage term of the job for re-output can be designated, and the image data and the output format can be transmitted from the scanner 12 to the server 14. At the server 14, the image data and output format are registered as a job and printed at the printer 16. The image data is copied, and is stored in a designated storage destination as a job for re-output. When the storage term thereof has passed, the job is automatically erased. In this way, even after printing and outputting of the image one time, the copied image data remains during the storage term. Thus, the same image can be outputted again, or can be outputted by changing the printer 16 or output method.

Accordingly, at the time of designating printing of image data for which there is the possibility of re-output, by the operator merely designating the storage destination and the storage term of the job for re-output, the image can be outputted time and again during the storage term. When the storage term has passed, the job for re-output is automatically erased from the memory. Thus, wasteful use of memory resources can be prevented.

Further, the destruction time can be designated, and the image data and output format can be transmitted to the server 14 from the scanner 12. At the server 14, the image data and the output format are registered as a job, and when printing at the designated printer 16 is possible, the job is transmitted to the printer 16 such that printing is carried out, and thereafter, the job is erased. When the previously designated destruction time is reached, the job is automatically erased, and the processings relating to that job are terminated.

Accordingly, for image data for which output is unnecessary if output thereof has not been carried out by a predetermined time, by the operator merely designating that predetermined time as the destruction time at the time when the operator designates printing, the job is erased automatically if output has not been carried out by the desired time. Thus, output of unnecessary images can be prevented.

In this way, a job is automatically erased if the designated deletion time has been reached or the storage term has elapsed. Thus, even if the operator does not search for and delete unnecessary jobs from among the registered jobs and the stored jobs for re-output, unnecessary jobs can be deleted by the simple operation of merely inputting, at the time of instructing printing, the deletion time or the storage term. Further, there is no worry that the necessary jobs will be mistakenly deleted due to mistakes in operation by the operator.

In the present embodiment, at the time of re-output, the fact that the operator has designated a job for re-output is taken into consideration, and the operator sets the storage term and the storage destination for re-output separately from the reservation for destruction, such that the job for re-output can be stored and managed in an arbitrary place. However, the present invention is not limited to the same. It is possible to not designate the storage destination. Further, it is possible to not separate the destruction time and the storage term, and instead, to set a valid term in common.

Further, in a case in which the destruction time and the storage term are set separately, at the time when the destruction time is reached and the registered job is to be deleted, if this time is during the storage term, the job may be stored in a designated storage destination as a job for re-output. For example, in a case in which if a job is not outputted by 3:00 today, the job may be outputted up until the day after tomorrow, the destruction time is set for 3:00 today, and the storage term is set for the day after tomorrow. In this way, if the job is not outputted by 3:00, the registered job is deleted and image output is temporarily cancelled, but the job for re-output is stored. Thus, the job can be outputted again at a time when the rate of operation of the printer 16 is low or the like.

As described above, the seventh embodiment of the present invention has the excellent effect that jobs which are no longer needed can easily and accurately be deleted.

Hereinafter, an eighth embodiment of the present invention will be described in detail with reference to the drawings. The basic structure of the print system of the present embodiment is the same as that of the first embodiment of the present invention. Thus, the same structural elements, members and the like are denoted by the same reference numerals, and description thereof is omitted. Further, description is omitted of portions of the functions, operations, and effects of the print system of the present embodiment which are the same as those of the first embodiment.

Figure 43A:
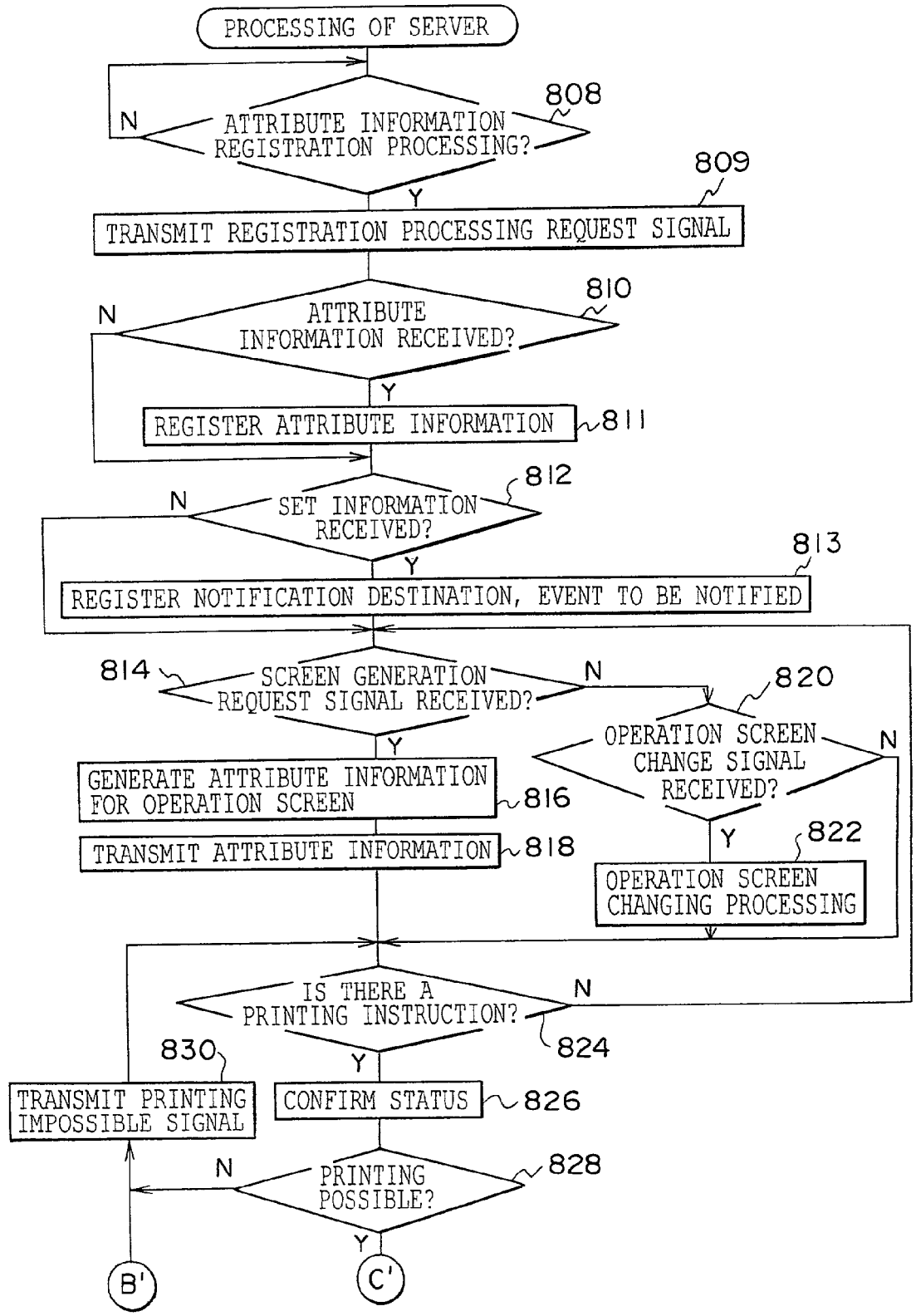
FIG. 43A is a processing routine which is executed by the controller of the server.
Figure 43B:
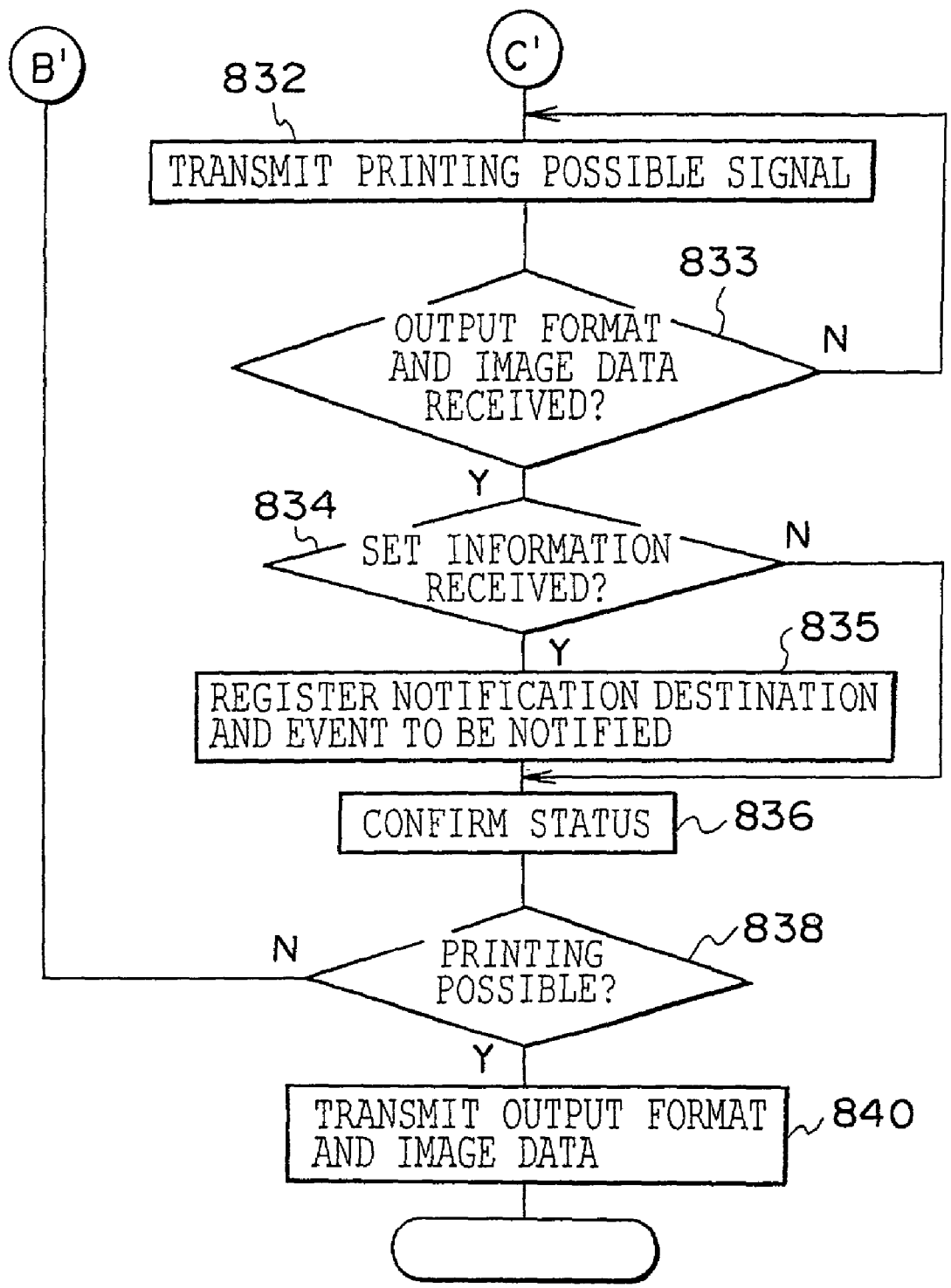
FIG. 43B is a processing routine which is executed by the controller of the server.
Figure 44A:
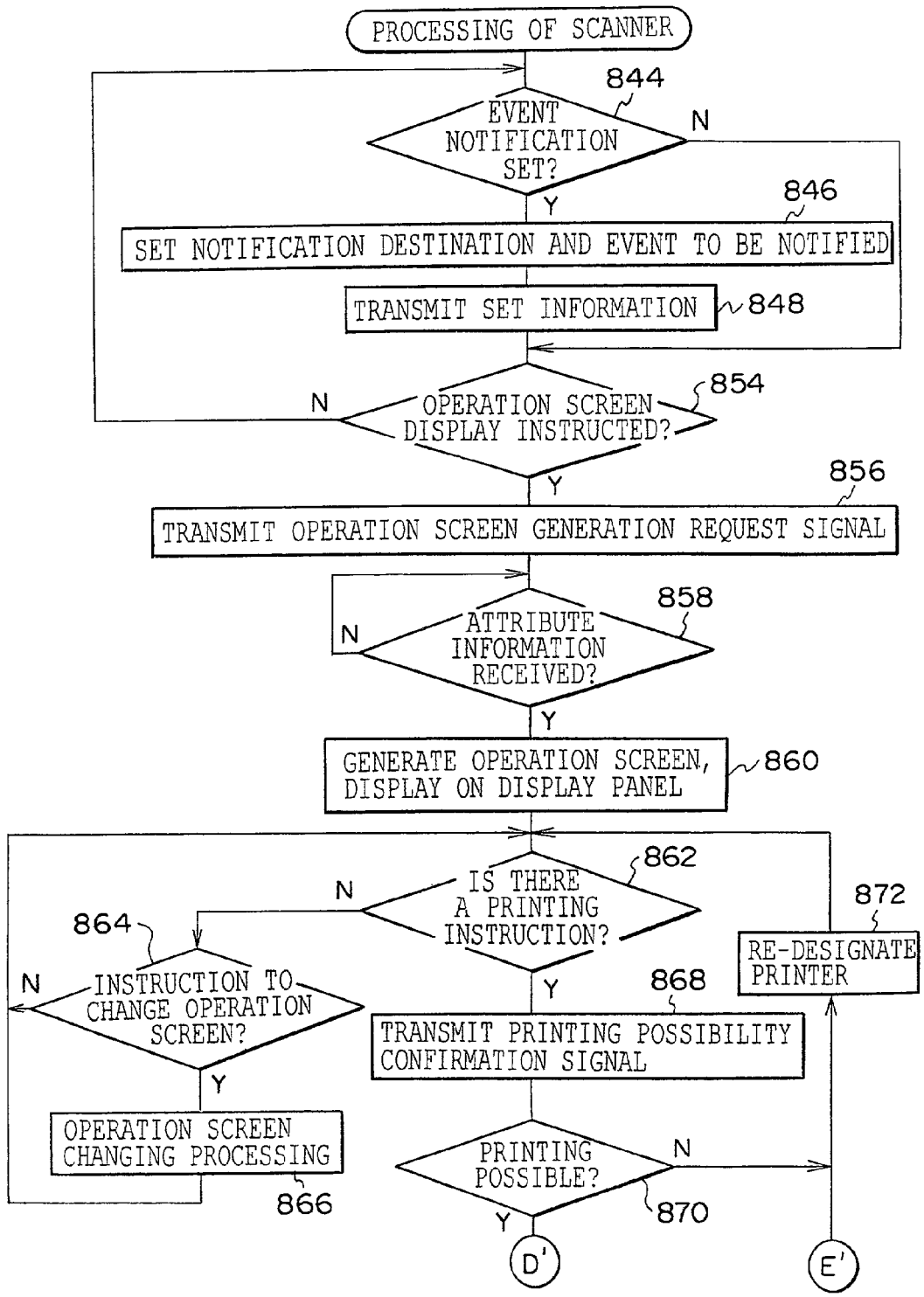
FIG. 44A is a processing routine which is executed by the controller of the scanner.

With reference to FIGS. 5, 43, and 44, the processing routines which are executed by the respective controllers of the scanner, the server, and the printer of the present embodiment will be described. These processing routines are divided into attribute information registration processing, operation screen display processing, notification destination setting processing, printing instructing processing, printing processing, and event monitoring processing, and will respectively be described hereinafter.

[Attribute Information Registration Processing]

In a case in which the printer 16 is connected to the network 10, by operating an operation panel (not shown) provided at the server 14 or by operating management tool software provided at the server 14 from any of the clients 18 which are connected to the server 14 via the network, attribute information registration processing for registering the printer in the server is carried out. Namely, at the server 14, by an instruction to the management tool software, in step 808 of FIG. 43, when it is judged that there is an attribute information registration processing request, in step 809, a registration processing request signal, which requests registration processing of printer attribute information, is transmitted from the server 14 to the printer 16.

At the printer 16, in step 100 of FIG. 5, a determination is made as to whether a registration processing request signal has been received. If a registration processing request signal has been received, in step 102, attribute information of the printer 16 is transmitted from the printer 16 to the server 14. In step 810, the server 14 judges whether attribute information transmitted from the printer 16 has been received. If attribute information has been received, in step 812, the file system 14E is controlled, and the attributes of the printer 16 are registered in the database 24.

[Notification Destination Setting Processing]

When event notification is selected from the menu displayed on the display panel 12B of the scanner 12 by the operator, in step 844 of FIG. 44, it is judged that setting of event notification has been requested. In step 846, an operation screen for event notification setting is displayed on the display panel 12B, and the operator is urged to set the notification destination of the events and the types of events to be notified.

Figure 46:
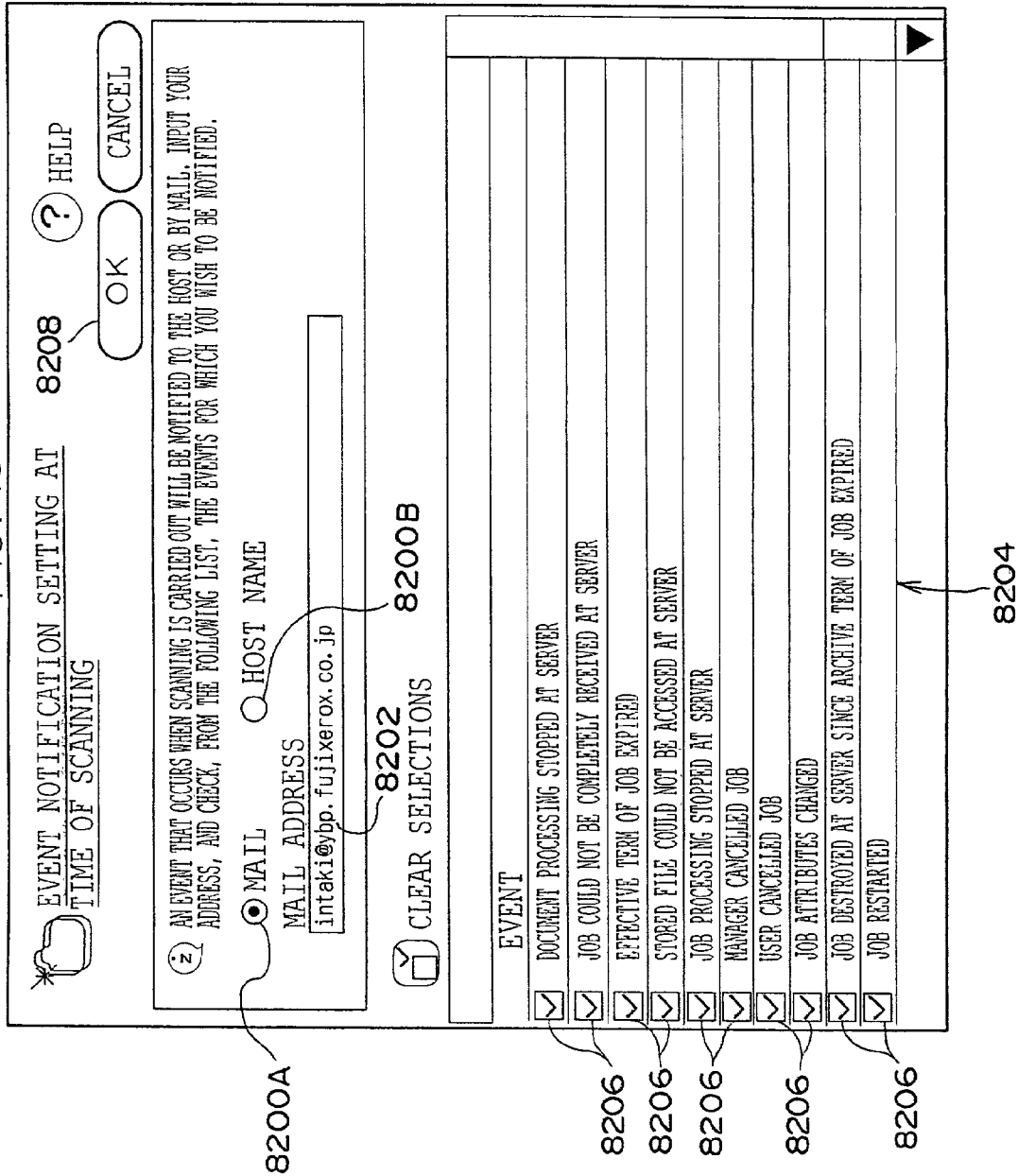
FIG. 46 is an example of an operation screen for event notification setting which is displayed in order to set event notification of the scanner.

In the present embodiment, in order to set notification of events of the scanner 12, an operation screen for event notification setting such as that shown in FIG. 46 for example is displayed on the display panel 12B. In order to set notification of events of the printer 16, an operation screen for event notification setting such as that shown in FIG. 47 for example is displayed on the display panel 12B. Namely, it is possible to set separate notification destinations for events of the scanner 12 and events of the printer 16.

The operator operates the operation screen for event notification setting, and designates the event notification destination and the types of events to be notified. In the examples shown in FIGS. 46 and 47, the operator selects and presses one of a radio button 8200A, which is provided at the operation screen for event notification setting and expresses that notification is to be by mail, and a radio button 8200B, which is provided at the operation screen for event notification setting and expresses that the host (client) is to be notified. In this way, one of the buttons is set in an on state. Then, if the radio button 8200A has been selected, the mail address is inputted into a notification destination input box 8202. If the radio button 8200B has been selected, the client name, which is one of clients $18_1$ to $18_n$, is inputted into the notification destination input box 8202. Input into the notification destination input box 8202 can be carried out by, for example, selecting the mail address or the client name which is registered in advance in a pull-down menu form, or by providing a keyboard in the vicinity of the display panel 12B and carrying out input from the keyboard.

The operator confirms a list 8204 of events which can be selected, which list 8204 is displayed in the lower portion of the operation screen for event notification setting. From among checkboxes 8206 provided for the respective events, the operator presses and turns on the checkboxes 8206 corresponding to the events for which he/she wishes to receive a generated notification.

Examples of events of the scanner 12 which can be selected are processing of a document was stopped at the server, a job (image data, output format, or the like) could not be received at the sever, the valid term of the job expired, a stored file could not be accessed at the server, job processing was stopped at the server, the manager cancelled the job, the user cancelled the job, the attributes (output format) of the job were changed, the job was destroyed at the server since the archive term of the job expired, the job was restarted, or the like. Examples of events of the printer 16 which can be selected are the printer was registered, a printer registration was deleted, a printer job was temporarily stopped, a printer job was restarted, attributes of the printer were changed, a printer error was overcome and the printer returned to normal, the status of the printer changed, the printer main body is waiting for an operation of the user, the power was turned off before the printer was finished, the printer ran out of time, and the like.

In this way, when the radio buttons 8200A, 8200B, the notification destination input box 8202, and the checkboxes 8206 are operated such that the notification destination and types of events to be notified are set, the operator presses an OK button 8208 on the operation screen for event notification setting. In this way, in step 148, setting information, which expresses the notification destination and types of events to be notified which were set at the operation screen for event notification setting, is transmitted to the server 14.

The operation screen for event notification setting can be displayed on the displays provided at the respective clients $18_1$ through $18_n$. The operator can operate a keyboard or a mouse provided at the clients $18_1$ through $18_n$, and set the event notification destination and the types of events to be notified at the operation screen for event notification setting displayed on the display. Namely, the clients $18_1$ through $18_n$ correspond to the information input device of the present invention.

At the server 14, when it is judged in step 812 of FIG. 43 that setting information, which expresses the notification destination and the types of events to be notified, has been received, the routine proceeds to step 813 where the notification destination and the types of events to be notified are registered (stored) in the memory 14C or the database 24.

[Operation Screen Display Processing]

When the operator selects the output method from the operation screen and selects one group of the printers 16, in step 854, it is judged that there is a designation for display of operation screen for printing. In step 856, an operation screen generating request signal for generating an operation screen for printing is transmitted to the server 14 from the scanner 12. Further, it is possible for the operator to operate the display panel 12B and select, for example, one group from the pre-registered groups of printers 16 as the output destination, and for only information expressing that that group of printers 16 has been selected to be transmitted from the scanner 12 to the server 14.

At the server 14, when it is judged in step 814 of FIG. 43 that a screen generating request signal transmitted from the scanner 12 has been received, in step 816, the status of the printer 16 connected to the network 10 is confirmed. On the basis of the operation screen generating request signal and the registered attribute information of the printer 16, attribute information for generating an operation screen for printing of the designated printer 16 is generated. In step 818, the generated attribute information is transmitted to the scanner 12.

When the attribute information is transmitted from the server 14 to the scanner 12 and it is judged in step 858 of FIG. 44 that the attribute information from the server 14 has been received, the scanner 12 combines the received attribute information, which is expressed as text data for generating an operation screen for printing, and user interface parts, which are stored in the memory 12D and which express picture information such as buttons or the like, and the scanner generates the operation screen for printing. In step 860, the generated operation screen for printing is displayed on the touch panel 12B as the user interface.

When the operator operates the displayed operation screen for printing and designates a screen change of the operation screen for printing, the routine moves from step 862 in FIG. 44 on to steps 864 and 866, and moves from step 814 in FIG. 43 on to steps 820 and 822, and screen changing processing is carried out. In this screen changing processing, as shown in steps 856 through 860 of FIG. 44 and in steps 814 through 818 of FIG. 43, a new operation screen generating request signal is transmitted to the server 14 in accordance with the operation of the display panel 12B of the scanner 12, and attribute information for generating a new operation screen for printing is generated by the server 14, and the generated attribute information is transmitted. As a result, the display of the operation screen for printing is changed in accordance with operation using the operation screen for printing of the display panel 12B of the scanner 12.

To describe the screen changing processing in further detail, when a group of printers 16 is selected by operation of the operation screen for printing of the touch panel 12B of the scanner 12 and a screen generating signal for setting output instructions is transmitted to the printers belonging to the designated group, at the server 14, the logical product of the attribute information of the printers 16 belonging to the group is computed. The attribute information common to the printers 16 belonging to that group is selected and is transmitted to the scanner 12. In this way, an operation screen for printing, which displays a group of printers 16 and the common attribute information of the group, is generated and displayed.

[Printing Instructing Processing]

The operator confirms the attribute information of the printer by the operation screen for printing. Thereafter, from the operation screen for printing, the operator sets the output parameters which express the image data output format, such as sheet size, enlargement/reduction magnification, and the like, and carries out printing instruction. In this way, it is judged in step 862 of FIG. 44 that there is a printing instruction. In step 868, a printing possibility confirmation signal, for confirming whether or not printing by the designated printer 16 is possible, is transmitted to the server.

When the printing possibility confirmation signal is transmitted from the scanner 12 to the server 14 and it is judged in step 824 of FIG. 43 that the printing possibility confirmation signal has been received (i.e., that there is a printing instruction), in step 826, the status of the designated printer 16 is confirmed. In step 828, if it is judged from the status that printing is possible, in step 832, a printing possible signal is transmitted to the scanner 12. On the other hand, if it is judged in step 828 that printing is not possible, in step 830, a printing impossible signal is transmitted to the scanner 12.

On the other hand, when it is judged in step 870 that a printing impossible signal has been inputted, in step 872, the operator is instructed to re-designate the printer 16. When the operator operates the touch panel 12B and re-designates the printer 16 which is to output, in the same way as described above, the routine proceeds from step 862 to step 868. A printing possibility confirmation signal for confirming whether or not printing is possible is transmitted to the server 14. In a case in which a printing possible signal is received in step 870 and it is judged in step 874 that image reading has been instructed, the image data recorded on the original is read in step 876. If the operator has selected, within a predetermined time, to carry out event notification settings for each job, the routine moves on from step 878 to step 880, and in the same way as in step 846, the event notification destination and the types of events to be notified are set.

When the event notification destination and the types of events to be notified are set, in step 882, the set information relating to the event notification destination and types of events to be notified is transmitted to the server 14 together with the output format and the image data.

If carrying out of event notification setting for each job is not selected within the predetermined time, the routine moves from step 878 to steps 884 and 886, and the output format and the image data are transmitted to the server 14.

Namely, in the present embodiment, the event notification destination and the types of events to be notified can be set in advance (see step 846), and the notification destination and types of events to be notified can be changed for each job (see step 880).

On the other hand, when it is judged in step 870 that a printing impossible signal has been inputted, in step 872, the operator is instructed to re-designate the printer 16. When the operator operates the touch panel 12B and re-designates the printer 16 which is to output, in the same way as described above, the routine proceeds from step 862 to step 868. A printing possibility confirmation signal for confirming whether or not printing is possible is transmitted to the server 14. In a case in which a printing possible signal is received in step 870 and it is judged in step 874 that image reading has been instructed, the image data recorded on the original is read in step 876. Then, in accordance with whether or not the operator selects, within a predetermined time, that event notification setting for the respective jobs is to be carried out, the routine proceeds from step 878 to steps 880 and 882, and in the same way as described above, the set information relating to the event notification destination and types of events to be notified is transmitted to the server 14 together with the output format and the image data, or the routine proceeds from step 878 to steps 884 and 886, and the output format and the image data are transmitted to the server 14.

[Printing Processing]

In step 833 of FIG. 43, when it is judged that the output format and the image data from the scanner 12 have been received at the server 14, in step 834, it is judged whether setting information relating to the event notification destination and types of events to be notified is included.

When the output format and the image data transmitted in previously-described step 878 of FIG. 44 are received, the setting information relating to the event notification destination and types of events to be notified is included. Thus, the routine moves from step 834 to step 835, and the notification destination and types of events to be notified are registered (stored) in the memory 14C or the database 24. Thereafter, the routine moves on to step 836. When the output format and the image data transmitted in previously-described step 882 of FIG. 44 are received, the setting information relating to the event notification destination and types of events to be notified is not included. Thus, the routine proceeds as is onto step 836 where the status of the printer 16 which has been designated to execute the job is confirmed. In step 838, it is judged, from the confirmed status, whether or not printing is possible. If an error has arisen and printing is not possible at a printer 16 for which printing has been designated, in step 830, a printing impossible signal is transmitted to the scanner 12. In this way, at the scanner 12, in step 888, it is judged that, after transmission of the output format and the image data, a printing impossible signal was received. As described above, in step 872, when the operator is instructed by the operation screen to re-designate the printer 16 and the operator operates the display panel 12B and re-designates the printer 16 which is to output, a printing possible signal is received. When start of scanning is instructed, the image is read, and the output format and the image data, or the output format, the image data and the set information relating to the event notification destination and types of events to be notified, are again transmitted to the server 14. Then, until it is judged in step 889 that a predetermined time has elapsed, the routine returns to step 888, and it is repeatedly judged whether or not a printing impossible signal has been received.

On the other hand, when it is judged in step 838 that printing is possible, in step 840, the server 14 transmits, via the network 10 and to the printer 16 for which printing is designated, an image output format signal, which expresses the sheet size, the number of sets, and the like, and the image data inputted from the scanner 12. In step 104 of FIG. 5, if it is judged that the printer 16 has received the output format and the image data transmitted from the server 14, in step 106, an image based on the image data is formed on a recording sheet in the designated output format, and the recording sheet on which the image is formed is outputted.

[Event Monitoring Processing]

Figure 45:
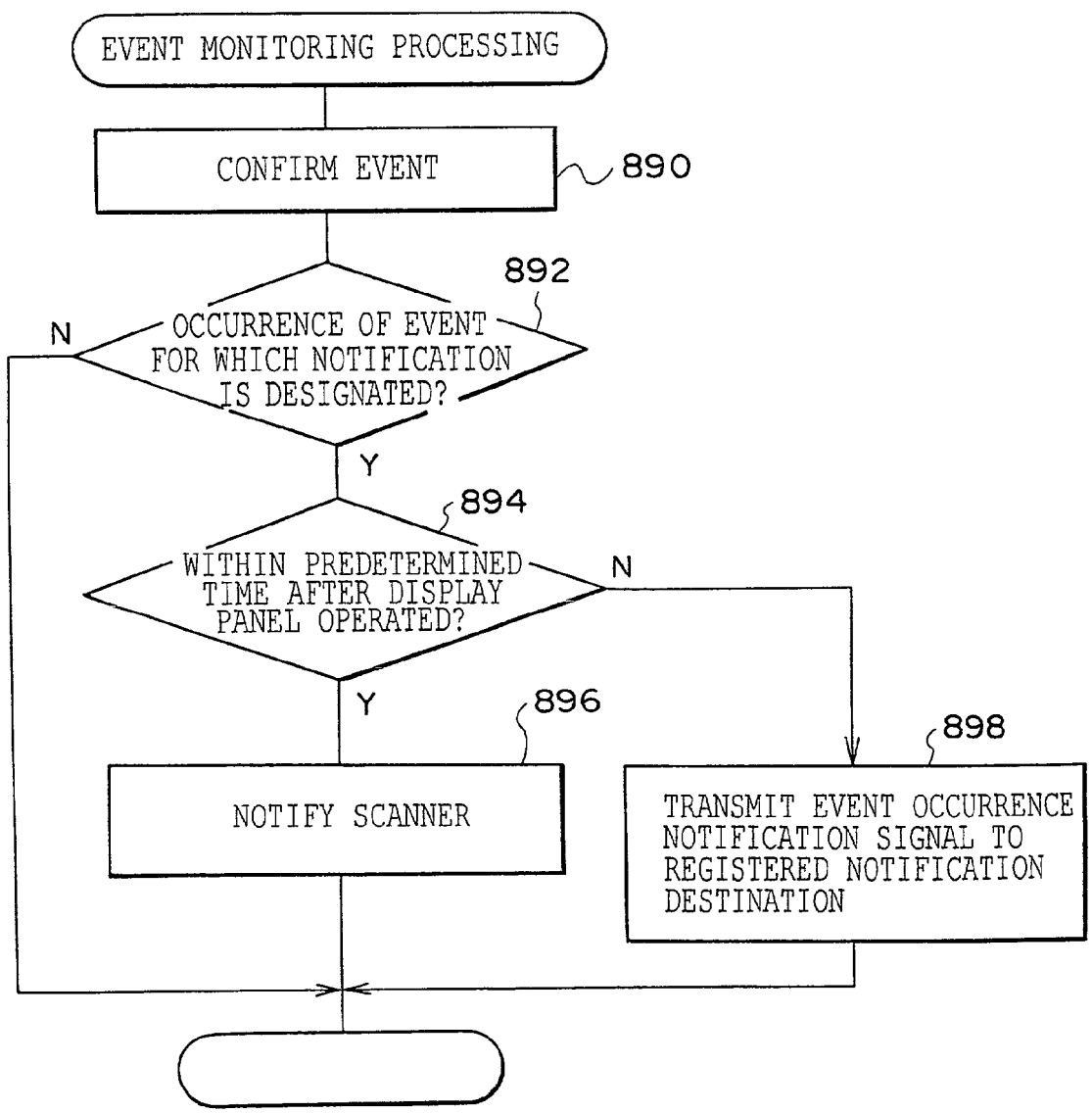
FIG. 45 is an event monitoring processing routine which is executed, in an interrupting manner, by the controller of the server.

The event monitoring processing is processing which is always carried out in a background process at the server 14. This background process will be described hereinafter with reference to FIG. 45. Note that, while the server 14 is starting-up, the process shown in FIG. 45 is always executed repeatedly by the controller 14A in an interrupting manner each time a predetermined period of time passes.

In the event monitoring processing, in step 890, an event, which has occurred at the scanner 12 and the printer 16 which are connected to the network 10, is confirmed.

It is confirmed whether an event, which was registered (stored) in the memory 14C or the database 24 in step 813 or step 835 of previously-described FIG. 43, i.e., an event for which notification has been designated by the operator, has occurred. In a case in which it is within a predetermined period of time from the time the display panel 12B was operated by the operator for image reading or instructing printing, the routine proceeds from step 892 to steps 894 and 896. In step 896, a signal expressing that such an event has occurred is transmitted to the scanner 12. Due to the transmission of this signal, for example, a message based on this signal is displayed on the display panel 12B.

In this way, immediately after the display panel 12B is operated for image reading or to instruct printing, i.e., before the operator moves away from the place of the scanner 12, the occurrence of an event is notified to the scanner 12, and the occurrence of the event can be notified to the operator.

After a period of time which is greater than or equal to the predetermined period of time has elapsed from the time the operator operates the display panel 12B for image reading or instructing printing, if it is confirmed that an event for which notification has been set has arisen, the routine proceeds from step 892 to step 894 and step 898. In step 898, a signal expressing that the event has occurred is transmitted to the notification destination which was registered (stored) in the memory 14C or the database 24 in step 813 or step 835 of previously-described FIG. 43, i.e., to the mail address or the host (client $18_1$ through $18_n$) set as the notification destination by the operator. Due to transmission of this signal, for example, in a case in which the notification destination is a mail address, an e-mail message stating that an event has occurred is transmitted to that mail address, and in a case in which the notification destination is a host (client $18_1$ through $18_n$), a message stating that an event has occurred is displayed on the display provided at that host.

In this way, in a case in which a predetermined period of time passes from operation of the display panel 12B and the operator moves away from the scanner 12 by, for example, returning to his/her desk or going to the printer 16 to pick up the outputted image or the like, the occurrence of the event can be notified to the notification destination set by the operator, and the occurrence of the event can be notified to the operator.

As described above, in the present embodiment, when the operator sets a notification destination and an event occurs at the scanner 12 or the printer 16, the occurrence of the event is notified to the set notification destination. Thus, even if the operator moves away from the location of the scanner 12, the occurrence of the event can be reliably reported.

In the present embodiment, an example is described of a case in which the notification destination of the event changes over time, but it is not necessary for the notification destination to be changed. Further, an example is described of a case in which the operator is notified of the occurrence of an event. However, the mail address of or the host used by the system manager may be set as the notification destination, and the occurrence of the event may be reported to the system manager. Further, an example is described of a case in which setting and registration of notification destinations and types of events to be notified are possible for each job. However, it is possible for a notification destination and types of events to be notified to be set and registered in advance, and for the operator to select the on/off state of event notification for each job. In this way, it is possible for, only in cases of jobs for which event notification is turned on, event notification to be carried out on the basis of the setting information which is set and registered in advance, and it is possible for event notification to not be carried out in cases in which event notification is not selected.

As described above, the eighth embodiment of the present invention has the excellent effect that the operator can reliably be notified of the occurrence of an event.

What is claimed is:

1. An input control device used in a network to which a plurality of image output devices are connected, comprising:
    an information input device at which is displayed an operation screen generated on the basis of operation screen generating information, and which is for input, from the operation screen which is displayed, of information which designates image output devices which are to output images, and information which relates to output formats of images to be outputted from designated image output devices; and
    a transmitting and receiving device which transmits the information which designates image output devices and the information which relates to output formats of images to be outputted, which are inputted from the information input device, and image data inputted from an image data input device, and which receives the operation screen generating information, the operation screen generating information being generated on the basis of attribute information of each of the image output devices transmitted from the respective image output devices,
    wherein a user designates the image output devices among the plurality of image output devices connected to the network,
    the operation screen generating information is generated on the basis of attribute information of the designated image output devices designated by the user among the plurality of image output devices connected to the network,
    the operation screen, which is specific for and common to the designated image output devices designated by the user among the plurality of image output devices connected to the network, is generated on the basis of the operation screen generating information based on the attribute information of the designated image output devices designated by the user among the plurality of image output devices connected to the network to provide a user interface for operating the designated image output devices designated by the user among the plurality of image output devices connected to the network, and
    the operation screen includes a common initiation portion for initiating outputting of images by the designated image output devices designated by the user among the plurality of image output devices connected to the network.

2. An input control device according to claim 1, wherein the operation screen generating information is generated on the basis of common attribute information, which is common for the designated image output devices designated by the user among the plurality of image output devices connected to the network, in the attribute information of the designated image output devices designated by the user among the plurality of image output devices connected to the network.

3. An input control device according to claim 1, wherein the common attribute information is obtained each time when the user designates the image output devices to generate the operation screen which is specific for and common to the designated image output devices designated by the user among the plurality of image output devices connected to the network.

4. An image input device used in an image output system the image output system comprising:
    a plurality of image output devices which are respectively connected to a network, and which output images on the basis of image data and information relating to output formats of images, which image data and information are transmitted via the network; and
    an image output management device which is connected to the network, and which, on the basis of attribute information of each of the plurality of image output devices, generates and transmits a signal for generating an operation screen, and which outputs, to designated image output devices, transmitted information relating to the output formats of the images and transmitted image data,
    wherein the image input device comprises:
    an image data input device for input of the image data;
    a display-and-input device at which is displayed the operation screen generated on the basis of the signal for generating the operation screen, and which is for input, from the operation screen which is displayed, of information which designates image output devices which are to output the images, and information which relates to output formats of the images to be outputted from the designated image output devices; and
    a transmitting and receiving device which is connected to the network, and which transmits, to the image output management device via the network, the information which designates image output devices and the information which relates to output formats of images to be outputted, which are inputted from the display-and-input device, and the image data inputted from the image data input device, and which receives, via the network, the signal for generating the operation screen,
    wherein a user designates the image output devices among the plurality of image output devices connected to the network, and information of the designated image output devices is inputted from the display-and-input device and transmitted, by the transmitting and receiving device, to the image output management device, the image output management device generates the signal for generating the operation screen on the basis of attribute information of the designated image output devices designated by the user among the plurality of image output devices connected to the network, the operation screen, which is specific for and common to the designated image output devices designated by the user among the plurality of image output devices connected to the network, is generated on the basis of the signal for generating the operation screen based on the attribute information of the designated image output devices designated by the user among the plurality of image output devices connected to the network to provide a user interface for operating the designated image output devices designated by the user among the plurality of image output devices connected to the network, and the operation screen includes a common initiation portion for initiating outputting of images by the designated image output devices designated by the user among the plurality of image output devices connected to the network.

5. An image input device used in an image output system according to claim 4, wherein the operation screen is displayed at the display-and-input device and enables designation of two or more of the plurality of image output devices and the two or more image output devices are designated by designating a group which is registered in advance and which is formed from the plurality of image output devices.

6. An image input device according to claim 4 wherein, the image output management device transmits, to each of the plurality of image output devices which are designated, transmitted information relating to the output formats of the images and transmitted image data, the display-and-input device is for input, from the operation screen which is displayed, of information designating the plurality of image output devices which are to output images, and information relating to the output formats of the images to be outputted from each of the plurality of image output devices which are designated, and the transmitting and receiving device transmits, to the image output management device and via the network, the information designating the plurality of image output devices and the information relating to the output formats of the images to be outputted, which are inputted from the display-and-input device, and the image data inputted by a single operation from the image data input device.

7. An image input device according to claim 6, wherein the output formats for each of the plurality of image output devices which are designated are respectively different.

8. An input control device according to claim 4, wherein the signal for generating the operation screen is generated on the basis of common attribute information, which is common for the designated image output devices designated by the user among the plurality of image output devices connected to the network, in the attribute information of the designated image output devices designated by the user among the plurality of image output devices connected to the network.

9. An image output management device connected to a network to which a plurality of image output devices are connected, wherein, on the basis of attribute information of each of the plurality of image output devices, the image output management device generates and transmits information, which is for generating an operation screen at which is inputted information, which designates image output devices which are to output images, and information, which relates to output formats of images to be outputted from the image output devices which are designated;

the image output management device receives the information which designates the image output devices and the information which relates to the output formats of the images, which information are inputted from the operation screen generated on the basis of the information for generating the operation screen;

a display-and-input device is provided at at least one of the plurality of image output devices, or is provided at the image output management device, or is connected via the network, the display-and-input device displaying the operation screen which is generated on the basis of the information for generating the operation screen, and enabling receiving the information which designates the image output devices and the information which relates to the output formats of the images from the operation screen which is displayed; and the image output management device transmits, to the image output devices designated from the operation screen, the received information which relates to the output formats of the images and image data, wherein a user designates the image output devices among the plurality of image output devices connected to the network, and information of the designated image output devices is inputted from the display-and-input device and transmitted to the image output management device, the image output management device generates the information for generating the operation screen on the basis of attribute information of the designated image output devices designated by the user among the plurality of image output devices connected to the network, the operation screen, which is specific for and common to the designated image output devices designated by the user among the plurality of image output devices connected to the network, is generated on the basis of the information for generating the operation screen based on the attribute information of the designated image output devices designated by the user among the plurality of image output devices connected to the network to provide a user interface for operating the designated image output devices designated by the user among the plurality of image output devices connected to the network, and the operation screen includes a common initiation portion for initiating outputting of images by the designated image output devices designated by the user among the plurality of image output devices connected to the network.

10. An image output management device according to claim 9, wherein the image output management device stores attribute information of each of the plurality of image output devices.

11. An image output management device according to claim 9, wherein, on the basis of attribute information of each of the plurality of image output devices, the image output management device generates and transmits, via the network, a signal for generating the operation screen for input of information, which designates the plurality of image output devices which are to output images, and information, which relates to output formats of the images to be outputted from each of the plurality of image output devices which are designated, and the information management device transmits, to each of the plurality of image output devices which are designated from the operation screen, received information relating to the output formats of the images and image data inputted by a single operation.

12. An image output management device according to claim 11, wherein the display-and-input device, at which the operation screen generated on the basis of the signal for generating the operation screen is displayed and which is for input, from the operation screen which is displayed, of the information designating the image output devices and the information relating to the output formats of the images, is one of connected to the network and provided at at least one of the plurality of image output devices.

13. An image output management device according to claim 11, wherein an image data input device, which is for input of the image data, is one of connected to the network and provided at at least one of the plurality of image output devices.

14. An image output management device according to claim 13, wherein the display-and-input device, at which the operation screen generated on the basis of the signal for generating the operation screen is displayed and which is for input, from the operation screen which is displayed, of the information designating the image output devices and the information relating to the output formats of the images, is one of connected to the network or provided at the image data input device.

15. An image output management device according to claim 11, wherein when the image data is transmitted to each of the plurality of image output devices, the image data is converted, in accordance with attributes of the plurality of image output devices which have different attributes and which are designated at the display-and-input device.

16. An input control device according to claim 9, wherein the information for generating the operation screen is generated on the basis of common attribute information, which is common for the designated image output devices designated by the user among the plurality of image output devices connected to the network, in the attribute information of the designated image output devices designated by the user among the plurality of image output devices connected to the network.

17. An image output management device which is connected to a network to which a plurality of image output devices and an image data input device for input of image data are connected,
wherein the image output management device generates and transmits, via the network, a signal for generating an operation screen at which information for operating devices connected to the network is inputted, the signal for generating the operation screen being generated on the basis of attribute information of each of the image output devices transmitted from the respective image output devices;
the image output management device receives, via the network, the information inputted from the operation screen generated on the basis of the signal; and
the image output management device transmits, to the devices connected to the network, received information in order to operate the devices connected to the network,
wherein a user designates the image output devices among the plurality of image output devices connected to the network,
the image output management device generates the signal for generating the operation screen on the basis of attribute information of the designated image output devices designated by the user among the plurality of image output devices connected to the network,
the operation screen, which is specific for and common to the designated image output devices designated by the user among the plurality of image output devices connected to the network, is generated on the basis of the signal for generating the operation screen based on the attribute information of the designated image output devices designated by the user among the plurality of image output devices connected to the network to provide a user interface for operating the designated image output devices designated by the user among the plurality of image output devices connected to the network, and
the operation screen includes a common initiation portion for initiating outputting of images by the designated image output devices designated by the user among the plurality of image output devices connected to the network.

18. An image output management device according to claim 17, wherein the signal for generating the operation screen is generated on the basis of common attribute information, which is common for the designated image output devices designated by the user among the plurality of image output devices connected to the network, in the attribute information of the designated image output devices designated by the user among the plurality of image output devices connected to the network.

19. An image output management device used in an image output system, the image output system comprising:
a plurality of image output devices which are respectively connected to a network, and which output images on the basis of image data and information relating to output formats of images, which image data and information are transmitted via the network;
an image data input device for input of the image data;
a display-and-input device at which is displayed an operation screen generated on the basis of a signal for generating the operation screen, and which is for input, from the operation screen which is displayed, of information which designates image output devices which are to output images, and information which relates to output formats of images to be outputted from the image output devices which are designated; and
a transmitting and receiving device which is connected to the network, and which transmits, via the network, information inputted from the display-and-input device and the image data inputted from the image data input device, and which receives, via the network, the signal for generating the operation screen,
wherein said image output management device is connected to the network, and on the basis of attribute information of each of the plurality of image output devices, generates and transmits, to the transmitting and receiving device, the signal for generating the operation screen, and transmits, to the image output devices which are designated, the image data and the information relating to the output formats of the images, which image data and information are transmitted from the transmitting and receiving device,
wherein a user designates the image output devices among the plurality of image output devices connected to the network, and information of the designated image output devices is inputted from the display-and-input device and transmitted, by the transmitting and receiving device, to the image output management device, the image output management device generates the signal for generating the operation screen on the basis of attribute information of the designated image output devices designated by the user among the plurality of image output devices connected to the network, the operation screen, which is specific for and common to the designated image output devices designated by the user among the plurality of image output devices connected to the network, is generated on the basis of the signal for generating the operation screen based on the attribute information of the designated image output devices designated by the user among the plurality of image output devices connected to the network to provide a user interface for operating the designated image output devices designated by the user among the plurality of image output devices connected to the network, and the operation screen includes a common initiation portion for initiating outputting of images by the designated image output devices designated by the user among the plurality of image output devices connected to the network.

20. An image output management device according to claim 19, wherein, the display-and-input device is for input, from the operation screen which is displayed, of information which designates the plurality of the image output devices which are to output images, and information which relates to output formats of the images to be outputted from each of the plurality of image output devices which are designated, the transmitting and receiving device transmits via the network the information which designates the plurality of the image output devices and the information which relates to output formats of the images to be outputted, which are inputted from the display-and-input device, and image data inputted by a single operation from the image data input device, and wherein the image output management device transmits, to each of the plurality of image output devices which are designated, the image data and the information relating to the output formats of the images, which image data and information are transmitted from the transmitting and receiving device.

21. An image output management device according to claim 19, wherein the signal for generating the operation screen is generated on the basis of common attribute information, which is common for the designated image output devices designated by the user among the plurality of image output devices connected to the network, in the attribute information of the designated image output devices designated by the user among the plurality of image output devices connected to the network.

22. An image output system comprising:

a plurality of image output devices which are respectively connected to a network, and which output images on the basis of image data and information relating to output formats of images, which image data and information are transmitted via the network;

an image data input device for input of the image data;

a display-and-input device at which is displayed an operation screen generated on the basis of a signal for generating the operation screen, and which is for input, from the operation screen which is displayed, of information which designates image output devices which are to output images, and information which relates to output formats of images to be outputted from the image output devices which are designated;

a transmitting and receiving device which is connected to the network, and which transmits, via the network, the information which designates image output devices and the information which relates to output formats of images to be outputted, which are inputted from the display-and-input device, and the image data inputted from the image data input device, and which receives, via the network, the signal for generating the operation screen; and an image output management device which is connected to the network, and which, on the basis of attribute information of each of the plurality of image output devices, generates and transmits, to the transmitting and receiving device, the signal for generating the operation screen, and which transmits, to the image output devices which are designated, the image data and the information relating to the output formats of the images, which image data and information are transmitted from the transmitting and receiving device, wherein a user designates the image output devices among the plurality of image output devices connected to the network, and information of the designated image output devices is inputted from the display-and-input device and transmitted, by the transmitting and receiving device, to the image output management device, the image output management device generates the signal for generating the operation screen on the basis of attribute information of the designated image output devices designated by the user among the plurality of image output devices connected to the network, the operation screen, which is specific for and common to the designated image output devices designated by the user among the plurality of image output devices connected to the network, is generated on the basis of the signal for generating the operation screen based on the attribute information of the designated image output devices designated by the user among the plurality of image output devices connected to the network to provide a user interface for operating the designated image output devices designated by the user among the plurality of image output devices connected to the network, and the operation screen includes a common initiation portion for initiating outputting of images by the designated image output devices designated by the user among the plurality of image output devices connected to the network.

23. An image output system according to claim 22 wherein, the display-and-input device is for input, from the operation screen which is displayed, of information which designates the plurality of image output devices which are to output images, and information which relates to output formats of the images to be outputted from each of the plurality of image output devices which are designated, the transmitting and receiving device transmits, via the network, information inputted from the display-and-input device and image data inputted by a single operation from the image data input device, and the image output management device transmits, to each of the plurality of image output devices which are designated, the image data and the information relating to the output formats of the images, which image data and information are transmitted from the transmitting and receiving device.

24. An image output system according to claim 22, wherein the signal for generating the operation screen is generated on the basis of common attribute information, which is common for the designated image output devices designated by the user among the plurality of image output devices connected to the network, in the attribute information of the designated image output devices designated by the user among the plurality of image output devices connected to the network.

25. A recording medium which is readable by a computer and on which is recorded a program which makes a computer function such that, on the basis of attribute information of each of a plurality of image output devices connected to a network, a signal is generated and transmitted via the network, the signal being for generating an operation screen at which are inputted information, which designates image output devices which are to output images, and information, which relates to output formats of the images to be outputted from image output devices which are designated, the signal for generating the operation screen being generated on the basis of the attribute information of each of the image output devices transmitted from the respective image output devices;

the information which designates the image output devices and the information which relates to the output formats of the images, which information are inputted from the operation screen which is generated on the basis of the signal, are received via the network; and the received information relating to the output formats of the images, and image data are transmitted to the image output devices which are designated from the operation screen, wherein a user designates the image output devices among the plurality of image output devices connected to the network, the signal for generating the operation screen is generated on the basis of attribute information of the designated image output devices designated by the user among the plurality of image output devices connected to the network, the operation screen, which is specific for and common to the designated image output devices designated by the user among the plurality of image output devices connected to the network, is generated on the basis of the signal for generating the operation screen based on the attribute information of the designated image output devices designated by the user among the plurality of image output devices connected to the network to provide a user interface for operating the designated image output devices designated by the user among the plurality of image output devices connected to the network, and the operation screen includes a common initiation portion for initiating outputting of images by the designated image output devices designated by the user among the plurality of image output devices connected to the network.

26. A recording medium according to claim 25, wherein the signal for generating the operation screen is generated on the basis of common attribute information, which is common for the designated image output devices designated by the user among the plurality of image output devices connected to the network, in the attribute information of the designated image output devices designated by the user among the plurality of image output devices connected to the network.

27. An image input device comprising:

an image data input device for input of image data;

a display-and-input device at which an operation screen generated on the basis of a signal for generating the operation screen is displayed, and which is for input, from the operation screen which is displayed, of information designating a plurality of image output devices connected to a network which are to output images, and information relating to output formats of the images to be outputted from each of the plurality of image output devices which are designated, the signal for generating the operation screen being generated on the basis of attribute information of each of the image output devices transmitted from the respective image output devices; and a transmitting and receiving device which transmits, via the network, the information designating the plurality of image output devices and the information relating to output formats of the images to be outputted, which are inputted from the display-and-input device, and the image data inputted by a single operation from the image data input device, and which receives, via the network, the signal for generating the operation screen, wherein a user designates the image output devices among the plurality of image output devices connected to the network, the signal for generating the operation screen is generated on the basis of attribute information of the designated image output devices designated by the user among the plurality of image output devices connected to the network, the operation screen, which is specific for and common to the designated image output devices designated by the user among the plurality of image output devices connected to the network, is generated on the basis of the signal for generating the operation screen based on the attribute information of the designated image output devices designated by the user among the plurality of image output devices connected to the network to provide a user interface for operating the designated image output devices designated by the user among the plurality of image output devices connected to the network, and the operation screen includes a common initiation portion for initiating outputting of images by the designated image output devices designated by the user among the plurality of image output devices connected to the network.

28. A recording medium according to claim 27, wherein the signal for generating the operation screen is generated on the basis of common attribute information, which is common for the designated image output devices designated by the user among the plurality of image output devices connected to the network, in the attribute information of the designated image output devices designated by the user among the plurality of image output devices connected to the network.

* * * * *